United States Patent
Moussette et al.

(10) Patent No.: US 11,921,926 B2
(45) Date of Patent: *Mar. 5, 2024

(54) CONTENT-BASED TACTILE OUTPUTS

(71) Applicant: Apple Inc., Cupertino, CA (US)

(72) Inventors: Camille Moussette, San Francisco, CA (US); David H. Bloom, San Francisco, CA (US); Gary Ian Butcher, Los Gatos, CA (US); Alan C. Dye, San Francisco, CA (US); Dylan Ross Edwards, San Jose, CA (US); Jules K. Fennis, Los Gatos, CA (US); Brian T. Gleeson, Mountain View, CA (US); Miao He, Sunnyvale, CA (US); Matthew J. Sundstrom, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,559

(22) Filed: Sep. 1, 2022

(65) Prior Publication Data
US 2023/0004227 A1    Jan. 5, 2023

Related U.S. Application Data

(63) Continuation of application No. 16/926,512, filed on Jul. 10, 2020, now Pat. No. 11,435,830, which is a
(Continued)

(51) Int. Cl.
*G06F 3/01*      (2006.01)
*G06F 3/0362*    (2013.01)
(Continued)

(52) U.S. Cl.
CPC ............ *G06F 3/016* (2013.01); *G06F 3/0362* (2013.01); *G06F 3/0412* (2013.01); *G06F 3/04845* (2013.01); *G06F 3/0487* (2013.01)

(58) Field of Classification Search
CPC ...... G06F 3/016; G06F 3/0362; G06F 3/0412; G06F 3/04845; G06F 3/0487; G06F 3/04847; G06F 3/0485; G06F 3/04817
See application file for complete search history.

(56) References Cited

U.S. PATENT DOCUMENTS

| 3,357,173 A | 12/1967 | Wyssen |
| 4,185,283 A | 1/1980 | Clark et al. |

(Continued)

FOREIGN PATENT DOCUMENTS

| AU | 2012200689 A1 | 3/2012 |
| AU | 2014100584 A4 | 7/2014 |

(Continued)

OTHER PUBLICATIONS

Final Office Action received for U.S. Appl. No. 17/572,117, dated Dec. 22, 2022, 16 pages.
(Continued)

*Primary Examiner* — Hassan Mrabi
(74) *Attorney, Agent, or Firm* — DLA Piper LLP (US)

(57) ABSTRACT

The present disclosure generally relates to content-based tactile outputs. In some embodiments, user interfaces associated with content-based tactile outputs are described. In some embodiments, user interfaces associated with end-of-content tactile outputs are described. In some embodiments, user interfaces associated with moving a user interface in response to different types of input are described. In some embodiments, user interfaces associated with adjustable item-based tactile outputs are described. In some embodiments, user interfaces associated with input velocity-based tactile outputs are described.

45 Claims, 50 Drawing Sheets

Related U.S. Application Data continuation of application No. 16/144,950, filed on Sep. 27, 2018, now Pat. No. 10,712,824.

(60) Provisional application No. 62/729,978, filed on Sep. 11, 2018.

(51) Int. Cl.
*G06F 3/041* (2006.01)
*G06F 3/04845* (2022.01)
*G06F 3/0487* (2013.01)

(56) References Cited

U.S. PATENT DOCUMENTS

| | | |
|---|---|---|
| 4,358,837 A | 11/1982 | Yamazaki et al. |
| 4,395,134 A | 7/1983 | Luce |
| 4,444,515 A | 4/1984 | Clark et al. |
| 4,445,785 A | 5/1984 | Chambon et al. |
| 4,623,261 A | 11/1986 | Muto |
| 5,088,070 A | 2/1992 | Shiff et al. |
| 5,204,600 A | 4/1993 | Kahkoska |
| 5,220,260 A | 6/1993 | Schuler |
| 5,313,229 A | 5/1994 | Gilligan et al. |
| 5,323,363 A | 6/1994 | Hysek et al. |
| 5,329,501 A | 7/1994 | Meister et al. |
| 5,477,508 A | 12/1995 | Will |
| 5,508,978 A | 4/1996 | Kalbermatter et al. |
| 5,519,393 A | 5/1996 | Brandestini |
| 5,528,260 A | 6/1996 | Kent |
| 5,530,455 A | 6/1996 | Gillick et al. |
| 5,559,761 A | 9/1996 | Frenkel et al. |
| 5,563,631 A | 10/1996 | Masunaga |
| 5,592,195 A | 1/1997 | Misono et al. |
| 5,623,588 A | 4/1997 | Gould |
| 5,689,628 A | 11/1997 | Robertson |
| 5,691,747 A | 11/1997 | Amano |
| 5,739,775 A | 4/1998 | Brandestini |
| 5,751,260 A | 5/1998 | Nappi et al. |
| 5,825,353 A | 10/1998 | Will |
| 5,852,413 A | 12/1998 | Bacchi et al. |
| 5,874,961 A | 2/1999 | Bates et al. |
| 5,903,229 A | 5/1999 | Kishi |
| 5,940,521 A | 8/1999 | East et al. |
| 5,960,366 A | 9/1999 | Duwaer |
| 5,973,670 A | 10/1999 | Barber et al. |
| 5,982,710 A | 11/1999 | Rawat et al. |
| 6,005,579 A | 12/1999 | Sugiyama et al. |
| 6,052,339 A | 4/2000 | Frenkel et al. |
| 6,081,256 A | 6/2000 | Martin et al. |
| 6,128,006 A | 10/2000 | Rosenberg et al. |
| 6,157,381 A | 12/2000 | Bates et al. |
| 6,161,957 A | 12/2000 | Guanter |
| 6,192,258 B1 | 2/2001 | Kamada et al. |
| 6,203,190 B1 | 3/2001 | Stotz |
| 6,249,689 B1 | 6/2001 | Aizawa |
| 6,266,098 B1 | 7/2001 | Cove et al. |
| 6,275,173 B1 | 8/2001 | Wu |
| 6,297,795 B1 | 10/2001 | Kato et al. |
| 6,300,939 B1 | 10/2001 | Decker et al. |
| 6,305,234 B1 | 10/2001 | Thies et al. |
| 6,310,648 B1 | 10/2001 | Miller et al. |
| 6,323,846 B1 | 11/2001 | Westerman et al. |
| 6,336,126 B1 | 1/2002 | Bjorklund et al. |
| 6,339,438 B1 | 1/2002 | Bates et al. |
| 6,351,657 B2 | 2/2002 | Yamada |
| 6,369,794 B1 | 4/2002 | Sakurai et al. |
| 6,380,927 B1 | 4/2002 | Ostrum et al. |
| 6,396,482 B1 | 5/2002 | Griffin et al. |
| 6,411,570 B1 | 6/2002 | Smith |
| 6,477,117 B1 | 11/2002 | Narayanaswami et al. |
| 6,489,950 B1 | 12/2002 | Griffin et al. |
| 6,522,347 B1 | 2/2003 | Sakai et al. |
| 6,525,997 B1 | 2/2003 | Narayanaswami et al. |
| 6,535,461 B1 | 3/2003 | Karhu et al. |
| 6,556,222 B1 | 4/2003 | Narayanaswami |
| 6,570,557 B1 | 5/2003 | Westerman et al. |
| 6,570,583 B1 | 5/2003 | Kung et al. |
| 6,597,374 B1 | 7/2003 | Baker et al. |
| 6,600,936 B1 | 7/2003 | Kärkkäinen et al. |
| 6,636,197 B1 | 10/2003 | Goldenberg et al. |
| 6,636,246 B1 | 10/2003 | Gallo et al. |
| 6,647,338 B1 | 11/2003 | Remlinger et al. |
| 6,661,438 B1 | 12/2003 | Shiraishi et al. |
| 6,677,932 B1 | 1/2004 | Westerman |
| 6,686,904 B1 | 2/2004 | Sherman et al. |
| 6,686,911 B1 | 2/2004 | Levin et al. |
| 6,700,564 B2 | 3/2004 | McLoone et al. |
| 6,720,860 B1 | 4/2004 | Narayanaswami |
| 6,763,226 B1 | 7/2004 | McZeal, Jr. |
| 6,788,220 B2 | 9/2004 | Netzer et al. |
| 6,809,275 B1 | 10/2004 | Cheng et al. |
| 6,809,724 B1 | 10/2004 | Shiraishi et al. |
| 6,842,169 B2 | 1/2005 | Griffin et al. |
| 6,900,793 B2 | 5/2005 | Goh et al. |
| 6,937,228 B2 | 8/2005 | Yu |
| 6,967,642 B2 | 11/2005 | Sangiovanni et al. |
| 6,967,903 B2 | 11/2005 | Guanter et al. |
| 6,972,776 B2 | 12/2005 | Davis et al. |
| 6,977,868 B2 | 12/2005 | Brewer et al. |
| 7,002,558 B2 | 2/2006 | Keely et al. |
| 7,024,625 B2 | 4/2006 | Shalit |
| 7,036,090 B1 | 4/2006 | Nguyen |
| 7,046,230 B2 | 5/2006 | Zadesky et al. |
| 7,058,904 B1 | 6/2006 | Khan et al. |
| 7,075,513 B2 | 7/2006 | Silfverberg et al. |
| 7,081,905 B1 | 7/2006 | Raghunath |
| 7,091,964 B2 | 8/2006 | Wong et al. |
| 7,116,317 B2 | 10/2006 | Gregorio et al. |
| 7,130,664 B1 | 10/2006 | Williams |
| 7,143,355 B2 | 11/2006 | Yamaguchi et al. |
| 7,146,005 B1 | 12/2006 | Anft et al. |
| 7,168,047 B1 | 1/2007 | Huppi et al. |
| 7,227,963 B1 | 6/2007 | Yamada et al. |
| 7,256,770 B2 | 8/2007 | Hinckley et al. |
| 7,272,077 B2 | 9/2007 | Nobs et al. |
| 7,286,063 B2 | 10/2007 | Gauthey et al. |
| 7,286,119 B2 | 10/2007 | Miyashita et al. |
| 7,317,449 B2 | 1/2008 | Robbins et al. |
| 7,333,084 B2 | 2/2008 | Griffin et al. |
| 7,362,312 B2 | 4/2008 | Nurmi |
| 7,423,658 B1 | 9/2008 | Uomori et al. |
| 7,463,239 B2 | 12/2008 | Ledbetter et al. |
| 7,469,381 B2 | 12/2008 | Ording |
| 7,469,386 B2 | 12/2008 | Bear et al. |
| 7,477,890 B1 | 1/2009 | Narayanaswami et al. |
| 7,489,303 B1 | 2/2009 | Pryor |
| 7,499,040 B2 | 3/2009 | Zadesky et al. |
| 7,506,269 B2 | 3/2009 | Lang et al. |
| 7,519,468 B2 | 4/2009 | Orr et al. |
| 7,545,367 B2 | 6/2009 | Sunda et al. |
| 7,552,397 B2 | 6/2009 | Holecek et al. |
| 7,596,761 B2 | 9/2009 | Lemay et al. |
| 7,600,192 B1 | 10/2009 | Hashimoto et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,710,393 B2 | 5/2010 | Tsuk et al. |
| 7,710,409 B2 | 5/2010 | Robbin et al. |
| 7,720,552 B1 | 5/2010 | Lloyd |
| 7,738,911 B2 | 6/2010 | Kim |
| 7,794,138 B2 | 9/2010 | Hilfiker |
| 7,844,914 B2 | 11/2010 | Andre et al. |
| 7,844,915 B2 | 11/2010 | Platzer et al. |
| 7,856,255 B2 | 12/2010 | Tsuchiya et al. |
| 7,876,288 B1 | 1/2011 | Huang |
| 7,903,115 B2 | 3/2011 | Platzer et al. |
| 7,916,157 B1 | 3/2011 | Kelley et al. |
| 7,956,847 B2 | 6/2011 | Christie |
| 7,957,762 B2 | 6/2011 | Herz et al. |
| 7,965,276 B1 | 6/2011 | Martin et al. |
| 8,001,488 B1 | 8/2011 | Lam et al. |
| 8,006,002 B2 | 8/2011 | Kalayjian et al. |

(56) References Cited

U.S. PATENT DOCUMENTS

| | | |
|---|---|---|
| 8,009,144 B2 | 8/2011 | Yajima et al. |
| 8,040,331 B2 | 10/2011 | Hill et al. |
| 8,046,705 B2 | 10/2011 | Hunleth et al. |
| 8,130,205 B2 | 3/2012 | Forstall et al. |
| 8,140,996 B2 | 3/2012 | Tomkins et al. |
| 8,191,011 B2 | 5/2012 | Abanami et al. |
| 8,194,036 B1 | 6/2012 | Geiss et al. |
| 8,196,043 B2 | 6/2012 | Crow et al. |
| 8,201,102 B2 | 6/2012 | Lee et al. |
| 8,239,784 B2 | 8/2012 | Hotelling et al. |
| 8,266,550 B1 | 9/2012 | Cleron et al. |
| 8,279,180 B2 | 10/2012 | Hotelling et al. |
| 8,307,306 B2 | 11/2012 | Komatsu et al. |
| 8,311,727 B2 | 11/2012 | Eckstein et al. |
| 8,375,326 B2 | 2/2013 | Bucher et al. |
| 8,381,135 B2 | 2/2013 | Hotelling et al. |
| 8,427,432 B2 | 4/2013 | Kim et al. |
| 8,448,083 B1 | 5/2013 | Migos et al. |
| 8,479,122 B2 | 7/2013 | Hotelling et al. |
| 8,487,882 B2 | 7/2013 | Inaba et al. |
| 8,533,623 B2 | 9/2013 | St. Jacques |
| 8,549,429 B2 | 10/2013 | Tsuruta et al. |
| 8,566,722 B2 | 10/2013 | Gordon et al. |
| 8,607,156 B1 | 12/2013 | Jania et al. |
| 8,627,236 B2 | 1/2014 | Jung et al. |
| 8,656,311 B1 | 2/2014 | Harper et al. |
| 8,665,209 B2 | 3/2014 | Rimas-Ribikauskas et al. |
| 8,669,944 B2 | 3/2014 | Klinghult et al. |
| 8,669,945 B2 | 3/2014 | Coddington |
| 8,677,283 B2 | 3/2014 | Fong |
| 8,686,944 B1 | 4/2014 | Dayer et al. |
| 8,717,302 B1 | 5/2014 | Qin et al. |
| 8,739,040 B2 | 5/2014 | Graham |
| 8,743,151 B1 | 6/2014 | Fulcher et al. |
| 8,799,816 B2 | 8/2014 | Wells et al. |
| 8,824,245 B2 | 9/2014 | Lau et al. |
| 8,854,318 B2 | 10/2014 | Borovsky et al. |
| 8,860,674 B2 | 10/2014 | Lee et al. |
| 8,868,338 B1 | 10/2014 | Chau et al. |
| 8,952,886 B2 | 2/2015 | Tsuk et al. |
| 8,954,887 B1 | 2/2015 | Mendis et al. |
| 9,001,625 B2 | 4/2015 | Essery et al. |
| 9,007,057 B2 | 4/2015 | Villaret |
| 9,007,302 B1 | 4/2015 | Bandt-Horn |
| 9,007,323 B2 | 4/2015 | Araki |
| 9,011,292 B2 | 4/2015 | Weast et al. |
| 9,104,705 B2 | 8/2015 | Fujinaga |
| 9,158,440 B1 | 10/2015 | Lider et al. |
| 9,176,652 B1 | 11/2015 | Patel et al. |
| 9,182,876 B2 | 11/2015 | Kim et al. |
| 9,189,089 B2 | 11/2015 | Sutton et al. |
| 9,195,219 B2 | 11/2015 | Hong et al. |
| 9,223,483 B2 | 12/2015 | Thorsander et al. |
| 9,229,624 B2 | 1/2016 | Wei et al. |
| 9,268,400 B2 | 2/2016 | Gomez Sainz-Garcia |
| 9,395,867 B2 | 7/2016 | Yach et al. |
| 9,395,905 B2 | 7/2016 | Wherry |
| 9,423,938 B1 | 8/2016 | Morris |
| 9,442,649 B2 | 9/2016 | Davis et al. |
| 9,448,691 B2 | 9/2016 | Suda |
| 9,454,229 B1 | 9/2016 | Wellen |
| 9,503,402 B2 | 11/2016 | Cue et al. |
| D778,912 S | 2/2017 | Akana et al. |
| 9,582,187 B2 | 2/2017 | Gil et al. |
| 9,620,312 B2 | 4/2017 | Ely et al. |
| 9,646,471 B2 | 5/2017 | Agarwal |
| 9,651,922 B2 | 5/2017 | Hysek et al. |
| 9,666,178 B2 | 5/2017 | Loubiere et al. |
| 9,678,571 B1 | 6/2017 | Robert et al. |
| 9,684,398 B1 | 6/2017 | Samuel et al. |
| 9,696,809 B2 | 7/2017 | Temple |
| 9,729,695 B2 | 8/2017 | Seo et al. |
| 9,772,769 B2 | 9/2017 | Shimazu |
| 9,792,014 B2 | 10/2017 | Feiereisen et al. |
| 9,798,443 B1 | 10/2017 | Gray |
| 9,823,828 B2 | 11/2017 | Zambetti et al. |
| 9,841,874 B2 | 12/2017 | Gu |
| 9,860,200 B1 | 1/2018 | Braun et al. |
| 9,870,114 B1 | 1/2018 | Jones et al. |
| D813,239 S | 3/2018 | Akana et al. |
| 9,921,711 B2 | 3/2018 | Oh et al. |
| 9,965,144 B2 | 5/2018 | Nakamura et al. |
| 9,971,495 B2 | 5/2018 | Shetty et al. |
| 9,984,539 B2 | 5/2018 | Moussette et al. |
| 10,019,097 B2 | 7/2018 | Ely et al. |
| 10,025,458 B2 | 7/2018 | Chaudhri et al. |
| 10,025,461 B2 | 7/2018 | Liu et al. |
| 10,048,802 B2 | 8/2018 | Shedletsky et al. |
| 10,057,470 B2 | 8/2018 | Kim et al. |
| 10,097,496 B2 | 10/2018 | Dye et al. |
| 10,133,439 B1 | 11/2018 | Brichter et al. |
| 10,152,196 B2 | 12/2018 | Jeong et al. |
| 10,175,652 B2 | 1/2019 | Ely et al. |
| 10,216,147 B2 | 2/2019 | Ely et al. |
| 10,216,352 B2 | 2/2019 | Liang et al. |
| 10,222,909 B2 | 3/2019 | Shedletsky et al. |
| 10,275,117 B2 | 4/2019 | Zambetti et al. |
| D849,749 S | 5/2019 | Akana et al. |
| 10,289,218 B1 | 5/2019 | Young |
| 10,296,125 B2 | 5/2019 | Ely et al. |
| 10,324,620 B2 | 6/2019 | Balaram |
| 10,331,081 B2 | 6/2019 | Ely et al. |
| 10,331,082 B2 | 6/2019 | Ely et al. |
| 10,339,721 B1 | 7/2019 | Dascola et al. |
| 10,388,325 B1 | 8/2019 | Badash et al. |
| 10,389,675 B2 | 8/2019 | Grandhi |
| 10,417,879 B2 | 9/2019 | Moussette et al. |
| 10,504,340 B2 | 12/2019 | Moussette et al. |
| 10,642,467 B2 | 5/2020 | Merminod et al. |
| 10,664,074 B2 | 5/2020 | Moussette et al. |
| 10,664,120 B1 | 5/2020 | Jones et al. |
| 10,852,700 B2 | 12/2020 | Abramov |
| 10,977,911 B2 | 4/2021 | Moussette et al. |
| 11,068,128 B2 | 7/2021 | Zambetti et al. |
| 11,140,255 B2 | 10/2021 | Seo et al. |
| 2001/0004337 A1 | 6/2001 | Paratte et al. |
| 2001/0011991 A1 | 8/2001 | Wang et al. |
| 2001/0035884 A1 | 11/2001 | Kikinis et al. |
| 2001/0041596 A1 | 11/2001 | Forlenzo et al. |
| 2001/0043514 A1 | 11/2001 | Kita et al. |
| 2002/0015024 A1 | 2/2002 | Westerman et al. |
| 2002/0019296 A1 | 2/2002 | Freeman et al. |
| 2002/0027547 A1 | 3/2002 | Kamijo et al. |
| 2002/0030665 A1 | 3/2002 | Ano |
| 2002/0030668 A1 | 3/2002 | Hoshino et al. |
| 2002/0036623 A1 | 3/2002 | Kano et al. |
| 2002/0047860 A1 | 4/2002 | Ceulaer et al. |
| 2002/0054164 A1 | 5/2002 | Uemura |
| 2002/0063684 A1 | 5/2002 | Tran |
| 2002/0069071 A1 | 6/2002 | Knockeart et al. |
| 2002/0101457 A1 | 8/2002 | Lang |
| 2002/0101458 A1 | 8/2002 | Sangiovanni |
| 2002/0118169 A1 | 8/2002 | Hinckley et al. |
| 2002/0126099 A1 | 9/2002 | Engholm |
| 2002/0140633 A1 | 10/2002 | Rafii et al. |
| 2002/0154150 A1 | 10/2002 | Ogaki et al. |
| 2002/0154175 A1 | 10/2002 | Abello et al. |
| 2002/0171689 A1 | 11/2002 | Fox et al. |
| 2002/0186621 A1 | 12/2002 | Lai et al. |
| 2003/0020671 A1 | 1/2003 | Santoro et al. |
| 2003/0025673 A1 | 2/2003 | Ledbetter et al. |
| 2003/0052901 A1 | 3/2003 | Fukuchi |
| 2003/0076301 A1 | 4/2003 | Tsuk et al. |
| 2003/0098891 A1 | 5/2003 | Molander et al. |
| 2003/0103044 A1 | 6/2003 | Sunda et al. |
| 2003/0112279 A1 | 6/2003 | Irimajiri |
| 2003/0115384 A1 | 6/2003 | Sonehara et al. |
| 2003/0117440 A1 | 6/2003 | Hellyar et al. |
| 2003/0122787 A1 | 7/2003 | Zimmerman et al. |
| 2003/0123329 A1 | 7/2003 | Guanter et al. |
| 2003/0128192 A1 | 7/2003 | Van Os |
| 2003/0137540 A1 | 7/2003 | Klevenz et al. |
| 2003/0142081 A1 | 7/2003 | Iizuka et al. |
| 2003/0142288 A1 | 7/2003 | Kinrot et al. |

(56) References Cited

U.S. PATENT DOCUMENTS

| | | |
|---|---|---|
| 2003/0189598 A1 | 10/2003 | Lipstein et al. |
| 2003/0210259 A1 | 11/2003 | Liu et al. |
| 2003/0210286 A1 | 11/2003 | Gerpheide et al. |
| 2004/0013042 A1 | 1/2004 | Farine et al. |
| 2004/0027793 A1 | 2/2004 | Haraguchi et al. |
| 2004/0038667 A1 | 2/2004 | Vance |
| 2004/0042347 A1 | 3/2004 | Born et al. |
| 2004/0047244 A1 | 3/2004 | Iino et al. |
| 2004/0061678 A1 | 4/2004 | Goh et al. |
| 2004/0073935 A1 | 4/2004 | Kang |
| 2004/0085328 A1 | 5/2004 | Maruyama et al. |
| 2004/0100479 A1 | 5/2004 | Nakano et al. |
| 2004/0113819 A1 | 6/2004 | Gauthey et al. |
| 2004/0130580 A1 | 7/2004 | Howard et al. |
| 2004/0130581 A1 | 7/2004 | Howard et al. |
| 2004/0145595 A1 | 7/2004 | Bennett |
| 2004/0150621 A1 | 8/2004 | Bohn |
| 2004/0155907 A1 | 8/2004 | Yamaguchi et al. |
| 2004/0164973 A1 | 8/2004 | Nakano et al. |
| 2004/0170270 A1 | 9/2004 | Takashima et al. |
| 2004/0218472 A1 | 11/2004 | Narayanaswami et al. |
| 2004/0225613 A1 | 11/2004 | Narayanaswami et al. |
| 2004/0230599 A1 | 11/2004 | Moore et al. |
| 2004/0233162 A1 | 11/2004 | Kobayashi |
| 2004/0239649 A1 | 12/2004 | Ludtke et al. |
| 2004/0239692 A1 | 12/2004 | Balle et al. |
| 2004/0252119 A1 | 12/2004 | Hunleth et al. |
| 2004/0264301 A1 | 12/2004 | Howard et al. |
| 2005/0007884 A1 | 1/2005 | Lorenzato et al. |
| 2005/0012723 A1 | 1/2005 | Pallakoff |
| 2005/0030279 A1 | 2/2005 | Fu |
| 2005/0081164 A1 | 4/2005 | Hama et al. |
| 2005/0097466 A1 | 5/2005 | Levi et al. |
| 2005/0116941 A1 | 6/2005 | Wallington et al. |
| 2005/0119031 A1 | 6/2005 | Spalink et al. |
| 2005/0136955 A1 | 6/2005 | Mumick et al. |
| 2005/0164623 A1 | 7/2005 | Huynh |
| 2005/0168566 A1 | 8/2005 | Tada et al. |
| 2005/0183012 A1 | 8/2005 | Petro et al. |
| 2005/0190059 A1 | 9/2005 | Wehrenberg |
| 2005/0191994 A1 | 9/2005 | May et al. |
| 2005/0195216 A1 | 9/2005 | Kramer et al. |
| 2005/0209051 A1 | 9/2005 | Santomassimo et al. |
| 2005/0215848 A1 | 9/2005 | Lorenzato et al. |
| 2005/0231489 A1 | 10/2005 | Ladouceur et al. |
| 2005/0259077 A1 | 11/2005 | Adams et al. |
| 2006/0007129 A1 | 1/2006 | Pletikosa et al. |
| 2006/0017692 A1 | 1/2006 | Wehrenberg et al. |
| 2006/0020904 A1 | 1/2006 | Aaltonen et al. |
| 2006/0022956 A1 | 2/2006 | Lengeling et al. |
| 2006/0025091 A1 | 2/2006 | Buford |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0028444 A1 | 2/2006 | Hinckley et al. |
| 2006/0028446 A1 | 2/2006 | Liberty et al. |
| 2006/0033724 A1 | 2/2006 | Chaudhri et al. |
| 2006/0054427 A1 | 3/2006 | Jasso et al. |
| 2006/0064716 A1 | 3/2006 | Sull et al. |
| 2006/0069604 A1 | 3/2006 | Leukart et al. |
| 2006/0082554 A1 | 4/2006 | Caine et al. |
| 2006/0085751 A1 | 4/2006 | O'Brien et al. |
| 2006/0090090 A1 | 4/2006 | Perng et al. |
| 2006/0092177 A1 | 5/2006 | Blasko et al. |
| 2006/0095846 A1 | 5/2006 | Nurmi |
| 2006/0112350 A1 | 5/2006 | Kato et al. |
| 2006/0143574 A1 | 6/2006 | Ito et al. |
| 2006/0152480 A1 | 7/2006 | Senn |
| 2006/0161861 A1 | 7/2006 | Holecek et al. |
| 2006/0174213 A1 | 8/2006 | Kato |
| 2006/0181506 A1 | 8/2006 | Fyke et al. |
| 2006/0197753 A1 | 9/2006 | Hotelling |
| 2006/0212905 A1 | 9/2006 | Matsuda et al. |
| 2006/0224945 A1 | 10/2006 | Khan et al. |
| 2006/0255683 A1 | 11/2006 | Suzuki et al. |
| 2006/0267994 A1 | 11/2006 | Pfleging et al. |
| 2006/0268019 A1 | 11/2006 | Wang et al. |
| 2006/0268020 A1 | 11/2006 | Han |
| 2006/0290671 A1 | 12/2006 | Bohn et al. |
| 2007/0002019 A1 | 1/2007 | Lane et al. |
| 2007/0030256 A1 | 2/2007 | Akaike et al. |
| 2007/0031119 A1 | 2/2007 | Iwanaga |
| 2007/0036346 A1 | 2/2007 | Kwon |
| 2007/0046635 A1 | 3/2007 | Nishiyama et al. |
| 2007/0063995 A1 | 3/2007 | Bailey et al. |
| 2007/0070090 A1 | 3/2007 | Debettencourt et al. |
| 2007/0073917 A1 | 3/2007 | Larson et al. |
| 2007/0085841 A1 | 4/2007 | Tsuk et al. |
| 2007/0097151 A1 | 5/2007 | Rosenberg |
| 2007/0098395 A1 | 5/2007 | Battles et al. |
| 2007/0106949 A1 | 5/2007 | Narita et al. |
| 2007/0120819 A1 | 5/2007 | Young et al. |
| 2007/0132733 A1 | 6/2007 | Ram |
| 2007/0132789 A1 | 6/2007 | Ording et al. |
| 2007/0136679 A1 | 6/2007 | Yang |
| 2007/0146337 A1 | 6/2007 | Ording et al. |
| 2007/0150830 A1 | 6/2007 | Ording et al. |
| 2007/0157094 A1 | 7/2007 | Lemay et al. |
| 2007/0168369 A1 | 7/2007 | Bruns |
| 2007/0176910 A1 | 8/2007 | Simek et al. |
| 2007/0180379 A1 | 8/2007 | Osato et al. |
| 2007/0182595 A1 | 8/2007 | Ghasabian |
| 2007/0182999 A1 | 8/2007 | Anthony et al. |
| 2007/0188460 A1 | 8/2007 | Bells et al. |
| 2007/0209017 A1 | 9/2007 | Gupta et al. |
| 2007/0211042 A1 | 9/2007 | Kim et al. |
| 2007/0216661 A1 | 9/2007 | Chen et al. |
| 2007/0226646 A1 | 9/2007 | Nagiyama et al. |
| 2007/0229458 A1 | 10/2007 | Moon |
| 2007/0236475 A1 | 10/2007 | Wherry |
| 2007/0236479 A1 | 10/2007 | Wang et al. |
| 2007/0237493 A1 | 10/2007 | Hall et al. |
| 2007/0239837 A1 | 10/2007 | Jablokov et al. |
| 2007/0242569 A1 | 10/2007 | Inoue et al. |
| 2007/0247435 A1 | 10/2007 | Benko et al. |
| 2007/0279401 A1 | 12/2007 | Ramstein et al. |
| 2007/0290045 A1 | 12/2007 | Cisar |
| 2007/0291018 A1 | 12/2007 | Park et al. |
| 2007/0296711 A1 | 12/2007 | Yee et al. |
| 2008/0001915 A1 | 1/2008 | Pihlaja et al. |
| 2008/0004084 A1 | 1/2008 | Park et al. |
| 2008/0019494 A1 | 1/2008 | Toda |
| 2008/0020810 A1 | 1/2008 | Park |
| 2008/0033779 A1 | 2/2008 | Coffman et al. |
| 2008/0040692 A1 | 2/2008 | Sunday et al. |
| 2008/0043028 A1 | 2/2008 | Tanaka |
| 2008/0052643 A1 | 2/2008 | Ike et al. |
| 2008/0052945 A1 | 3/2008 | Matas et al. |
| 2008/0055241 A1 | 3/2008 | Goldenberg et al. |
| 2008/0062127 A1 | 3/2008 | Brodersen et al. |
| 2008/0062141 A1 | 3/2008 | Chaudhri |
| 2008/0066135 A1 | 3/2008 | Brodersen et al. |
| 2008/0096593 A1 | 4/2008 | Park |
| 2008/0098313 A1 | 4/2008 | Pollack |
| 2008/0102786 A1 | 5/2008 | Griffin |
| 2008/0109764 A1 | 5/2008 | Linnamaki |
| 2008/0123473 A1 | 5/2008 | Ozawa et al. |
| 2008/0125196 A1 | 5/2008 | Ryu |
| 2008/0129520 A1 | 6/2008 | Lee |
| 2008/0130421 A1 | 6/2008 | Akaiwa et al. |
| 2008/0148177 A1 | 6/2008 | Lang et al. |
| 2008/0150901 A1 | 6/2008 | Lowles et al. |
| 2008/0155461 A1 | 6/2008 | Ozaki et al. |
| 2008/0155475 A1 | 6/2008 | Duhig et al. |
| 2008/0158149 A1 | 7/2008 | Levin |
| 2008/0163116 A1 | 7/2008 | Lee et al. |
| 2008/0163119 A1 | 7/2008 | Kim et al. |
| 2008/0163121 A1 | 7/2008 | Lee et al. |
| 2008/0165124 A1 | 7/2008 | Kim |
| 2008/0165140 A1 | 7/2008 | Christie et al. |
| 2008/0165152 A1 | 7/2008 | Forstall et al. |
| 2008/0165153 A1 | 7/2008 | Platzer et al. |
| 2008/0165161 A1 | 7/2008 | Platzer et al. |
| 2008/0165210 A1 | 7/2008 | Platzer et al. |

(56) References Cited

U.S. PATENT DOCUMENTS

| | | |
|---|---|---|
| 2008/0168349 A1 | 7/2008 | Lamiraux et al. |
| 2008/0168364 A1 | 7/2008 | Miller et al. |
| 2008/0168382 A1 | 7/2008 | Louch et al. |
| 2008/0168384 A1 | 7/2008 | Platzer et al. |
| 2008/0168404 A1 | 7/2008 | Ording |
| 2008/0168478 A1 | 7/2008 | Platzer et al. |
| 2008/0172634 A1 | 7/2008 | Choi et al. |
| 2008/0174570 A1 | 7/2008 | Jobs et al. |
| 2008/0184159 A1 | 7/2008 | Selig |
| 2008/0186808 A1 | 8/2008 | Lee |
| 2008/0201649 A1 | 8/2008 | Mattila et al. |
| 2008/0204478 A1 | 8/2008 | Hung |
| 2008/0207281 A1 | 8/2008 | Tsuchiya et al. |
| 2008/0216001 A1 | 9/2008 | Ording et al. |
| 2008/0224995 A1 | 9/2008 | Perkunder |
| 2008/0225014 A1 | 9/2008 | Kim |
| 2008/0257701 A1 | 10/2008 | Wlotzka et al. |
| 2008/0259025 A1 | 10/2008 | Eom |
| 2008/0279475 A1 | 11/2008 | Lee et al. |
| 2008/0288880 A1 | 11/2008 | Reponen et al. |
| 2008/0318635 A1 | 12/2008 | Yoon et al. |
| 2008/0320391 A1 | 12/2008 | Lemay et al. |
| 2009/0002396 A1 | 1/2009 | Andrews et al. |
| 2009/0007019 A1 | 1/2009 | Kobayashi et al. |
| 2009/0015550 A1 | 1/2009 | Koski et al. |
| 2009/0030800 A1 | 1/2009 | Grois |
| 2009/0046110 A1 | 2/2009 | Sadler et al. |
| 2009/0050465 A1 | 2/2009 | Asada et al. |
| 2009/0051649 A1 | 2/2009 | Rondel |
| 2009/0059730 A1 | 3/2009 | Lyons et al. |
| 2009/0064031 A1 | 3/2009 | Bull et al. |
| 2009/0070675 A1 | 3/2009 | Li |
| 2009/0070705 A1 | 3/2009 | Ording |
| 2009/0070711 A1 | 3/2009 | Kwak et al. |
| 2009/0079695 A1 | 3/2009 | Tatehata et al. |
| 2009/0079698 A1 | 3/2009 | Takashima et al. |
| 2009/0098912 A1 | 4/2009 | Kim et al. |
| 2009/0100373 A1 | 4/2009 | Pixley et al. |
| 2009/0102817 A1 | 4/2009 | Bathiche et al. |
| 2009/0109069 A1 | 4/2009 | Takasaki et al. |
| 2009/0119678 A1 | 5/2009 | Shih et al. |
| 2009/0125811 A1 | 5/2009 | Bethurum |
| 2009/0141046 A1 | 6/2009 | Rathnam et al. |
| 2009/0143117 A1 | 6/2009 | Shin et al. |
| 2009/0144642 A1 | 6/2009 | Crystal |
| 2009/0144654 A1 | 6/2009 | Brouwer et al. |
| 2009/0152452 A1 | 6/2009 | Lee et al. |
| 2009/0153288 A1 | 6/2009 | Hope et al. |
| 2009/0156255 A1 | 6/2009 | Shin et al. |
| 2009/0164937 A1 | 6/2009 | Alviar et al. |
| 2009/0174677 A1 | 7/2009 | Gehani et al. |
| 2009/0177538 A1 | 7/2009 | Brewer et al. |
| 2009/0177966 A1 | 7/2009 | Chaudhri |
| 2009/0189915 A1 | 7/2009 | Mercer et al. |
| 2009/0193359 A1 | 7/2009 | Anthony et al. |
| 2009/0196124 A1 | 8/2009 | Mooring et al. |
| 2009/0199130 A1 | 8/2009 | Tsern et al. |
| 2009/0204920 A1 | 8/2009 | Beverley et al. |
| 2009/0204929 A1 | 8/2009 | Baurmann et al. |
| 2009/0228825 A1 | 9/2009 | Van Os et al. |
| 2009/0231271 A1 | 9/2009 | Heubel et al. |
| 2009/0237372 A1 | 9/2009 | Kim et al. |
| 2009/0241150 A1 | 9/2009 | White et al. |
| 2009/0280907 A1 | 11/2009 | Larsen et al. |
| 2009/0288035 A1 | 11/2009 | Tunning et al. |
| 2009/0288039 A1 | 11/2009 | Mail et al. |
| 2009/0289905 A1 | 11/2009 | Ahn |
| 2009/0313299 A1 | 12/2009 | Bonev et al. |
| 2009/0315848 A1 | 12/2009 | Ku et al. |
| 2009/0315867 A1 | 12/2009 | Sakamoto et al. |
| 2009/0325563 A1 | 12/2009 | Horodezky et al. |
| 2010/0001967 A1 | 1/2010 | Yoo |
| 2010/0004031 A1 | 1/2010 | Kim |
| 2010/0004033 A1 | 1/2010 | Choe et al. |
| 2010/0017748 A1 | 1/2010 | Taylor et al. |
| 2010/0017872 A1 | 1/2010 | Goertz et al. |
| 2010/0026640 A1 | 2/2010 | Kim et al. |
| 2010/0029327 A1 | 2/2010 | Jee |
| 2010/0058223 A1 | 3/2010 | Price et al. |
| 2010/0058226 A1 | 3/2010 | Flake et al. |
| 2010/0058240 A1 | 3/2010 | Bull et al. |
| 2010/0070926 A1 | 3/2010 | Abanami et al. |
| 2010/0073692 A1 | 3/2010 | Waltman et al. |
| 2010/0079500 A1 | 4/2010 | Osullivan et al. |
| 2010/0088634 A1 | 4/2010 | Tsuruta et al. |
| 2010/0093400 A1 | 4/2010 | Ju et al. |
| 2010/0099462 A1 | 4/2010 | Baek et al. |
| 2010/0100137 A1 | 4/2010 | Justis et al. |
| 2010/0110044 A1 | 5/2010 | Englund |
| 2010/0113101 A1 | 5/2010 | Tanada |
| 2010/0128570 A1 | 5/2010 | Smith et al. |
| 2010/0141609 A1 | 6/2010 | Frisbee |
| 2010/0146387 A1 | 6/2010 | Hoover |
| 2010/0148945 A1 | 6/2010 | Yun et al. |
| 2010/0164908 A1 | 7/2010 | Hill et al. |
| 2010/0169097 A1 | 7/2010 | Nachman et al. |
| 2010/0173678 A1 | 7/2010 | Kim et al. |
| 2010/0175006 A1 | 7/2010 | Li |
| 2010/0187074 A1 | 7/2010 | Manni |
| 2010/0188268 A1 | 7/2010 | Grignani et al. |
| 2010/0199232 A1 | 8/2010 | Mistry et al. |
| 2010/0211498 A1 | 8/2010 | Aabye et al. |
| 2010/0211908 A1 | 8/2010 | Luk et al. |
| 2010/0211919 A1 | 8/2010 | Brown et al. |
| 2010/0214243 A1 | 8/2010 | Birnbaum et al. |
| 2010/0220562 A1 | 9/2010 | Hozumi et al. |
| 2010/0223055 A1 | 9/2010 | McLean |
| 2010/0235742 A1 | 9/2010 | Hsu et al. |
| 2010/0248778 A1 | 9/2010 | Biswas |
| 2010/0251168 A1 | 9/2010 | Fujita et al. |
| 2010/0259481 A1 | 10/2010 | Oh et al. |
| 2010/0262928 A1 | 10/2010 | Abbott |
| 2010/0267424 A1 | 10/2010 | Kim et al. |
| 2010/0269038 A1 | 10/2010 | Tsuda |
| 2010/0269108 A1 | 10/2010 | Boudreau et al. |
| 2010/0271312 A1 | 10/2010 | Alameh et al. |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0271401 A1 | 10/2010 | Fong |
| 2010/0277126 A1 | 11/2010 | Naeimi et al. |
| 2010/0283743 A1 | 11/2010 | Coddington |
| 2010/0302172 A1 | 12/2010 | Wilairat et al. |
| 2010/0315417 A1 | 12/2010 | Cho et al. |
| 2010/0325575 A1 | 12/2010 | Platzer et al. |
| 2010/0331145 A1 | 12/2010 | Lakovic et al. |
| 2011/0006980 A1 | 1/2011 | Taniguchi et al. |
| 2011/0014956 A1 | 1/2011 | Lee et al. |
| 2011/0022472 A1 | 1/2011 | Zon |
| 2011/0025311 A1 | 2/2011 | Chauvin et al. |
| 2011/0025624 A1 | 2/2011 | Goto |
| 2011/0047491 A1 | 2/2011 | Hwang et al. |
| 2011/0055752 A1 | 3/2011 | Rubinstein et al. |
| 2011/0057877 A1 | 3/2011 | Nagashima et al. |
| 2011/0057886 A1 | 3/2011 | Ng et al. |
| 2011/0072345 A1 | 3/2011 | Lim |
| 2011/0074699 A1 | 3/2011 | Marr et al. |
| 2011/0074719 A1 | 3/2011 | Yeh et al. |
| 2011/0074828 A1 | 3/2011 | Capela et al. |
| 2011/0078560 A1 | 3/2011 | Weeldreyer et al. |
| 2011/0078622 A1 | 3/2011 | Missig et al. |
| 2011/0081889 A1 | 4/2011 | Gao et al. |
| 2011/0086613 A1 | 4/2011 | Doudkine et al. |
| 2011/0087982 A1 | 4/2011 | McCann et al. |
| 2011/0090255 A1 | 4/2011 | Wilson et al. |
| 2011/0093812 A1 | 4/2011 | Fong |
| 2011/0095993 A1 | 4/2011 | Zuverink |
| 2011/0099509 A1 | 4/2011 | Horagai et al. |
| 2011/0102455 A1 | 5/2011 | Temple |
| 2011/0107264 A1 | 5/2011 | Akella |
| 2011/0119578 A1 | 5/2011 | Schwartz |
| 2011/0126097 A1 | 5/2011 | Isono |
| 2011/0126139 A1 | 5/2011 | Jeong et al. |
| 2011/0126155 A1 | 5/2011 | Krishnaraj et al. |

(56) References Cited

U.S. PATENT DOCUMENTS

| | | |
|---|---|---|
| 2011/0128226 A1 | 6/2011 | Jensen |
| 2011/0131494 A1 | 6/2011 | Ono et al. |
| 2011/0131531 A1 | 6/2011 | Russell et al. |
| 2011/0145759 A1 | 6/2011 | Leffert et al. |
| 2011/0157046 A1 | 6/2011 | Lee et al. |
| 2011/0161853 A1 | 6/2011 | Park |
| 2011/0164042 A1 | 7/2011 | Chaudhri |
| 2011/0167262 A1 | 7/2011 | Ross et al. |
| 2011/0167369 A1 | 7/2011 | Van Os |
| 2011/0167382 A1 | 7/2011 | Van Os |
| 2011/0187355 A1 | 8/2011 | Dixon et al. |
| 2011/0197160 A1 | 8/2011 | Kim et al. |
| 2011/0199342 A1 | 8/2011 | Vartanian et al. |
| 2011/0202834 A1 | 8/2011 | Mandryk et al. |
| 2011/0202859 A1 | 8/2011 | Fong |
| 2011/0202861 A1 | 8/2011 | Fritzley et al. |
| 2011/0202866 A1 | 8/2011 | Huang et al. |
| 2011/0202878 A1 | 8/2011 | Park et al. |
| 2011/0209104 A1 | 8/2011 | Hinckley et al. |
| 2011/0210834 A1 | 9/2011 | Pasquero et al. |
| 2011/0210926 A1 | 9/2011 | Pasquero et al. |
| 2011/0224967 A1 | 9/2011 | Van |
| 2011/0225543 A1 | 9/2011 | Arnold et al. |
| 2011/0234633 A1 | 9/2011 | Ogura et al. |
| 2011/0235469 A1 | 9/2011 | Irwin |
| 2011/0248948 A1 | 10/2011 | Griffin et al. |
| 2011/0252357 A1 | 10/2011 | Chaudhri |
| 2011/0252362 A1 | 10/2011 | Cho et al. |
| 2011/0252369 A1 | 10/2011 | Chaudhri |
| 2011/0271183 A1 | 11/2011 | Bose et al. |
| 2011/0271233 A1 | 11/2011 | Radakovitz et al. |
| 2011/0279384 A1 | 11/2011 | Miller et al. |
| 2011/0291945 A1 | 12/2011 | Ewing et al. |
| 2011/0296312 A1 | 12/2011 | Boyer et al. |
| 2011/0298830 A1 | 12/2011 | Lam |
| 2011/0300910 A1 | 12/2011 | Choi |
| 2011/0300915 A1 | 12/2011 | Stoustrup et al. |
| 2011/0302493 A1 | 12/2011 | Runstedler et al. |
| 2011/0307842 A1 | 12/2011 | Chiang et al. |
| 2011/0316888 A1 | 12/2011 | Sachs et al. |
| 2012/0011437 A1 | 1/2012 | James et al. |
| 2012/0019513 A1 | 1/2012 | Fong et al. |
| 2012/0026198 A1 | 2/2012 | Maesaka |
| 2012/0030566 A1 | 2/2012 | Victor et al. |
| 2012/0030627 A1 | 2/2012 | Nurmi et al. |
| 2012/0032988 A1 | 2/2012 | Katayama et al. |
| 2012/0038582 A1 | 2/2012 | Grant |
| 2012/0044267 A1 | 2/2012 | Fino et al. |
| 2012/0050185 A1 | 3/2012 | Davydov et al. |
| 2012/0052921 A1 | 3/2012 | Lim et al. |
| 2012/0054670 A1 | 3/2012 | Rainisto |
| 2012/0056848 A1 | 3/2012 | Yamano et al. |
| 2012/0059787 A1 | 3/2012 | Brown et al. |
| 2012/0062398 A1 | 3/2012 | Durand |
| 2012/0066621 A1 | 3/2012 | Matsubara |
| 2012/0066629 A1 | 3/2012 | Lee et al. |
| 2012/0066638 A1 | 3/2012 | Ohri et al. |
| 2012/0068925 A1 | 3/2012 | Wong et al. |
| 2012/0083260 A1 | 4/2012 | Arriola et al. |
| 2012/0084689 A1 | 4/2012 | Ledet et al. |
| 2012/0089951 A1 | 4/2012 | Cassidy |
| 2012/0092383 A1 | 4/2012 | Hysek et al. |
| 2012/0099406 A1 | 4/2012 | Lau et al. |
| 2012/0105484 A1 | 5/2012 | Cui |
| 2012/0112859 A1 | 5/2012 | Park et al. |
| 2012/0127071 A1 | 5/2012 | Jitkoff et al. |
| 2012/0131495 A1 | 5/2012 | Goossens et al. |
| 2012/0131504 A1 | 5/2012 | Fadell et al. |
| 2012/0133604 A1 | 5/2012 | Ishizuka et al. |
| 2012/0133677 A1 | 5/2012 | Suzuki et al. |
| 2012/0142414 A1 | 6/2012 | Murakami |
| 2012/0147052 A1 | 6/2012 | Homma et al. |
| 2012/0155223 A1 | 6/2012 | Hoover |
| 2012/0159380 A1 | 6/2012 | Kocienda et al. |
| 2012/0162261 A1 | 6/2012 | Kim et al. |
| 2012/0162350 A1 | 6/2012 | Lee et al. |
| 2012/0169776 A1 | 7/2012 | Rissa et al. |
| 2012/0174005 A1 | 7/2012 | Deutsch et al. |
| 2012/0174033 A1 | 7/2012 | Joo |
| 2012/0179998 A1 | 7/2012 | Nesladek et al. |
| 2012/0185781 A1 | 7/2012 | Guzman et al. |
| 2012/0186951 A1 | 7/2012 | Wu et al. |
| 2012/0192110 A1 | 7/2012 | Wu et al. |
| 2012/0197743 A1 | 8/2012 | Grigg et al. |
| 2012/0204123 A1 | 8/2012 | Bauer et al. |
| 2012/0218205 A1 | 8/2012 | Park |
| 2012/0226977 A1 | 9/2012 | Lengeling et al. |
| 2012/0229521 A1 | 9/2012 | Hales et al. |
| 2012/0236037 A1 | 9/2012 | Lessing et al. |
| 2012/0242584 A1 | 9/2012 | Tuli et al. |
| 2012/0256863 A1 | 10/2012 | Zhang et al. |
| 2012/0272145 A1 | 10/2012 | Ryan et al. |
| 2012/0272181 A1 | 10/2012 | Rogers et al. |
| 2012/0278725 A1 | 11/2012 | Gordon et al. |
| 2012/0278755 A1 | 11/2012 | Lehmann et al. |
| 2012/0284674 A1 | 11/2012 | Geng et al. |
| 2012/0286944 A1 | 11/2012 | Forutanpour et al. |
| 2012/0289290 A1 | 11/2012 | Chae et al. |
| 2012/0290472 A1 | 11/2012 | Mullen et al. |
| 2012/0293311 A1 | 11/2012 | Pasquero et al. |
| 2012/0297324 A1 | 11/2012 | Dollar et al. |
| 2012/0297342 A1 | 11/2012 | Jang et al. |
| 2012/0304111 A1 | 11/2012 | Queru et al. |
| 2012/0304113 A1 | 11/2012 | Patten et al. |
| 2012/0306765 A1 | 12/2012 | Moore et al. |
| 2012/0306930 A1 | 12/2012 | Decker et al. |
| 2012/0307603 A1 | 12/2012 | Bongio et al. |
| 2012/0311055 A1 | 12/2012 | Adams et al. |
| 2012/0324357 A1 | 12/2012 | Viegers et al. |
| 2012/0324390 A1 | 12/2012 | Tao et al. |
| 2012/0327006 A1 | 12/2012 | Israr et al. |
| 2012/0327009 A1 | 12/2012 | Fleizach |
| 2013/0019182 A1 | 1/2013 | Gil et al. |
| 2013/0021362 A1 | 1/2013 | Sakurada et al. |
| 2013/0024780 A1 | 1/2013 | Sutedja et al. |
| 2013/0024808 A1 | 1/2013 | Rainisto |
| 2013/0024811 A1 | 1/2013 | Gleadall et al. |
| 2013/0027412 A1 | 1/2013 | Roddy |
| 2013/0031507 A1 | 1/2013 | George |
| 2013/0031514 A1 | 1/2013 | Gabbert |
| 2013/0036005 A1 | 2/2013 | Rappe |
| 2013/0038636 A1 | 2/2013 | Fujiwaka |
| 2013/0046397 A1 | 2/2013 | Fadell et al. |
| 2013/0055160 A1 | 2/2013 | Yamada et al. |
| 2013/0063383 A1 | 3/2013 | Anderssonreimer et al. |
| 2013/0067390 A1 | 3/2013 | Kwiatkowski et al. |
| 2013/0070573 A1 | 3/2013 | Oshio |
| 2013/0073932 A1 | 3/2013 | Migos et al. |
| 2013/0097526 A1 | 4/2013 | Stovicek et al. |
| 2013/0097556 A1 | 4/2013 | Louch et al. |
| 2013/0097566 A1 | 4/2013 | Berglund |
| 2013/0104039 A1 | 4/2013 | Ormin et al. |
| 2013/0111342 A1 | 5/2013 | Alameh et al. |
| 2013/0111384 A1 | 5/2013 | Kim et al. |
| 2013/0111396 A1 | 5/2013 | Brid |
| 2013/0111407 A1 | 5/2013 | Mullen |
| 2013/0117689 A1 | 5/2013 | Lessing et al. |
| 2013/0117698 A1 | 5/2013 | Park et al. |
| 2013/0120295 A1 | 5/2013 | Kim et al. |
| 2013/0132883 A1 | 5/2013 | Vayrynen |
| 2013/0135228 A1 | 5/2013 | Won et al. |
| 2013/0135234 A1 | 5/2013 | Hisano et al. |
| 2013/0135236 A1 | 5/2013 | Yano |
| 2013/0139102 A1 | 5/2013 | Miura et al. |
| 2013/0141342 A1 | 6/2013 | Bokma et al. |
| 2013/0142016 A1 | 6/2013 | Pozzo Di Borgo et al. |
| 2013/0145292 A1 | 6/2013 | Cohen et al. |
| 2013/0145316 A1 | 6/2013 | Heo |
| 2013/0147747 A1 | 6/2013 | Takagi |
| 2013/0149674 A1 | 6/2013 | Anderson et al. |
| 2013/0152017 A1 | 6/2013 | Song et al. |
| 2013/0154933 A1 | 6/2013 | Sheik-Nainar |
| 2013/0159941 A1 | 6/2013 | Langlois et al. |
| 2013/0169579 A1 | 7/2013 | Havnor |

(56) References Cited

U.S. PATENT DOCUMENTS

| | | |
|---|---|---|
| 2013/0174031 A1 | 7/2013 | Constantinou |
| 2013/0176020 A1 | 7/2013 | Chauvin et al. |
| 2013/0191220 A1 | 7/2013 | Dent et al. |
| 2013/0205210 A1 | 8/2013 | Jeon et al. |
| 2013/0205939 A1 | 8/2013 | Meerovitsch et al. |
| 2013/0208013 A1 | 8/2013 | Yuu et al. |
| 2013/0218517 A1 | 8/2013 | Ausserlechner et al. |
| 2013/0222301 A1 | 8/2013 | Lee et al. |
| 2013/0226444 A1 | 8/2013 | Johansson et al. |
| 2013/0227412 A1 | 8/2013 | Ornstein et al. |
| 2013/0227419 A1 | 8/2013 | Lee et al. |
| 2013/0227470 A1 | 8/2013 | Thorsander et al. |
| 2013/0227483 A1 | 8/2013 | Thorsander et al. |
| 2013/0227490 A1 | 8/2013 | Thorsander et al. |
| 2013/0254708 A1 | 9/2013 | Dorcey |
| 2013/0258819 A1 | 10/2013 | Hoover |
| 2013/0262564 A1 | 10/2013 | Wall et al. |
| 2013/0275899 A1 | 10/2013 | Schubert et al. |
| 2013/0282360 A1 | 10/2013 | Shimota et al. |
| 2013/0282459 A1 | 10/2013 | Smets et al. |
| 2013/0283204 A1 | 10/2013 | Pasquero et al. |
| 2013/0290116 A1 | 10/2013 | Hepworth et al. |
| 2013/0303087 A1 | 11/2013 | Hauser et al. |
| 2013/0303191 A1 | 11/2013 | Pasquero et al. |
| 2013/0305184 A1 | 11/2013 | Kim et al. |
| 2013/0305187 A1 | 11/2013 | Phillips et al. |
| 2013/0307603 A1 | 11/2013 | Koester |
| 2013/0318437 A1 | 11/2013 | Jung et al. |
| 2013/0324093 A1 | 12/2013 | Santamaria et al. |
| 2013/0328786 A1 | 12/2013 | Hinckley |
| 2013/0339343 A1 | 12/2013 | Hierons et al. |
| 2013/0339345 A1 | 12/2013 | Soto Matamala et al. |
| 2013/0342457 A1 | 12/2013 | Cox et al. |
| 2014/0002502 A1 | 1/2014 | Han |
| 2014/0028554 A1 | 1/2014 | De Los Reyes et al. |
| 2014/0028688 A1 | 1/2014 | Houjou et al. |
| 2014/0028735 A1 | 1/2014 | Williams et al. |
| 2014/0036639 A1 | 2/2014 | Boni et al. |
| 2014/0040742 A1 | 2/2014 | Park et al. |
| 2014/0075311 A1 | 3/2014 | Boettcher et al. |
| 2014/0075368 A1 | 3/2014 | Kim et al. |
| 2014/0080416 A1 | 3/2014 | Seo et al. |
| 2014/0092037 A1 | 4/2014 | Kim |
| 2014/0092143 A1 | 4/2014 | Vanblon et al. |
| 2014/0105278 A1 | 4/2014 | Bivolarsky |
| 2014/0106734 A1 | 4/2014 | Lee |
| 2014/0108936 A1 | 4/2014 | Khosropour et al. |
| 2014/0109002 A1 | 4/2014 | Kimball et al. |
| 2014/0111415 A1 | 4/2014 | Gargi et al. |
| 2014/0118127 A1 | 5/2014 | Levesque et al. |
| 2014/0132640 A1 | 5/2014 | Sharma et al. |
| 2014/0136443 A1 | 5/2014 | Kinsey et al. |
| 2014/0136981 A1 | 5/2014 | Xiang et al. |
| 2014/0137020 A1 | 5/2014 | Sharma et al. |
| 2014/0139422 A1 | 5/2014 | Mistry et al. |
| 2014/0139637 A1 | 5/2014 | Mistry et al. |
| 2014/0143678 A1 | 5/2014 | Mistry et al. |
| 2014/0143683 A1 | 5/2014 | Underwood et al. |
| 2014/0143737 A1 | 5/2014 | Mistry et al. |
| 2014/0149921 A1 | 5/2014 | Hauser et al. |
| 2014/0152585 A1 | 6/2014 | Andersson Reimer |
| 2014/0157160 A1 | 6/2014 | Cudak et al. |
| 2014/0160078 A1 | 6/2014 | Seo et al. |
| 2014/0164945 A1 | 6/2014 | Junqua et al. |
| 2014/0164966 A1 | 6/2014 | Kim et al. |
| 2014/0189608 A1 | 7/2014 | Shuttleworth et al. |
| 2014/0192626 A1 | 7/2014 | Wolff et al. |
| 2014/0204229 A1 | 7/2014 | Leung et al. |
| 2014/0215340 A1 | 7/2014 | Shetty et al. |
| 2014/0222916 A1 | 8/2014 | Foley et al. |
| 2014/0237382 A1 | 8/2014 | Grandhi |
| 2014/0245221 A1 | 8/2014 | Dougherty et al. |
| 2014/0253487 A1 | 9/2014 | Bezinge et al. |
| 2014/0258935 A1 | 9/2014 | Nishida et al. |
| 2014/0260776 A1 | 9/2014 | Burleson et al. |
| 2014/0267441 A1 | 9/2014 | Matas et al. |
| 2014/0282005 A1 | 9/2014 | Gutowitz |
| 2014/0282016 A1 | 9/2014 | Hosier, Jr. |
| 2014/0282142 A1 | 9/2014 | Lin |
| 2014/0282214 A1 | 9/2014 | Shirzadi et al. |
| 2014/0289659 A1 | 9/2014 | Harrison et al. |
| 2014/0292668 A1 | 10/2014 | Fricklas et al. |
| 2014/0298233 A1 | 10/2014 | Pettey et al. |
| 2014/0304389 A1 | 10/2014 | Reavis |
| 2014/0306989 A1 | 10/2014 | Doubleday et al. |
| 2014/0328147 A1 | 11/2014 | Yang et al. |
| 2014/0330435 A1 | 11/2014 | Stoner et al. |
| 2014/0333670 A1 | 11/2014 | Balivada et al. |
| 2014/0337791 A1 | 11/2014 | Agnetta et al. |
| 2014/0347289 A1 | 11/2014 | Lee et al. |
| 2014/0362024 A1 | 12/2014 | Hicks |
| 2014/0365126 A1 | 12/2014 | Vulcano et al. |
| 2014/0372115 A1 | 12/2014 | Lebeau et al. |
| 2015/0007025 A1 | 1/2015 | Sassi et al. |
| 2015/0007048 A1 | 1/2015 | Dumans |
| 2015/0007052 A1 | 1/2015 | Dumans |
| 2015/0009784 A1 | 1/2015 | Cho et al. |
| 2015/0011204 A1 | 1/2015 | Seo et al. |
| 2015/0036555 A1 | 2/2015 | Shin et al. |
| 2015/0041289 A1 | 2/2015 | Ely et al. |
| 2015/0042438 A1 | 2/2015 | Liu et al. |
| 2015/0046871 A1 | 2/2015 | Lewis |
| 2015/0049591 A1 | 2/2015 | Adams et al. |
| 2015/0058723 A1 | 2/2015 | Cieplinski et al. |
| 2015/0058744 A1 | 2/2015 | Dhingra et al. |
| 2015/0065821 A1 | 3/2015 | Conrad |
| 2015/0067495 A1 | 3/2015 | Bernstein et al. |
| 2015/0067497 A1* | 3/2015 | Cieplinski ............ G06F 3/0488 715/702 |
| 2015/0067513 A1 | 3/2015 | Zambetti et al. |
| 2015/0067555 A1 | 3/2015 | Joo et al. |
| 2015/0074615 A1 | 3/2015 | Han et al. |
| 2015/0077398 A1 | 3/2015 | Stokes et al. |
| 2015/0085621 A1 | 3/2015 | Hong et al. |
| 2015/0121224 A1 | 4/2015 | Krasnahill, Jr. |
| 2015/0121311 A1 | 4/2015 | Lou et al. |
| 2015/0148927 A1 | 5/2015 | Georges et al. |
| 2015/0149899 A1 | 5/2015 | Bernstein et al. |
| 2015/0149956 A1 | 5/2015 | Kempinski et al. |
| 2015/0160856 A1 | 6/2015 | Jang et al. |
| 2015/0169062 A1 | 6/2015 | Park et al. |
| 2015/0172438 A1 | 6/2015 | Yang |
| 2015/0178041 A1 | 6/2015 | Uskoreit |
| 2015/0185845 A1 | 7/2015 | Nagara et al. |
| 2015/0193099 A1 | 7/2015 | Murphy |
| 2015/0193951 A1 | 7/2015 | Lee et al. |
| 2015/0199012 A1 | 7/2015 | Palmer |
| 2015/0199082 A1 | 7/2015 | Scholler et al. |
| 2015/0199110 A1 | 7/2015 | Nakazato |
| 2015/0205476 A1 | 7/2015 | Kuscher et al. |
| 2015/0234518 A1 | 8/2015 | Teller et al. |
| 2015/0234562 A1 | 8/2015 | Ording |
| 2015/0261310 A1 | 9/2015 | Walmsley et al. |
| 2015/0269944 A1 | 9/2015 | Wang |
| 2015/0277559 A1 | 10/2015 | Vescovi et al. |
| 2015/0277563 A1 | 10/2015 | Huang et al. |
| 2015/0286391 A1 | 10/2015 | Jacobs et al. |
| 2015/0293592 A1 | 10/2015 | Cheong et al. |
| 2015/0302301 A1 | 10/2015 | Petersen |
| 2015/0302774 A1 | 10/2015 | Dagar |
| 2015/0331589 A1 | 11/2015 | Kawakita |
| 2015/0339018 A1 | 11/2015 | Moon et al. |
| 2015/0363048 A1 | 12/2015 | Brown et al. |
| 2015/0370425 A1 | 12/2015 | Chen et al. |
| 2015/0370529 A1 | 12/2015 | Zambetti et al. |
| 2015/0378447 A1 | 12/2015 | Nagano et al. |
| 2015/0378555 A1 | 12/2015 | Ramanathan et al. |
| 2015/0379476 A1 | 12/2015 | Chaudhri et al. |
| 2016/0004393 A1 | 1/2016 | Faaborg et al. |
| 2016/0011758 A1 | 1/2016 | Meggs et al. |
| 2016/0012018 A1 | 1/2016 | Do Ba |
| 2016/0018981 A1 | 1/2016 | Amerige et al. |
| 2016/0028875 A1 | 1/2016 | Brown et al. |
| 2016/0034133 A1 | 2/2016 | Wilson et al. |

(56) References Cited

U.S. PATENT DOCUMENTS

| | | |
|---|---|---|
| 2016/0034148 A1 | 2/2016 | Wilson et al. |
| 2016/0034152 A1 | 2/2016 | Wilson et al. |
| 2016/0034153 A1 | 2/2016 | Lejeune et al. |
| 2016/0034166 A1 | 2/2016 | Wilson et al. |
| 2016/0034167 A1 | 2/2016 | Wilson et al. |
| 2016/0041702 A1 | 2/2016 | Wang |
| 2016/0054710 A1 | 2/2016 | Jo et al. |
| 2016/0062466 A1 | 3/2016 | Verweij et al. |
| 2016/0062487 A1 | 3/2016 | Foss et al. |
| 2016/0062567 A1 | 3/2016 | Yang et al. |
| 2016/0062571 A1 | 3/2016 | Dascola et al. |
| 2016/0062573 A1* | 3/2016 | Dascola ............... G06F 3/0362 715/810 |
| 2016/0062608 A1 | 3/2016 | Foss et al. |
| 2016/0063828 A1 | 3/2016 | Verweij et al. |
| 2016/0063850 A1 | 3/2016 | Yang et al. |
| 2016/0065509 A1 | 3/2016 | Butcher et al. |
| 2016/0065525 A1 | 3/2016 | Dye et al. |
| 2016/0071241 A1 | 3/2016 | Anzures et al. |
| 2016/0091971 A1 | 3/2016 | Burr |
| 2016/0098016 A1 | 4/2016 | Shedletsky et al. |
| 2016/0109936 A1 | 4/2016 | Lee |
| 2016/0162164 A1 | 6/2016 | Phillips et al. |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0170625 A1 | 6/2016 | Zambetti et al. |
| 2016/0180820 A1 | 6/2016 | Pascucci et al. |
| 2016/0198319 A1 | 7/2016 | Huang et al. |
| 2016/0202866 A1 | 7/2016 | Zambetti |
| 2016/0209939 A1 | 7/2016 | Zambetti et al. |
| 2016/0231883 A1 | 8/2016 | Zambetti |
| 2016/0259499 A1 | 9/2016 | Kocienda et al. |
| 2016/0259530 A1 | 9/2016 | Everitt et al. |
| 2016/0259535 A1 | 9/2016 | Fleizach et al. |
| 2016/0269540 A1 | 9/2016 | Butcher et al. |
| 2016/0283094 A1 | 9/2016 | Choi |
| 2016/0299912 A1 | 10/2016 | Acuna et al. |
| 2016/0327911 A1 | 11/2016 | Eim et al. |
| 2016/0357368 A1 | 12/2016 | Federighi et al. |
| 2017/0010678 A1 | 1/2017 | Tuli |
| 2017/0010751 A1 | 1/2017 | Shedletsky et al. |
| 2017/0017369 A1* | 1/2017 | Kanter ............... G06F 3/0482 |
| 2017/0045958 A1 | 2/2017 | Battlogg |
| 2017/0053542 A1 | 2/2017 | Wilson et al. |
| 2017/0089735 A1 | 3/2017 | Ruh |
| 2017/0104902 A1 | 4/2017 | Kim et al. |
| 2017/0208466 A1 | 7/2017 | Seo et al. |
| 2017/0220005 A1 | 8/2017 | Han et al. |
| 2017/0220215 A1* | 8/2017 | Wu ............... G06F 3/04845 |
| 2017/0220226 A1* | 8/2017 | Wu ............... G06F 3/0485 |
| 2017/0242933 A1 | 8/2017 | Liu |
| 2017/0269692 A1 | 9/2017 | Eck et al. |
| 2017/0315716 A1 | 11/2017 | Zambetti et al. |
| 2017/0357317 A1 | 12/2017 | Chaudhri et al. |
| 2017/0357318 A1 | 12/2017 | Chaudhri et al. |
| 2017/0357319 A1 | 12/2017 | Chaudhri et al. |
| 2017/0357320 A1* | 12/2017 | Chaudhri ............ G06F 3/04883 |
| 2017/0357321 A1 | 12/2017 | Fleizach et al. |
| 2017/0357427 A1 | 12/2017 | Wilson et al. |
| 2017/0358181 A1 | 12/2017 | Moussette et al. |
| 2018/0024683 A1 | 1/2018 | Ely et al. |
| 2018/0067557 A1 | 3/2018 | Robert et al. |
| 2018/0074690 A1 | 3/2018 | Zambetti et al. |
| 2018/0074693 A1 | 3/2018 | Jones et al. |
| 2018/0081453 A1 | 3/2018 | Ely |
| 2018/0088532 A1 | 3/2018 | Ely et al. |
| 2018/0088797 A1 | 3/2018 | Mcatee et al. |
| 2018/0164973 A1 | 6/2018 | Kim et al. |
| 2018/0204425 A1 | 7/2018 | Moussette et al. |
| 2018/0210516 A1 | 7/2018 | Zambetti et al. |
| 2018/0210641 A1* | 7/2018 | Thelleerathu ..... H04M 1/72469 |
| 2018/0260555 A1* | 9/2018 | Hardee ............... G06F 21/36 |
| 2018/0307363 A1 | 10/2018 | Ely et al. |
| 2018/0329587 A1 | 11/2018 | Ko et al. |
| 2018/0335891 A1 | 11/2018 | Shedletsky et al. |
| 2018/0335901 A1 | 11/2018 | Manzari et al. |
| 2018/0336866 A1 | 11/2018 | Triverio et al. |
| 2018/0341344 A1 | 11/2018 | Foss et al. |
| 2018/0349583 A1 | 12/2018 | Turgeman et al. |
| 2018/0364815 A1 | 12/2018 | Moussette et al. |
| 2018/0367489 A1 | 12/2018 | Dye et al. |
| 2018/0369691 A1 | 12/2018 | Rihn et al. |
| 2019/0033862 A1 | 1/2019 | Groden et al. |
| 2019/0050055 A1* | 2/2019 | Chaudhri ............... G06F 3/0485 |
| 2019/0056700 A1 | 2/2019 | Matsuno et al. |
| 2019/0072912 A1 | 3/2019 | Pandya et al. |
| 2019/0080066 A1 | 3/2019 | Van Os et al. |
| 2019/0080072 A1 | 3/2019 | Van Os et al. |
| 2019/0101870 A1 | 4/2019 | Pandya et al. |
| 2019/0121300 A1 | 4/2019 | Peterson et al. |
| 2019/0163324 A1 | 5/2019 | Shedletsky et al. |
| 2019/0163329 A1 | 5/2019 | Yang et al. |
| 2019/0172016 A1 | 6/2019 | Chaudhri et al. |
| 2019/0212885 A1 | 7/2019 | Zambetti et al. |
| 2019/0243471 A1 | 8/2019 | Foss et al. |
| 2019/0253619 A1 | 8/2019 | Davydov et al. |
| 2019/0272036 A1 | 9/2019 | Grant et al. |
| 2019/0274565 A1 | 9/2019 | Soli et al. |
| 2019/0279520 A1 | 9/2019 | Wilson et al. |
| 2019/0332173 A1 | 10/2019 | Wellen |
| 2019/0342622 A1 | 11/2019 | Carrigan et al. |
| 2019/0354268 A1 | 11/2019 | Everitt et al. |
| 2019/0369755 A1 | 12/2019 | Roper et al. |
| 2019/0369838 A1 | 12/2019 | Josephson et al. |
| 2020/0050332 A1 | 2/2020 | Yang et al. |
| 2020/0081538 A1 | 3/2020 | Moussette et al. |
| 2020/0081539 A1 | 3/2020 | Moussette et al. |
| 2020/0110522 A1 | 4/2020 | Zambetti et al. |
| 2020/0145361 A1 | 5/2020 | Dye et al. |
| 2020/0167047 A1 | 5/2020 | Dascola et al. |
| 2020/0192473 A1 | 6/2020 | Wang et al. |
| 2020/0241477 A1 | 7/2020 | Wellen |
| 2020/0241643 A1 | 7/2020 | Kim et al. |
| 2020/0272287 A1 | 8/2020 | Yang et al. |
| 2020/0272293 A1 | 8/2020 | Zambetti et al. |
| 2020/0333940 A1 | 10/2020 | Lee et al. |
| 2020/0341553 A1 | 10/2020 | Moussette et al. |
| 2020/0344439 A1 | 10/2020 | Choi et al. |
| 2020/0368616 A1 | 11/2020 | Delamont |
| 2020/0379565 A1 | 12/2020 | Fleizach et al. |
| 2020/0393957 A1 | 12/2020 | Wilson et al. |
| 2021/0055697 A1 | 2/2021 | Abramov |
| 2021/0073741 A1 | 3/2021 | Chaudhri et al. |
| 2021/0110014 A1 | 4/2021 | Turgeman et al. |
| 2021/0208750 A1 | 7/2021 | Zambetti et al. |
| 2021/0255710 A1 | 8/2021 | Fleizach et al. |
| 2021/0342017 A1 | 11/2021 | Foss et al. |
| 2022/0129858 A1 | 4/2022 | Chaudhri et al. |
| 2022/0137759 A1 | 5/2022 | Yang et al. |
| 2022/0244782 A1 | 8/2022 | Robert et al. |
| 2022/0413632 A1 | 12/2022 | Foss et al. |
| 2023/0024225 A1 | 1/2023 | Zambetti et al. |
| 2023/0049771 A1 | 2/2023 | Dascola et al. |
| 2023/0273690 A1 | 8/2023 | Foss et al. |

FOREIGN PATENT DOCUMENTS

| | | |
|---|---|---|
| AU | 2016231505 A1 | 10/2016 |
| AU | 2018100429 A4 | 5/2018 |
| AU | 2018100429 B4 | 8/2018 |
| CN | 1207517 A | 2/1999 |
| CN | 1263425 A | 8/2000 |
| CN | 1330310 A | 1/2002 |
| CN | 1341889 A | 3/2002 |
| CN | 1398366 A | 2/2003 |
| CN | 1549998 A | 11/2004 |
| CN | 1650251 A | 8/2005 |
| CN | 1757011 A | 4/2006 |
| CN | 1797295 A | 7/2006 |
| CN | 1811899 A | 8/2006 |
| CN | 101042300 A | 9/2007 |
| CN | 101059730 A | 10/2007 |

(56) References Cited

FOREIGN PATENT DOCUMENTS

| | | |
|---|---|---|
| CN | 101101595 A | 1/2008 |
| CN | 101192047 A | 6/2008 |
| CN | 101203821 A | 6/2008 |
| CN | 101232528 A | 7/2008 |
| CN | 101398741 A | 4/2009 |
| CN | 101431545 A | 5/2009 |
| CN | 101446802 A | 6/2009 |
| CN | 101529368 A | 9/2009 |
| CN | 101606123 A | 12/2009 |
| CN | 101611374 A | 12/2009 |
| CN | 101625620 A | 1/2010 |
| CN | 101634659 A | 1/2010 |
| CN | 101776968 A | 7/2010 |
| CN | 101872240 A | 10/2010 |
| CN | 101876877 A | 11/2010 |
| CN | 101893992 A | 11/2010 |
| CN | 101976171 A | 2/2011 |
| CN | 102033710 A | 4/2011 |
| CN | 101241407 B | 7/2011 |
| CN | 102144213 A | 8/2011 |
| CN | 102252126 A | 11/2011 |
| CN | 102402328 A | 4/2012 |
| CN | 102479053 A | 5/2012 |
| CN | 102508707 A | 6/2012 |
| CN | 102591579 A | 7/2012 |
| CN | 102612679 A | 7/2012 |
| CN | 102725724 A | 10/2012 |
| CN | 102750066 A | 10/2012 |
| CN | 102763066 A | 10/2012 |
| CN | 102812426 A | 12/2012 |
| CN | 102859482 A | 1/2013 |
| CN | 102890612 A | 1/2013 |
| CN | 102902453 A | 1/2013 |
| CN | 102902454 A | 1/2013 |
| CN | 102905181 A | 1/2013 |
| CN | 101034328 B | 2/2013 |
| CN | 102917137 A | 2/2013 |
| CN | 102981727 A | 3/2013 |
| CN | 102981770 A | 3/2013 |
| CN | 103019083 A | 4/2013 |
| CN | 103034399 A | 4/2013 |
| CN | 103069378 A | 4/2013 |
| CN | 103154878 A | 6/2013 |
| CN | 202982930 U | 6/2013 |
| CN | 103212197 A | 7/2013 |
| CN | 103270486 A | 8/2013 |
| CN | 103460164 A | 12/2013 |
| CN | 103703437 A | 4/2014 |
| CN | 103782252 A | 5/2014 |
| CN | 103793138 A | 5/2014 |
| CN | 103858088 A | 6/2014 |
| CN | 103870255 A | 6/2014 |
| CN | 103914261 A | 7/2014 |
| CN | 103970413 A | 8/2014 |
| CN | 104166458 A | 11/2014 |
| CN | 104508618 A | 4/2015 |
| CN | 104866337 A | 8/2015 |
| CN | 104869231 A | 8/2015 |
| CN | 105872228 A | 8/2016 |
| CN | 105955591 A | 9/2016 |
| CN | 107710135 A | 2/2018 |
| CN | 107797655 A | 3/2018 |
| CN | 107797657 A | 3/2018 |
| CN | 108139863 A | 6/2018 |
| CN | 108304106 A | 7/2018 |
| CN | 108334190 A | 7/2018 |
| CN | 108369455 A | 8/2018 |
| EP | 1052566 A1 | 11/2000 |
| EP | 1168149 A2 | 1/2002 |
| EP | 1406158 A2 | 4/2004 |
| EP | 1486860 A1 | 12/2004 |
| EP | 1505484 A1 | 2/2005 |
| EP | 1571538 A1 | 9/2005 |
| EP | 1679879 A2 | 7/2006 |
| EP | 1847920 A2 | 10/2007 |
| EP | 1850213 A2 | 10/2007 |
| EP | 1942401 A1 | 7/2008 |
| EP | 1944677 A2 | 7/2008 |
| EP | 1956433 A1 | 8/2008 |
| EP | 1956446 A2 | 8/2008 |
| EP | 1959337 A2 | 8/2008 |
| EP | 2124131 A2 | 11/2009 |
| EP | 2207084 A2 | 7/2010 |
| EP | 2224317 A1 | 9/2010 |
| EP | 2237140 A2 | 10/2010 |
| EP | 2284646 A1 | 2/2011 |
| EP | 2302492 A2 | 3/2011 |
| EP | 2302493 A2 | 3/2011 |
| EP | 2385451 A1 | 11/2011 |
| EP | 2547117 A1 | 1/2013 |
| EP | 2551784 A1 | 1/2013 |
| EP | 2610738 A2 | 7/2013 |
| EP | 2693382 A2 | 2/2014 |
| EP | 2733579 A2 | 5/2014 |
| EP | 2733598 A2 | 5/2014 |
| EP | 2741176 A2 | 6/2014 |
| EP | 3401770 A1 | 11/2018 |
| EP | 3410263 A1 | 12/2018 |
| GB | 2392773 A | 3/2004 |
| GB | 2489580 A | 10/2012 |
| JP | 55-80084 A | 6/1980 |
| JP | 5-88812 A | 4/1993 |
| JP | 6-348408 A | 12/1994 |
| JP | 7-152478 A | 6/1995 |
| JP | 8-76926 A | 3/1996 |
| JP | 11-110106 A | 4/1999 |
| JP | 2000-503153 A | 3/2000 |
| JP | 2000-305760 A | 11/2000 |
| JP | 2001-5445 A | 1/2001 |
| JP | 2001-100905 A | 4/2001 |
| JP | 2001-202170 A | 7/2001 |
| JP | 2001-202178 A | 7/2001 |
| JP | 2001-202181 A | 7/2001 |
| JP | 2001-209827 A | 8/2001 |
| JP | 2002-175139 A | 6/2002 |
| JP | 2002-288690 A | 10/2002 |
| JP | 2003-248544 A | 9/2003 |
| JP | 2003-256095 A | 9/2003 |
| JP | 2003-330586 A | 11/2003 |
| JP | 2003-330856 A | 11/2003 |
| JP | 2004-21522 A | 1/2004 |
| JP | 2004-178584 A | 6/2004 |
| JP | 2004-184396 A | 7/2004 |
| JP | 2004-259063 A | 9/2004 |
| JP | 2005-4891 A | 1/2005 |
| JP | 2005-196077 A | 7/2005 |
| JP | 2006-11690 A | 1/2006 |
| JP | 2006-140990 A | 6/2006 |
| JP | 2006-185273 A | 7/2006 |
| JP | 2007-512635 A | 5/2007 |
| JP | 2007-170995 A | 7/2007 |
| JP | 2007-179544 A | 7/2007 |
| JP | 2008-97057 A | 4/2008 |
| JP | 2008-518539 A | 5/2008 |
| JP | 2008-139163 A | 6/2008 |
| JP | 2008-157974 A | 7/2008 |
| JP | 2008-539513 A | 11/2008 |
| JP | 2009-59382 A | 3/2009 |
| JP | 2009-510404 A | 3/2009 |
| JP | 2009-128296 A | 6/2009 |
| JP | 2009-246553 A | 10/2009 |
| JP | 2009-265793 A | 11/2009 |
| JP | 2009-294526 A | 12/2009 |
| JP | 2010-515978 A | 5/2010 |
| JP | 2010-257051 A | 11/2010 |
| JP | 2011-8540 A | 1/2011 |
| JP | 2011-90640 A | 5/2011 |
| JP | 2011-96043 A | 5/2011 |
| JP | 2011-530738 A | 12/2011 |
| JP | 2012-27797 A | 2/2012 |
| JP | 2012-58979 A | 3/2012 |
| JP | 2012-115519 A | 6/2012 |
| JP | 2012-155698 A | 8/2012 |
| JP | 2012-168620 A | 9/2012 |

(56) References Cited

FOREIGN PATENT DOCUMENTS

| | | |
|---|---|---|
| JP | 2012-252384 A | 12/2012 |
| JP | 2012-531607 A | 12/2012 |
| JP | 2013-3718 A | 1/2013 |
| JP | 2013-114844 A | 6/2013 |
| JP | 2013-122738 A | 6/2013 |
| JP | 2013-137750 A | 7/2013 |
| JP | 2013-164700 A | 8/2013 |
| JP | 2013-168086 A | 8/2013 |
| JP | 2014-42164 A | 3/2014 |
| JP | 2016-538653 A | 12/2016 |
| JP | 2017-500656 A | 1/2017 |
| JP | 2017-516163 A | 6/2017 |
| JP | 2018-508076 A | 3/2018 |
| JP | 2018-508900 A | 3/2018 |
| JP | 2019-512814 A | 5/2019 |
| KR | 10-2004-0107472 A | 12/2004 |
| KR | 10-0630154 B1 | 9/2006 |
| KR | 10-2007-0024702 A | 3/2007 |
| KR | 10-2008-0095085 A | 10/2008 |
| KR | 10-2010-0003589 A | 1/2010 |
| KR | 10-0971452 B1 | 7/2010 |
| KR | 10-2010-0109277 A | 10/2010 |
| KR | 10-2011-0093090 A | 8/2011 |
| KR | 10-2011-0114294 A | 10/2011 |
| KR | 10-2012-0071468 A | 7/2012 |
| KR | 10-2012-0079707 A | 7/2012 |
| KR | 10-2013-0027017 A | 3/2013 |
| KR | 10-2013-0052751 A | 5/2013 |
| KR | 10-2015-0122810 A | 11/2015 |
| KR | 10-2017-0030980 A | 3/2017 |
| TW | I269202 B | 12/2006 |
| TW | D122820 S | 5/2008 |
| TW | 200843452 A | 11/2008 |
| TW | 201119339 A | 6/2011 |
| TW | I349212 B | 9/2011 |
| TW | I381305 B | 1/2013 |
| TW | I384394 B | 2/2013 |
| TW | I394410 B1 | 4/2013 |
| TW | I395498 B | 5/2013 |
| TW | I405106 B | 8/2013 |
| TW | 201403363 A | 1/2014 |
| TW | I426416 B | 2/2014 |
| TW | 201421340 A | 6/2014 |
| TW | I443547 B | 7/2014 |
| WO | 1993/08517 A1 | 4/1993 |
| WO | 1996/19872 A1 | 6/1996 |
| WO | 2001/69369 A1 | 9/2001 |
| WO | 2003/021568 A1 | 3/2003 |
| WO | 2003/036457 A2 | 5/2003 |
| WO | 2005/055034 A1 | 6/2005 |
| WO | 2005/103863 A2 | 11/2005 |
| WO | 2006/037545 A2 | 4/2006 |
| WO | 2006/042309 A1 | 4/2006 |
| WO | 2006/094308 A2 | 9/2006 |
| WO | 2006/094308 A3 | 12/2006 |
| WO | 2008/030779 A2 | 3/2008 |
| WO | 2008/030880 A1 | 3/2008 |
| WO | 2008/033853 A2 | 3/2008 |
| WO | 2008/085742 A2 | 7/2008 |
| WO | 2008/085855 A1 | 7/2008 |
| WO | 2008/086218 A2 | 7/2008 |
| WO | 2008/099251 A1 | 8/2008 |
| WO | 2008/106777 A1 | 9/2008 |
| WO | 2009/026508 A1 | 2/2009 |
| WO | 2009/084368 A1 | 7/2009 |
| WO | 2009/085378 A1 | 7/2009 |
| WO | 2009/097592 A1 | 8/2009 |
| WO | WO-2009104064 A1 * 8/2009 ........... G06F 3/0482 |
| WO | 2009/114239 A1 | 9/2009 |
| WO | 2010/024969 A1 | 3/2010 |
| WO | 2010/150768 A1 | 12/2010 |
| WO | 2011/084859 A1 | 7/2011 |
| WO | 2011/126502 A1 | 10/2011 |
| WO | 2012/006494 A1 | 1/2012 |
| WO | 2012/080020 A1 | 6/2012 |
| WO | 2012/129359 A1 | 9/2012 |
| WO | 2013/051048 A1 | 4/2013 |
| WO | 2013/085580 A1 | 6/2013 |
| WO | 2013/105664 A1 | 7/2013 |
| WO | 2013/114844 A1 | 8/2013 |
| WO | 2013/133901 A2 | 9/2013 |
| WO | 2013/169842 A2 | 11/2013 |
| WO | 2013/169846 A1 | 11/2013 |
| WO | 2013/169849 A2 | 11/2013 |
| WO | 2013/169853 A1 | 11/2013 |
| WO | 2013/169875 A2 | 11/2013 |
| WO | 2014/105276 A1 | 7/2014 |
| WO | 2015/034969 A2 | 3/2015 |
| WO | 2015/057320 A1 | 4/2015 |
| WO | 2016/141057 A1 | 9/2016 |
| WO | 2016/144385 A1 | 9/2016 |
| WO | 2016/144563 A1 | 9/2016 |
| WO | 2016/144696 A2 | 9/2016 |
| WO | 2016/144975 A2 | 9/2016 |
| WO | 2017/027625 A2 | 2/2017 |
| WO | 2018/048518 A1 | 3/2018 |
| WO | 2018/048632 A1 | 3/2018 |

OTHER PUBLICATIONS

Notice of Allowance received for U.S. Appl. No. 17/902,191, dated Jan. 3, 2023, 8 pages.
Corrected Notice of Allowance received for U.S. Appl. No. 17/902,191, dated Jan. 10, 2023, 2 pages.
Craciunoiu, Marius, "Hide header on scroll down, show on scroll up", Online available at: https://medium.com/@mariusc23/hide-header-on-scroll-down-show-on-scroll-up-67bbaae9a78c, Nov. 27, 2013, 5 pages.
Final Office Action received for U.S. Appl. No. 16/734,173, dated Jan. 5, 2023, 15 pages.
Notice of Allowance received for Chinese Patent Application No. 201910438645.6, dated Dec. 28, 2022, 7 pages (3 pages of English Translation and 4 pages of Official Copy).
Notice of Allowance received for Japanese Patent Application No. 2021-126843, dated Jan. 6, 2023, 4 pages (1 page of English Translation and 3 pages of Official Copy).
Notice of Allowance received for U.S. Appl. No. 15/818,500, dated Jan. 17, 2023, 17 pages.
Applicant-Initiated Interview Summary received for U.S. Appl. No. 16/871,995, dated Oct. 18, 2022, 4 pages.
Applicant-Initiated Interview Summary received for U.S. Appl. No. 14/913,349, dated Oct. 12, 2022, 2 pages.
Non-Final Office Action received for U.S. Appl. No. 17/572,117, dated Oct. 6, 2022, 15 pages.
Notice of Allowance received for U.S. Appl. No. 15/655,253, dated Oct. 19, 2022, 9 pages.
Applicant-Initiated Interview Summary received for U.S. Appl. No. 16/734,173, dated Nov. 22, 2022, 4 pages.
Office Action received for Chinese Patent Application No. 201911023176.8, dated Oct. 25, 2022, 12 pages (6 pages of English Translation and 6 pages of Official Copy).
Advisory Action received for U.S. Appl. No. 16/703,486, dated Nov. 15, 2022, 5 pages.
Applicant-Initiated Interview Summary received for U.S. Appl. No. 17/572,117, dated Nov. 17, 2022, 4 pages.
Corrected Notice of Allowance received for U.S. Appl. No. 14/913,349, dated Nov. 3, 2022, 2 pages.
Advisory Action received for U.S. Appl. No. 16/734,173, dated Apr. 4, 2022, 5 pages.
Applicant-Initiated Interview Summary received for U.S. Appl. No. 16/703,486, dated May 12, 2022, 4 pages.
Applicant-Initiated Interview Summary received for U.S. Appl. No. 16/871,995, dated Apr. 5, 2022, 5 pages.
Applicant-Initiated Interview Summary received for U.S. Appl. No. 17/212,850, dated Jul. 20, 2022, 5 pages.
Applicant-Initiated Interview Summary received for U.S. Appl. No. 17/306,342, dated Jun. 3, 2022, 2 pages.
Corrected Notice of Allowance received for U.S. Appl. No. 14/913,349, dated Oct. 3, 2022, 3 pages.

(56) References Cited

OTHER PUBLICATIONS

Corrected Notice of Allowance received for U.S. Appl. No. 14/913,349, dated Sep. 1, 2022, 2 pages.
Corrected Notice of Allowance received for U.S. Appl. No. 16/775,528, dated Mar. 25, 2022, 2 pages.
Corrected Notice of Allowance received for U.S. Appl. No. 17/378,451, dated Aug. 12, 2022, 2 pages.
Decision of Appeal received for Korean Patent Application No. 10-2021-7001918, mailed on Aug. 23, 2022, 14 pages (2 pages of English Translation and 12 pages of Official Copy).
Decision of Appeal received for Korean Patent Application No. 10-2021-7017259, mailed on Jun. 29, 2022, 28 pages (4 pages of English Translation and 24 pages of Official Copy).
Decision on Appeal received for Korean Patent Application No. 10-2021-7001482, mailed on Jul. 20, 2022, 27 pages (1 page of English Translation and 26 pages of Official Copy).
Decision on Appeal received for U.S. Appl. No. 15/655,253, mailed on Sep. 22, 2022, 12 pages.
Decision to Grant received for European Patent Application No. 19185318.3, dated Mar. 31, 2022, 3 pages.
Extended European Search Report received for European Patent Application No. 22157106.0, dated Jun. 27, 2022, 8 pages.
Final Office Action received for U.S. Appl. No. 16/703,486, dated Aug. 26, 2022, 14 pages.
Final Office Action received for U.S. Appl. No. 16/871,995, dated Jul. 5, 2022, 17 pages.
Final Office Action received for U.S. Appl. No. 17/212,850, dated Jun. 1, 2022, 14 pages.
Non-Final Office Action received for U.S. Appl. No. 15/818,500, dated Jul. 27, 2022, 15 pages.
Non-Final Office Action received for U.S. Appl. No. 16/734,173, dated Sep. 23, 2022, 17 pages.
Non-Final Office Action received for U.S. Appl. No. 17/212,850, dated Sep. 21, 2022, 13 pages.
Notice of Acceptance received for Australian Patent Application No. 2021201748, dated Jun. 23, 2022, 3 pages.
Notice of Acceptance received for Australian Patent Application No. 2021201780, dated Aug. 2, 2022, 3 pages.
Notice of Acceptance received for Australian Patent Application No. 2022202044, dated Aug. 4, 2022, 3 pages.
Notice of Allowance received for Chinese Patent Application No. 201910446753.8, dated Jun. 29, 2022, 2 pages (1 page of English Translation and 1 page of Official Copy).
Notice of Allowance received for Chinese Patent Application No. 201910447678.7, dated Jun. 20, 2022, 2 pages (1 page of English Translation and 1 page of Official Copy).
Notice of Allowance received for Japanese Patent Application No. 2019-116590, dated Jul. 25, 2022, 15 pages (1 page of English Translation and 14 pages of Official Copy).
Notice of Allowance received for Japanese Patent Application No. 2021-510409, dated Sep. 12, 2022, 4 pages (1 page of English Translation and 3 pages of Official Copy).
Notice of Allowance received for Korean Patent Application No. 10-2021-7039120, dated Sep. 22, 2022, 7 pages (2 pages of English Translation and 5 pages of Official Copy).
Notice of Allowance received for U.S. Appl. No. 17/378,451, dated Apr. 4, 2022, 8 pages.
Notice of Allowance received for U.S. Appl. No. 14/913,349, dated Jul. 15, 2022, 6 pages.
Notice of Allowance received for U.S. Appl. No. 16/775,528, dated Jun. 15, 2022, 6 pages.
Notice of Allowance received for U.S. Appl. No. 17/306,342, dated Jul. 29, 2022, 14 pages.
Notice of Allowance received for U.S. Appl. No. 17/378,451, dated Jul. 7, 2022, 8 pages.
Notice of Hearing received for Indian Patent Application No. 201617008296, mailed on Sep. 11, 2022, 3 pages.
Office Action received for Australian Patent Application No. 2021201748, dated Mar. 18, 2022, 6 pages.
Office Action received for Australian Patent Application No. 2021201780, dated Mar. 22, 2022, 3 pages.
Office Action received for Australian Patent Application No. 2021212114, dated Jul. 29, 2022, 7 pages.
Office Action received for Chinese Patent Application No. 201910446753.8, dated Mar. 2, 2022, 11 pages (5 pages of English Translation and 6 pages of Official Copy).
Office Action received for European Patent Application No. 19173371.6, dated Sep. 13, 2022, 16 pages.
Office Action received for European Patent Application No. 19173886.3, dated Sep. 13, 2022, 13 pages.
Office Action received for European Patent Application No. 20190670.8, dated Sep. 14, 2022, 6 pages.
Office Action received for European Patent Application No. 20217518.8, dated Jul. 6, 2022, 5 pages.
Office Action received for Japanese Patent Application No. 2021-111630, dated Aug. 5, 2022, 8 pages (4 pages of English Translation and 4 pages of Official Copy).
Office Action received for Japanese Patent Application No. 2021-126843, dated Aug. 29, 2022, 6 pages (3 pages of English Translation and 3 pages of Official Copy).
Office Action received for Korean Patent Application No. 10-2021-7001918, dated Apr. 28, 2022, 7 pages (3 pages of English Translation and 4 pages of Official Copy).
Record of Oral Hearing received for U.S. Appl. No. 14/913,349 mailed on Sep. 23, 2022, 12 pages.
Record of Oral Hearing received for U.S. Appl. No. 15/655,253, mailed on Sep. 26, 2022, 14 pages.
Accepted Outlook Meetings Move to Deleted Folder, Available online at :—https://social.technet.microsoft.com/Forums/office/en-US/f3301c9a-a93f-49f7-be13-c642e285f150/accepted-outlook-meetings-move-to-deleted-folder?forum=outlook, Jan. 12, 2011, 4 pages.
Advisory Action received for U.S. Appl. No. 14/641,308, dated Nov. 14, 2019, 4 pages.
Advisory Action received for U.S. Appl. No. 14/752,776, dated Aug. 31, 2018, 3 pages.
Advisory Action received for U.S. Appl. No. 14/839,912, dated Nov. 14, 2019, 6 pages.
Advisory Action received for U.S. Appl. No. 14/841,646, dated Nov. 21, 2018, 5 pages.
Advisory Action received for U.S. Appl. No. 14/913,349, dated Oct. 29, 2019, 4 pages.
Advisory Action received for U.S. Appl. No. 15/049,052, dated Sep. 11, 2017, 2 pages.
Advisory Action received for U.S. Appl. No. 15/049,058, dated Oct. 18, 2017, 3 pages.
Advisory Action received for U.S. Appl. No. 15/049,064, dated May 10, 2017, 3 pages.
Advisory Action received for U.S. Appl. No. 15/655,253, dated May 11, 2021, 6 pages.
Advisory Action received for U.S. Appl. No. 15/818,500, dated Feb. 18, 2022, 4 pages.
Advisory Action received for U.S. Appl. No. 16/144,950, dated Feb. 20, 2020, 5 pages.
Advisory Action received for U.S. Appl. No. 16/147,413, dated Nov. 25, 2019, 6 pages.
Advisory Action received for U.S. Appl. No. 16/734,173, dated Oct. 14, 2021, 3 pages.
Agarwal Deepesh, "DexClock—Live Clock and Date Blended Into Beautiful Artwork as Your Desktop Wallpaper", available at: https://www.megaleecher.net/DexCiock_Wallpaper_Designs, Jul. 6, 2013, 4 pages.
Android 2.3.4 User's Guide, Online available at: https://static.googleusercontent.com/media/www.google.com/en//help/hc/pdfs/mobile/AndroidUsersGuide-2.3.4.pdf, May 20, 2011, 384 pages.
Android Central, "Gmail on iOS versus Android", Online Available at: https://www.youtube.com/watch?v=w2aVeZLxU5Q&t=80s, Nov. 2, 2011, 3 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.

(56) References Cited

OTHER PUBLICATIONS

Applicant-Initiated Interview Summary received for U.S. Appl. No. 14/913,345, dated Nov. 4, 2019, 5 pages.
Applicant-Initiated Interview Summary received for U.S. Appl. No. 14/913,349, dated Oct. 7, 2019, 4 pages.
Applicant-Initiated Interview Summary received for U.S. Appl. No. 15/655,253, dated Mar. 31, 2020, 5 pages.
Applicant-Initiated Interview Summary received for U.S. Appl. No. 15/655,253, dated Nov. 12, 2019, 3 pages.
Applicant-Initiated Interview Summary received for U.S. Appl. No. 16/144,950, dated Jan. 29, 2020, 5 pages.
Applicant-Initiated Interview Summary received for U.S. Appl. No. 16/147,413, dated Oct. 28, 2019, 5 pages.
Applicant-Initiated Interview Summary received for U.S. Appl. No. 16/265,938, dated Mar. 11, 2020, 5 pages.
Applicant-Initiated Interview Summary received for U.S. Appl. No. 16/384,726, dated Nov. 5, 2020, 3 pages.
Applicant-Initiated Interview Summary received for U.S. Appl. No. 16/871,995, dated Dec. 6, 2021, 4 pages.
Applicant-Initiated Interview Summary received for U.S. Appl. No. 16/871,995, dated Jul. 16, 2021, 4 pages.
Applicant-Initiated Interview Summary received for U.S. Appl. No. 14/839,912, dated Nov. 5, 2019, 5 pages.
Applicant-Initiated Interview Summary received for U.S. Appl. No. 14/641,308, dated Oct. 10, 2019, 5 pages.
Applicant-Initiated Interview Summary received for U.S. Appl. No. 15/655,253, dated Mar. 29, 2021, 4 pages.
Applicant-Initiated Interview Summary received for U.S. Appl. No. 15/655,253, dated Nov. 30, 2020, 5 pages.
Applicant-Initiated Interview Summary received for U.S. Appl. No. 15/818,500, dated Aug. 9, 2021, 6 pages.
Applicant-Initiated Interview Summary received for U.S. Appl. No. 15/818,500, dated Jan. 24, 2022, 4 pages.
Applicant-Initiated Interview Summary received for U.S. Appl. No. 15/818,500, dated Jan. 30, 2020, 5 pages.
Applicant-Initiated Interview Summary received for U.S. Appl. No. 15/818,500, dated Oct. 13, 2020, 4 pages.
Applicant-Initiated Interview Summary received for U.S. Appl. No. 15/930,300, dated Oct. 27, 2020, 3 pages.
Applicant-Initiated Interview Summary received for U.S. Appl. No. 16/147,413, dated Jun. 2, 2020, 4 pages.
Applicant-Initiated Interview Summary received for U.S. Appl. No. 16/263,280, dated Apr. 26, 2021, 2 pages.
Applicant-Initiated Interview Summary received for U.S. Appl. No. 16/263,280, dated Nov. 25, 2020, 3 pages.
Applicant-Initiated Interview Summary received for U.S. Appl. No. 16/265,938, dated May 28, 2020, 5 pages.
Applicant-Initiated Interview Summary received for U.S. Appl. No. 16/358,483, dated Sep. 28, 2020, 6 pages.
Applicant-Initiated Interview Summary received for U.S. Appl. No. 16/525,082, dated Jul. 28, 2020, 4 pages.
Applicant-Initiated Interview Summary received for U.S. Appl. No. 16/734,173, dated Feb. 25, 2021, 3 pages.
Applicant-Initiated Interview Summary received for U.S. Appl. No. 16/734,173, dated Jan. 25, 2022, 4 pages.
Applicant-Initiated Interview Summary received for U.S. Appl. No. 16/734,173, dated Mar. 21, 2022, 3 pages.
Applicant-Initiated Interview Summary received for U.S. Appl. No. 16/734,173, dated Sep. 9, 2021, 2 pages.
Applicant-Initiated Interview Summary received for U.S. Appl. No. 16/734,173, dated Sep. 27, 2021, 2 pages.
Applicant-Initiated Interview Summary received for U.S. Appl. No. 16/775,528, dated Aug. 30, 2021, 4 pages.
Applicant-Initiated Interview Summary received for U.S. Appl. No. 16/775,528, dated Feb. 23, 2021, 4 pages.
Applicant-Initiated Interview Summary received for U.S. Appl. No. 16/775,528, dated Jan. 13, 2022, 4 pages.
Applicant-Initiated Interview Summary received for U.S. Appl. No. 16/814,801, dated Jan. 29, 2021, 2 pages.
Applicant-Initiated Interview Summary received for U.S. Appl. No. 16/926,512, dated Apr. 21, 2022, 4 pages.
Applicant-Initiated Interview Summary received for U.S. Appl. No. 17/103,436, dated Sep. 22, 2021, 2 pages.
Applicant-Initiated Interview Summary received for U.S. Appl. No. 17/212,850, dated Jan. 13, 2022, 5 pages.
Ask Different, "Time—Is It Not Possible to Make Apple Watch Chime on the Hour?", Online available at: https://apple.stackexchange.com/questions/347805/is-it-not-possible-to-make-apple-watch-chime-on-the-hour, Retrieved on U.S. Appl. No. 12/712,020, filed Jan. 7, 2019, 3 pages.
Askabouttech, "How to Change Android Smartwatch Wallpaper", also online available at:—https://www.youtube.com/watch?v=SBYrsyuHqBA (Year: 2014), Jul. 12, 2014, 5 pages.
Board Decision received for Chinese Patent Application No. 201580046339.8, dated Jun. 22, 2021, 12 pages.
Board Opinion received for Chinese Patent Application No. 201580046339.8, dated Mar. 19, 2021, 11 pages.
Board Opinion received for Chinese Patent Application No. 201910164962.3, dated Sep. 16, 2021, 16 pages.
Brinkmann, Martin, "How to Zoom in Firefox", Ghacks, Available at <https://web.archive.org/web/20130804034728/https://www.ghacks.net/2009/02/23/how-to-zoom-in-firefox/>, Feb. 23, 2009, 11 pages.
Clock & Calendar for SmartWatch 2, https://www.youtube.com/watch?v=Uj-K2vMnrj8, Nov. 20, 2013, 2 pages.
Colt Sam, "Here's One Way Apple's Smartwatch Could Be Better Than Anything Else", Business Insider, Aug. 21, 2014, pp. 1-4.
Corrected Notice of Allowance received for U.S. Appl. No. 14/641,252, dated Aug. 28, 2018, 2 pages.
Corrected Notice of Allowance received for U.S. Appl. No. 14/641,252, dated Jul. 9, 2018, 25 pages.
Corrected Notice of Allowance received for U.S. Appl. No. 14/641,252, dated May 10, 2018, 10 pages.
Corrected Notice of Allowance received for U.S. Appl. No. 14/641,308, dated Mar. 10, 2020, 4 pages.
Corrected Notice of Allowance received for U.S. Appl. No. 14/829,573, dated Aug. 9, 2018, 3 pages.
Corrected Notice of Allowance received for U.S. Appl. No. 14/829,573, dated Sep. 11, 2018, 3 pages.
Corrected Notice of Allowance received for U.S. Appl. No. 14/830,629, dated Feb. 13, 2019, 3 pages.
Corrected Notice of Allowance received for U.S. Appl. No. 14/841,656, dated Apr. 11, 2018, 2 pages.
Corrected Notice of Allowance received for U.S. Appl. No. 14/841,656, dated May 7, 2018, 14 pages.
Corrected Notice of Allowance received for U.S. Appl. No. 14/913,345, dated Apr. 13, 2020, 4 pages.
Corrected Notice of Allowance received for U.S. Appl. No. 15/927,768, dated Aug. 7, 2019, 2 pages.
Corrected Notice of Allowance received for U.S. Appl. No. 15/927,768, dated Jul. 9, 2019, 2 pages.
Corrected Notice of Allowance received for U.S. Appl. No. 15/930,300, dated Dec. 24, 2020, 3 pages.
Corrected Notice of Allowance received for U.S. Appl. No. 16/055,489, dated Feb. 26, 2019, 2 pages.
Corrected Notice of Allowance received for U.S. Appl. No. 16/109,120, dated Nov. 12, 2019, 2 pages.
Corrected Notice of Allowance received for U.S. Appl. No. 16/147,413, dated Jan. 8, 2021, 7 pages.
Corrected Notice of Allowance received for U.S. Appl. No. 16/147,413, dated Nov. 25, 2020, 7 pages.
Corrected Notice of Allowance received for U.S. Appl. No. 16/147,413, dated Sep. 17, 2020, 7 pages.
Corrected Notice of Allowance received for U.S. Appl. No. 16/263,280, dated Aug. 5, 2021, 4 pages.
Corrected Notice of Allowance received for U.S. Appl. No. 16/358,483, dated Feb. 12, 2021, 4 pages.
Corrected Notice of Allowance received for U.S. Appl. No. 16/384,726, dated Apr. 2, 2021, 2 pages.
Corrected Notice of Allowance received for U.S. Appl. No. 16/814,801, dated Mar. 11, 2021, 8 pages.
Corrected Notice of Allowance received for U.S. Appl. No. 17/103,436, dated Dec. 22, 2021, 2 pages.

(56) References Cited

OTHER PUBLICATIONS

Corrected Notice of Allowance received for U.S. Appl. No. 17/378,451, dated May 4, 2022, 2 pages.
Decision on Appeal received for Korean Patent Application No. 10-2019-7028736, mailed on May 24, 2021, 16 pages.
Decision on Appeal received for Korean Patent Application No. 10-2016-7008449, mailed on Jul. 30, 2019, 29 pages.
Decision on Appeal received for Korean Patent Application No. 10-2016-7008474, mailed on Jan. 29, 2020, 21 pages.
Decision on Appeal received for Korean Patent Application No. 10-2016-7008488, mailed on Oct. 18, 2019, 33 pages.
Decision on Appeal received for Korean Patent Application No. 10-2018-7010872, mailed on Jan. 20, 2020, 20 pages.
Decision on Appeal received for Korean Patent Application No. 10-2018-7033888, mailed on Oct. 27, 2021, 34 pages.
Decision on Appeal received for U.S. Appl. No. 14/913,349, mailed on Apr. 20, 2022, 13 pages.
Decision to Grant received for Danish Patent Application No. PA201570781, dated Jul. 17, 2017, 2 pages.
Decision to Grant received for Danish Patent Application No. PA201670117, dated Nov. 20, 2017, 2 pages.
Decision to Grant received for Danish Patent Application No. PA201770181, dated Mar. 7, 2018, 2 pages.
Decision to Grant received for Danish Patent Application No. PA201770794, dated Nov. 11, 2019, 2 pages.
Decision to Grant received for Danish Patent Application No. PA201870631, dated May 15, 2019, 2 pages.
Decision to Grant received for Danish Patent Application No. PA201870632, dated May 14, 2019, 2 pages.
Decision to Grant received for Danish Patent Application No. PA201970259, dated Sep. 17, 2021, 2 pages.
Decision to Grant received for European Patent Application No. 14772001.5, dated Dec. 5, 2019, 2 pages.
Decision to Grant received for European Patent Application No. 14772002.3, dated Feb. 20, 2020, 2 pages.
Decision to Grant received for European Patent Application No. 14772494.2, dated Jul. 23, 2020, 2 pages.
Decision to Grant received for European Patent Application No. 15739110.3, dated Sep. 19, 2019, 2 pages.
Decision to Grant received for European Patent Application No. 15782209.9, dated Feb. 14, 2019, 2 pages.
Decision to Grant received for European Patent Application No. 18157131.6, dated May 16, 2019, 2 pages.
Decision to Grant received for European Patent Application No. 19199004.3, dated Jan. 21, 2021, 2 pages.
Dewsbery Victor, "Designing for Small Screens", AVA Publishing, 2005, 27 pages.
Ellis, Benus, "Use a Phone Number in the Google Calendar Where Line for One Click Calling", Available online at: https://ellisbenus.com/ellis-benus/use-a-phone-number-in-the-google-calender-where-line-for-one-click-calling, Ellis Benus—Small Business Web Guru, Oct. 3, 2012, 2 pages.
European Search Report received for European Patent Application No. 19173371.6, dated Oct. 30, 2019, 7 pages.
European Search Report received for European Patent Application No. 19173886.3, dated Oct. 30, 2019, 8 pages.
European Search Report received for European Patent Application No. 19199004.3, dated Nov. 12, 2019, 6 pages.
European Search Report received for European Patent Application No. 19206249.5, dated Dec. 19, 2019, 4 pages.
European Search Report received for European Patent Application No. 20217518.8, dated Apr. 16, 2021, 4 pages.
Examiner-Initiated Interview Summary received for U.S. Appl. No. 14/913,349, dated Oct. 27, 2020, 3 pages.
Examiner-Initiated Interview Summary received for U.S. Appl. No. 14/913,349, dated Sep. 22, 2021, 2 pages.
Examiner's Answer to Appeal Brief received for U.S. Appl. No. 14/913,349, mailed on Sep. 30, 2021, 23 pages.
Examiner's Answer to Appeal Brief received for U.S. Appl. No. 15/655,253, mailed on Mar. 10, 2022, 16 pages.
Extended European Search Report (includes Partial European Search Report and European Search Opinion) received for European Patent Application No. 16190252.3, dated Mar. 1, 2017, 10 pages.
Extended European Search Report received for European Patent Application No. 19185318.3, dated Nov. 20, 2019, 8 pages.
Extended European Search Report received for European Patent Application No. 17813779.0, dated Oct. 29, 2019, 8 pages.
Extended European Search Report received for European Patent Application No. 19156614.0, dated May 28, 2019, 9 pages.
Extended European Search Report received for European Patent Application No. 19195247.2, dated Mar. 9, 2020, 7 pages.
Extended European Search Report received for European Patent Application No. 19217240.1, dated May 25, 2020, 7 pages.
Extended European Search Report received for European Patent Application No. 20190670.8, dated Nov. 2, 2020, 10 pages.
"Feel the current time on your Apple Watch with TimeBuzz", Available online at: https://www.timebuzz.nl/, Version: 1.5 (build 32), 2021, 11 pages.
Feng, Lipeng, "Bound for computer lovers", Dec. 31, 2009, 2 pages.
Final Office Action received for U.S. Appl. No. 13/038,276, dated Mar. 27, 2014, 24 pages.
Final Office Action received for U.S. Appl. No. 13/038,276, dated Mar. 11, 2016, 36 pages.
Final Office Action received for U.S. Appl. No. 14/641,308, dated Jul. 1, 2019, 46 pages.
Final Office Action received for U.S. Appl. No. 14/641,308, dated Mar. 14, 2018, 42 pages.
Final Office Action received for U.S. Appl. No. 14/752,776, dated May 29, 2018, 36 pages.
Final Office Action received for U.S. Appl. No. 14/830,629, dated Apr. 16, 2018, 27 pages.
Final Office Action received for U.S. Appl. No. 14/841,646, dated Aug. 2, 2018, 22 pages.
Final Office Action received for U.S. Appl. No. 14/913,345, dated Oct. 26, 2018, 20 pages.
Final Office Action received for U.S. Appl. No. 14/913,349, dated Jul. 22, 2019, 20 pages.
Final Office Action received for U.S. Appl. No. 14/913,349, dated Jul. 30, 2018, 18 pages.
Final Office Action received for U.S. Appl. No. 14/913,349, dated Oct. 30, 2020, 33 pages.
Final Office Action received for U.S. Appl. No. 15/049,049 dated Jul. 12, 2018, 24 pages.
Final Office Action received for U.S. Appl. No. 15/049,049, dated May 23, 2017, 23 pages.
Final Office Action received for U.S. Appl. No. 15/049,052, dated Mar. 1, 2018, 15 pages.
Final Office Action received for U.S. Appl. No. 15/049,052, dated May 17, 2017, 13 pages.
Final Office Action received for U.S. Appl. No. 15/049,052, dated Oct. 2, 2018, 16 pages.
Final Office Action received for U.S. Appl. No. 15/049,058, dated Aug. 8, 2018, 23 pages.
Final Office Action received for U.S. Appl. No. 15/049,058, dated May 8, 2017, 21 pages.
Final Office Action received for U.S. Appl. No. 15/049,064, dated Feb. 27, 2017, 13 pages.
Final Office Action received for U.S. Appl. No. 15/655,253, dated Feb. 4, 2020, 20 pages.
Final Office Action received for U.S. Appl. No. 15/655,253, dated Feb. 9, 2021, 16 pages.
Final Office Action received for U.S. Appl. No. 15/818,500, dated Apr. 6, 2020, 15 pages.
Final Office Action received for U.S. Appl. No. 15/818,500, dated Nov. 30, 2021, 14 pages.
Final Office Action received for U.S. Appl. No. 16/144,950, dated Nov. 25, 2019, 24 pages.
Final Office Action received for U.S. Appl. No. 16/147,413, dated Sep. 3, 2019, 19 pages.
Final Office Action received for U.S. Appl. No. 16/263,280, dated Mar. 4, 2021, 13 pages.
Final Office Action received for U.S. Appl. No. 16/265,938, dated Apr. 7, 2020, 45 pages.

(56) References Cited

OTHER PUBLICATIONS

Final Office Action received for U.S. Appl. No. 16/734,173, dated Feb. 22, 2022, 16 pages.
Final Office Action received for U.S. Appl. No. 16/734,173, dated Jul. 13, 2021, 12 pages.
Final Office Action received for U.S. Appl. No. 16/775,528, dated May 25, 2021, 15 pages.
Final Office Action received for U.S. Appl. No. 16/871,995, dated Aug. 20, 2021, 25 pages.
Final Office Action received for U.S. Appl. No. 14/839,912, dated Jul. 30, 2019, 42 pages.
Final Office Action received for U.S. Appl. No. 14/839,912, dated Sep. 13, 2018, 31 pages.
Fitzpatrick, Jason, "How to Use Your Smart Watch or Fitness Tracker as a Silent Alarm Clock", Available Online at: https://www.howtogeek.com/232576/how-to-use-your-smart-watch-or-fitness-tracker-as-a-silent-alarm-clock/, Oct. 30, 2015, 5 pages.
"FTScroller v0.2.2", Online available at https://github.com/ftlabs/ftscroller/tree/v0.2.2, Mar. 18, 2013, 9 pages.
Googlehelp, "Change Your Watch's Home Screen", Available Online at: https://support.google.com/wearos/answer/6140435?hl=en, Dec. 11, 2014, 2 pages.
"Headset Button Controller v7.3 APK Full App Download for Andriod", Blackberry, iPhone, Available online at: http://fullappdownload.com/headset-button-controller-v7-3-apk/, Jan. 27, 2014, 11 pages.
Intention to Grant received for Danish Patent Application No. PA201570781, dated Dec. 8, 2016, 2 pages.
Intention to Grant received for Danish Patent Application No. PA201670117, dated Apr. 21, 2017, 2 pages.
Intention to Grant received for Danish Patent Application No. PA201770794, dated Aug. 15, 2019, 2 pages.
Intention to Grant received for Danish Patent Application No. PA201870631, dated Apr. 5, 2019, 2 pages.
Intention to Grant received for Danish Patent Application No. PA201870632, dated Apr. 5, 2019, 2 pages.
Intention to Grant received for Danish Patent Application No. PA201970259, dated Mar. 23, 2021, 2 pages.
Intention to Grant received for European Patent Application No. 14772001.5, dated Jul. 18, 2019, 16 pages.
Intention to Grant received for European Patent Application No. 14772001.5, dated Mar. 22, 2019, 17 pages.
Intention to Grant received for European Patent Application No. 14772002.3, dated Jun. 24, 2019, 9 pages.
Intention to Grant received for European Patent Application No. 14772002.3, dated Nov. 6, 2019, 9 pages.
Intention to Grant received for European Patent Application No. 14772494.2, dated Mar. 16, 2020, 10 pages.
Intention to Grant received for European Patent Application No. 15739110.3, dated Mar. 7, 2019, 8 pages.
Intention to Grant received for European Patent Application No. 15739110.3, dated Sep. 11, 2019, 6 pages.
Intention to Grant received for European Patent Application No. 15782209.9, dated Sep. 28, 2018, 8 pages.
Intention to Grant received for European Patent Application No. 18157131.6, dated Jan. 9, 2019, 9 pages.
Intention to Grant received for European Patent Application No. 19185318.3, dated Dec. 10, 2021, 12 pages.
Intention to Grant received for European Patent Application No. 19199004.3, dated Sep. 14, 2020, 9 pages.
Intention to Grant received for Indian Patent Application No. 201617009216, dated Aug. 27, 2020, 2 pages.
International Preliminary Report on Patentability received for PCT Patent Application No. PCT/US2012/025519, dated Sep. 12, 2013, 6 pages.
International Preliminary Report on Patentability received for PCT Patent Application No. PCT/US2014/053951, dated Mar. 17, 2016, 9 pages.
International Preliminary Report on Patentability received for PCT Patent Application No. PCT/US2014/053957, dated Mar. 17, 2016, 8 pages.
International Preliminary Report on Patentability received for PCT Patent Application No. PCT/US2014/053958, dated Mar. 17, 2016, 8 pages.
International Preliminary Report on Patentability received for PCT Patent Application No. PCT/US2014/053961, dated Jul. 21, 2016, 24 pages.
International Preliminary Report on Patentability received for PCT Patent Application No. PCT/US2015/019322, dated Mar. 16, 2017, 11 pages.
International Preliminary Report on Patentability received for PCT Patent Application No. PCT/US2015/038173, dated Jan. 5, 2017, 10 pages.
International Preliminary Report on Patentability received for PCT Patent Application No. PCT/US2015/038174, dated Jan. 5, 2017, 27 pages.
International Preliminary Report on Patentability received for PCT Patent Application No. PCT/US2015/045936, dated Mar. 16, 2017, 9 pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2015/047704, dated Mar. 16, 2017, 19 pages.
International Preliminary Report on Patentability received for PCT Patent Application No. PCT/US2015/054310, dated Sep. 14, 2017, 7 pages.
International Preliminary Report on Patentability received for PCT Patent Application No. PCT/US2016/019637, dated Sep. 21, 2017, 12 pages.
International Preliminary Report on Patentability received for PCT Patent Application No. PCT/US2017/035325, dated Dec. 27, 2018, 9 pages.
International Preliminary Report on Patentability received for PCT Patent Application No. PCT/US2019/049237, dated Mar. 25, 2021, 15 pages.
International Preliminary Report on Patentability received for PCT Patent Application No. PCT/US2015/019320, dated Mar. 16, 2017, 10 pages.
International Preliminary Report on Patentability received for PCT Patent Application No. PCT/US2015/019321, dated Mar. 16, 2017, 8 pages.
International Search Report and Written Opinion received for PCT Patent Application No. PCT/US2012/025519, dated Jun. 11, 2012, 7 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/019321, dated Jun. 3, 2015, 11 pages.
International Search Report and Written Opinion received for PCT Patent Application No. PCT/US2015/019322, dated Jun. 18, 2015, 16 pages.
International Search Report and Written Opinion received for PCT Patent Application No. PCT/US2015/038173 dated Sep. 25, 2015, 13 pages.
International Search Report and Written Opinion received for PCT Patent Application No. PCT/US2015/038174, dated Jan. 18, 2016, 38 pages.

(56) References Cited

OTHER PUBLICATIONS

International Search Report and Written Opinion received for PCT Patent Application No. PCT/US2015/045936, dated Nov. 4, 2015, 12 pages.
International Search Report and Written Opinion received for PCT Patent Application No. PCT/US2015/045965, dated Feb. 1, 2016, 20 pages.
International Search Report and Written Opinion received for PCT Patent Application No. PCT/US2015/047704, dated Feb. 22, 2016, 25 pages.
International Search Report and Written Opinion received for PCT Patent Application No. PCT/US2015/054310, dated Jan. 20, 2016, 10 pages.
International Search Report and Written Opinion received for PCT Patent Application No. PCT/US2016/019637, dated Aug. 18, 2016, 18 pages.
International Search Report and Written Opinion received for PCT Patent Application No. PCT/US2017/035325, dated Sep. 7, 2017, 11 pages.
International Search Report and Written Opinion received for PCT Patent Application No. PCT/US2019/049237, dated Jan. 8, 2020, 21 pages.
International Search Report received for PCT Patent Application No. PCT/US2014/053961, dated Jul. 11, 2016, 10 pages.
International Written Opinion received for PCT Patent Application No. PCT/US2014/053961, dated Jul. 11, 2016, 22 pages.
Invitation to Pay Additional Fees received for PCT Patent Application No. PCT/US2014/053961, dated Aug. 3, 2015, 6 pages.
Invitation to Pay Additional Fees received for PCT Patent Application No. PCT/US2015/038174, dated Oct. 5, 2015, 5 pages.
Invitation to Pay Additional Fees received for PCT Patent Application No. PCT/US2015/047704, dated Dec. 16, 2015, 10 pages.
Invitation to Pay Additional Fees received for PCT Patent Application No. PCT/US2016/019637, dated Jun. 1, 2016, 6 pages.
Invitation to Pay Additional Fees received for PCT Patent Application No. PCT/US2019/049237, dated Oct. 31, 2019, 18 pages.
Jepson, Tom, "How to auto-forward specific emails in gmail?", Available online at <http://www.tomjepson.co.uk/how-to-auto-forward-specific-emails-in-gmail/>, May 19, 2013, 7 pages.
Kamijo, Noboru, "Next Generation Mobile System—WatchPad1.5", Available at <http://researcher.ibm.com/researcher/view_group_subpage.php?id=5617>, retrieved on Jul. 4, 2015, 2 pages.
Little Ben—Elegant Quarter Chime Clock App for your iPhone & iPad, Online available at: www.curveddesign.com, Retrieved on Dec. 4, 2020, Oct. 29, 2013, 8 pages.
Little Ben—Time haptics for your Apple Watch, Like a Cuckoo Clock, Online available at: https://www.producthunt.com/posts/little-ben, Retrieved on Dec. 7, 2020, Nov. 25, 2017, 2 pages.
Lyons et al., "Facet: A Multi-Segment Wrist Worn System", Online available at: <http://fetlab.io/publications/2012-Facet-a%20multi-segment%20wrist%20worn%20system.pdf>, Oct. 7-10, 2012, pp. 123-129.
Mai, Tuan, "This Watch Tells You the Time in Vibrating Morse Code", Available at <https://web.archive.org/web/20130915060538/http://www.tomsguide.com/us/Watch-Concept-Morse-Code,news-12089.html>, Aug. 9, 2011, pp. 1-3.
"Microsoft Outlook 2010(TM) A Beginners Guide", Available online at:—http://www.reading.ac.uk/web/files/its/outlook2010.pdf, Apr. 1, 2012, 24 pages.
Narayanaswami et al., "Challenges and considerations for the design and production of a purpose-optimized body-worn wristwatch computer", Online available at https://www.spiedigitallibrary.org/conference-proceedings-of-spie/5443/0000/Challenges-and-considerations-for-the-design-and-production-of-a/10.1117/12.561263.short?SSO=1, Defense, Security, and Cockpit Displays, vol. 5443, Sep. 15, 2004, 13 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Netsapiens, "Click to Call in MS Outlook", Available online at <https://netsapiens.com/click-to-call-in-ms-outlook-windows-apps/>, May 4, 2012, 8 pages.
Non-Final Office Action received for U.S. Appl. No. 13/038,276, dated Jul. 29, 2015, 31 pages.
Non-Final Office Action received for U.S. Appl. No. 13/038,276, dated Sep. 12, 2013, 24 pages.
Non-Final Office Action received for U.S. Appl. No. 14/641,308, dated Dec. 20, 2018, 43 pages.
Non-Final Office Action received for U.S. Appl. No. 14/641,308, dated Jun. 23, 2017, 53 pages.
Non-Final Office Action received for U.S. Appl. No. 14/752,776, dated Jan. 2, 2018, 30 pages.
Non-Final Office Action received for U.S. Appl. No. 14/752,776, dated Nov. 5, 2018, 48 pages.
Non-Final Office Action received for U.S. Appl. No. 14/829,573, dated Jan. 22, 2018, 26 pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017, 24 pages.
Non-Final Office Action received for U.S. Appl. No. 14/839,912, dated Feb. 26, 2019, 36 pages.
Non-Final Office Action received for U.S. Appl. No. 14/839,914, dated Oct. 19, 2017, 46 pages.
Non-Final Office Action received for U.S. Appl. No. 14/841,646, dated Dec. 1, 2017, 23 pages.
Non-Final Office Action received for U.S. Appl. No. 14/841,656, dated Jul. 26, 2017, 20 pages.
Non-Final Office Action received for U.S. Appl. No. 14/913,345, dated Apr. 5, 2018, 15 pages.
Non-Final Office Action received for U.S. Appl. No. 14/913,349, dated Apr. 2, 2019, 15 pages.
Non-Final Office Action received for U.S. Appl. No. 14/913,349, dated Apr. 22, 2020, 20 pages.
Non-Final Office Action received for U.S. Appl. No. 14/913,349, dated Jan. 2, 2020, 25 pages.
Non-Final Office Action received for U.S. Appl. No. 14/913,349, dated Jan. 11, 2018, 6 pages.
Non-Final Office Action received for U.S. Appl. No. 14/913,350, dated May 14, 2018, 30 pages.
Non-Final Office Action received for U.S. Appl. No. 15/049,049 dated Dec. 15, 2017, 23 pages.
Non-Final Office Action received for U.S. Appl. No. 15/049,049, dated Feb. 6, 2019, 21 pages.
Non-Final Office Action received for U.S. Appl. No. 15/049,049, dated Nov. 9, 2016, 21 pages.
Non-Final Office Action received for U.S. Appl. No. 15/049,052, dated May 31, 2018, 15 pages.
Non-Final Office Action received for U.S. Appl. No. 15/049,052, dated Nov. 29, 2016, 13 pages.
Non-Final Office Action received for U.S. Appl. No. 15/049,052, dated Sep. 21, 2017, 14 pages.
Non-Final Office Action received for U.S. Appl. No. 15/049,058, dated Feb. 20, 2018, 21 pages.
Non-Final Office Action received for U.S. Appl. No. 15/049,058, dated Jun. 5, 2019, 25 pages.
Non-Final Office Action received for U.S. Appl. No. 15/049,058, dated Nov. 16, 2016, 19 pages.
Non-Final Office Action received for U.S. Appl. No. 15/049,064, dated Oct. 27, 2016, 15 pages.
Non-Final Office Action received for U.S. Appl. No. 15/421,711, dated May 18, 2018, 25 pages.
Non-Final Office Action received for U.S. Appl. No. 15/655,253, dated Jul. 10, 2019, 16 pages.
Non-Final Office Action received for U.S. Appl. No. 15/655,253, dated Sep. 10, 2020, 17 pages.
Non-Final Office Action received for U.S. Appl. No. 15/818,500, dated Aug. 30, 2019, 17 pages.
Non-Final Office Action received for U.S. Appl. No. 15/818,500, dated Jul. 12, 2021, 18 pages.
Non-Final Office Action received for U.S. Appl. No. 16/144,950, dated Mar. 6, 2019, 24 pages.

(56) References Cited

OTHER PUBLICATIONS

Non-Final Office Action received for U.S. Appl. No. 16/147,413, dated Mar. 11, 2020, 22 pages.
Non-Final Office Action received for U.S. Appl. No. 16/147,413, dated Feb. 7, 2019, 18 pages.
Non-Final Office Action received for U.S. Appl. No. 16/263,280, dated Jul. 27, 2020, 11 pages.
Non-Final Office Action received for U.S. Appl. No. 16/265,938, dated Nov. 4, 2019, 28 pages.
Non-Final Office Action received for U.S. Appl. No. 16/358,483, dated May 1, 2020, 37 pages.
Non-Final Office Action received for U.S. Appl. No. 16/384,726, dated May 14, 2020, 16 pages.
Non-Final Office Action received for U.S. Appl. No. 16/525,082, dated Jul. 9, 2020, 20 pages.
Non-Final Office Action received for U.S. Appl. No. 16/703,486, dated Jan. 27, 2022, 13 pages.
Non-Final Office Action received for U.S. Appl. No. 16/734,173, dated Jan. 6, 2021, 14 pages.
Non-Final Office Action received for U.S. Appl. No. 16/734,173, dated Jul. 23, 2020, 16 pages.
Non-Final Office Action received for U.S. Appl. No. 16/734,173, dated Nov. 2, 2021, 13 pages.
Non-Final Office Action received for U.S. Appl. No. 16/775,528, dated Nov. 20, 2020, 15 pages.
Non-Final Office Action received for U.S. Appl. No. 16/775,528, dated Sep. 13, 2021, 14 pages.
Non-Final Office Action received for U.S. Appl. No. 16/814,801, dated Dec. 15, 2020, 17 pages.
Non-Final Office Action received for U.S. Appl. No. 16/871,995, dated Apr. 26, 2021, 14 pages.
Non-Final Office Action received for U.S. Appl. No. 16/871,995, dated Feb. 1, 2022, 18 pages.
Non-Final Office Action received for U.S. Appl. No. 16/926,512, dated Jan. 21, 2022, 20 pages.
Non-Final Office Action received for U.S. Appl. No. 17/103,436, dated Aug. 18, 2021, 16 pages.
Non-Final Office Action received for U.S. Appl. No. 17/212,850, dated Oct. 8, 2021, 14 pages.
Non-Final Office Action received for U.S. Appl. No. 17/306,342, dated Mar. 15, 2022, 15 pages.
Non-Final Office Action received for U.S. Appl. No. 14/839,912, dated Feb. 12, 2018, 30 pages.
Non-Final Office Action received for U.S. Appl. No. 14/913,345, dated Jun. 26, 2019, 23 pages.
Non-Final Office Action received for U.S. Appl. No. 14/839,912, dated Jun. 8, 2017, 26 pages.
Notice of Acceptance received for Australian Patent Application No. 2014315319, dated Oct. 12, 2017, 3 pages.
Notice of Acceptance received for Australian Patent Application No. 2014315324, dated Sep. 28, 2017, 3 pages.
Notice of Acceptance received for Australian Patent Application No. 2014315325, dated Apr. 19, 2017, 3 pages.
Notice of Acceptance received for Australian Patent Application No. 2015279544, dated Mar. 1, 2018, 3 pages.
Notice of Acceptance received for Australian Patent Application No. 2016231598, dated Mar. 1, 2018, 3 pages.
Notice of Acceptance received for Australian Patent Application No. 2017276285, dated Apr. 3, 2019, 3 pages.
Notice of Acceptance received for Australian Patent Application No. 2018200289, dated Jul. 23, 2019, 3 pages.
Notice of Acceptance received for Australian Patent Application No. 2018204286, dated Feb. 27, 2020, 3 pages.
Notice of Acceptance received for Australian Patent Application No. 2019201628, dated Sep. 10, 2019, 3 pages.
Notice of Acceptance received for Australian Patent Application No. 2019206101, dated Dec. 11, 2020, 3 pages.
Notice of Acceptance received for Australian Patent Application No. 2019272034, dated Dec. 14, 2020, 3 pages.
Notice of Acceptance received for Australian Patent Application No. 2019337519, dated Dec. 15, 2021, 3 pages.
Notice of Acceptance received for Australian Patent Application No. 2020203919, dated Sep. 3, 2021, 3 pages.
Notice of Acceptance received for Australian Patent Application No. 2015279545, dated Feb. 9, 2018, 3 pages.
Notice of Allowance and Search Report received for Taiwanese Patent Application No. 104128687, dated Jun. 7, 2016, 4 pages.
Notice of Allowance received for Chinese Patent Application No. 201480059543.9, dated Sep. 4, 2019, 2 pages.
Notice of Allowance received for Chinese Patent Application No. 201480060044.1, dated Mar. 29, 2019, 3 pages.
Notice of Allowance received for Chinese Patent Application No. 201480060082.7, dated Mar. 12, 2019, 2 pages.
Notice of Allowance received for Chinese Patent Application No. 201580029054.3, dated Jul. 19, 2019, 2 pages.
Notice of Allowance received for Chinese Patent Application No. 201580077206.7, dated Feb. 3, 2021, 2 pages.
Notice of Allowance received for Chinese Patent Application No. 201780014703.1, dated Nov. 6, 2019, 2 pages.
Notice of Allowance received for Chinese Patent Application No. 201810074876.9, dated Jan. 12, 2021, 2 pages.
Notice of Allowance received for Chinese Patent Application No. 201910454069.4, dated Nov. 2, 2020, 7 pages.
Notice of Allowance received for Chinese Patent Application No. 201910454076.4, dated Feb. 4, 2021, 2 pages.
Notice of Allowance received for Chinese Patent Application No. 201911127193.6, dated May 8, 2021, 4 pages.
Notice of Allowance received for Chinese Patent Application No. 202110396782.5, dated Mar. 30, 2022, 5 pages.
Notice of Allowance received for Danish Patent Application No. PA201570776, dated Feb. 8, 2017, 2 pages.
Notice of Allowance received for Danish Patent Application No. PA201670118, dated Mar. 30, 2017, 2 pages.
Notice of Allowance received for Japanese Patent Application No. 2016-537945, dated Aug. 3, 2018, 4 pages.
Notice of Allowance received for Japanese Patent Application No. 2016-537946, dated Mar. 26, 2018, 4 pages.
Notice of Allowance received for Japanese Patent Application No. 2016-537947, dated Jun. 5, 2017, 6 pages.
Notice of Allowance received for Japanese Patent Application No. 2016-537948, dated Nov. 11, 2019, 3 pages.
Notice of Allowance received for Japanese Patent Application No. 2017-545561, dated Jul. 12, 2019, 4 pages.
Notice of Allowance received for Japanese Patent Application No. 2018-083313, dated Jul. 1, 2019, 4 pages.
Notice of Allowance received for Japanese Patent Application No. 2018-090084, dated May 24, 2019, 4 pages.
Notice of Allowance received for Japanese Patent Application No. 2018-143982, dated Apr. 8, 2019, 4 pages.
Notice of Allowance received for Japanese Patent Application No. 2019-088503, dated Feb. 18, 2022, 4 pages.
Notice of Allowance received for Japanese Patent Application No. 2019-138053, dated Jul. 2, 2021, 4 pages.
Notice of Allowance received for Korean Patent Application No. 10-2016-7008449, dated Aug. 9, 2019, 6 pages.
Notice of Allowance received for Korean Patent Application No. 10-2016-7008488, dated Oct. 25, 2019, 4 pages.
Notice of Allowance received for Korean Patent Application No. 10-2018-7002695, dated Oct. 8, 2018, 5 pages.
Notice of Allowance received for Korean Patent Application No. 10-2018-7010872, dated Feb. 10, 2020, 6 pages.
Notice of Allowance received for Korean Patent Application No. 10-2018-7013265, dated Apr. 1, 2020, 4 pages.
Notice of Allowance received for Korean Patent Application No. 10-2018-7032106, dated Jun. 28, 2019, 5 pages.
Notice of Allowance received for Korean Patent Application No. 10-2019-7007748, dated May 6, 2020, 5 pages.
Notice of Allowance received for Korean Patent Application No. 10-2020-7019035, dated Jun. 18, 2021, 4 pages.
Notice of Allowance received for Korean Patent Application No. 10-2020-7022802, dated Mar. 4, 2021, 6 pages.

(56) References Cited

OTHER PUBLICATIONS

Notice of Allowance received for Korean Patent Application No. 10-2021-7005523, dated Aug. 26, 2021, 4 pages.
Notice of Allowance received for Taiwanese Patent Application No. 103130517, dated May 14, 2018, 5 pages.
Notice of Allowance received for Taiwanese Patent Application No. 103130518, dated May 19, 2016, 6 pages.
Notice of Allowance received for Taiwanese Patent Application No. 103130519, dated Oct. 27, 2016, 3 pages.
Notice of Allowance received for Taiwanese Patent Application No. 103130520, dated Apr. 25, 2018, 4 pages.
Notice of Allowance received for Taiwanese Patent Application No. 104107318, dated Oct. 19, 2021, 5 pages.
Notice of Allowance received for Taiwanese Patent Application No. 104107327, dated Jul. 19, 2019, 5 pages.
Notice of Allowance received for Taiwanese Patent Application No. 104107333, dated Nov. 8, 2016, 2 pages.
Notice of Allowance received for Taiwanese Patent Application No. 104107334, dated Jan. 26, 2017, 3 pages.
Notice of Allowance received for Taiwanese Patent Application No. 104133281, dated Mar. 29, 2018, 4 pages.
Notice of Allowance received for U.S. Appl. No. 13/038,276, dated Nov. 3, 2016, 10 pages.
Notice of Allowance received for U.S. Appl. No. 13/038,276, dated Nov. 30, 2016, 2 pages.
Notice of Allowance received for U.S. Appl. No. 14/641,241, dated Apr. 13, 2017, 2 pages.
Notice of Allowance received for U.S. Appl. No. 14/641,241, dated Jan. 31, 2017, 13 pages.
Notice of Allowance received for U.S. Appl. No. 14/641,241, dated Mar. 24, 2017, 3 pages.
Notice of Allowance received for U.S. Appl. No. 14/641,252, dated Apr. 11, 2018, 14 pages.
Notice of Allowance received for U.S. Appl. No. 14/641,252, dated Jul. 18, 2018, 9 pages.
Notice of Allowance received for U.S. Appl. No. 14/641,308, dated Jan. 15, 2020, 7 pages.
Notice of Allowance received for U.S. Appl. No. 14/829,573, dated Apr. 25, 2018, 6 pages.
Notice of Allowance received for U.S. Appl. No. 14/830,629, dated Oct. 17, 2018, 8 pages.
Notice of Allowance received for U.S. Appl. No. 14/839,914, dated Jun. 22, 2018, 12 pages.
Notice of Allowance received for U.S. Appl. No. 14/841,646, dated Apr. 18, 2019, 7 pages.
Notice of Allowance received for U.S. Appl. No. 14/841,656, dated Feb. 12, 2018, 9 pages.
Notice of Allowance received for U.S. Appl. No. 14/841,656, dated Mar. 5, 2018, 3 pages.
Notice of Allowance received for U.S. Appl. No. 14/913,345, dated Feb. 10, 2020, 10 pages.
Notice of Allowance received for U.S. Appl. No. 14/913,350, dated Dec. 19, 2018, 27 pages.
Notice of Allowance received for U.S. Appl. No. 15/049,049, dated Jul. 25, 2019, 8 pages.
Notice of Allowance received for U.S. Appl. No. 15/049,052, dated Sep. 16, 2019, 5 pages.
Notice of Allowance received for U.S. Appl. No. 15/049,064, dated Jul. 18, 2017, 24 pages.
Notice of Allowance received for U.S. Appl. No. 15/058,996, dated Dec. 27, 2016, 10 pages.
Notice of Allowance received for U.S. Appl. No. 15/421,711, dated Oct. 5, 2018, 10 pages.
Notice of Allowance received for U.S. Appl. No. 15/818,500, dated Feb. 22, 2021, 11 pages.
Notice of Allowance received for U.S. Appl. No. 15/927,768, dated May 31, 2019, 13 pages.
Notice of Allowance received for U.S. Appl. No. 15/930,300, dated Aug. 5, 2020, 14 pages.
Notice of Allowance received for U.S. Appl. No. 16/055,489, dated Jan. 9, 2019, 24 pages.
Notice of Allowance received for U.S. Appl. No. 16/055,489, dated Jan. 25, 2019, 8 pages.
Notice of Allowance received for U.S. Appl. No. 16/055,489, dated Nov. 8, 2018, 28 pages.
Notice of Allowance received for U.S. Appl. No. 16/109,120, dated Sep. 11, 2019, 12 pages.
Notice of Allowance received for U.S. Appl. No. 16/144,950, dated Mar. 19, 2020, 14 pages.
Notice of Allowance received for U.S. Appl. No. 16/147,413, dated Jul. 20, 2020, 11 pages.
Notice of Allowance received for U.S. Appl. No. 16/147,413, dated Nov. 5, 2020, 10 pages.
Notice of Allowance received for U.S. Appl. No. 16/263,280, dated Jun. 8, 2021, 8 pages.
Notice of Allowance received for U.S. Appl. No. 16/263,280, dated Sep. 17, 2021, 8 pages.
Notice of Allowance received for U.S. Appl. No. 16/265,938, dated Oct. 15, 2020, 8 pages.
Notice of Allowance received for U.S. Appl. No. 16/358,483, dated Jan. 19, 2021, 9 pages.
Notice of Allowance received for U.S. Appl. No. 16/358,483, dated May 17, 2021, 5 pages.
Notice of Allowance received for U.S. Appl. No. 16/384,726, dated Mar. 17, 2021, 9 pages.
Notice of Allowance received for U.S. Appl. No. 16/525,082, dated Aug. 20, 2020, 5 pages.
Notice of Allowance received for U.S. Appl. No. 16/525,082, dated Nov. 17, 2020, 7 pages.
Notice of Allowance received for U.S. Appl. No. 16/775,528, dated Feb. 24, 2022, 18 pages.
Notice of Allowance received for U.S. Appl. No. 16/814,801, dated Feb. 18, 2021, 9 pages.
Notice of Allowance received for U.S. Appl. No. 16/926,512, dated May 18, 2022, 9 pages.
Notice of Allowance received for U.S. Appl. No. 17/103,436, dated Dec. 8, 2021, 12 pages.
"Nova Launcher", Available on https://web.archive.org/web/20150703231459/https://play.google.com/store/apps/details?id=com.teslacoilsw.launcher, retrieved on Jul. 3, 2015, 3 pages.
Office Action and Search Report received for Danish Patent Application No. PA 201670118, dated Jul. 1, 2016, 7 pages.
Office Action received for Danish Patent Application No. PA201770794, dated Dec. 19, 2017, 8 pages.
Office Action received for Korean Patent Application No. 10-2018-7010872, dated Dec. 21, 2018, 7 pages.
Office Action received for Australian Patent Application No. 2014315234, dated Jul. 12, 2017, 4 pages.
Office Action received for Australian Patent Application No. 2014315234, dated Nov. 2, 2016, 3 pages.
Office Action received for Australian Patent Application No. 2014315319, dated Aug. 3, 2017, 3 pages.
Office Action received for Australian Patent Application No. 2014315319, dated Oct. 17, 2016, 3 pages.
Office Action received for Australian Patent Application No. 2014315324, dated Aug. 8, 2017, 3 pages.
Office Action received for Australian Patent Application No. 2014315324, dated Oct. 21, 2016, 3 pages.
Office Action received for Australian Patent Application No. 2014315325, dated Nov. 3, 2016, 3 pages.
Office Action received for Australian Patent Application No. 2015279544, dated Apr. 18, 2017, 4 pages.
Office Action received for Australian Patent Application No. 2015279544, dated Feb. 13, 2018, 5 pages.
Office Action received for Australian Patent Application No. 2016229407, dated Aug. 15, 2018, 4 pages.
Office Action received for Australian Patent Application No. 2016229407, dated May 27, 2019, 4 pages.
Office Action received for Australian Patent Application No. 2016231598, dated Apr. 7, 2017, 5 pages.
Office Action received for Australian Patent Application No. 2017254897, dated Aug. 29, 2018, 4 pages.

(56) References Cited

OTHER PUBLICATIONS

Office Action received for Australian Patent Application No. 2017254897, dated Jun. 28, 2019, 4 pages.
Office Action received for Australian Patent Application No. 2017276285, dated Nov. 26, 2018, 2 pages.
Office Action received for Australian Patent Application No. 2018200289, dated Apr. 9, 2019, 5 pages.
Office Action received for Australian Patent Application No. 2018200289, dated Dec. 4, 2018, 4 pages.
Office Action received for Australian Patent Application No. 2018200998, dated Jan. 30, 2019, 4 pages.
Office Action received for Australian Patent Application No. 2018200998, dated Mar. 9, 2018, 5 pages.
Office Action received for Australian Patent Application No. 2018204286, dated Apr. 17, 2019, 5 pages.
Office Action received for Australian Patent Application No. 2018204286, dated Nov. 12, 2019, 5 pages.
Office Action received for Australian Patent Application No. 2018204286, dated Sep. 5, 2019, 5 pages.
Office Action received for Australian Patent Application No. 2019201628, dated May 13, 2019, 2 pages.
Office Action received for Australian Patent Application No. 2019206101, dated Jul. 14, 2020, 4 pages.
Office Action received for Australian Patent Application No. 2019216614, dated Apr. 1, 2020, 4 pages.
Office Action received for Australian Patent Application No. 2019216614, dated Aug. 13, 2020, 4 pages.
Office Action received for Australian Patent Application No. 2019216614, dated Aug. 22, 2019, 3 pages.
Office Action received for Australian Patent Application No. 2019257521, dated Apr. 8, 2021, 6 pages.
Office Action received for Australian Patent Application No. 2019257521, dated Aug. 7, 2020, 5 pages.
Office Action received for Australian Patent Application No. 2019257521, dated Jul. 27, 2021, 6 pages.
Office Action received for Australian Patent Application No. 2019257521, dated Oct. 21, 2020, 6 pages.
Office Action received for Australian Patent Application No. 2019272034, dated Sep. 14, 2020, 4 pages.
Office Action received for Australian Patent Application No. 2019337519, dated Mar. 18, 2021, 5 pages.
Office Action received for Australian Patent Application No. 2019337519, dated Oct. 8, 2021, 7 pages.
Office Action received for Australian Patent Application No. 2020203919, dated Dec. 23, 2020, 5 pages.
Office Action received for Australian Patent Application No. 2020203919, dated Jul. 19, 2021, 7 pages.
Office Action received for Australian Patent Application No. 2020203919, dated Mar. 30, 2021, 5 pages.
Office Action received for Australian Patent Application No. 2020203919, dated Oct. 19, 2020, 5 pages.
Office Action received for Australian Patent Application No. 2022202044, dated Apr. 6, 2022, 3 pages.
Office Action received for Australian Patent Application No. 2014315234, dated Apr. 19, 2017, 4 pages.
Office Action received for Australian Patent Application No. 2015279545, dated Apr. 13, 2017, 3 pages.
Office Action received for Chinese Patent Application No. 201480059543.9, dated Feb. 28, 2019, 16 pages.
Office Action received for Chinese Patent Application No. 201480059543.9, dated Jan. 26, 2018, 17 pages.
Office Action received for Chinese Patent Application No. 201480059543.9, dated Sep. 19, 2018, 18 pages.
Office Action received for Chinese Patent Application No. 201480060044.1, dated Jan. 26, 2018, 15 pages.
Office Action received for Chinese Patent Application No. 201480060044.1, dated Sep. 25, 2018, 6 pages.
Office Action received for Chinese Patent Application No. 201480060082.7, dated Jan. 26, 2018, 15 pages.
Office Action received for Chinese Patent Application No. 201480060082.7, dated Sep. 25, 2018, 6 pages.
Office Action received for Chinese Patent Application No. 201480060083.1, dated Aug. 13, 2019, 6 pages.
Office Action received for Chinese Patent Application No. 201480060083.1, dated Dec. 5, 2018, 11 pages.
Office Action received for Chinese Patent Application No. 201580029054.3, dated Dec. 5, 2018, 12 pages.
Office Action received for Chinese Patent Application No. 201580046339.8, dated Feb. 26, 2019, 18 pages.
Office Action received for Chinese Patent Application No. 201580046339.8, dated Jun. 3, 2020, 19 pages.
Office Action received for Chinese Patent Application No. 201580046339.8, dated Oct. 19, 2020, 12 pages.
Office Action received for Chinese Patent Application No. 201580046339.8, dated Oct. 31, 2019, 9 pages.
Office Action received for Chinese Patent Application No. 201580077206.7, dated Feb. 3, 2020, 29 pages.
Office Action received for Chinese Patent Application No. 201580077206.7, dated Nov. 11, 2020, 11 pages.
Office Action received for Chinese Patent Application No. 201680012759.9, dated Jun. 19, 2020, 18 pages.
Office Action received for Chinese Patent Application No. 201780014703.1, dated Apr. 30, 2019, 9 pages.
Office Action received for Chinese Patent Application No. 201810074876.9, dated Jul. 31, 2020, 11 pages.
Office Action received for Chinese Patent Application No. 201910164962.3, dated Apr. 8, 2020, 25 pages.
Office Action received for Chinese Patent Application No. 201910164962.3, dated Jan. 12, 2021, 14 pages.
Office Action received for Chinese Patent Application No. 201910164962.3, dated Sep. 18, 2020, 19 pages.
Office Action received for Chinese Patent Application No. 201910438645.6, dated Mar. 2, 2022, 11 pages.
Office Action received for Chinese Patent Application No. 201910447678.7, dated Mar. 21, 2022, 14 pages.
Office Action received for Chinese Patent Application No. 201910447678.7, dated Nov. 29, 2021, 17 pages.
Office Action received for Chinese Patent Application No. 201910454069.4, dated Dec. 20, 2019, 6 pages.
Office Action received for Chinese Patent Application No. 201910454069.4, dated Jul. 24, 2020, 8 pages.
Office Action received for Chinese Patent Application No. 201910454076.4, dated Dec. 18, 2019, 14 pages.
Office Action received for Chinese Patent Application No. 201910454076.4, dated Oct. 16, 2020, 14 pages.
Office Action received for Chinese Patent Application No. 201911127193.6, dated Dec. 17, 2020, 21 pages.
Office Action received for Chinese Patent Application No. 202110396782.5, dated Nov. 11, 2021, 10 pages.
Office Action received for Danish Patent Application No. PA201570776, dated Aug. 19, 2016, 3 pages.
Office Action received for Danish Patent Application No. PA201570776, dated Jan. 26, 2016, 12 pages.
Office Action received for Danish Patent Application No. PA201570781, dated Aug. 19, 2016, 3 pages.
Office Action received for Danish Patent Application No. PA201670117, dated Jan. 12, 2017, 3 pages.
Office Action received for Danish Patent Application No. PA201670117, dated Jun. 13, 2016, 10 pages.
Office Action received for Danish Patent Application No. PA201670118, dated Feb. 2, 2017, 2 pages.
Office Action received for Danish Patent Application No. PA201670118, dated Oct. 25, 2016, 3 pages.
Office Action received for Danish Patent Application No. PA201670580, dated Feb. 4, 2019, 2 pages.
Office Action received for Danish Patent Application No. PA201670580, dated Mar. 8, 2018, 3 pages.
Office Action received for Danish Patent Application No. PA201770181, dated Jan. 3, 2018, 2 pages.
Office Action received for Danish Patent Application No. PA201770181, dated Jun. 13, 2017, 6 pages.

(56) References Cited

OTHER PUBLICATIONS

Office Action received for Danish Patent Application No. PA201770794, dated Apr. 5, 2018, 4 pages.
Office Action received for Danish Patent Application No. PA201770794, dated Jun. 13, 2019, 2 pages.
Office Action received for Danish Patent Application No. PA201770794, dated Oct. 30, 2018, 3 pages.
Office Action received for Danish Patent Application No. PA201970259, dated Jan. 15, 2020, 4 pages.
Office Action received for Danish Patent Application No. PA201970259, dated Nov. 23, 2020, 3 pages.
Office Action received for European Patent Application No. 14771688.0, dated Jan. 21, 2019, 8 pages.
Office Action received for European Patent Application No. 14771688.0, dated May 31, 2018, 6 pages.
Office Action received for European Patent Application No. 14771688.0, dated Nov. 30, 2017, 15 pages.
Office Action received for European Patent Application No. 14771688.0, dated Sep. 16, 2019, 7 pages.
Office Action received for European Patent Application No. 14772001.5, dated Feb. 14, 2018, 5 pages.
Office Action received for European Patent Application No. 14772001.5, dated May 30, 2017, 10 pages.
Office Action received for European Patent Application No. 14772002.3, dated Jul. 4, 2017, 8 pages.
Office Action received for European Patent Application No. 14772494.2, dated Jun. 20, 2017, 7 pages.
Office Action received for European Patent Application No. 14772494.2, dated Oct. 2, 2018, 9 pages.
Office Action received for European Patent Application No. 15739109.5, dated Jan. 31, 2018, 7 pages.
Office Action received for European Patent Application No. 15739110.3, dated Jan. 31, 2018, 8 pages.
Office Action received for European Patent Application No. 16190252.3, dated Feb. 19, 2018, 7 pages.
Office Action received for European Patent Application No. 16710372.0, dated Feb. 22, 2019, 7 pages.
Office Action received for European Patent Application No. 17813779.0, dated Aug. 28, 2020, 7 pages.
Office Action received for European Patent Application No. 17813779.0, dated Mar. 4, 2021, 7 pages.
Office Action received for European Patent Application No. 18157131.6, dated May 8, 2018, 12 pages.
Office Action received for European Patent Application No. 19156614.0, dated Jul. 16, 2021, 10 pages.
Office Action received for European Patent Application No. 19173371.6, dated Mar. 15, 2021, 6 pages.
Office Action received for European Patent Application No. 19173371.6, dated Nov. 12, 2019, 11 pages.
Office Action received for European Patent Application No. 19173886.3, dated Mar. 16, 2021, 6 pages.
Office Action received for European Patent Application No. 19173886.3, dated Nov. 12, 2019, 9 pages.
Office Action received for European Patent Application No. 19199004.3, dated Nov. 22, 2019, 10 pages.
Office Action received for European Patent Application No. 19206249.5, dated Jan. 11, 2021, 8 pages.
Office Action received for European Patent Application No. 19206249.5, dated Jan. 20, 2020, 8 pages.
Office Action received for European Patent Application No. 19217240.1, dated Dec. 17, 2021, 8 pages.
Office Action received for European Patent Application No. 20217518.8, dated Apr. 30, 2021, 8 pages.
Office Action received for Indian Patent Application No. 201617008291, dated Jan. 14, 2020, 7 pages.
Office Action received for Indian Patent Application No. 201617008296, dated Jan. 14, 2020, 7 pages.
Office Action received for Indian Patent Application No. 201617009216, dated Jan. 24, 2020, 6 pages.
Office Action received for Indian Patent Application No. 201617009428, dated Feb. 26, 2020, 7 pages.
Office Action received for Indian Patent Application No. 201818001531, dated Mar. 12, 2021, 6 pages.
Office Action received for Indian Patent Application No. 202018011347, dated Mar. 2, 2022, 6 pages.
Office Action received for Indian Patent Application No. 202018012249, dated Nov. 1, 2021, 6 pages.
Office Action received for Indian Patent Application No. 202018014953, dated Mar. 7, 2022, 7 pages.
Office Action received for Indian Patent Application No. 202018015998, dated Nov. 17, 2021, 6 pages.
Office Action received for Indian Patent Application No. 202018016000, dated Nov. 16, 2021, 6 pages.
Office Action received for Japanese Patent Application No. 2016-537945, dated Apr. 7, 2017, 6 pages.
Office Action received for Japanese Patent Application No. 2016-537945, dated Jan. 9, 2018, 5 pages.
Office Action received for Japanese Patent Application No. 2016-537946, dated Aug. 7, 2017, 8 pages.
Office Action received for Japanese Patent Application No. 2016-537946, dated Jan. 30, 2017, 12 pages.
Office Action received for Japanese Patent Application No. 2016-537947, dated Feb. 24, 2017, 6 pages.
Office Action received for Japanese Patent Application No. 2016-537948, dated Apr. 6, 2018, 5 pages.
Office Action received for Japanese Patent Application No. 2016-537948, dated Jun. 9, 2017, 10 pages.
Office Action received for Japanese Patent Application No. 2016-537948, dated Sep. 3, 2018, 4 pages.
Office Action received for Japanese Patent Application No. 2017-545561, dated Aug. 6, 2018, 8 pages.
Office Action received for Japanese Patent Application No. 2018-083313, dated Feb. 12, 2019, 4 pages.
Office Action received for Japanese Patent Application No. 2018-090084, dated Feb. 15, 2019, 6 pages.
Office Action received for Japanese Patent Application No. 2018-143982, dated Dec. 7, 2018, 10 pages.
Office Action received for Japanese Patent Application No. 2019-088503, dated Apr. 2, 2021, 6 pages.
Office Action received for Japanese Patent Application No. 2019-088503, dated Jul. 31, 2020, 7 pages.
Office Action received for Japanese Patent Application No. 2019-116590, dated Feb. 4, 2022, 17 pages.
Office Action received for Japanese Patent Application No. 2019-116590, dated Mar. 15, 2021, 6 pages.
Office Action received for Japanese Patent Application No. 2019-116590, dated Oct. 5, 2020, 6 pages.
Office Action received for Japanese Patent Application No. 2019-138053, dated Oct. 2, 2020, 6 pages.
Office Action received for Japanese Patent Application No. 2021-510409, dated Apr. 8, 2022, 5 pages.
Office Action received for Japanese Patent Application No. 2021-510409, dated Oct. 8, 2021, 9 pages.
Office Action received for Korean Patent Application No. 10-2016-7008449, dated Jan. 12, 2017, 15 pages.
Office Action received for Korean Patent Application No. 10-2016-7008449, dated Jan. 16, 2018, 10 pages.
Office Action received for Korean Patent Application No. 10-2016-7008449, dated Nov. 27, 2017, 6 pages.
Office Action received for Korean Patent Application No. 10-2016-7008474, dated Aug. 6, 2018, 10 pages.
Office Action received for Korean Patent Application No. 10-2016-7008474, dated Dec. 30, 2016, 10 pages.
Office Action received for Korean Patent Application No. 10-2016-7008474, dated May 15, 2018, 7 pages.
Office Action received for Korean Patent Application No. 10-2016-7008474, dated Nov. 27, 2017, 6 pages.
Office Action received for Korean Patent Application No. 10-2016-7008488, dated Feb. 8, 2018, 8 pages.
Office Action received for Korean Patent Application No. 10-2016-7008488, dated Jan. 12, 2017, 14 pages.

(56) References Cited

OTHER PUBLICATIONS

Office Action received for Korean Patent Application No. 10-2016-7008488, dated Nov. 27, 2017, 6 pages.
Office Action received for Korean Patent Application No. 10-2016-7008682, dated Dec. 30, 2016, 11 pages.
Office Action received for Korean Patent Application No. 10-2016-7008682, dated Feb. 8, 2018, 7 pages.
Office Action received for Korean Patent Application No. 10-2016-7008682, dated Nov. 27, 2017, 7 pages.
Office Action received for Korean Patent Application No. 10-2017-7024506, dated Aug. 12, 2019, 6 pages.
Office Action received for Korean Patent Application No. 10-2017-7024506, dated Feb. 19, 2020, 12 pages.
Office Action received for Korean Patent Application No. 10-2017-7024506, dated Jul. 8, 2020, 6 pages.
Office Action received for Korean Patent Application No. 10-2017-7024506, dated Sep. 28, 2018, 11 pages.
Office Action received for Korean Patent Application No. 10-2018-7002695, dated Feb. 27, 2018, 12 pages.
Office Action received for Korean Patent Application No. 10-2018-7002695, dated Jun. 19, 2018, 8 pages.
Office Action received for Korean Patent Application No. 10-2018-7010872, dated May 21, 2018, 10 pages.
Office Action received for Korean Patent Application No. 10-2018-7013265, dated Aug. 10, 2018, 12 pages.
Office Action received for Korean Patent Application No. 10-2018-7013265, dated Jun. 14, 2019, 6 pages.
Office Action received for Korean Patent Application No. 10-2018-7032106, dated Dec. 26, 2018, 10 pages.
Office Action received for Korean Patent Application No. 10-2018-7033888, dated Jul. 7, 2020, 7 pages.
Office Action received for Korean Patent Application No. 10-2018-7033888, dated Nov. 28, 2019, 10 pages.
Office Action received for Korean Patent Application No. 10-2018-7033888, dated Oct. 19, 2020, 10 pages.
Office Action received for Korean Patent Application No. 10-2019-7007748, dated Nov. 15, 2019, 9 pages.
Office Action received for Korean Patent Application No. 10-2019-7028736, dated May 7, 2020, 8 pages.
Office Action received for Korean Patent Application No. 10-2019-7028736, dated Nov. 28, 2019, 8 pages.
Office Action received for Korean Patent Application No. 10-2019-7028736, dated Oct. 22, 2020, 6 pages.
Office Action received for Korean Patent Application No. 10-2020-7019035, dated Aug. 28, 2020, 6 pages.
Office Action received for Korean Patent Application No. 10-2020-7022802, dated Aug. 28, 2020, 7 pages.
Office Action received for Korean Patent Application No. 10-2021-7001482, dated Apr. 9, 2021, 10 pages.
Office Action received for Korean Patent Application No. 10-2021-7001482, dated Jan. 24, 2022, 9 pages.
Office Action received for Korean Patent Application No. 10-2021-7001918, dated May 7, 2021, 5 pages.
Office Action received for Korean Patent Application No. 10-2021-7001918, dated Nov. 16, 2021, 12 pages.
Office Action received for Korean Patent Application No. 10-2021-7005523, dated Mar. 31, 2021, 8 pages.
Office Action received for Korean Patent Application No. 10-2021-7017259, dated Jan. 10, 2022, 6 pages.
Office Action received for Korean Patent Application No. 10-2021-7017259, dated Jul. 19, 2021, 10 pages.
Office Action received for Korean Patent Application No. 10-2021-7017259, dated Mar. 3, 2022, 8 pages.
Office Action received for Korean Patent Application No. 10-2021-7039120, dated May 30, 2022, 7 pages.
Office Action received for Korean Patent Application No. 10-2018-7010872, dated Feb. 13, 2019, 7 pages.
Office Action received for Taiwan Patent Application No. 103130519, dated Mar. 25, 2016, 14 pages.
Office Action received for Taiwanese Patent Application No. 103130517, dated Feb. 6, 2018, 5 pages.
Office Action received for Taiwanese Patent Application No. 103130517, dated Feb. 22, 2016, 7 pages.
Office Action received for Taiwanese Patent Application No. 103130517, dated Jul. 29, 2016, 7 pages.
Office Action received for Taiwanese Patent Application No. 103130518, dated Oct. 15, 2015, 7 pages.
Office Action received for Taiwanese Patent Application No. 103130520, dated Apr. 17, 2017, 8 pages.
Office Action received for Taiwanese Patent Application No. 103130520, dated Jan. 23, 2018, 5 pages.
Office Action received for Taiwanese Patent Application No. 103130520, dated May 23, 2016, 38 pages.
Office Action received for Taiwanese Patent Application No. 103130520, dated Oct. 1, 2015, 58 pages.
Office Action received for Taiwanese Patent Application No. 103130520, dated Sep. 29, 2016, 39 pages.
Office Action received for Taiwanese Patent Application No. 104107318, dated Dec. 26, 2018, 33 pages.
Office Action received for Taiwanese Patent Application No. 104107318, dated Feb. 18, 2020, 10 pages.
Office Action received for Taiwanese Patent Application No. 104107318, dated Jul. 9, 2021, 5 pages.
Office Action received for Taiwanese Patent Application No. 104107327, dated Sep. 28, 2018, 7 pages.
Office Action received for Taiwanese Patent Application No. 104107329, dated Jul. 24, 2020, 7 pages.
Office Action received for Taiwanese Patent Application No. 104107329, dated Mar. 5, 2020, 22 pages.
Office Action received for Taiwanese Patent Application No. 104107333, dated May 17, 2016, 6 pages.
Office Action received for Taiwanese Patent Application No. 104107334, dated Sep. 19, 2016, 15 pages.
Office Action received for Taiwanese Patent Application No. 104128701, dated Jul. 22, 2016, 25 pages.
Office Action received for Taiwanese Patent Application No. 104128701, dated Mar. 16, 2017, 8 pages.
Office Action received for Taiwanese Patent Application No. 104133281, dated Mar. 30, 2017, 10 pages.
Office Action received for Taiwanese Patent Application No. 104133281, dated Sep. 1, 2016, 10 pages.
Office Action received for Taiwanese Patent Application No. 104120843, dated Jan. 30, 2016, 5 pages.
Partial European Search Report received for European Patent Application No. 19173371.6, dated Jul. 18, 2019, 17 pages.
Partial European Search Report received for European Patent Application No. 19173886.3, dated Jul. 18, 2019, 15 pages.
Pedersen, Isabel, "Ready to Wear (or Not) Examining the Rhetorical Impact of Proposed Wearable Devices", 2013 IEEE International Symposium on Technology and Society (ISTAS) Social Implications of Wearable Computing and Augmediated Reality III Everyday Life, Dec. 31, 2013, pp. 201-202.
Raghunath et al., "User Interfaces for Applications on a Wrist Watch", Personal and Ubiquitous Computing, vol. 6, No. 1, 2002, Springer, 2002, pp. 17-30.
"Remote Phone Call", Available online at <https://web.archive.org/web/20140625104844/https://www.justremotephone.com/>, Jun. 25, 2014, 22 pages.
"Responding to a meeting invitation", Available online at:—https://web.archive.org/web/20121128174157/https://www.zimbra.com/desktop7/help/en_US/Calendar/Responding_to_an_invitation.htm, Nov. 28, 2012, 1 page.
Rev. Some Culture, "It's super easy for middle-aged and elderly people to learn compute", Jul. 31, 2013, 2 pages.
Search Report and Opinion received for Danish Patent Application No. PA201670580, dated Jan. 31, 2017, 7 pages.
Search Report and opinion received for Danish Patent Application No. PA201870631, dated Dec. 6, 2018, 8 pages.
Search Report and Opinion received for Danish Patent Application No. PA201870632, dated Dec. 3, 2018, 8 pages.
Search Report and Opinion received for Danish Patent Application No. PA201970259, dated Jul. 19, 2019, 10 pages.

(56) References Cited

OTHER PUBLICATIONS

Search Report received for Danish Patent Application No. PA201570781, dated Mar. 8, 2016, 10 pages.
Search Report received for European Patent Application No. 18157131.6, dated Apr. 19, 2018, 4 pages.
Summons to Attend Oral Proceedings received for European Patent Application No. 14772001.5, mailed on Nov. 14, 2018, 5 pages.
Summons to Attend Oral Proceedings received for European Patent Application No. 14772001.5, mailed on Oct. 4, 2018, 15 pages.
Summons to Attend Oral Proceedings received for European Patent Application No. 15739109.5, mailed on Aug. 23, 2018, 9 pages.
Summons to Attend Oral Proceedings received for European Patent Application No. 15739109.5, mailed on Oct. 4, 2018, 3 pages.
Summons to Attend Oral Proceedings received for European Patent Application No. 15739110.3, mailed on Aug. 23, 2018, 10 pages.
Summons to Attend Oral Proceedings received for European Patent Application No. 15739110.3, mailed on Oct. 2, 2018, 3 pages.
Summons to Attend Oral Proceedings received for European Patent Application No. 16190252.3, mailed on Jan. 8, 2019, 3 pages.
Summons to Attend Oral Proceedings received for European Patent Application No. 16190252.3, mailed on Oct. 30, 2018, 13 pages.
Supplemental Notice of Allowance received for U.S. Appl. No. 15/818,500, dated Mar. 5, 2021, 2 pages.
Supplemental Notice of Allowance received for U.S. Appl. No. 16/926,512, dated Aug. 8, 2022, 3 pages.
Tablet Talk, "Tablet Talk App: Frequently Asked Questions—Tablet Talk.", available at https://web.archive.org/web/20140625102903/http://1www.tablettal app.com/faq, Jun. 25, 2014, pp. 1-6.
The Blind Life, "Double Tap Big Clock", https://www.youttlbe.com/watch?v-=U6XMnSPCEXU, Mar. 2, 2016, 2 Pages.
"The interview with a key person. IBM and Citizen met and applied Linux to a watch", ASCII Corporation, vol. 25, No. 12, Dec. 12, 2001, pp. 136-143.
The Window Club, "How to Set GIF as Background Windows 7", Online Available at <https://www.youtube.com/watch?v=tUec42Qd7ng>, Dec. 24, 2012, pp. 1-5.
Timebuzz, "Feel the current time on your Apple Watch with Time Buzz", Available at <https://web.archive.org/web/20160125032143/http://www.timebuzz.nl/>, Jan. 25, 2016, pp. 1-6.
Timebuzz, "Introducing Time Buzz, an Apple Watch App that Allows You to Tell the Time Using the Taptic Engine", Online available at: https://www.applevis.com/forum/watchos-apple-watch-apps/introducing-timebuzz-apple-watch-app-allows-you-tell-time-using, Retrieved on Dec. 7, 2020, Dec. 22, 2015, 10 pages.
Tong et al., "Discussion About the Influence of Wearable Device on Mobile Operators'Service", Telecom science, Oct. 31, 2014, pp. 134-142.
Toyssy et al., "Telling Time by Vibration", 6th International Conference, EuroHaptics 2008 Madrid, Spain, Jun. 10-11, 2008, pp. 924-929.
Toyssy, Sampo, "Telling Time by Vibration", University of Tampere, Department of Computer Sciences, Interactive Technology, Master's Thesis, Nov. 2007, 57 Pages.
"Use Accessibility features on your Apple Watch", Online available at: https://support.apple.com/en-us/HT204576, Retrieved on 12/712020, Oct. 30, 2018, 5 pages.
"WatchPad 1.5", Online Available at http://web.archive.org/web/20011205071448/http://www.trl.ibm.com:80/projects/ngm/index_e.htm, Dec. 5, 2001, 2 pages.
"Watchpad 1.5.mpeg", YouTube.com, Online Available at <https://www.youtube.com/watch?v=7xjvVbeUn80>, Uploaded on Jun. 20, 2010, 2 pages.
Wikipedia, "Rotary encoder", Online Available at <https://en.wikipedia.org/wiki/Rotary_encoder>, Retrieved on May 17, 2017, 17 pages.
WZ Science Alliance, "Very simple geriatrics computer and Internet bestselling upgrade", Sep. 30, 2013, 3 pages.
Zibreg, Christian, "How to select Siri voices for VoiceOver, Speak Screen and Speak Selection features", Available online at: https://www.idownloadblog.com/2016/02/17/how-to-select-siri-voices-for-voiceover/, Retrieved on Dec. 8, 2020, Feb. 17, 2016, 22 pages.
Office Action received for Australian Patent Application No. 2021277718, dated Dec. 5, 2022, 3 pages.
Notice of Allowance received for U.S. Appl. No. 16/734,173, dated Apr. 11, 2023, 17 pages.
Notice of Allowance received for U.S. Appl. No. 17/572,117, dated Apr. 4, 2023, 9 pages.
Office Action received for Japanese Patent Application No. 2022-045923, dated Apr. 3, 2023, 8 pages (4 pages of English Translation and 4 pages of Official Copy).
Supplemental Notice of Allowance received for U.S. Appl. No. 15/818,500, dated Mar. 24, 2023, 2 pages.
Office Action received for Australian Patent Application No. 2021212114, dated Feb. 14, 2023, 4 pages.
Office Action received for Japanese Patent Application No. 2021-111630, dated Feb. 10, 2023, 9 pages (4 pages of English Translation and 5 pages of Official Copy).
Applicant-Initiated Interview Summary received for U.S. Appl. No. 15/818,500, dated Oct. 21, 2022, 4 pages.
Applicant-Initiated Interview Summary received for U.S. Appl. No. 16/703,486, dated Oct. 28, 2022, 5 pages.
Applicant-Initiated Interview Summary received for U.S. Appl. No. 17/212,850, dated Nov. 2, 2022, 5 pages.
Office Action received for Australian Patent Application No. 2021212114, dated Oct. 28, 2022, 3 pages.
Office Action received for Australian Patent Application No. 2021277718, dated Oct. 17, 2022, 4 pages.
Applicant-Initiated Interview Summary received for U.S. Appl. No. 17/572,117, dated Feb. 1, 2023, 4 pages.
Non-Final Office Action received for U.S. Appl. No. 16/871,995, dated Jan. 31, 2023, 19 pages.
Office Action received for Australian Patent Application No. 2021277718, dated Jan. 23, 2023, 4 pages.
Office Action received for Chinese Patent Application No. 201910875660.7, dated Dec. 26, 2022, 7 pages (3 pages of English Translation and 4 pages of Official Copy).
Advisory Action received for U.S. Appl. No. 16/734,173, dated Mar. 13, 2023, 6 pages.
Applicant-Initiated Interview Summary received for U.S. Appl. No. 16/734,173, dated Mar. 3, 2023, 4 pages.
Notice of Acceptance received for Australian Patent Application No. 2021277718, dated Mar. 3, 2023, 3 pages.
Office Action received for Chinese Patent Application No. 201911022448.2, dated Jan. 28, 2023, 16 pages (7 pages of English Translation and 9 pages of Official Copy).
Office Action received for Indian Patent Application No. 202018015999, dated Feb. 21, 2023, 8 pages.
Applicant-Initiated Interview Summary received for U.S. Appl. No. 17/212,850, dated Jul. 17, 2023, 5 pages.
Office Action received for Australian Patent Application No. 2022235609, dated Jul. 12, 2023, 4 pages.
Office Action received for Chinese Patent Application No. 202211502699.2, dated Jul. 1, 2023, 21 pages (9 pages of English Translation and 12 pages of Official Copy).
Applicant-Initiated Interview Summary received for U.S. Appl. No. 16/871,995, dated May 2, 2023, 4 pages.
Office Action received for Chinese Patent Application No. 201911127810.2, dated Feb. 23, 2023, 12 pages (4 pages of English Translation and 8 pages of Official Copy).
Office Action received for Chinese Patent Application No. 201911129908.1, dated Mar. 1, 2023, 17 pages (7 pages of English Translation and 10 pages of Official Copy).
Office Action received for European Patent Application No. 19156614.0, dated Apr. 24, 2023, 10 pages.
Non-Final Office Action received for U.S. Appl. No. 17/506,197, dated Sep. 14, 2023, 13 pages.
Office Action received for Australian Patent Application No. 2023202432, dated Sep. 18, 2023, 4 pages.
Office Action received for Chinese Patent Application No. 201910875660.7, dated Aug. 12, 2023, 15 pages (6 pages of English Translation and 9 pages of Official Copy).

(56) References Cited

OTHER PUBLICATIONS

Office Action received for Japanese Patent Application No. 2022-045923, dated Sep. 8, 2023, 8 pages (4 pages of English Translation and 4 pages of Official Copy).
Examiner's Answer to Appeal Brief received for U.S. Appl. No. 16/703,486, mailed on Jun. 6, 2023, 20 pages.
Office Action received for Chinese Patent Application No. 201911023176.8, dated Apr. 15, 2023, 6 pages (3 pages of English Translation and 3 pages of Official Copy).
Office Action received for Chinese Patent Application No. 201911127810.2, dated May 18, 2023, 12 pages (6 pages of English Translation and 6 pages of Official Copy).
Office Action received for European Patent Application No. 19206249.5, dated Jun. 16, 2023, 6 pages.
Applicant-Initiated Interview Summary received for U.S. Appl. No. 17/878,792, dated Sep. 8, 2023, 4 pages.
Notice of Allowance received for Chinese Patent Application No. 201911023176.8, dated Aug. 15, 2023, 2 pages (1 page of English Translation and 1 page of Official Copy).
Notice of Allowance received for U.S. Appl. No. 17/212,850, dated Sep. 5, 2023, 18 pages.
Office Action received for Australian Patent Application No. 2022235585, dated Jul. 27, 2023, 4 pages.
Office Action received for Chinese Patent Application No. 201911022448.2, dated Jul. 14, 2023, 13 pages (5 pages of English Translation and 8 pages of Official Copy).
Office Action received for Chinese Patent Application No. 201911127810.2, dated Jul. 26, 2023, 11 pages (5 pages of English Translation and 6 pages of Official Copy).
Office Action received for Chinese Patent Application No. 202110902807.4, dated Jul. 4, 2023, 15 pages (6 pages of English Translation and 9 pages of Official Copy).
Final Office Action received for U.S. Appl. No. 17/212,850, dated May 9, 2023, 15 pages.
Office Action received for Korean Patent Application No. 10-2022-7045500, dated Apr. 24, 2023, 9 pages (4 pages of English Translation and 5 pages of Official copy).
Final Office Action received for U.S. Appl. No. 16/871,995, dated Jul. 3, 2023, 18 pages.
Non-Final Office Action received for U.S. Appl. No. 17/878,792, dated Jun. 23, 2023, 19 pages.
Notice of Acceptance received for Australian Patent Application No. 2021212114, dated Jul. 7, 2023, 3 pages.
Notice of Hearing received for Indian Patent Application No. 201617008291, mailed on Jul. 4, 2023, 3 pages.
Summons to Attend Oral Proceedings received for European Patent Application No. 19173886.3, mailed on Oct. 20, 2023, 18 pages.
Notice of Allowance received for Japanese Patent Application No. 2022-126562, dated Sep. 29, 2023, 4 pages (1 page of English Translation and 3 pages of Official Copy).
Office Action received for European Patent Application No. 19173371.6, dated Oct. 9, 2023, 21 pages.
Notice of Acceptance received for Australian Patent Application No. 2022235609, dated Nov. 14, 2023, 3 pages.
Office Action received for Chinese Patent Application No. 202211502699.2, dated Nov. 16, 2023, 17 pages (10 pages of English Translation and 7 pages of Official Copy).

* cited by examiner

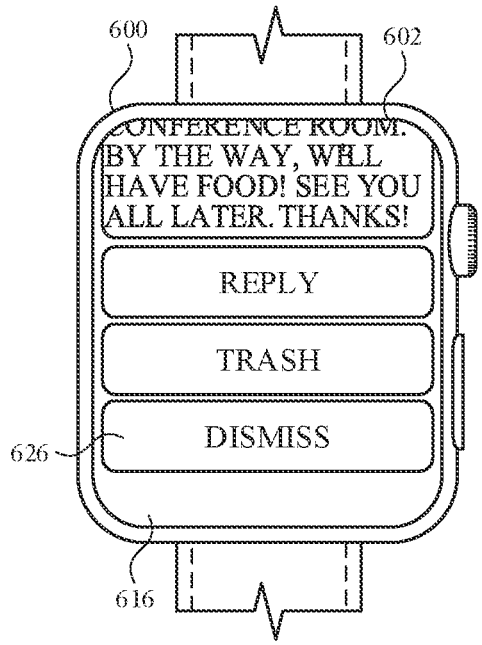
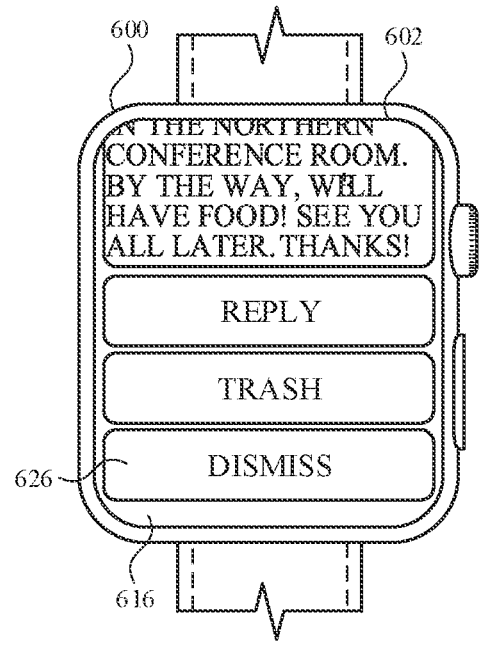
FIG. 6Q
FIG. 6R
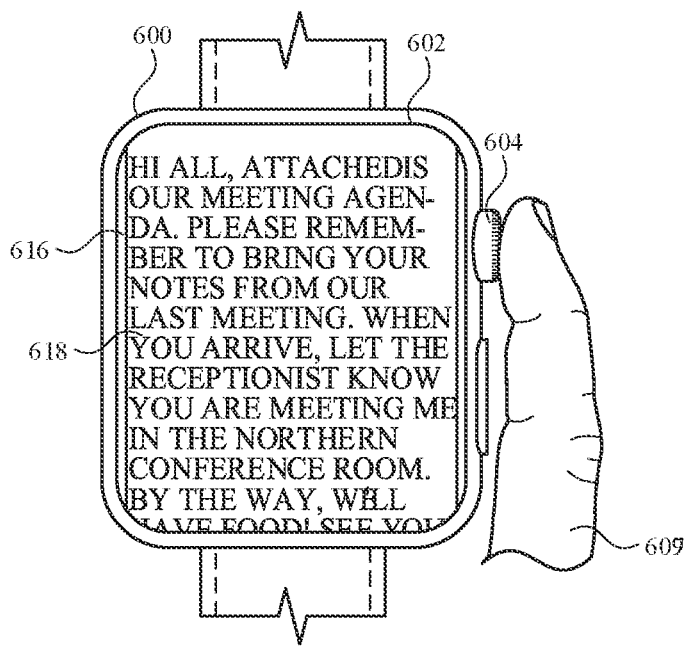
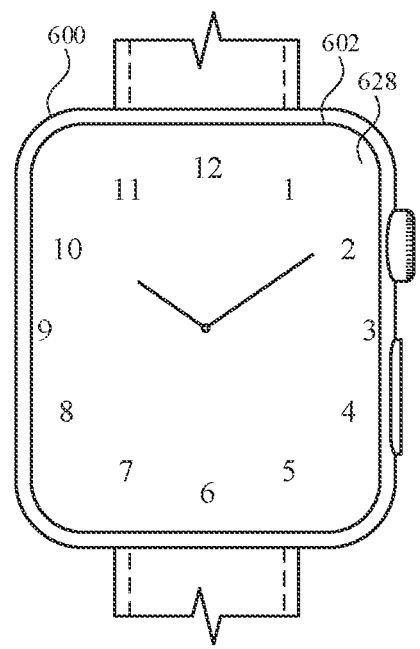
FIG. 6S
FIG. 6T

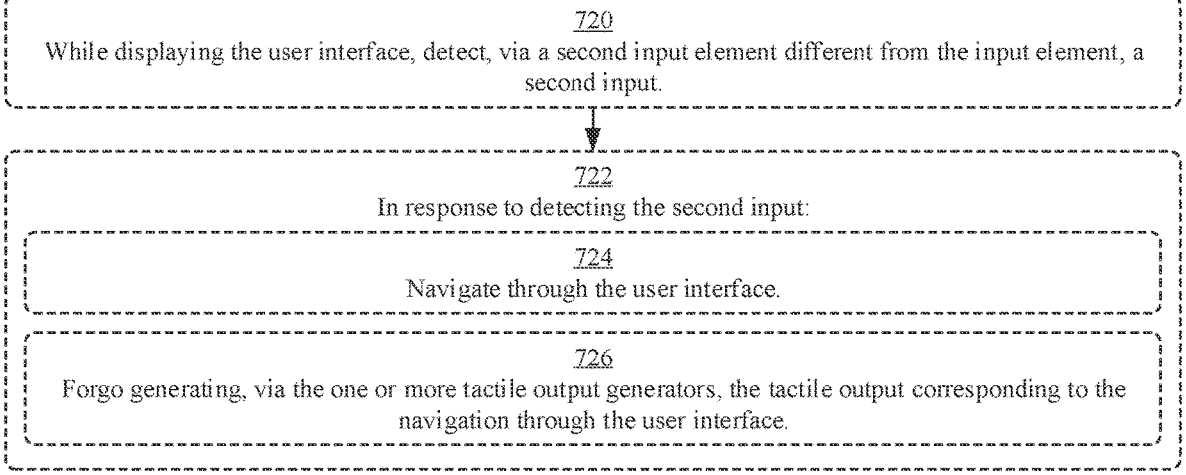

720
While displaying the user interface, detect, via a second input element different from the input element, a second input.

722
In response to detecting the second input:

724
Navigate through the user interface.

726
Forgo generating, via the one or more tactile output generators, the tactile output corresponding to the navigation through the user interface.

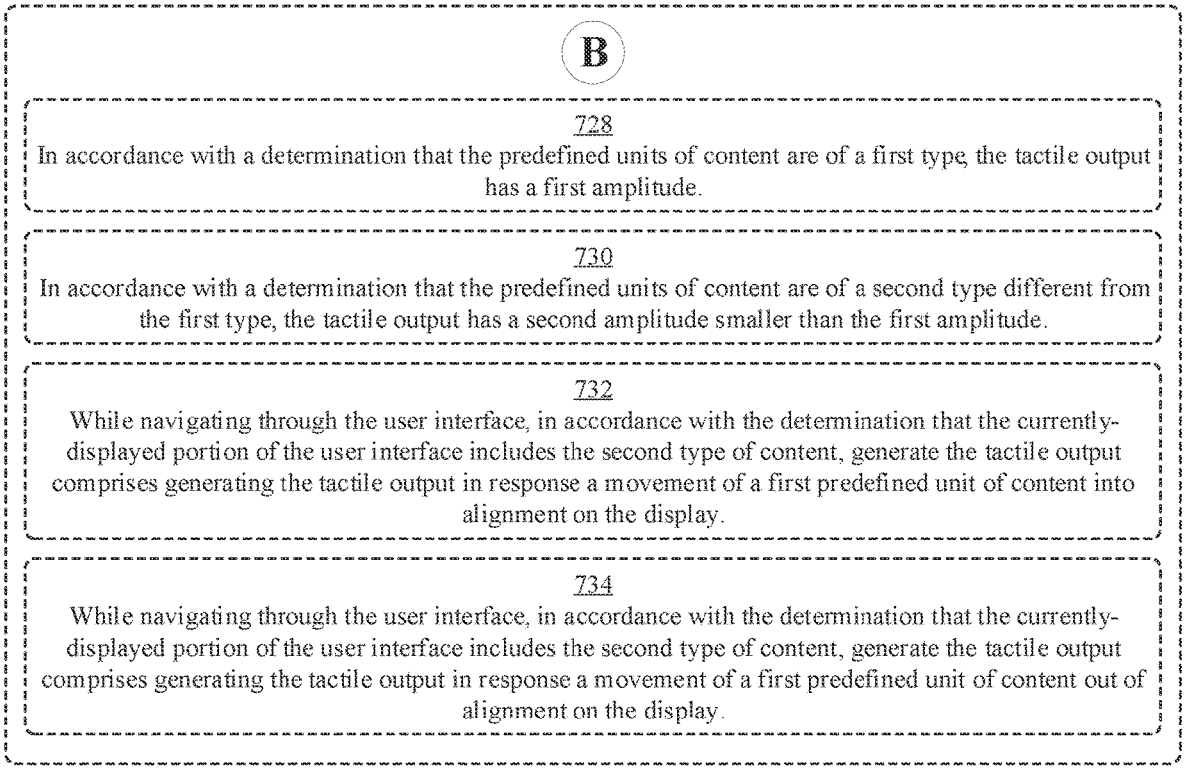

728
In accordance with a determination that the predefined units of content are of a first type, the tactile output has a first amplitude.

730
In accordance with a determination that the predefined units of content are of a second type different from the first type, the tactile output has a second amplitude smaller than the first amplitude.

732
While navigating through the user interface, in accordance with the determination that the currently-displayed portion of the user interface includes the second type of content, generate the tactile output comprises generating the tactile output in response a movement of a first predefined unit of content into alignment on the display.

734
While navigating through the user interface, in accordance with the determination that the currently-displayed portion of the user interface includes the second type of content, generate the tactile output comprises generating the tactile output in response a movement of a first predefined unit of content out of alignment on the display.

736
In accordance with a determination that the user interface is displaying a terminal portion of the first type of content, the tactile output corresponding to the navigation includes a third type of tactile output sequence, different from the first type of tactile output sequence, indicating that the content is at the terminal portion.

738
In accordance with a determination that the user interface is not displaying a terminal portion of the first type of content, the tactile output portion corresponding to the navigation does not include the third type of tactile output sequence.

D

740
Generate audio output associated with the tactile output corresponding to the navigation through the user interface, including:

742
In accordance with the determination that the currently-displayed portion of the user interface includes the first type of content, the audio output includes a first type of audio output sequence that is associated with the first type of tactile output sequence.

744
In accordance with the determination that the currently-displayed portion of the user interface includes the second type of content, the audio output includes a second type of audio output sequence that is associated with the second type of tactile output sequence.

1132
In accordance with a determination that the input includes movement of a contact on the touch-sensitive display and that the movement moves the user interface object across the display by less than the first threshold amount, move the user interface object back in the opposite direction.

1134
In accordance with a determination that the input includes rotational input directed to the rotatable input element and that the rotational input moves the user interface object across the display by less than the second threshold amount, move the user interface object back in the opposite direction.

1136
In accordance with the determination that the input includes rotational input directed to the rotatable input element and that the rotational input meets criteria for moving the user interface object to the respective position on the display, move the user interface object to the respective position on the display in conjunction with generating a tactile output corresponding to the movement of the user interface object.

1138
In accordance with the determination that the input includes movement of a contact on the touch-sensitive display that meets criteria for moving the user interface object to the respective position on the display, move the user interface object to the respective position on the display without generating the tactile output.

*FIG. 11C*

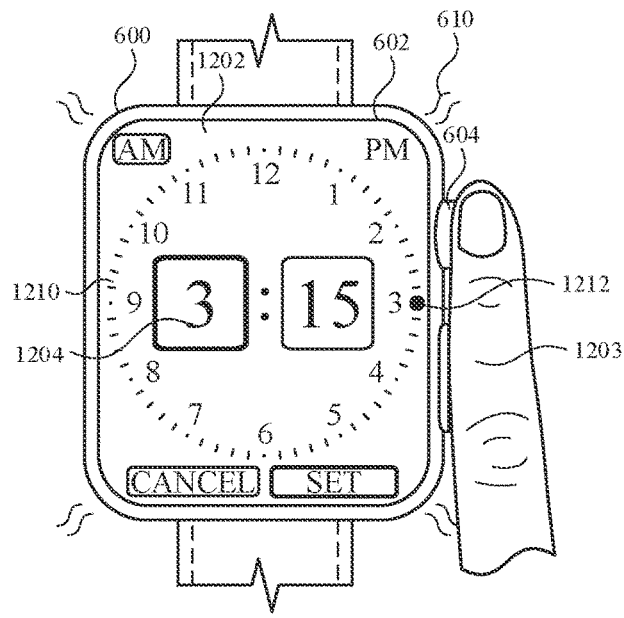
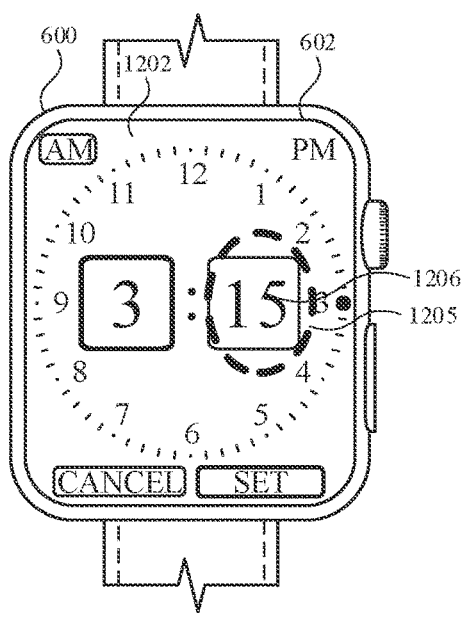
*FIG. 12E*  *FIG. 12F*
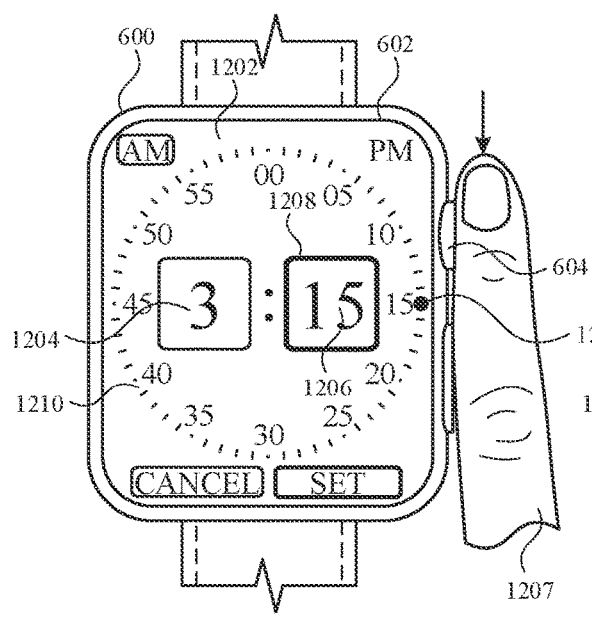
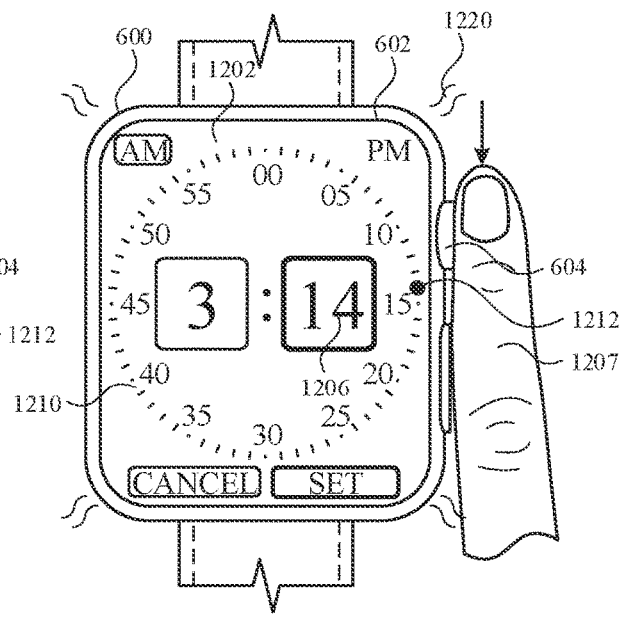
*FIG. 12G*  *FIG. 12H*

FIG. 15C

1540
While detecting the rotational input, generate a plurality of audio outputs associated with the plurality of tactile outputs, wherein:

1542
In accordance with the determination that the speed of the rotational input is the first speed:

1544
Generate a first number of audio outputs for the respective amount of rotation of the rotatable input element.

1546
Generate the audio outputs at a first magnitude for the respective amount of rotation of the rotatable input element.

1548
In accordance with the determination that the speed of the rotation input is the second speed:

1550
Generate a second number of audio outputs for the respective amount of rotation of the rotatable input element.

1552
Generate the audio outputs at a second magnitude different from the first magnitude for the respective amount of rotation of the rotatable input element.

1554
In accordance with a determination that the speed of the rotational input is of an initial speed:

1556
Generate an initial number of tactile outputs and an initial number of audio outputs for the respective amount of rotation of the rotatable input element.

1558
Generate the plurality of tactile outputs having an initial amplitude and the plurality of audio outputs having an initial magnitude for the respective amount of rotation of the rotatable input element.

1560
In accordance with a determination that the speed of the rotational input is of a threshold speed:

1562
Generate a threshold number of tactile outputs and the initial number of audio outputs for the respective amount of rotation of the rotatable input element, the threshold number of tactile outputs different from the initial number of tactile outputs.

1564
Generate the plurality of tactile outputs having a threshold amplitude and the plurality of audio outputs having the initial magnitude for the respective amount of rotation of the rotatable input element, the threshold amplitude different from the initial amplitude.

CONTENT-BASED TACTILE OUTPUTS

CROSS-REFERENCE TO RELATED APPLICATIONS

This application is a Continuation of U.S. non-Provisional application Ser. No. 16/926,512, entitled "CONTENT-BASED TACTILE OUTPUTS," filed Jul. 10, 2020 which is a Continuation of U.S. application Ser. No. 16/144,950, entitled "CONTENT-BASED TACTILE OUTPUTS," filed Sep. 27, 2018 which claims priority to U.S. Provisional Patent Application Ser. No. 62/729,978, entitled "CONTENT-BASED TACTILE OUTPUTS," filed Sep. 11, 2018, the contents of which are hereby incorporated by reference in their entirety.

FIELD

The present disclosure relates generally to computer user interfaces, and more specifically to techniques for managing content-based tactile outputs.

BACKGROUND

At present, there is a need for electronic devices that provide sensory feedback (e.g., tactile and/or audio outputs) based on the type of content being displayed and navigated on the display to enhance the user experience, enhance user efficiency, and convenience in utilizing the device.

BRIEF SUMMARY

Some techniques for managing content-based tactile outputs using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing content-based tactile outputs. Such methods and interfaces optionally complement or replace other methods for managing content-based tactile outputs. Such methods and interfaces reduce the cognitive burden on a user and produce a more efficient human-machine interface. For example, such methods and interfaces enhance user experience and convenience in navigating content shown on a device, and thus enable the user to more easily and efficiently navigate content shown on the device. For battery-operated computing devices, such methods and interfaces conserve power and increase the time between battery charges.

In accordance with some embodiments, a method performed at an electronic device with a display, an input element, and one or more tactile output generators is described. The method comprises: displaying, on the display, a user interface; while displaying the user interface, detecting, via the input element, a first input; and in response to detecting the first input: navigating through the user interface; and generating, via the one or more tactile output generators, tactile output corresponding to the navigation through the user interface, including: in accordance with a determination that a currently-displayed portion of the user interface includes a first type of content, the tactile output corresponding to the navigation includes a first type of tactile output sequence that includes one or more tactile outputs determined based on an input metric of the first input; and in accordance with a determination that the currently-displayed portion of the user interface includes a second type of content different from the first type of content, the tactile output corresponding to the navigation includes a second type of tactile output sequence that includes one or more tactile outputs determined based on movement of predefined units of content in the user interface.

In accordance with some embodiments, a non-transitory computer-readable storage medium is described. The non-transitory computer-readable storage medium stores one or more programs configured to be executed by one or more processors of an electronic device with a display, an input element, and one or more tactile output generators, the one or more programs including instructions for: displaying, on the display, a user interface; while displaying the user interface, detecting, via the input element, a first input; and in response to detecting the first input: navigating through the user interface; and generating, via the one or more tactile output generators, tactile output corresponding to the navigation through the user interface, including: in accordance with a determination that a currently-displayed portion of the user interface includes a first type of content, the tactile output corresponding to the navigation includes a first type of tactile output sequence that includes one or more tactile outputs determined based on an input metric of the first input; and in accordance with a determination that the currently-displayed portion of the user interface includes a second type of content different from the first type of content, the tactile output corresponding to the navigation includes a second type of tactile output sequence that includes one or more tactile outputs determined based on movement of predefined units of content in the user interface.

In accordance with some embodiments, a transitory computer-readable storage medium is described. The transitory computer-readable storage medium stores one or more programs configured to be executed by one or more processors of an electronic device with a display, an input element, and one or more tactile output generators, the one or more programs including instructions for: displaying, on the display, a user interface; while displaying the user interface, detecting, via the input element, a first input; and in response to detecting the first input: navigating through the user interface; and generating, via the one or more tactile output generators, tactile output corresponding to the navigation through the user interface, including: in accordance with a determination that a currently-displayed portion of the user interface includes a first type of content, the tactile output corresponding to the navigation includes a first type of tactile output sequence that includes one or more tactile outputs determined based on an input metric of the first input; and in accordance with a determination that the currently-displayed portion of the user interface includes a second type of content different from the first type of content, the tactile output corresponding to the navigation includes a second type of tactile output sequence that includes one or more tactile outputs determined based on movement of predefined units of content in the user interface.

In accordance with some embodiments, an electronic device is described. The electronic device comprises a display, an input element, one or more tactile output generators, one or more processors, and memory storing one or more programs configured to be executed by the one or more processors, the one or more programs including instructions for: displaying, on the display, a user interface; while displaying the user interface, detecting, via the input element, a first input; and in response to detecting the first input: navigating through the user interface; and generating, via the one or more tactile output generators, tactile output corresponding to the navigation through the user interface, including: in accordance with a determination that a currently-displayed portion of the user interface includes a first type of content, the tactile output corresponding to the navigation includes a first type of tactile output sequence that includes one or more tactile outputs determined based on an input metric of the first input; and in accordance with a determination that the currently-displayed portion of the user interface includes a second type of content different from the first type of content, the tactile output corresponding to the navigation includes a second type of tactile output sequence that includes one or more tactile outputs determined based on movement of predefined units of content in the user interface.

In accordance with some embodiments, an electronic device is described. The electronic device comprises: a display; an input element; one or more tactile output generators; means for displaying, on the display, a user interface; means, while displaying the user interface, for detecting, via the input element, a first input; and means, in response to detecting the first input, for: navigating through the user interface; and generating, via the one or more tactile output generators, tactile output corresponding to the navigation through the user interface, including: in accordance with a determination that a currently-displayed portion of the user interface includes a first type of content, the tactile output corresponding to the navigation includes a first type of tactile output sequence that includes one or more tactile outputs determined based on an input metric of the first input; and in accordance with a determination that the currently-displayed portion of the user interface includes a second type of content different from the first type of content, the tactile output corresponding to the navigation includes a second type of tactile output sequence that includes one or more tactile outputs determined based on movement of predefined units of content in the user interface.

In accordance with some embodiments, a method performed at an electronic device with a display, an input element, and one or more tactile output generators is described. The method comprises: displaying, on the display, a first portion of content; while displaying the first portion of content, detecting, via the input element, a first input; in response to detecting the first input: navigating through the content to display a second portion of the content; and generating, via the one or more tactile output generators, a first type of tactile output sequence that includes one or more tactile outputs; while displaying the second portion of the content, detecting, via the input element, a second input; and in response to detecting the second input and in accordance with a determination that the second portion of the content is a terminal portion of the content: displaying a visual indication that the content is a terminal portion of the content; and forgoing generating, via the one or more tactile output generators, the first type of tactile output sequence.

In accordance with some embodiments, a non-transitory computer-readable storage medium is described. The non-transitory computer-readable storage medium stores one or more programs configured to be executed by one or more processors of an electronic device with a display, an input element, and one or more tactile output generators, the one or more programs including instructions for: displaying, on the display, a first portion of content; while displaying the first portion of content, detecting, via the input element, a first input; in response to detecting the first input: navigating through the content to display a second portion of the content; and generating, via the one or more tactile output generators, a first type of tactile output sequence that includes one or more tactile outputs; while displaying the second portion of the content, detecting, via the input element, a second input; and in response to detecting the second input and in accordance with a determination that the second portion of the content is a terminal portion of the content: displaying a visual indication that the content is a terminal portion of the content; and forgoing generating, via the one or more tactile output generators, the first type of tactile output sequence.

In accordance with some embodiments, a transitory computer-readable storage medium is described. The transitory computer-readable storage medium stores one or more programs configured to be executed by one or more processors of an electronic device with a display, an input element, and one or more tactile output generators, the one or more programs including instructions for: displaying, on the display, a first portion of content; while displaying the first portion of content, detecting, via the input element, a first input; in response to detecting the first input: navigating through the content to display a second portion of the content; and generating, via the one or more tactile output generators, a first type of tactile output sequence that includes one or more tactile outputs; while displaying the second portion of the content, detecting, via the input element, a second input; and in response to detecting the second input and in accordance with a determination that the second portion of the content is a terminal portion of the content: displaying a visual indication that the content is a terminal portion of the content; and forgoing generating, via the one or more tactile output generators, the first type of tactile output sequence.

In accordance with some embodiments, an electronic device is described. The electronic device comprises: a display, an input element, one or more tactile output generators, one or more processors, and memory storing one or more programs configured to be executed by the one or more processors, the one or more programs including instructions for: displaying, on the display, a first portion of content; while displaying the first portion of content, detecting, via the input element, a first input; in response to detecting the first input: navigating through the content to display a second portion of the content; and generating, via the one or more tactile output generators, a first type of tactile output sequence that includes one or more tactile outputs; while displaying the second portion of the content, detecting, via the input element, a second input; and in response to detecting the second input and in accordance with a determination that the second portion of the content is a terminal portion of the content: displaying a visual indication that the content is a terminal portion of the content; and forgoing generating, via the one or more tactile output generators, the first type of tactile output sequence.

In accordance with some embodiments, an electronic device is described. The electronic device comprises: a display; an input element; one or more tactile output generators; means for displaying, on the display, a first portion of content; means, while displaying the first portion of content, for detecting, via the input element, a first input; means, in response to detecting the first input, for: navigating through the content to display a second portion of the content; and generating, via the one or more tactile output generators, a first type of tactile output sequence that includes one or more tactile outputs; means, while displaying the second portion of the content, for detecting, via the input element, a second input; and means, in response to detecting the second input and in accordance with a determination that the second portion of the content is a terminal portion of the content, for: displaying a visual indication that the content is a terminal portion of the content; and forgoing generating, via the one or more tactile output generators, the first type of tactile output sequence.

In accordance with some embodiments, a method performed at an electronic device with a touch-sensitive display and a rotatable input element is described. The method comprises: displaying, on the display, a user interface; while displaying the user interface, detecting a first portion of an input at the device: in response to detecting a first portion of the input, moving a user interface object across the display of the device in accordance with the movement of the input; and after detecting the first portion of the input, detecting a second portion of the input at the device; and in response to detecting the second portion of the input: in accordance with a determination that the input includes movement of a contact on the touch-sensitive display and that the movement moves the user interface object across the display by more than a first threshold amount, moving the user interface object to a respective position on the display; in accordance with a determination that the input includes movement of a contact on the touch-sensitive display and that the movement moves the user interface object across the display by less than the first threshold amount, forgoing moving the user interface object to the respective position on the display; in accordance with a determination that the input includes rotational input directed to the rotatable input element and that the rotational input moves the user interface object across the display by more than a second threshold amount that is less than the first threshold amount, moving the user interface object to the respective position on the display; and in accordance with a determination that the input includes rotational input directed to the rotatable input element and that the rotational input moves the user interface object across the display by less than the second threshold amount, forgoing moving the user interface object to the respective position on the display.

In accordance with some embodiments, a non-transitory computer-readable storage medium is described. The non-transitory computer-readable storage medium stores one or more programs configured to be executed by one or more processors of an electronic device with a touch-sensitive display and a rotatable input element, the one or more programs including instructions for: displaying, on the display, a user interface; while displaying the user interface, detecting a first portion of an input at the device: in response to detecting a first portion of the input, moving a user interface object across the display of the device in accordance with the movement of the input; and after detecting the first portion of the input, detecting a second portion of the input at the device; and in response to detecting the second portion of the input: in accordance with a determination that the input includes movement of a contact on the touch-sensitive display and that the movement moves the user interface object across the display by more than a first threshold amount, moving the user interface object to a respective position on the display; in accordance with a determination that the input includes movement of a contact on the touch-sensitive display and that the movement moves the user interface object across the display by less than the first threshold amount, forgoing moving the user interface object to the respective position on the display; in accordance with a determination that the input includes rotational input directed to the rotatable input element and that the rotational input moves the user interface object across the display by more than a second threshold amount that is less than the first threshold amount, moving the user interface object to the respective position on the display; and in accordance with a determination that the input includes rotational input directed to the rotatable input element and that the rotational input moves the user interface object across the display by less than the second threshold amount, forgoing moving the user interface object to the respective position on the display.

In accordance with some embodiments, a transitory computer-readable storage medium is described. The transitory computer-readable storage medium stores one or more programs configured to be executed by one or more processors of an electronic device with a touch-sensitive display and a rotatable input element, the one or more programs including instructions for: displaying, on the display, a user interface; while displaying the user interface, detecting a first portion of an input at the device: in response to detecting a first portion of the input, moving a user interface object across the display of the device in accordance with the movement of the input; and after detecting the first portion of the input, detecting a second portion of the input at the device; and in response to detecting the second portion of the input: in accordance with a determination that the input includes movement of a contact on the touch-sensitive display and that the movement moves the user interface object across the display by more than a first threshold amount, moving the user interface object to a respective position on the display; in accordance with a determination that the input includes movement of a contact on the touch-sensitive display and that the movement moves the user interface object across the display by less than the first threshold amount, forgoing moving the user interface object to the respective position on the display; in accordance with a determination that the input includes rotational input directed to the rotatable input element and that the rotational input moves the user interface object across the display by more than a second threshold amount that is less than the first threshold amount, moving the user interface object to the respective position on the display; and in accordance with a determination that the input includes rotational input directed to the rotatable input element and that the rotational input moves the user interface object across the display by less than the second threshold amount, forgoing moving the user interface object to the respective position on the display.

In accordance with some embodiments, an electronic device is described. The electronic device comprises: a touch-sensitive display, a rotatable input element, one or more processors, and memory storing one or more programs configured to be executed by the one or more processors, the one or more programs including instructions for: displaying, on the display, a user interface; while displaying the user interface, detecting a first portion of an input at the device: in response to detecting a first portion of the input, moving a user interface object across the display of the device in accordance with the movement of the input; and after detecting the first portion of the input, detecting a second portion of the input at the device; and in response to detecting the second portion of the input: in accordance with a determination that the input includes movement of a contact on the touch-sensitive display and that the movement moves the user interface object across the display by more than a first threshold amount, moving the user interface object to a respective position on the display; in accordance with a determination that the input includes movement of a contact on the touch-sensitive display and that the movement moves the user interface object across the display by less than the first threshold amount, forgoing moving the user interface object to the respective position on the display; in accordance with a determination that the input includes rotational input directed to the rotatable input element and that the rotational input moves the user interface object across the display by more than a second threshold amount that is less than the first threshold amount, moving the user interface object to the respective position on the display; and in accordance with a determination that the input includes rotational input directed to the rotatable input element and that the rotational input moves the user interface object across the display by less than the second threshold amount, forgoing moving the user interface object to the respective position on the display.

In accordance with some embodiments, an electronic device is described. The electronic device comprises: a display; a rotatable input element; means for displaying, on the display, a user interface; means, while displaying the user interface, for detecting a first portion of an input at the device: means, in response to detecting a first portion of the input, for moving a user interface object across the display of the device in accordance with the movement of the input; and means, after detecting the first portion of the input, for detecting a second portion of the input at the device; and means, in response to detecting the second portion of the input, for: in accordance with a determination that the input includes movement of a contact on the touch-sensitive display and that the movement moves the user interface object across the display by more than a first threshold amount, moving the user interface object to a respective position on the display; in accordance with a determination that the input includes movement of a contact on the touch-sensitive display and that the movement moves the user interface object across the display by less than the first threshold amount, forgoing moving the user interface object to the respective position on the display; in accordance with a determination that the input includes rotational input directed to the rotatable input element and that the rotational input moves the user interface object across the display by more than a second threshold amount that is less than the first threshold amount, moving the user interface object to the respective position on the display; and in accordance with a determination that the input includes rotational input directed to the rotatable input element and that the rotational input moves the user interface object across the display by less than the second threshold amount, forgoing moving the user interface object to the respective position on the display.

In accordance with some embodiments, a method performed at an electronic device with a display, an input element, and one or more tactile output generators is described. The method comprises: displaying, on the display, a user interface that includes a first adjustable item and a second adjustable item; while displaying the user interface, detecting, via the input element, a rotational input; and in response to detecting the rotational input: in accordance with a determination that the first adjustable item is currently-selected: adjusting, based on the rotational input, the first adjustable item; and while adjusting the first adjustable item, generating, via the one or more tactile output generators, a first sequence of tactile outputs including one or more tactile outputs having a first amplitude; and in accordance with a determination that the second adjustable item is currently-selected: adjusting, based on the rotational input, the second adjustable item; and while adjusting the second adjustable item, generating, via the one or more tactile output generators, a second sequence of tactile outputs including one or more tactile outputs having a second amplitude that is different from the first amplitude.

In accordance with some embodiments, a non-transitory computer-readable storage medium is described. The non-transitory computer-readable storage medium stores one or more programs configured to be executed by one or more processors of an electronic device with a display, an input element, and one or more tactile output generators, the one or more programs including instructions for: displaying, on the display, a user interface that includes a first adjustable item and a second adjustable item; while displaying the user interface, detecting, via the input element, a rotational input; and in response to detecting the rotational input: in accordance with a determination that the first adjustable item is currently-selected: adjusting, based on the rotational input, the first adjustable item; and while adjusting the first adjustable item, generating, via the one or more tactile output generators, a first sequence of tactile outputs including one or more tactile outputs having a first amplitude; and in accordance with a determination that the second adjustable item is currently-selected: adjusting, based on the rotational input, the second adjustable item; and while adjusting the second adjustable item, generating, via the one or more tactile output generators, a second sequence of tactile outputs including one or more tactile outputs having a second amplitude that is different from the first amplitude.

In accordance with some embodiments, a transitory computer-readable storage medium is described. The transitory computer-readable storage medium stores one or more programs configured to be executed by one or more processors of an electronic device with a display, an input element, and one or more tactile output generators, the one or more programs including instructions for: displaying, on the display, a user interface that includes a first adjustable item and a second adjustable item; while displaying the user interface, detecting, via the input element, a rotational input; and in response to detecting the rotational input: in accordance with a determination that the first adjustable item is currently-selected: adjusting, based on the rotational input, the first adjustable item; and while adjusting the first adjustable item, generating, via the one or more tactile output generators, a first sequence of tactile outputs including one or more tactile outputs having a first amplitude; and in accordance with a determination that the second adjustable item is currently-selected: adjusting, based on the rotational input, the second adjustable item; and while adjusting the second adjustable item, generating, via the one or more tactile output generators, a second sequence of tactile outputs including one or more tactile outputs having a second amplitude that is different from the first amplitude.

In accordance with some embodiments, an electronic device is described. The electronic device comprises: a display, an input element, one or more tactile output generators, one or more processors, and memory storing one or more programs configured to be executed by the one or more processors, the one or more programs including instructions for: displaying, on the display, a user interface that includes a first adjustable item and a second adjustable item; while displaying the user interface, detecting, via the input element, a rotational input; and in response to detecting the rotational input: in accordance with a determination that the first adjustable item is currently-selected: adjusting, based on the rotational input, the first adjustable item; and while adjusting the first adjustable item, generating, via the one or more tactile output generators, a first sequence of tactile outputs including one or more tactile outputs having a first amplitude; and in accordance with a determination that the second adjustable item is currently-selected: adjusting, based on the rotational input, the second adjustable item; and while adjusting the second adjustable item, generating, via the one or more tactile output generators, a second sequence of tactile outputs including one or more tactile outputs having a second amplitude that is different from the first amplitude.

In accordance with some embodiments, an electronic device is described. The electronic device comprises: a display; an input element; one or more tactile output generators; means for displaying, on the display, a user interface that includes a first adjustable item and a second adjustable item; means, while displaying the user interface, for detecting, via the input element, a rotational input; and means, in response to detecting the rotational input, for: in accordance with a determination that the first adjustable item is currently-selected: adjusting, based on the rotational input, the first adjustable item; and while adjusting the first adjustable item, generating, via the one or more tactile output generators, a first sequence of tactile outputs including one or more tactile outputs having a first amplitude; and in accordance with a determination that the second adjustable item is currently-selected: adjusting, based on the rotational input, the second adjustable item; and while adjusting the second adjustable item, generating, via the one or more tactile output generators, a second sequence of tactile outputs including one or more tactile outputs having a second amplitude that is different from the first amplitude.

In accordance with some embodiments, a method performed at an electronic device with a display, a rotatable input element, and one or more tactile output generators is described. The method comprises: while displaying, on the display, a user interface, detecting, via the rotatable input element, a rotational input; and while detecting the rotational input, generating, via the one or more tactile output generators, a plurality of tactile outputs, wherein a type of the tactile outputs is associated with a modification of the user interface, and wherein: in accordance with a determination that a speed of the rotational input is a first speed, generating a first number of tactile outputs for a respective amount of rotation of the rotatable input element; and in accordance with a determination that the speed of the rotational input is a second speed that is different from the first speed, generating a second number of tactile outputs for the respective amount of rotation of the rotatable input element.

In accordance with some embodiments, a non-transitory computer-readable storage medium is described. The non-transitory computer-readable storage medium stores one or more programs configured to be executed by one or more processors of an electronic device with a display, a rotatable input element, and one or more tactile output generators, the one or more programs including instructions for: while displaying, on the display, a user interface, detecting, via the rotatable input element, a rotational input; and while detecting the rotational input, generating, via the one or more tactile output generators, a plurality of tactile outputs, wherein a type of the tactile outputs is associated with a modification of the user interface, and wherein: in accordance with a determination that a speed of the rotational input is a first speed, generating a first number of tactile outputs for a respective amount of rotation of the rotatable input element; and in accordance with a determination that the speed of the rotational input is a second speed that is different from the first speed, generating a second number of tactile outputs for the respective amount of rotation of the rotatable input element.

In accordance with some embodiments, a transitory computer-readable storage medium is described. The transitory computer-readable storage medium stores one or more programs configured to be executed by one or more processors of an electronic device with a display, a rotatable input element, and one or more tactile output generators, the one or more programs including instructions for: while displaying, on the display, a user interface, detecting, via the rotatable input element, a rotational input; and while detecting the rotational input, generating, via the one or more tactile output generators, a plurality of tactile outputs, wherein a type of the tactile outputs is associated with a modification of the user interface, and wherein: in accordance with a determination that a speed of the rotational input is a first speed, generating a first number of tactile outputs for a respective amount of rotation of the rotatable input element; and in accordance with a determination that the speed of the rotational input is a second speed that is different from the first speed, generating a second number of tactile outputs for the respective amount of rotation of the rotatable input element.

In accordance with some embodiments, an electronic device is described. The electronic device comprises: a display, a rotatable input element, one or more tactile output generators, one or more processors, and memory storing one or more programs configured to be executed by the one or more processors, the one or more programs including instructions for: while displaying, on the display, a user interface, detecting, via the rotatable input element, a rotational input; and while detecting the rotational input, generating, via the one or more tactile output generators, a plurality of tactile outputs, wherein a type of the tactile outputs is associated with a modification of the user interface, and wherein: in accordance with a determination that a speed of the rotational input is a first speed, generating a first number of tactile outputs for a respective amount of rotation of the rotatable input element; and in accordance with a determination that the speed of the rotational input is a second speed that is different from the first speed, generating a second number of tactile outputs for the respective amount of rotation of the rotatable input element.

In accordance with some embodiments an electronic device is described. The electronic device comprises a display; a rotatable input element; one or more tactile output generators; means, while displaying, on the display, a user interface, for detecting, via the rotatable input element, a rotational input; and means, while detecting the rotational input, for generating, via the one or more tactile output generators, a plurality of tactile outputs, wherein a type of the tactile outputs is associated with a modification of the user interface, and wherein: in accordance with a determination that a speed of the rotational input is a first speed, generating a first number of tactile outputs for a respective amount of rotation of the rotatable input element; and in accordance with a determination that the speed of the rotational input is a second speed that is different from the first speed, generating a second number of tactile outputs for the respective amount of rotation of the rotatable input element.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing content-based tactile outputs, thereby increasing the effectiveness, efficiency, and user satisfaction with such devices. Such methods and interfaces may complement or replace other methods for managing content-based tactile outputs.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7D are a flow diagram illustrating methods for managing user interfaces associated with content-based tactile outputs, in accordance with some embodiments.

FIGS. 11A-11C are a flow diagram illustrating methods for moving a user interface in response to different types of input, in accordance with some embodiments.

FIGS. 12A-12L illustrate example user interfaces associated with adjustable item-based tactile outputs, in accordance with some embodiments.

FIGS. 15A-15C are a flow diagram illustrating methods for managing user interfaces associated with input velocity-based tactile outputs, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing content-based tactile outputs. For example, there is a need for electronic devices that provide sensory feedback (e.g., tactile and/or audio outputs) based on the type of content being displayed and navigated on the display to enhance user experience and convenience and user efficiency in utilizing the device. Such techniques can reduce the cognitive burden on a user who accesses displayed content associated with content-based tactile outputs, thereby enhancing productivity. Further, such techniques can reduce processor and battery power otherwise wasted on redundant user inputs.

Figure 8A:
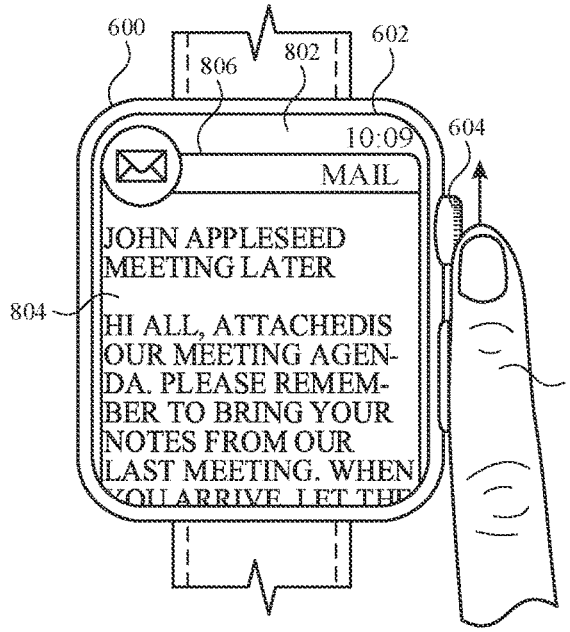
FIGS. 8A-8T illustrate example user interfaces associated with end-of-content tactile outputs, in accordance with some embodiments.
Figure 8B:
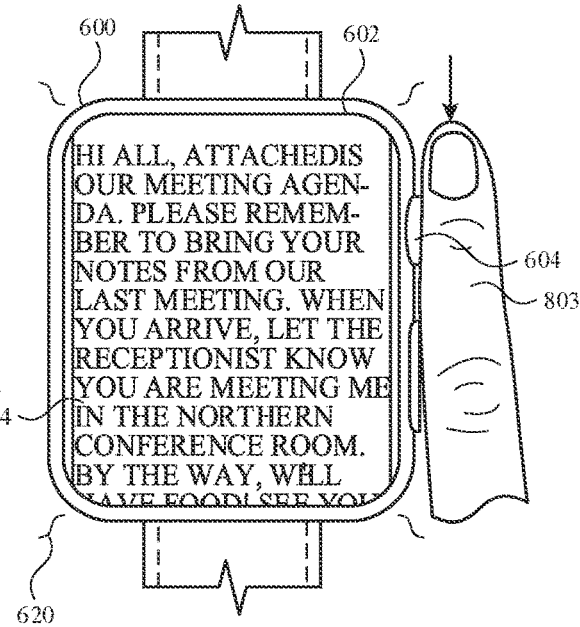
Figure 8C:
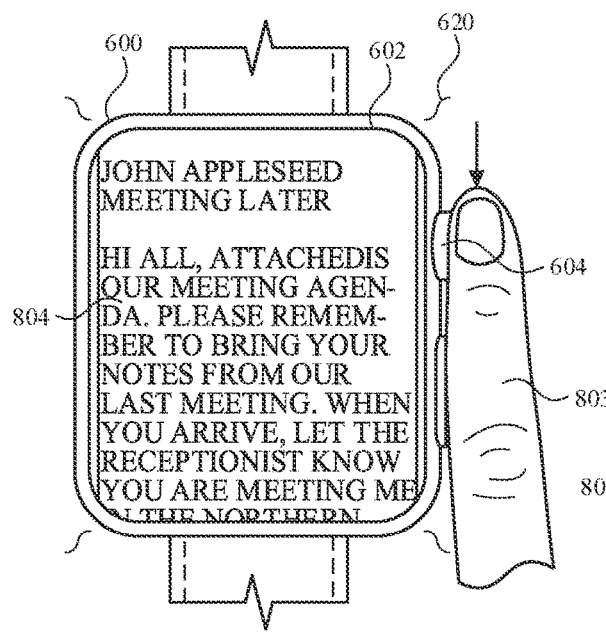

Below, FIGS. 1A-1B, 2, 3, 4A-4B, and 5A-5H provide a description of exemplary devices for performing the techniques for managing event notifications. FIGS. 6A-6AF illustrate example user interfaces associated with content-based tactile outputs, in accordance with some embodiments. FIGS. 7A-7D are a flow diagram illustrating methods for managing user interfaces associated with content-based tactile outputs, in accordance with some embodiments. The user interfaces in FIGS. 6A-6AF are used to illustrate the processes described below, including the processes in FIGS. 7A-7D. FIGS. 8A-8T illustrate example user interfaces associated with end-of-content tactile outputs, in accordance with some embodiments. FIGS. 9A-9B are a flow diagram illustrating methods for managing user interfaces associated with end-of-content tactile outputs, in accordance with some embodiments. The user interfaces in FIGS. 8A-8T are used to illustrate the processes described below, including the processes in FIGS. 9A-9B. FIGS. 10A-10K illustrate example user interfaces associated with moving a user interface in response to different types of input, in accordance with some embodiments. FIGS. 11A-11C are a flow diagram illustrating methods for moving a user interface in response to different types of input, in accordance with some embodiments. The user interfaces in FIGS. 10A-10K are used to illustrate the processes described below, including the processes in FIGS. 11A-11C. FIGS. 12A-12L illustrate example user interfaces associated with adjustable item-based tactile outputs, in accordance with some embodiments. FIGS. 13A-13B are a flow diagram illustrating methods for managing user interfaces associated with adjustable item-based tactile outputs, in accordance with some embodiments. The user interfaces in FIGS. 12A-12L are used to illustrate the processes described below, including the processes in FIGS. 13A-13B. FIGS. 14A-14H illustrate example user interfaces associated with input velocity-based tactile outputs, in accordance with some embodiments. FIGS. 15A-15C are a flow diagram illustrating methods for managing user interfaces associated with input velocity-based tactile outputs, in accordance with some embodiments. The user interfaces in FIGS. 14A-14H are used to illustrate the processes described below, including the processes in FIGS. 15A-15C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
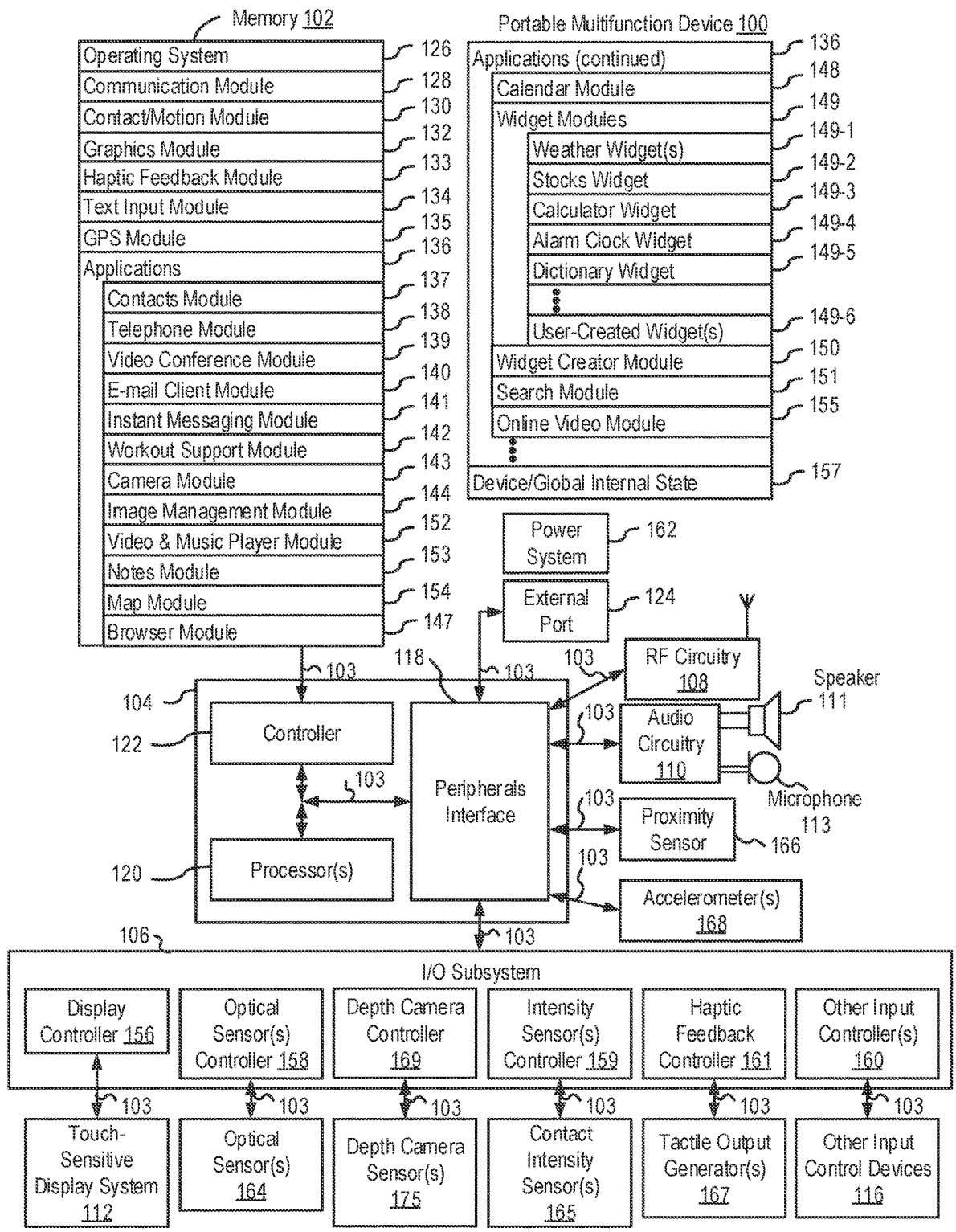
FIG. 1A is a block diagram illustrating a portable multifunction device with a touch-sensitive display, in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG.

Figure 3:
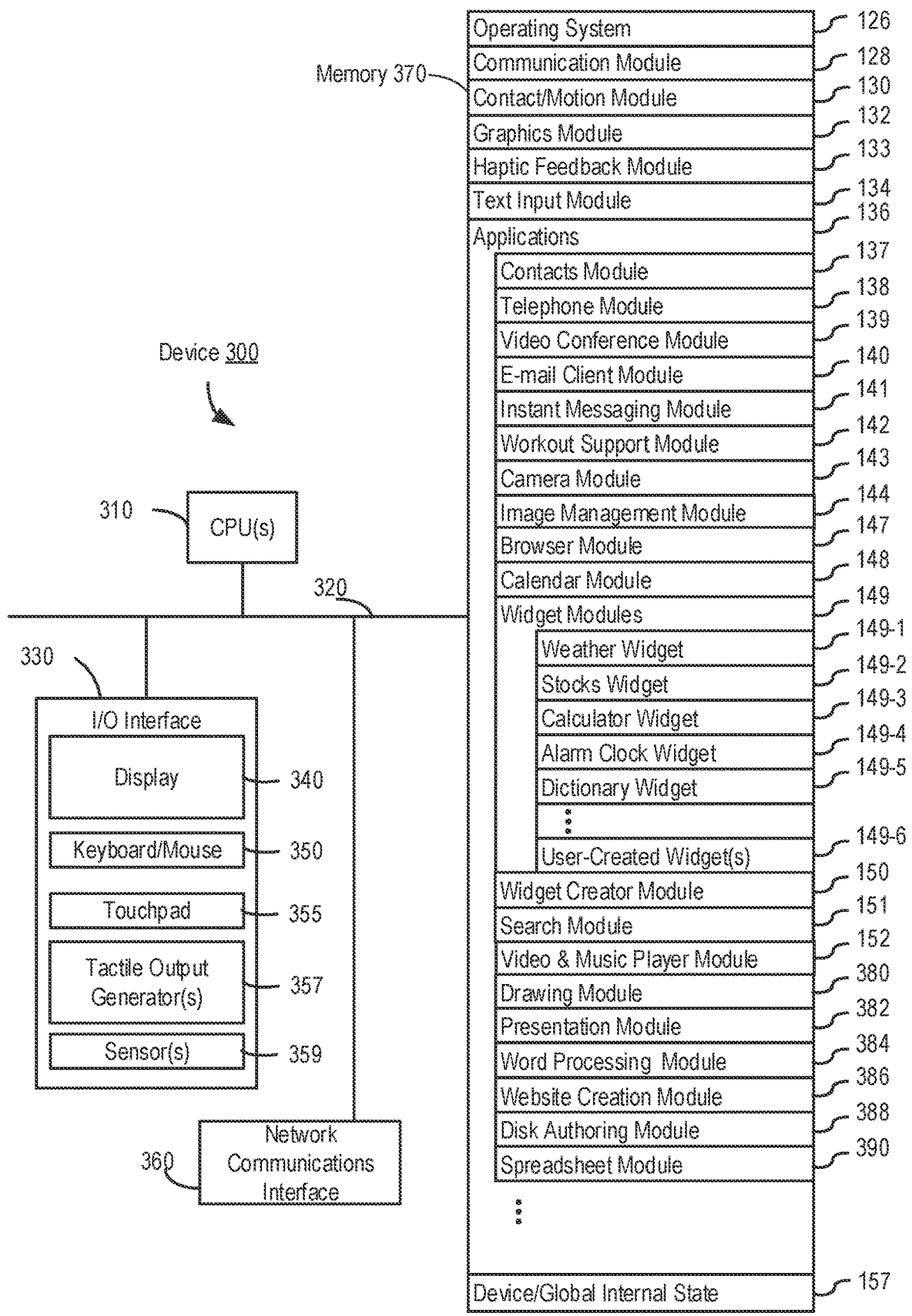
FIG. 3 is a block diagram of an exemplary multifunction device with a display and a touch-sensitive surface, in accordance with some embodiments.

1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the sets of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
 Contacts module 137 (sometimes called an address book or contact list);
 Telephone module 138;
 Video conference module 139;
 E-mail client module 140;
 Instant messaging (IM) module 141;
 Workout support module 142;
 Camera module 143 for still and/or video images;
 Image management module 144;
 Video player module;
 Music player module;
 Browser module 147;
 Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
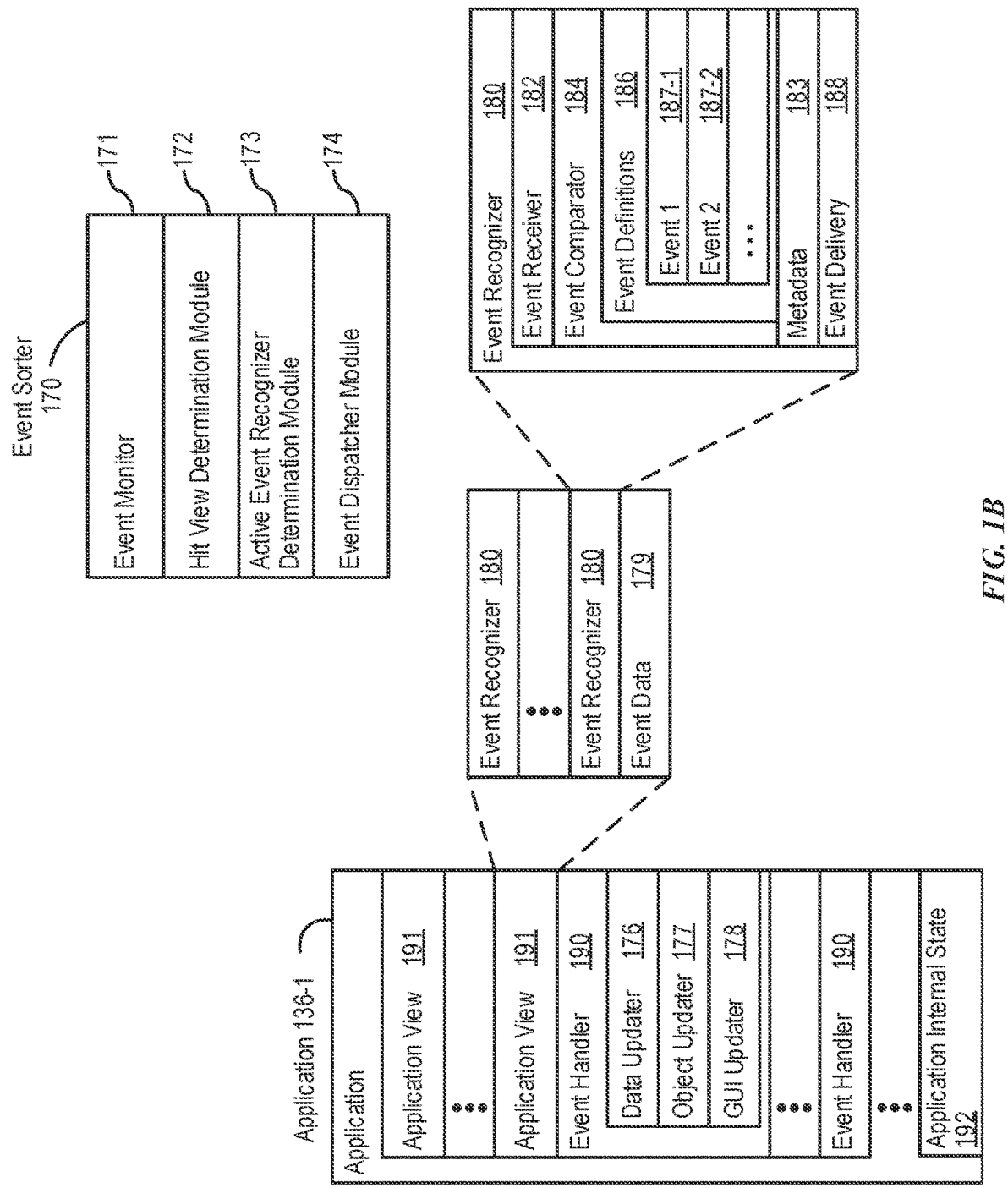
FIG. 1B is a block diagram illustrating exemplary components for event handling, in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
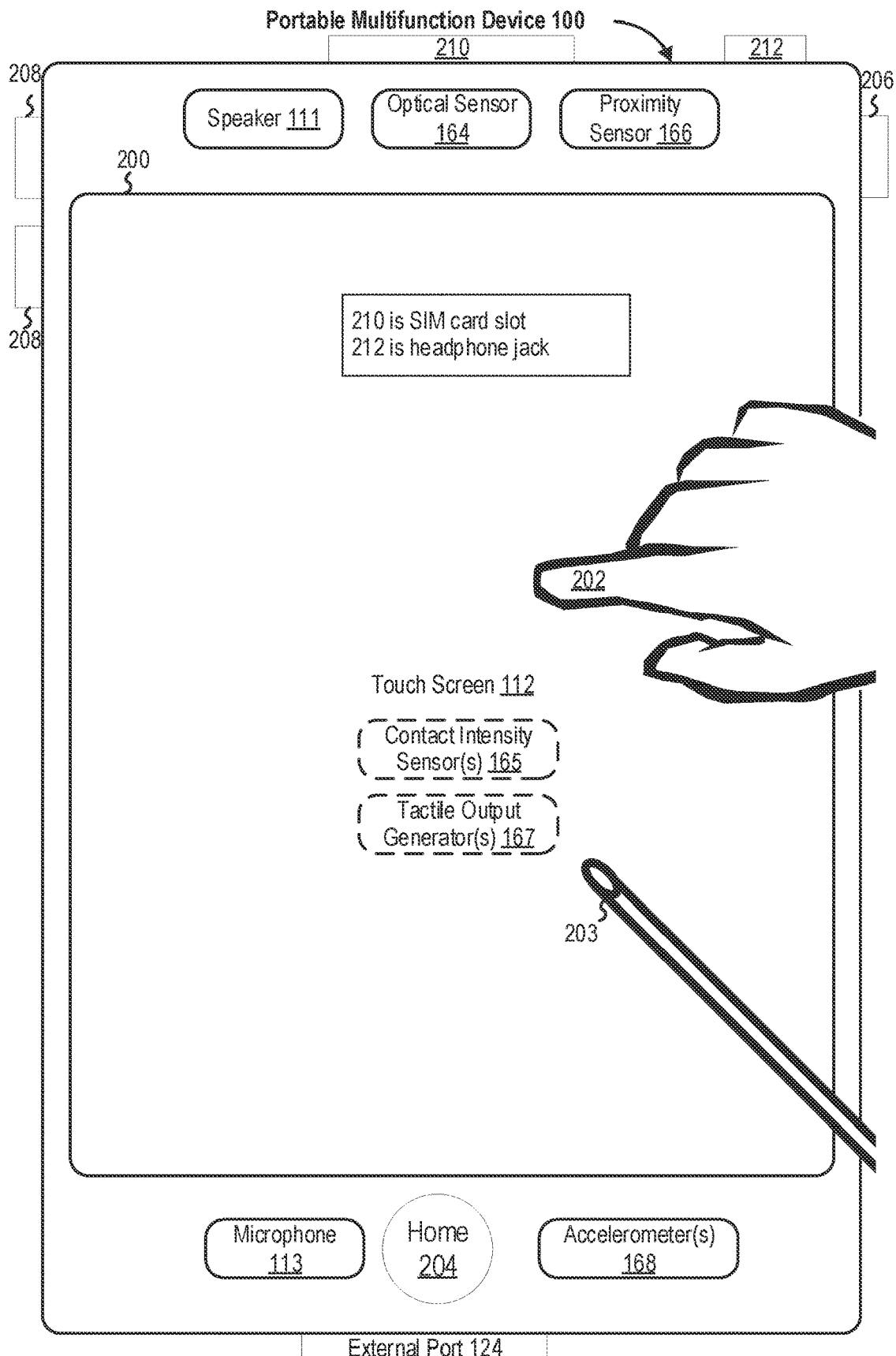
FIG. 2 illustrates a portable multifunction device having a touch screen, in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
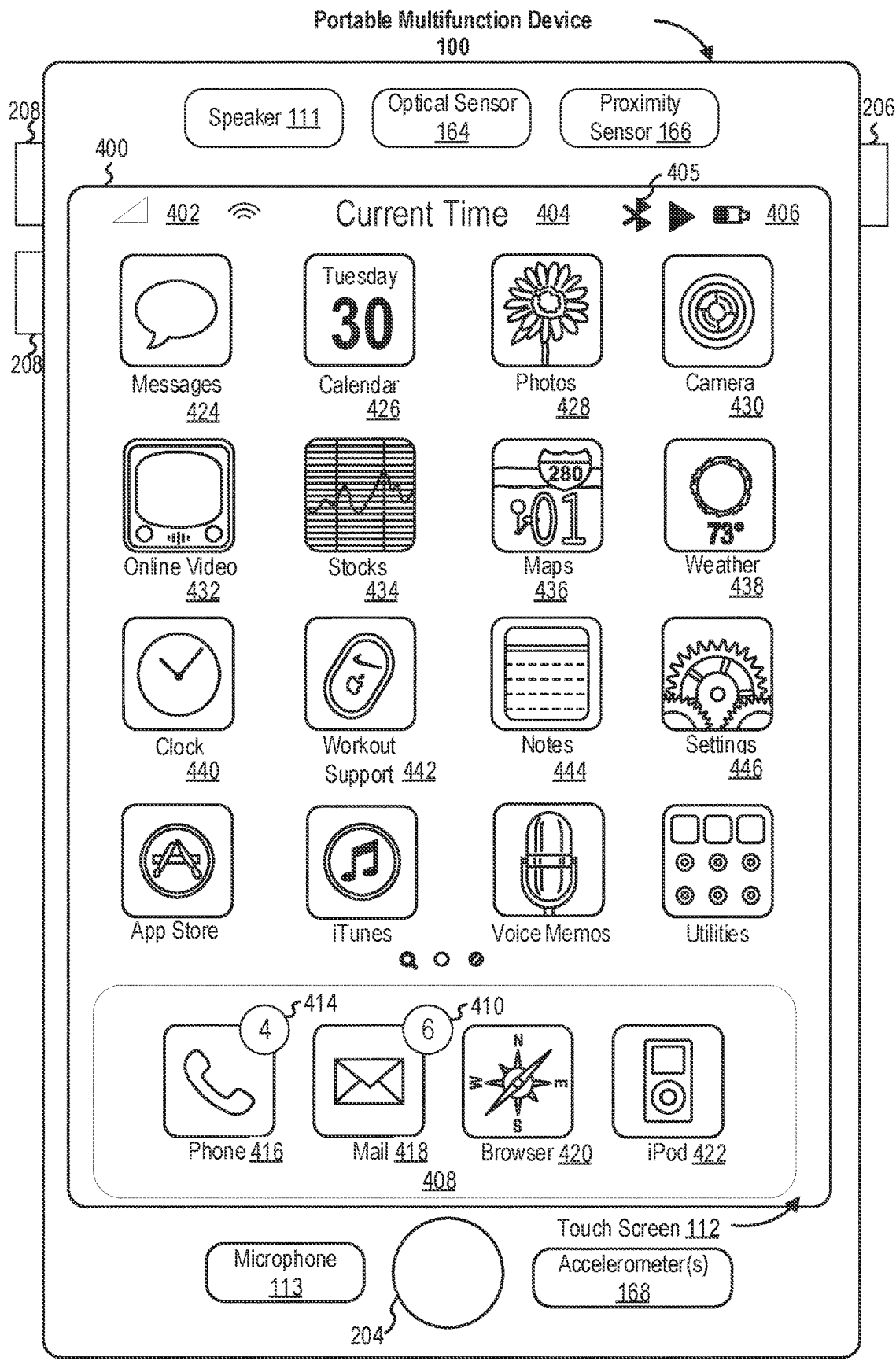
FIG. 4A illustrates an exemplary user interface for a menu of applications on a portable multifunction device, in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
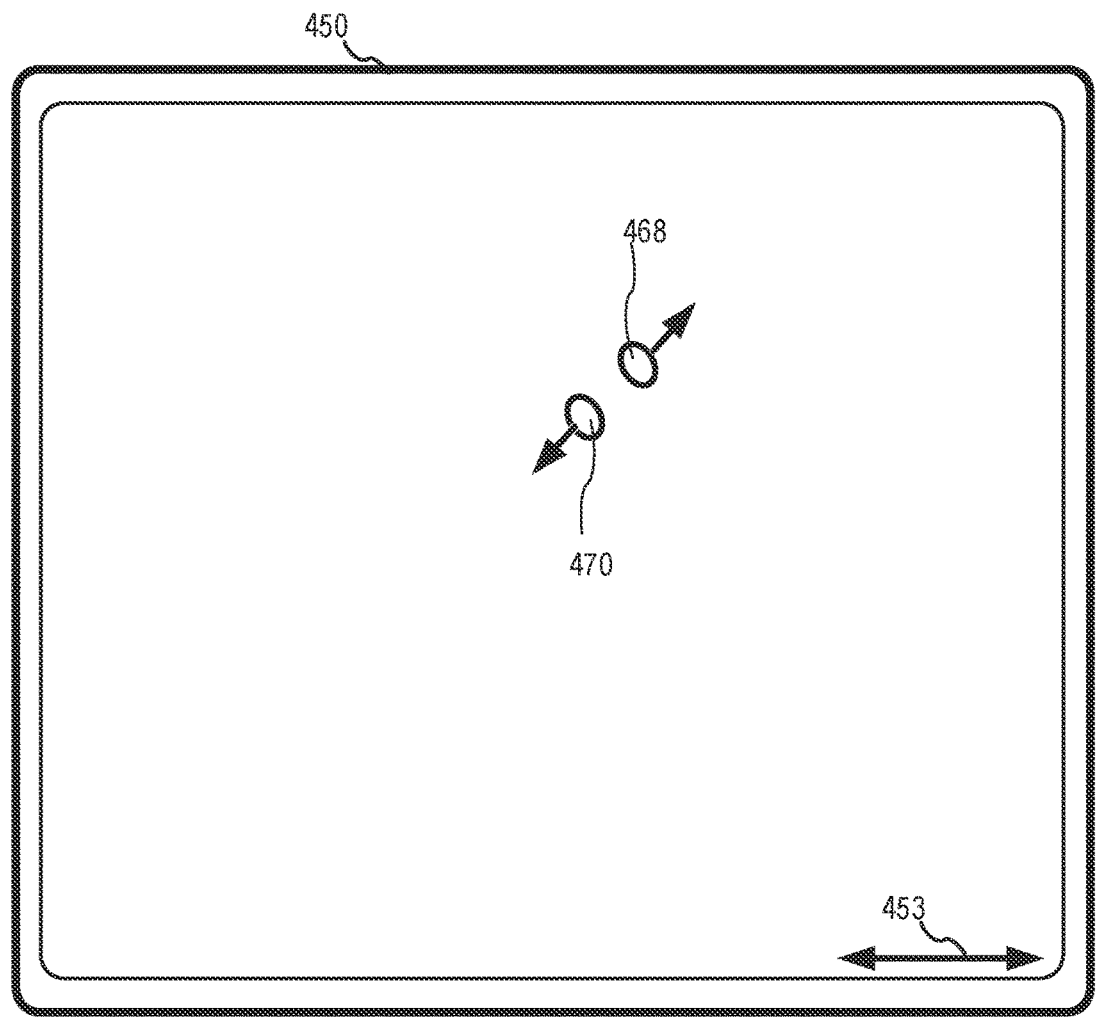
FIG. 4B illustrates an exemplary user interface for a multifunction device with a touch-sensitive surface that is separate from the display, in accordance with some embodiments.
Figure 4B:
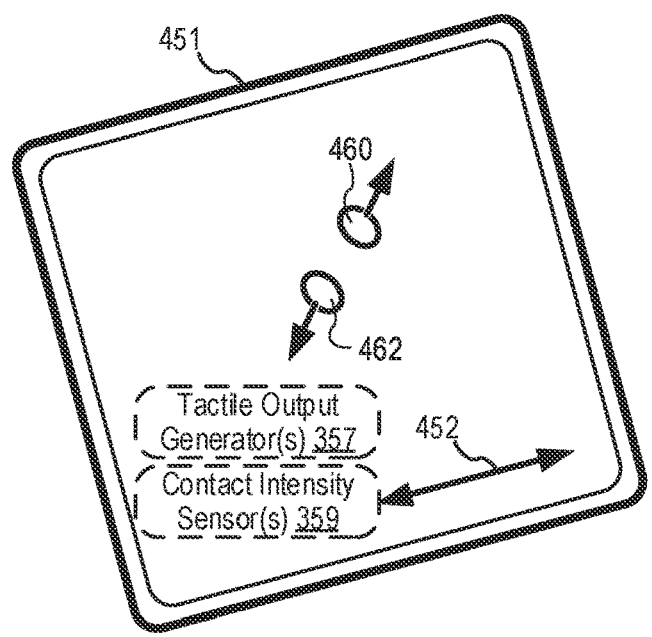

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
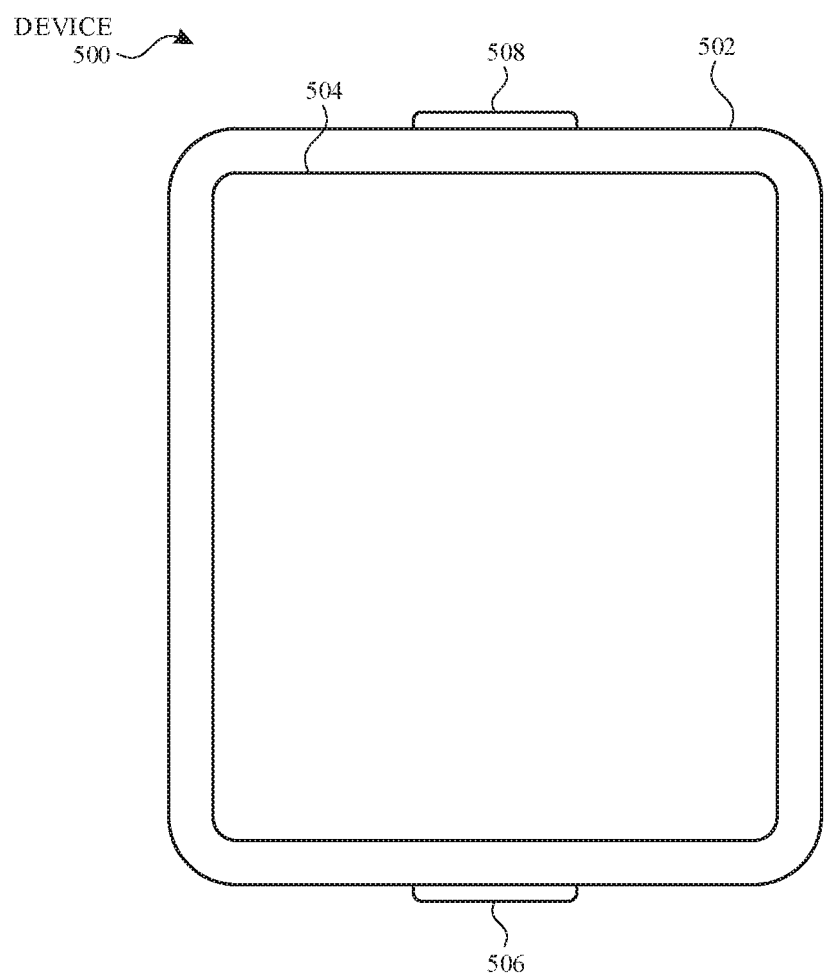
FIG. 5A illustrates a personal electronic device, in accordance with some embodiments.
Figure 6A:
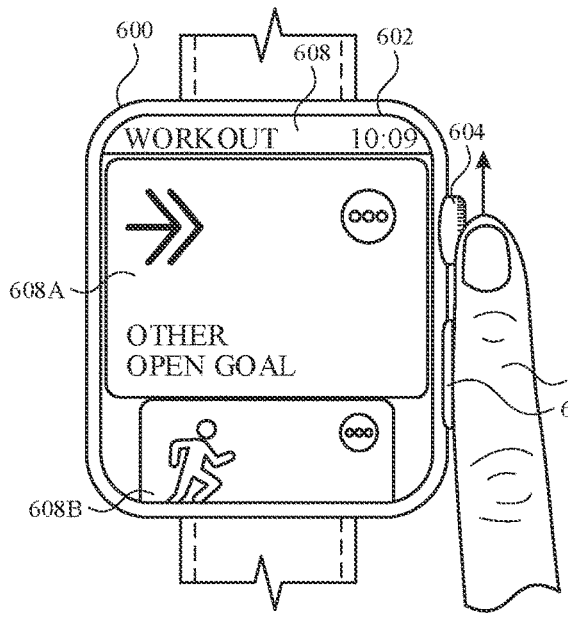
FIGS. 6A-6AF illustrate example user interfaces associated with content-based tactile outputs, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
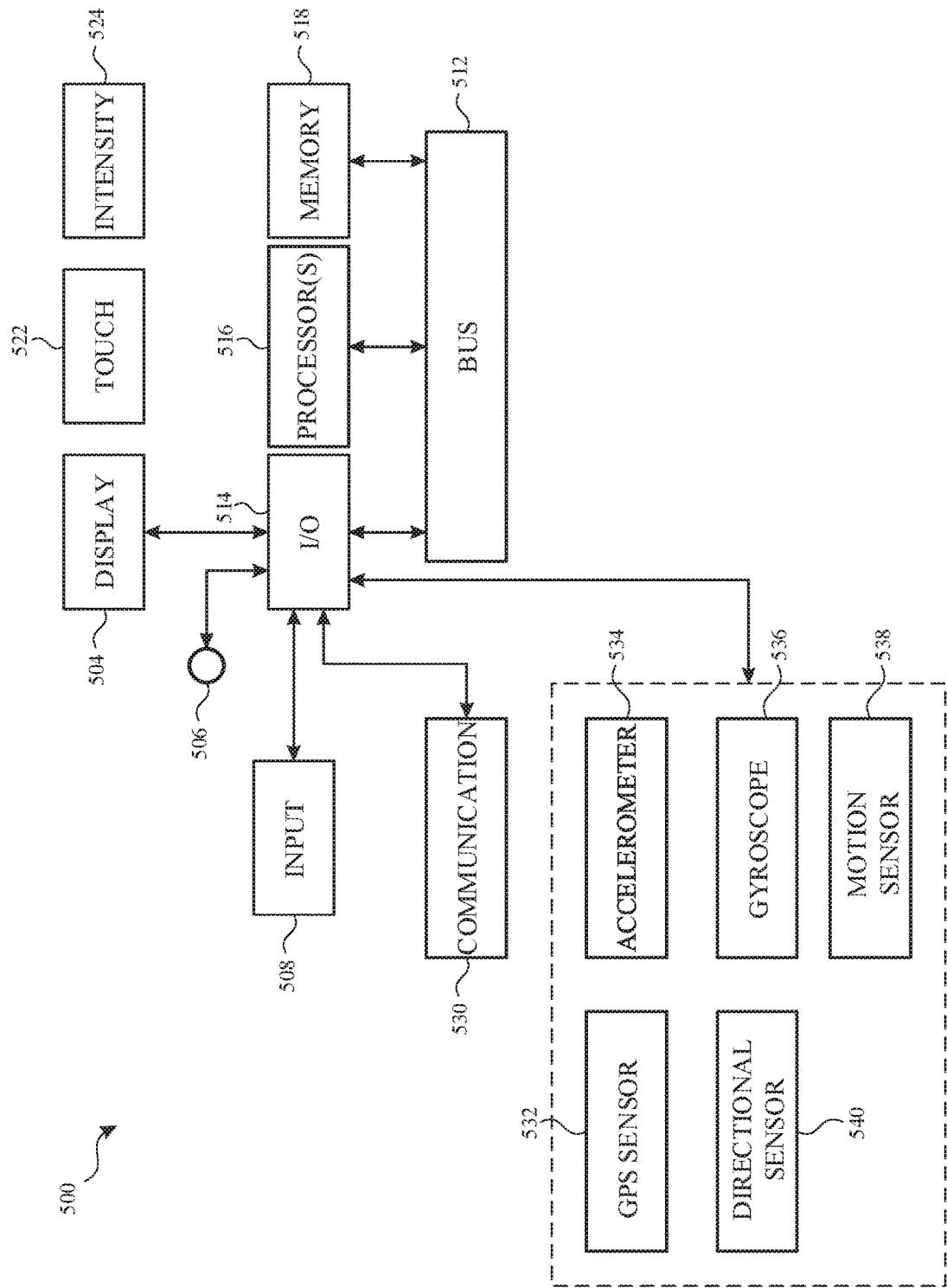
FIG. 5B is a block diagram illustrating a personal electronic device, in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIGS. 7A-7D), 900 (FIGS. 9A-9B), 1100 (FIGS. 11A-11C), 1300 (FIGS. 13A-13B), and 1500 (FIGS. 15A-15C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.5, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6AF illustrate exemplary user interfaces associated with content-based tactile outputs, in accordance with some embodiments. The user interfaces in these figures are used to illustrate the processes described below, including the processes in FIGS. 7A-7D.

FIG. 6A illustrates electronic device 600 (e.g., a smartwatch) with a display 602, a input element 604 (e.g., a rotatable input device that is rotatable relative to a housing of the device; a rotatable input device/mechanism that includes a fixed socket and a rotatable component (e.g., a crown) attached to or affixed to a shaft, where the rotatable component and shaft rotate together in the fixed socket; a rotatable input device/mechanism that includes a rotatable component (e.g., a crown) that rotates relative to a fixed component (e.g., a fixed shaft); a rotatable input device/mechanism that rotates, in response to a rotational input, on an axis such that the direction of the rotation is parallel to the display of the electronic device; a rotatable input device/mechanism that can detect rotational input (e.g., via a touch-detection mechanism) without the device itself being physically rotated; a rotatable and press-able input device; a rotatable crown), and one or more tactile output generators (e.g., incorporated within rotatable input element 604 and/or within a housing of the device). In some embodiments, electronic device 600 also includes an input button 606 (e.g., a mechanical input button, a press-able input button).

Electronic device 600 includes one or more tactile output generators that are enclosed in and/or integrated with input element 604 and/or a housing of the device, or otherwise are mechanically coupled either directly or indirectly such that tactile outputs generated by the tactile output generators generate tactile outputs at input element 604. The one or more tactile output generators generate different types of tactile output sequences, as described below in Table 1, based on the type of content (e.g., continuous content, such as continuous text, or discrete content, such as platters, affordances, buttons) being displayed and navigated/scrolled/adjusted on display 602 of the device. In some embodiments, the one or more tactile output generators also generate different types of audio output sequences that are associated with the different types of tactile output sequences. Tactile output sequences 610, 620, 630, and 1220 described herein are generated by the one or more tactile output generators described above. In some embodiments, the audio output sequences described herein that are associated with tactile output sequences 610, 620, 630, and 1220 are also generated by the one or more tactile output generators described above.

In some embodiments, a particular type of tactile output sequence generated by the one or more tactile output generators of the device described directly above corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Figure 5C:
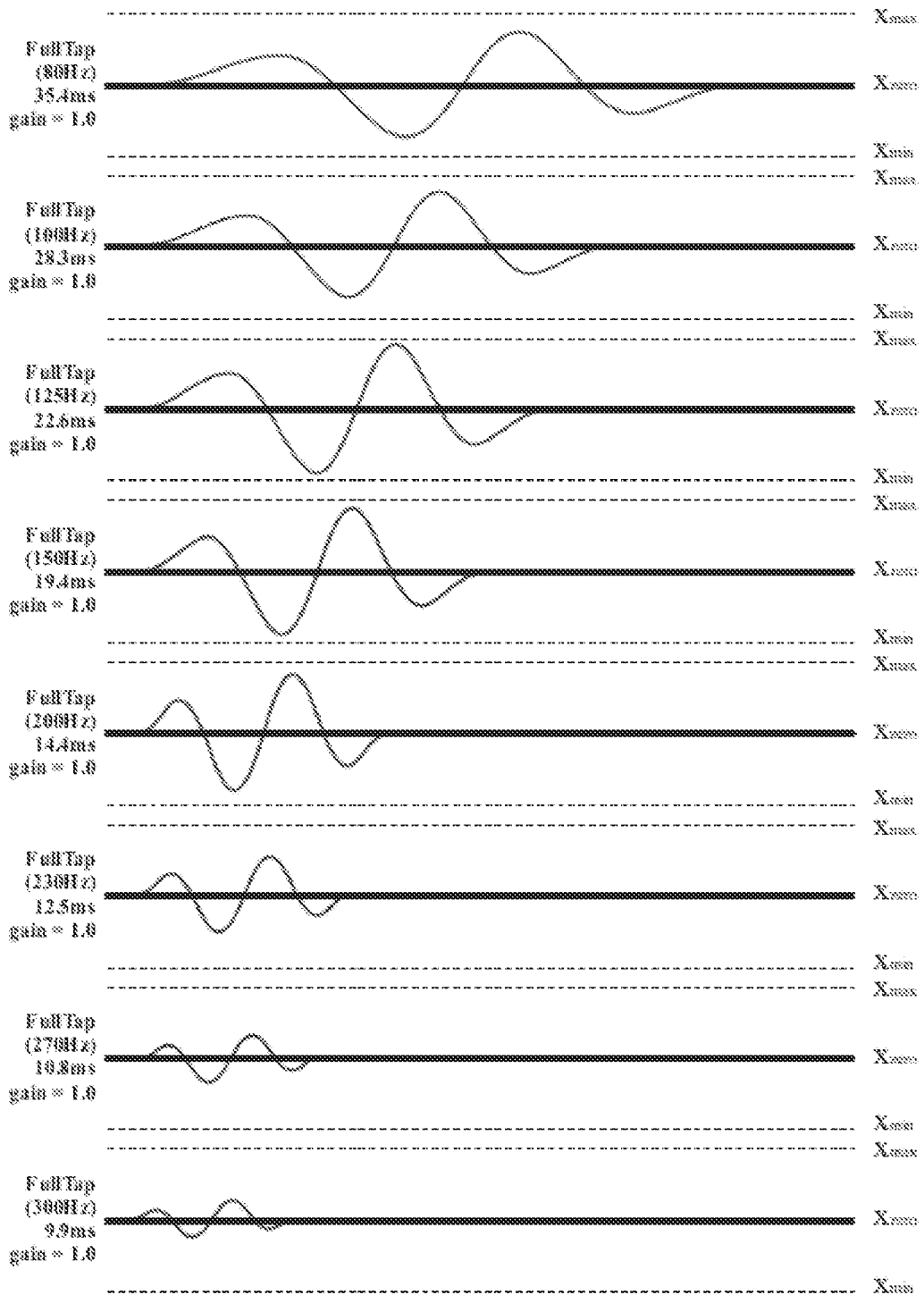
FIGS. 5C-5H illustrate example tactile output patterns that have a particular waveform, in accordance with some embodiments.
Figure 5D:
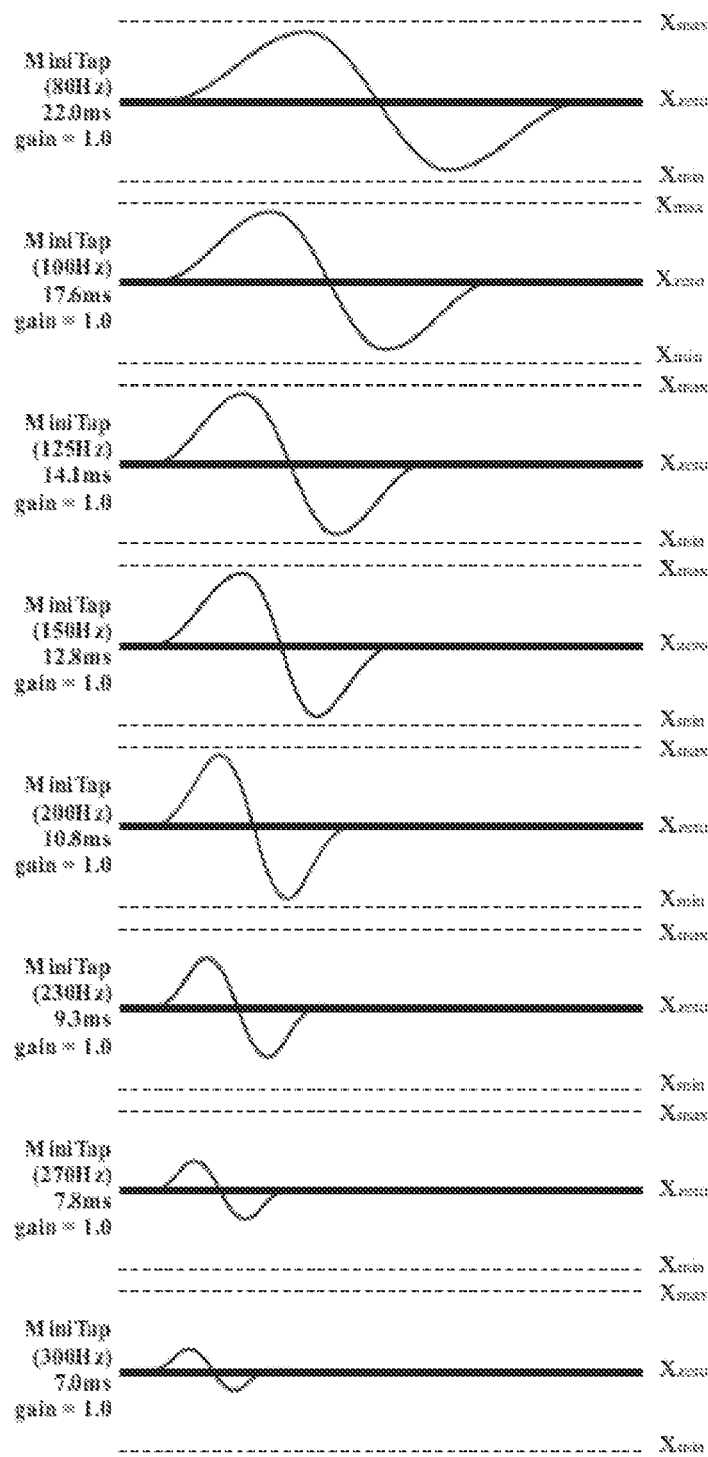
Figure 5E:
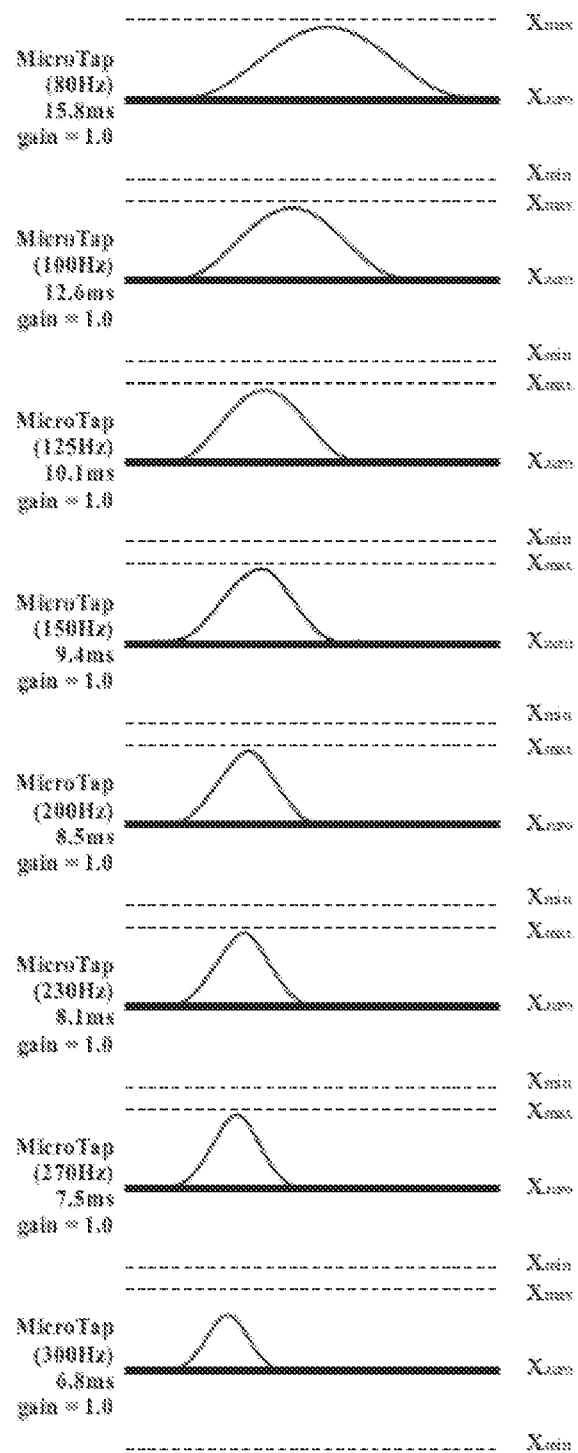
Figure 5F:
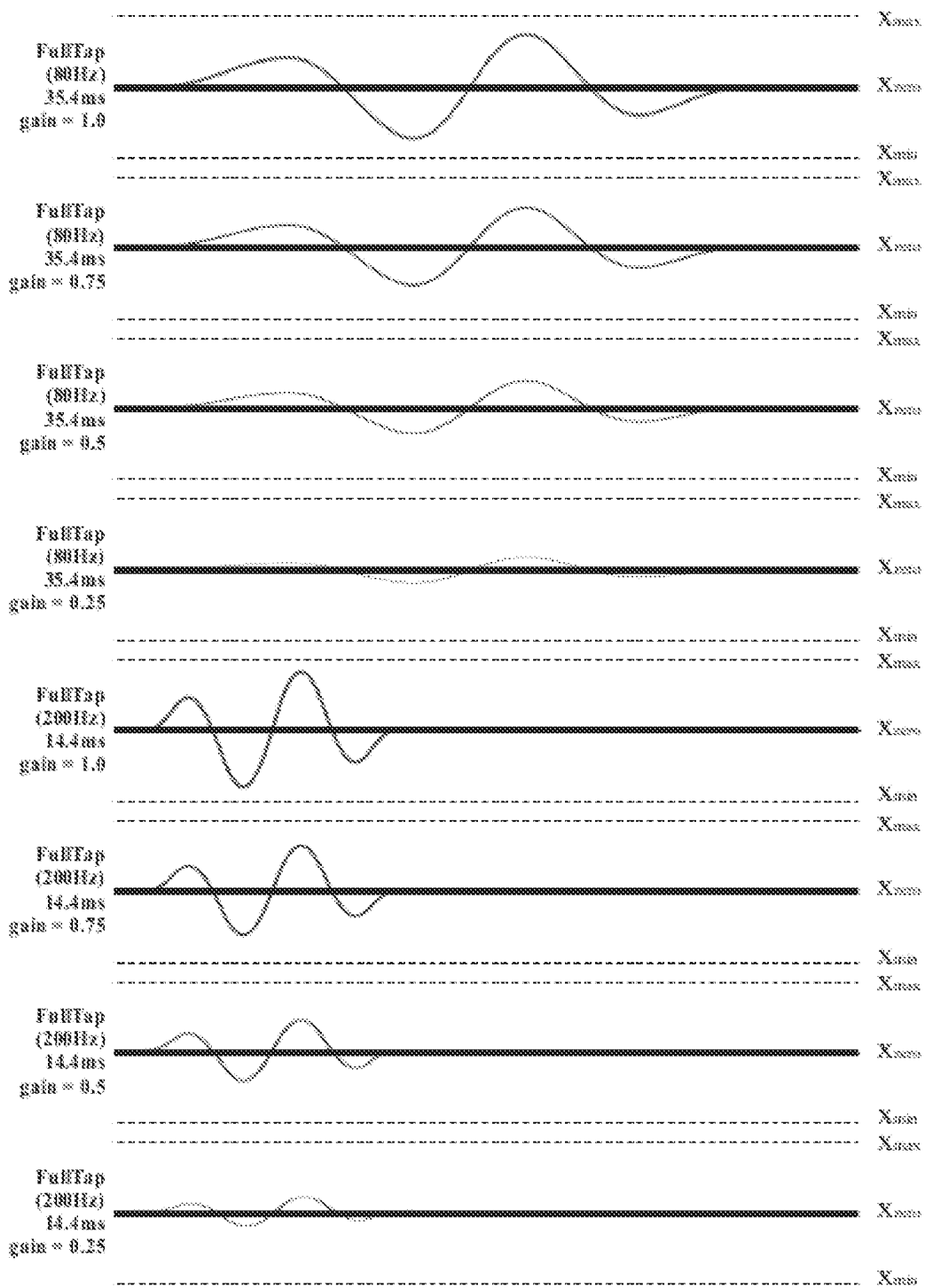
Figure 5G:
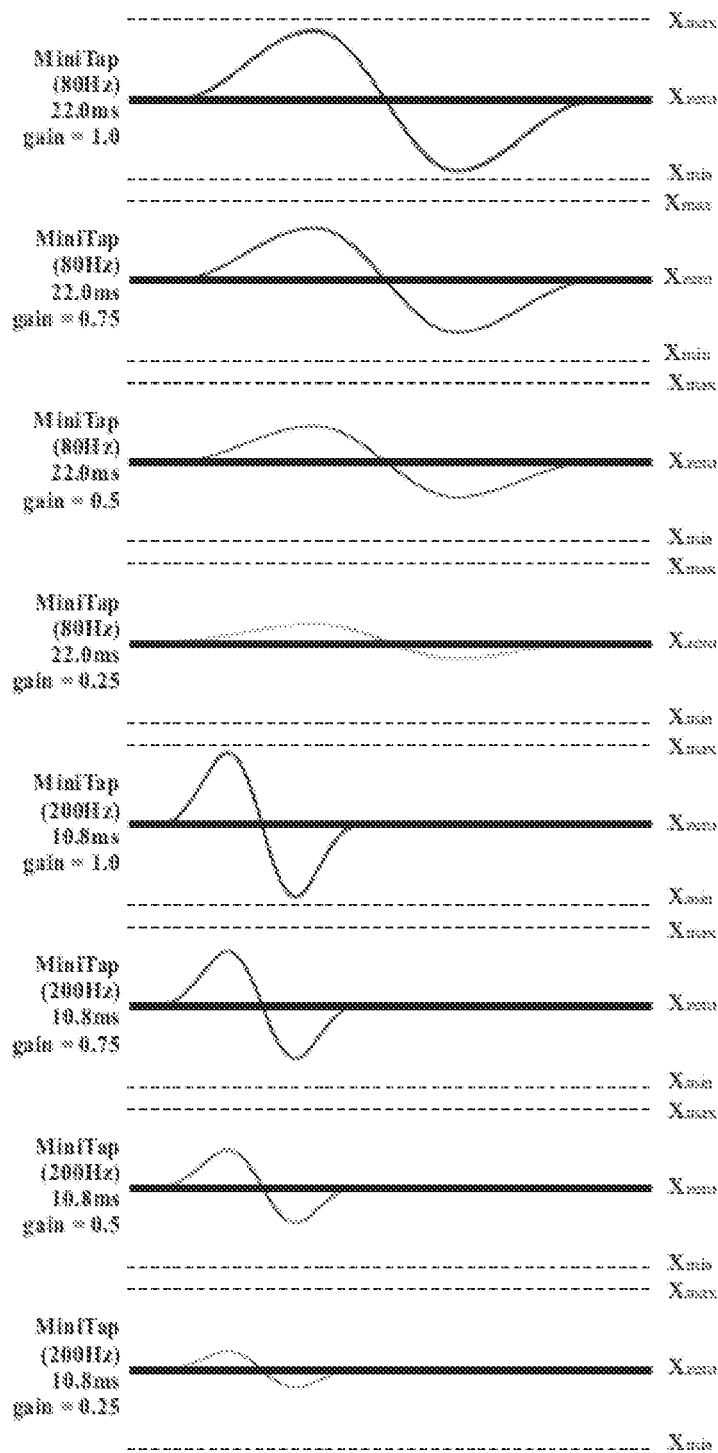
Figure 5H:
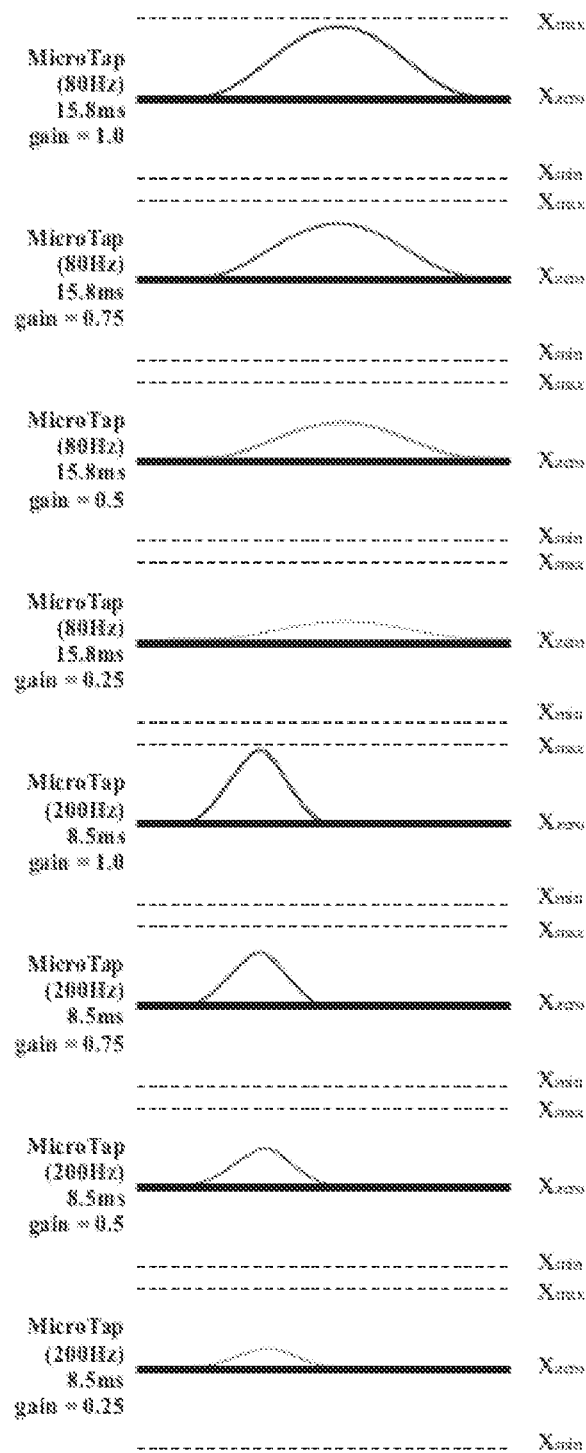

More specifically, FIGS. 5C-5E provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5F-5H, which are each shown with variants having a gain of 1.0, 0.75, 0.5, and 0.25. As shown in FIGS. 5F-5H, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 5C-5H show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. For example, a first set of tactile output patterns shown in FIG. 5C (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5D (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5E (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 5C-5H include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5C-5H describe movement of a mass in one dimension, however similar principles would also apply to movement of a moveable mass in two or three dimensions.

As shown in FIGS. 5C-5E, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 5C-5H, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5C). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5C-5E, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 5C-5E for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 below provides examples of tactile output/haptic feedback behaviors and configurations, and examples of their use with respect to the user interfaces for managing content-based tactile outputs that are illustrated and described herein.

TABLE 1

| Type of Tactile Output Sequence | Waveform | Textural (continuous) or Discrete | Associated Content Type | Used Examples |
|---|---|---|---|---|
| "Major" | MiniTap at 180 Hz | Discrete | Discrete | Tactile Output Sequence 610 |
| "Minor" | MicroTap at 200 Hz | Textural | Continuous | Tactile Output Sequence 620 |
| "Major-reduced" | MiniTap at 200 Hz | Discrete | Discrete | Tactile Output Sequence 1220 |
| "Limit" | MiniTap at 180 Hz | Discrete | End-of-Content | Tactile Output Sequence 630 |

Returning to the exemplary user interfaces of FIGS. 6A-6AF, in FIG. 6A, electronic device 600 displays, on display 602, a user interface 608 of a workout application that includes a plurality of platters (e.g., a predefined unit of a user interface that is a visually discrete and selectable user interface object, item, or element that is separate in functionality and/or purpose from other platters within the user interface, and is visually distinct and/or distinguishable from other platters and other user interface objects, items, or elements within the user interface), including a platter 608A and a platter 608B. While displaying user interface 608 showing platters 608A and 608B, electronic device 600 detects, via input element 604, a rotational input 601 (e.g., in a clockwise direction).

Figure 6B:
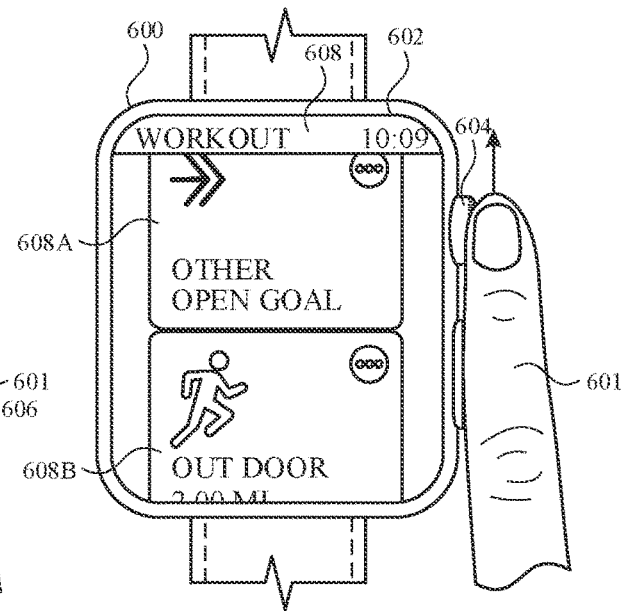

In FIG. 6B, in response to detecting rotational input 601 on input element 604, electronic device 600 scrolls (e.g., in the downwards direction in accordance with the direction of the rotational input, which is in a clockwise direction) the plurality of platters of user interface 608, including platters 608A and 608B. In FIG. 6B, while scrolling the plurality of platters of user interface 608 in response to detecting rotational input 601, electronic device 600 continues to detect, via input element 604, rotational input 601.

Figure 6C:
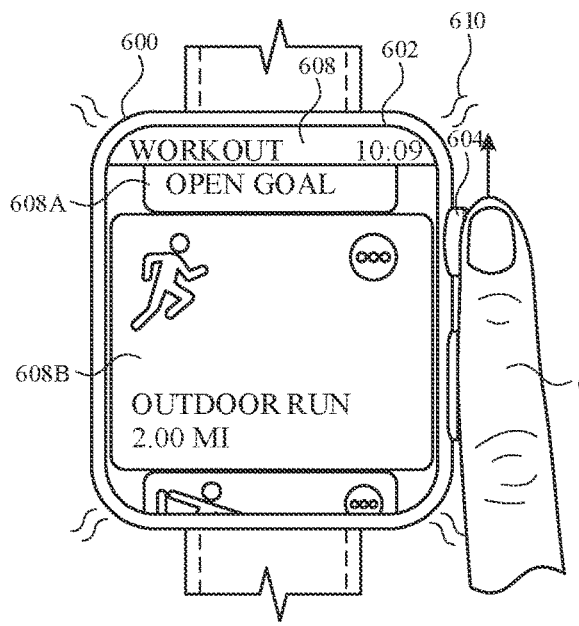

Electronic device 600 continues to scroll the plurality of platters, including platters 608A and 608B, of user interface 608 while continuing to detect rotational input 601 on input element 604. In FIG. 6C, as the plurality of platters are being scrolled, platter 608A slides off of an edge (e.g., the top edge) of the display while platter 608B is moved to a focal region (e.g., the center region, the middle region) of the display. In some embodiments, a user interface item or element, such as a platter, is deemed to have "reached" the focal region when a focal point of the user interface item or element is moved to the focal region. In some embodiments, a user interface item or element, such as a platter, is deemed to have "reached" the focal region when an edge (e.g., the top or bottom edge) of the user interface item/element is moved to the focal region. In some embodiments, upon reaching the focal region, a user interface item or element "snaps" to the focal region.

In FIG. 6C, platter 608B is moved towards and "snaps" to the focal region of the display. Upon platter 608B "snapping" to the focal region of the display, electronic device 600 generates a tactile output sequence 610 (e.g., a "major" tactile output, as described in Table 1). As described in greater detail below, the type of tactile output that is generated is based on the type of user interface item or element that is currently being moved, navigated, and/or manipulated on the display. In some embodiments, electronic device 600 also generates an audio output sequence (e.g., having a first type of audio pattern), via the one or more tactile output generators, associated with tactile output sequence 610.

Figure 6D:
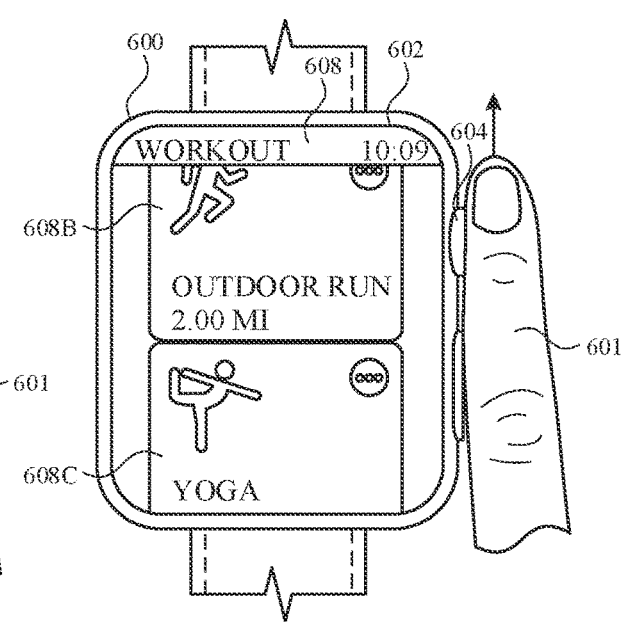

Electronic device 600 continues to scroll the plurality of platters, including platter 608B, of user interface 608 while continuing to detect rotational input 601 on input element 604. In FIG. 6D, as the plurality of platters are being scrolled, platter 608B begins to slide off of an edge (e.g., the top edge) of the display while a platter 608C is moved on to display from an opposite edge (e.g., the bottom edge) of the display.

Figure 6E:
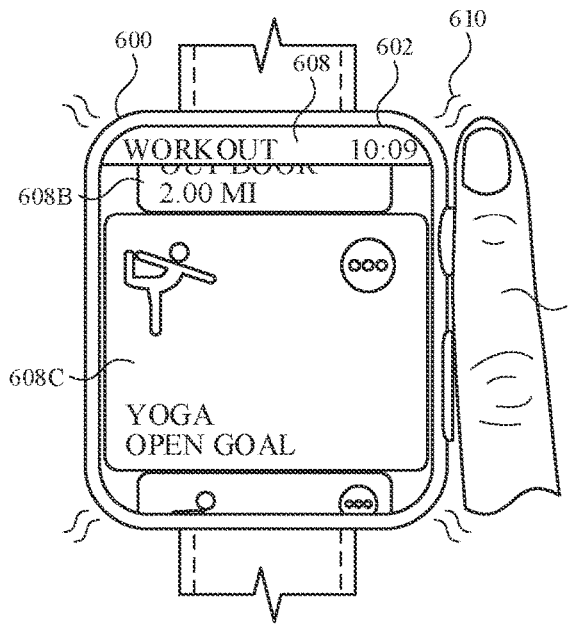

Electronic device 600 continues to scroll the plurality of platters, including platter 608C, of user interface 608 while continuing to detect rotational input 601 on input element 604. In FIG. 6E, as the plurality of platters are being scrolled, platter 608B slides off of an edge (e.g., the top edge) of the display while platter 608C is moved to the focal region (e.g., the center region, the middle region) of the display.

In FIG. 6E, platter 608C is moved towards and "snaps" to the focal region of the display. Upon platter 608C "snapping" to the focal region of the display, electronic device 600 again generates tactile output sequence 610 (e.g., a "major" tactile output, as described in greater detail above in Table 1). In some embodiments, electronic device 600 also generates the audio output sequence (e.g., having a first type of audio pattern) associated with tactile output sequence 610.

Figure 6F:
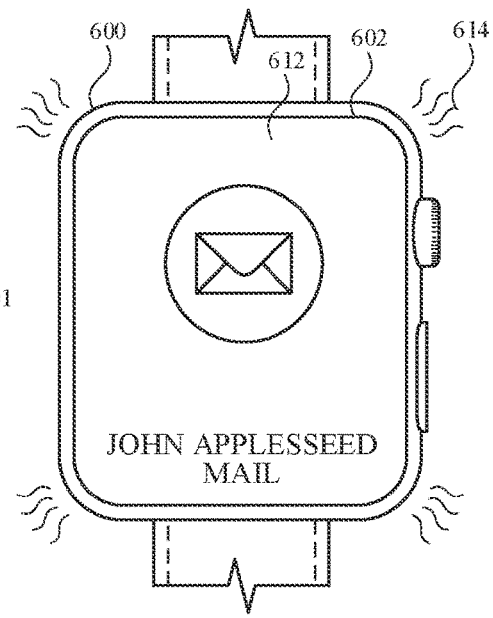

In FIG. 6F, electronic device 600 receives (e.g., via a wireless communication radio of the device) a message associated with a messaging application (e.g., an email for an email application, a text message for a text messaging application, a chat message or a chat application). In response to receiving the message, electronic device 600 displays, on display, a notification 612 indicating that the message has been received. Additionally, electronic device 600 generates a notification tactile output 614 notifying that a new message has been received. In some embodiments, notification tactile output 614 is generated via one or more tactile output generates that are different from the one or more tactile output generators that generate tactile output sequence 610. In some embodiments, notification tactile output 614 and tactile output sequence 610 are generated by the same one or more tactile output generators.

Figure 6G:
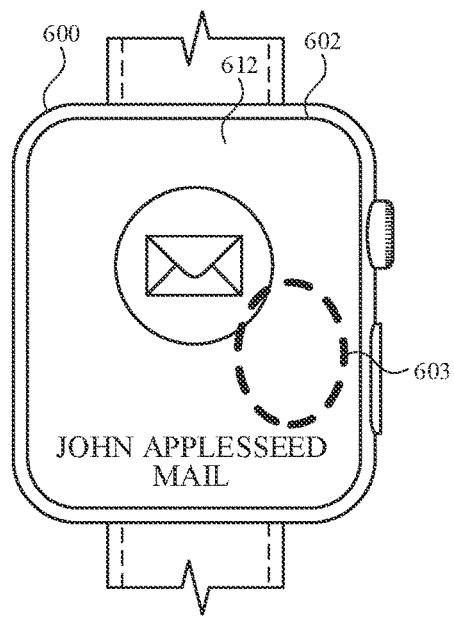

In FIG. 6G, subsequent to displaying, on display 602, notification 612 corresponding to the received message (e.g., an email message), electronic device 600 detects (e.g., via a touch-sensitive surface of display 602) a user selection 603 of notification 612.

Figure 6H:
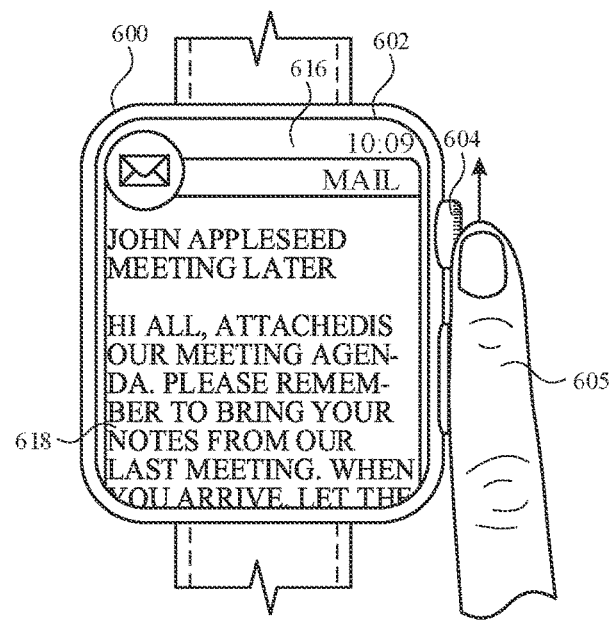

In FIG. 6H, in response to detecting user selection 603 of notification 612, electronic device 600 displays, on display 602, a user interface 616 of an email application corresponding to the received message and text 618 (e.g., continuous text content of the received message) of the received message. As shown in FIG. 6H, text 618 of the received message comprises continuous text that cannot simultaneously shown in its entirety on the display, and thus must be scrolled for a user to view the remaining portions of the content of the message.

In FIG. 6H, while displaying, in user interface 616 of the email application, text 618 of the received message, electronic device 600 detects, via input element 604, a rotational input 605 (e.g., in a clockwise direction). In response to and while detecting rotational input 605 on input element 604, electronic device 600 scrolls text 618 on the display.

While scrolling text 618 on the display, electronic device 600 generates, via the one or more tactile output generators, a tactile output sequence 620 (e.g., a "minor" tactile output, as described in Table 1). In some embodiments, electronic device 600 also generates an audio output sequence (e.g., having a second type of audio pattern) associated with tactile output sequence 620.

Figure 6I:
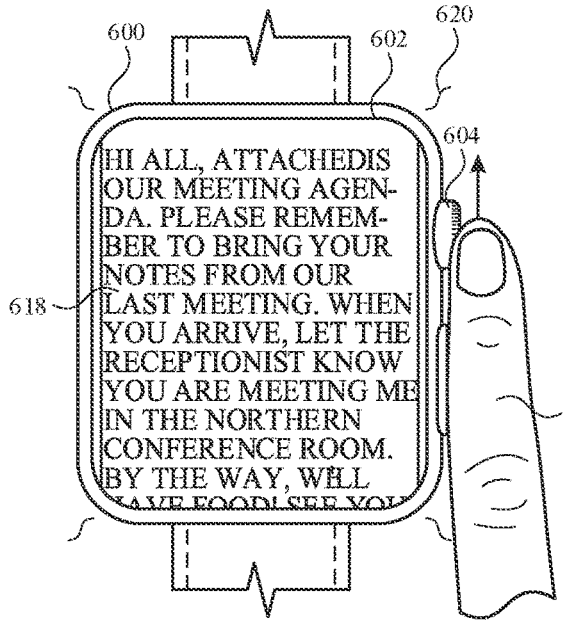
Figure 6J:
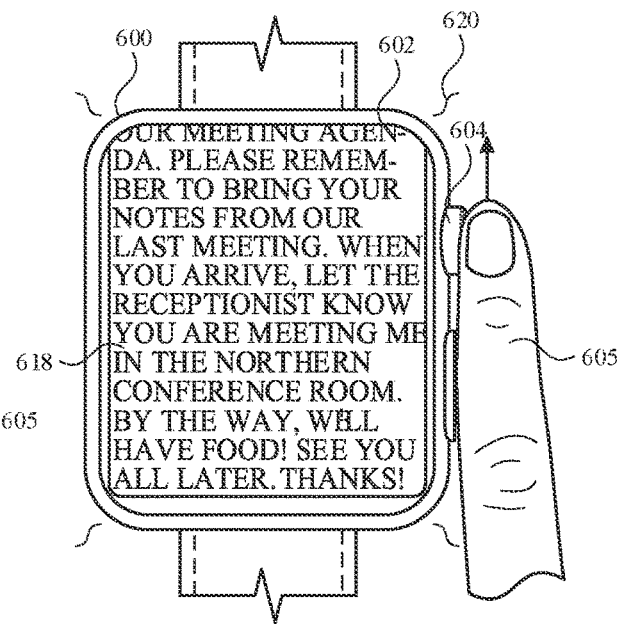

FIGS. 6I-6J illustrate electronic device 600 continuing to detect rotational input 605 on input element 604 and, in response to and while detecting rotational input 605, scrolling (e.g., downward) text 618 of the received message on the display. As shown in FIGS. 6I-6J, while detecting rotational input 605 and scrolling text 618, electronic device 600 continues generating tactile output sequence 620.

Figure 6K:
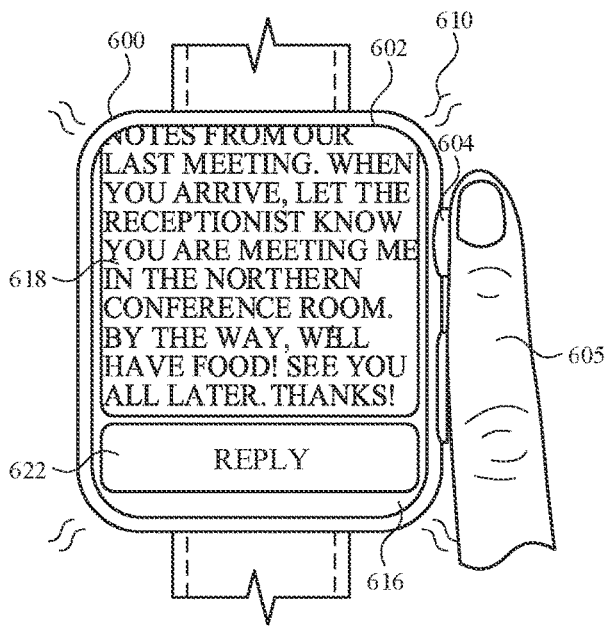

In FIG. 6K, after continuing to scroll text 618 of the received message in response to and while detecting rotational input 605 on input element 604, the end of the continuous text constituting text 618 is reached. As shown in FIG. 6K, electronic device 600 displays, in user interface 616 of the email application below text 618, an affordance 622 (e.g., a reply button) for performing a function associated with the received message. In some embodiments, upon displaying (e.g., fully displaying) affordance 622 on the display, electronic device 600 generates, via the one or more tactile output generators, tactile output sequence 610 and, in some embodiments, the audio output sequence associated with the tactile output sequence 610, first described above with reference to FIG. 6E. Alternatively, in some embodiments, electronic device 600 generates tactile output sequence 610 when affordance 622 "snaps" to the display from an edge (e.g., the bottom edge) of the display. Alternatively, in some embodiments, electronic device 600 generates tactile output sequence 610 when affordance 622 is moved to (e.g., and "snaps" to) a focal region of the display (e.g., a center region of the display).

Figure 6L:
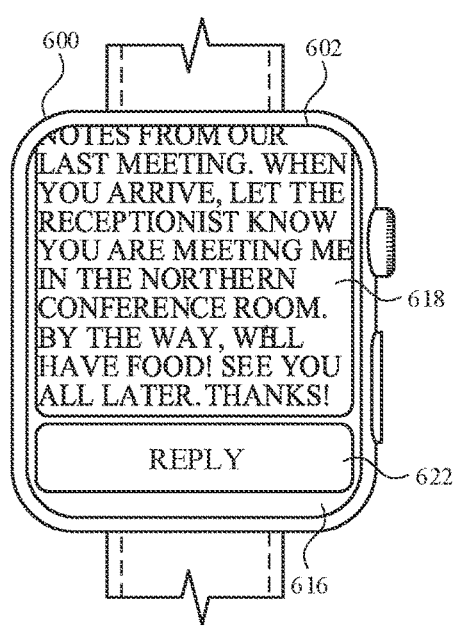

In FIG. 6L, electronic device 600 is no longer detecting rotational input 605 but is still displaying, on display 602, bottom portion of text 618 and affordance 622 of user interface 616.

Figure 6M:
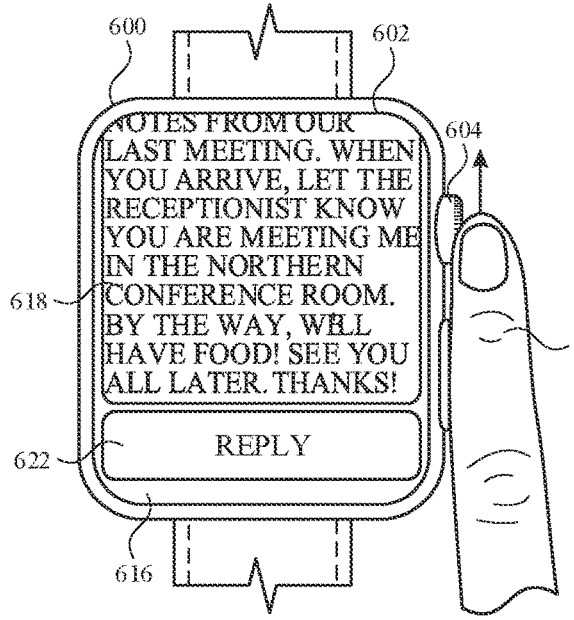

In FIG. 6M, while displaying bottom portion of text 618 and affordance 622 of user interface 616, electronic device 600 detects, via input element 604, a rotational input 607 (e.g., in a clockwise direction). In response to detecting and while continuing to detect rotational input 607, electronic device 600 scrolls (e.g., in a downwards direction in accordance with the direction of rotational input 607) user interface 616.

Figure 6N:
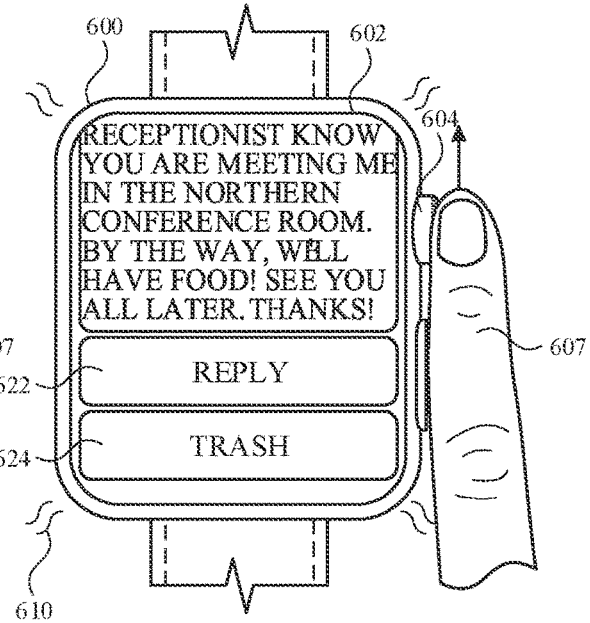

In FIG. 6N, while scrolling user interface 616 in response to rotational input 607 on input element 604, electronic device 600 displays, below affordance 622 in user interface 616, an affordance 624 (e.g., a delete button) for performing another function associated with the received message, and is the same type of user interface element (e.g., an affordance of the email application) as affordance 622. In some embodiments, upon displaying (e.g., fully displaying) affordance 624 on the display, electronic device 600 generates, via the one or more tactile output generators, tactile output sequence 610 and, in some embodiments, the audio output sequence associated with tactile output sequence 610. Alternatively, in some embodiments, electronic device 600 generates tactile output sequence 610 when affordance 622 "snaps" to the display from an edge (e.g., the bottom edge) of the display. Alternatively, in some embodiments, electronic device 600 generates tactile output sequence 610 when affordance 622 is moved to (e.g., and "snaps" to) a focal region of the display (e.g., a center region of the display).

Figure 6O:
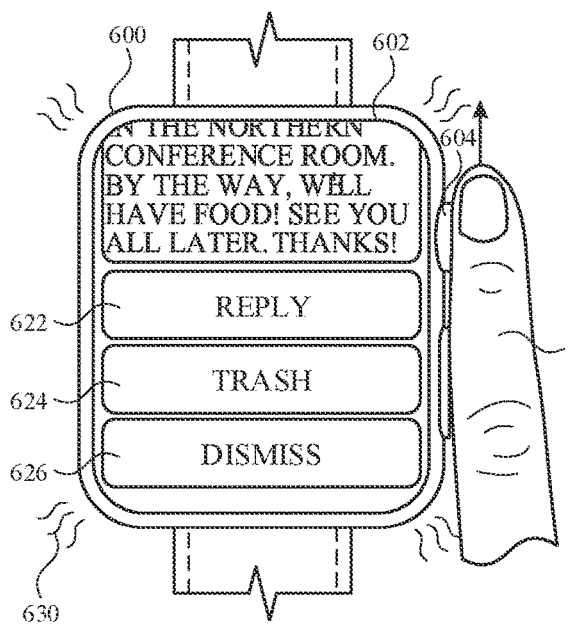

In FIG. 6O, while continuing to scroll user interface 616 in response to rotational input 607 on input element 604, electronic device 600 displays, below affordance 624 in user interface 616, an affordance 626 (e.g., a dismiss button) for performing another function associated with the received message, and is the same type of user interface element (e.g., an affordance of the email application) as affordances 622 and 624. Further, affordance 626 is a terminus user interface element of user interface 616.

In some embodiments, upon displaying (e.g., fully displaying) affordance 626 on the display, as shown in FIG. 6O, electronic device generates, via the one or more tactile output generators, a tactile output sequence 630 (e.g., a "limit" tactile output, as described in Table 1). In some embodiments, electronic device 600 also generates an audio output sequence (e.g., having a third type of audio pattern) associated with tactile output sequence 630.

Alternatively, as with affordances 622 and 624, in some embodiments, upon displaying (e.g., fully displaying) affordance 626 on the display, electronic device 600 generates, via the one or more tactile output generators, tactile output sequence 610 and, in some embodiments, the audio output sequence associated with tactile output sequence 610. Alternatively, in some embodiments, electronic device 600 generates tactile output sequence 610 when affordance 622 "snaps" to the display from an edge (e.g., the bottom edge) of the display. Alternatively, in some embodiments, electronic device 600 generates tactile output sequence 610 when affordance 622 is moved to (e.g., and "snaps" to) a focal region of the display (e.g., a center region of the display).

Figure 6P:
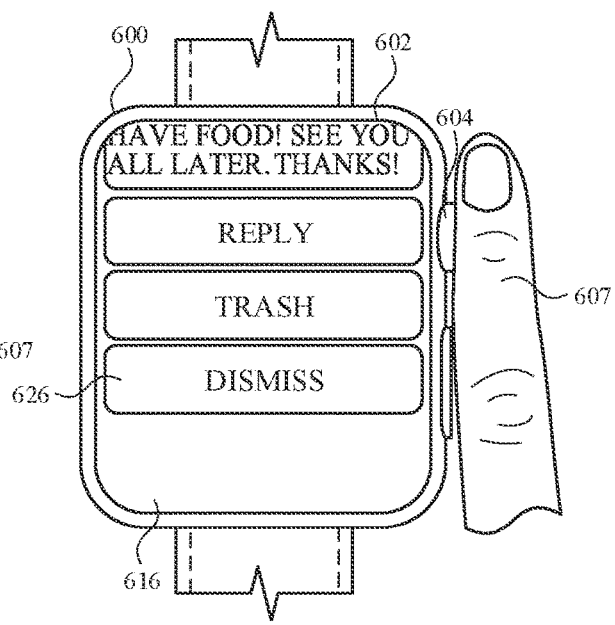

In FIG. 6O, electronic device 600 continues detecting, even after fully displaying the terminus user interface element (e.g., affordance 626) of user interface 616 and generating tactile output sequence 630, rotational input 607 on input element 604. As a result of continued rotational input 607 on input element 604, user interface 616 is further scrolled beyond the terminus user interface element (e.g., affordance 626) such that an empty region beyond affordance 626 is shown, as shown in FIG. 6P (e.g., user interface 616 is "stretched" beyond its terminus element).

After scrolling beyond affordance 626, electronic device 600 no longer detects rotational input 607. FIGS. 6Q-6R illustrate user interface 616, in response to no longer detecting rotational input 607, moving back (e.g., "bouncing back") to its initial position in FIG. 6O prior to being stretched beyond its terminus user interface element (e.g., affordance 626). For the sake of convenience, the stretch and subsequent bounce-back effect of the user interface illustrated in FIGS. 6O-6R is referred to from hereon as the "rubberbanding" effect. In some embodiments, after generating tactile output sequence 630 upon reaching the terminus user interface element, electronic device 600 does not generate a tactile output during a subsequent rubberbanding movement of the user interface.

FIG. 6S illustrates electronic device 600 displaying, on display 602, a middle portion of text 618 of the received message within user interface 616 of the email application. While displaying text 618, electronic device 600 detects a non-rotational input 609 (e.g., a press input, a press-and-hold input) on input element 604.

In FIG. 6T, in response to detecting non-rotational input 609 on input element 604, electronic device 600 displays, on display 602, a user interface 628 (e.g., a time user interface, a home use interface, a main user interface) different from user interface 616. Further, electronic device 600 does not generate a tactile output in response to non-rotational input 609 on input element 604.

Figure 6U:
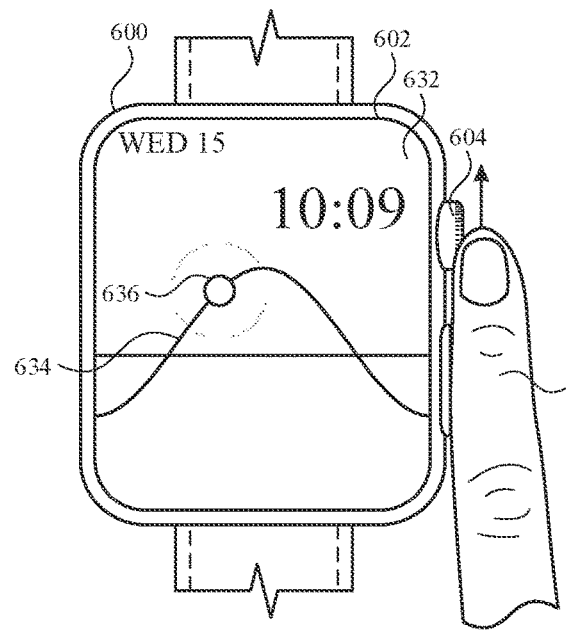

FIGS. 6U-6AF illustrate electronic device 600 navigating through a solar clock user interface 632 in response to rotational inputs on input element 604. As shown in FIG. 6U, solar clock user interface 632 includes a solar path 634 and a solar indicator 636 (e.g., a curved line indicative of the position of the sun during the course of a day). In FIG. 6U, while displaying solar clock user interface 632, electronic device 600 detects, via input element 604, a rotational input 611 (e.g., in a clockwise direction).

Figure 6V:
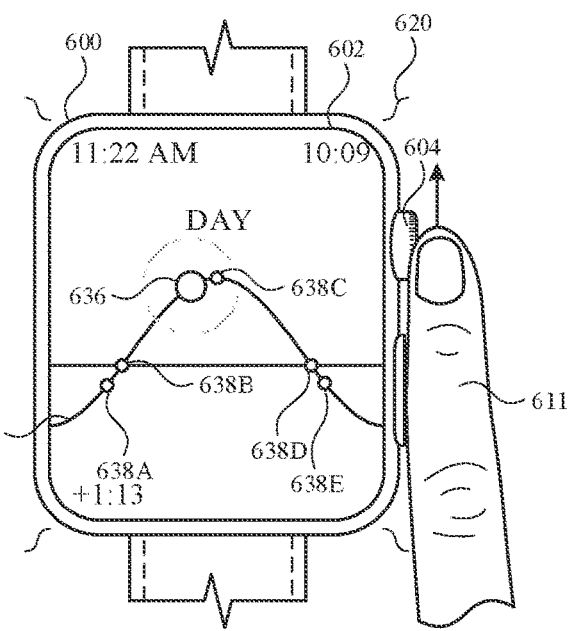

In FIG. 6V, while detecting rotational input 611 on input element 604, electronic device 600 moves solar indicator 636 along solar path 634 in a forward direction and generates (e.g., via the one or more tactile output generators of the device) tactile output sequence 620 and, in some embodiments, the audio output sequence associated with tactile output sequence 620. As also shown in FIG. 6V, while moving solar indicator 636 on solar path 634, electronic device 600 indicates, on solar path 634, discrete positions 638A-638E corresponding to milestone times during the course of a day (e.g., dawn, solar noon, twilight, sunset, dusk).

Figure 6W:
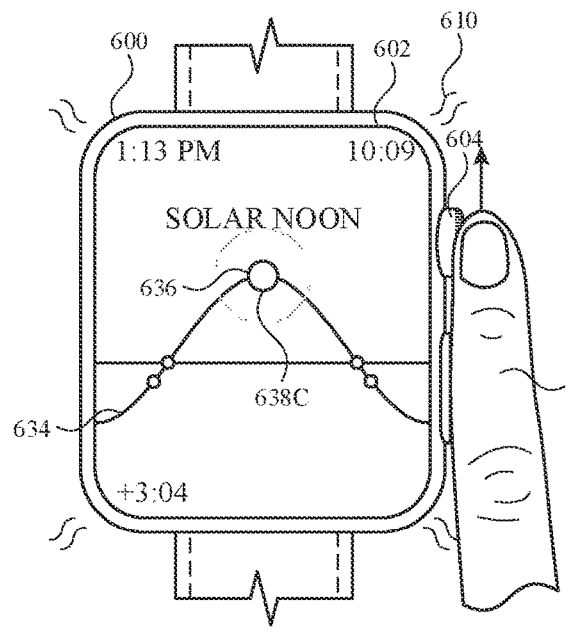

In FIG. 6W, while continuing to detect rotational input 611 on input element 604, electronic device 600 continues moving solar indicator 636 along solar path 634 in a forward direction until solar indicator 636 is moved to position 638C (e.g., solar noon). Upon reaching position 638C, electronic device 600 generates (e.g., via one or more tactile output generators of the device) tactile output sequence 610 and, in some embodiments, the audio output sequence associated with tactile output sequence 610.

Figure 6X:
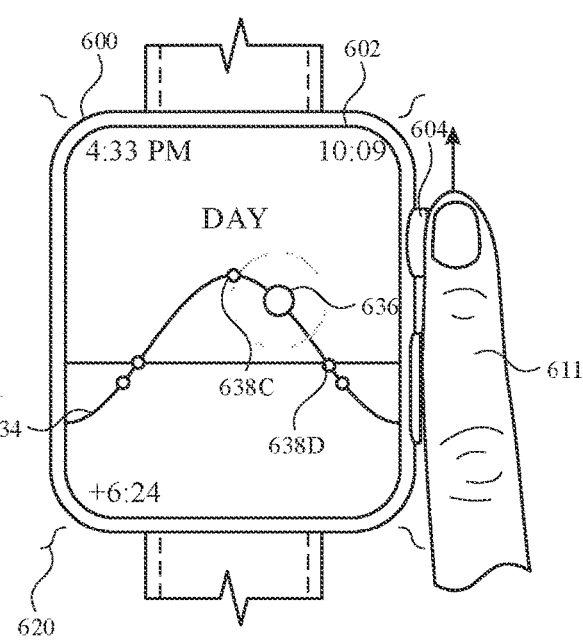
Figure 6Y:
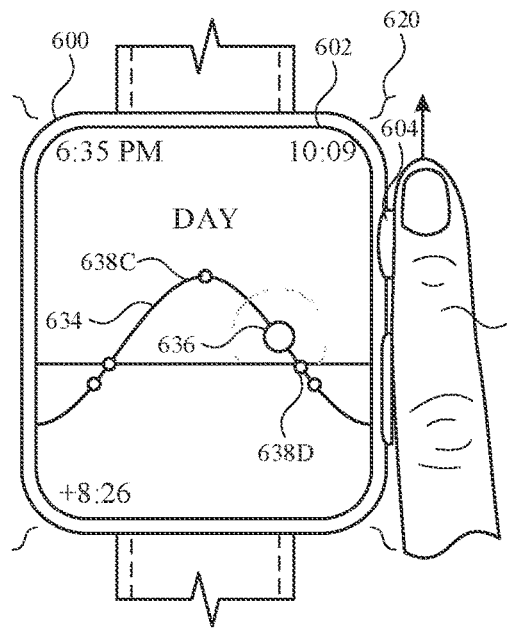

In FIGS. 6X-6Y, while continuing to detect rotational input 611 on input element 604, electronic device 600 continues moving solar indicator 636 along solar path 634, between discrete positions 638C and 638D, in a forward direction and, while moving solar indicator 636, generates (e.g., via one or more tactile output generators of the device) tactile output sequence 620 and, in some embodiments, the audio output sequence associated with tactile output sequence 620.

Figure 6Z:
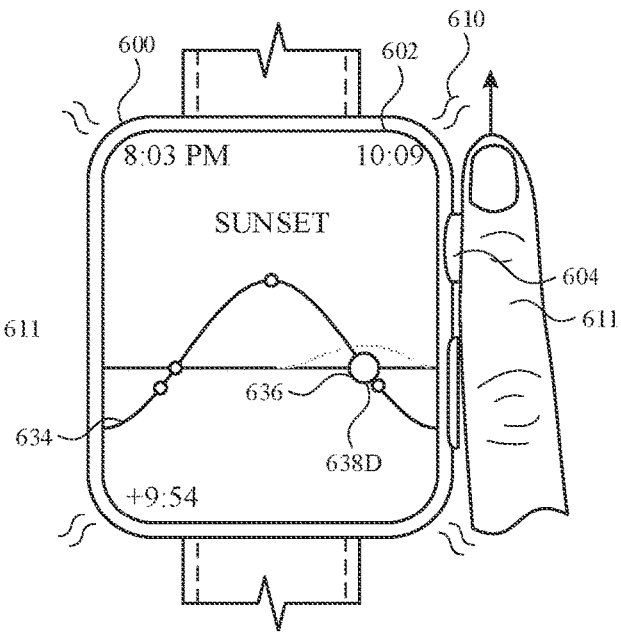
Figure 6A:
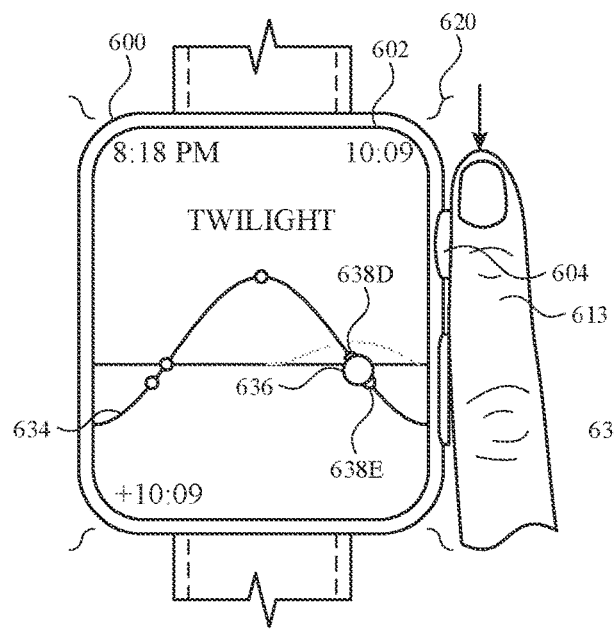
Figure 6A:
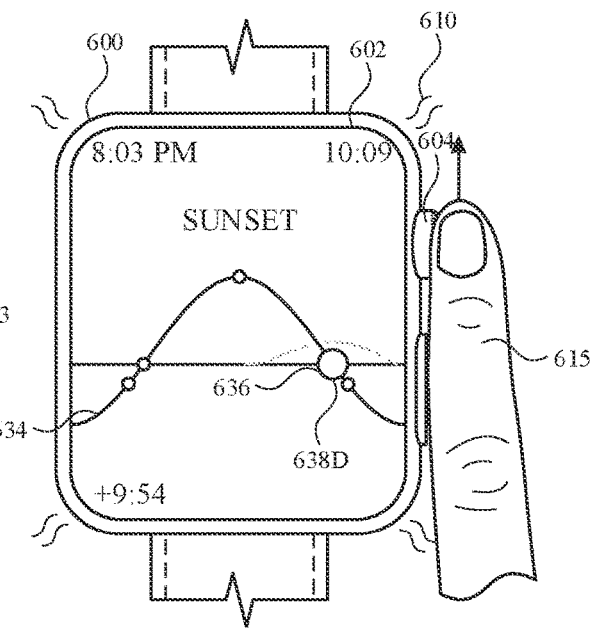
Figure 6A:
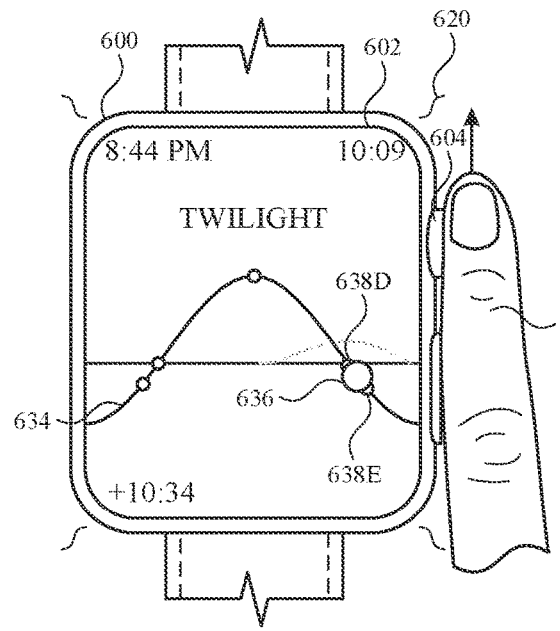
Figure 6A:
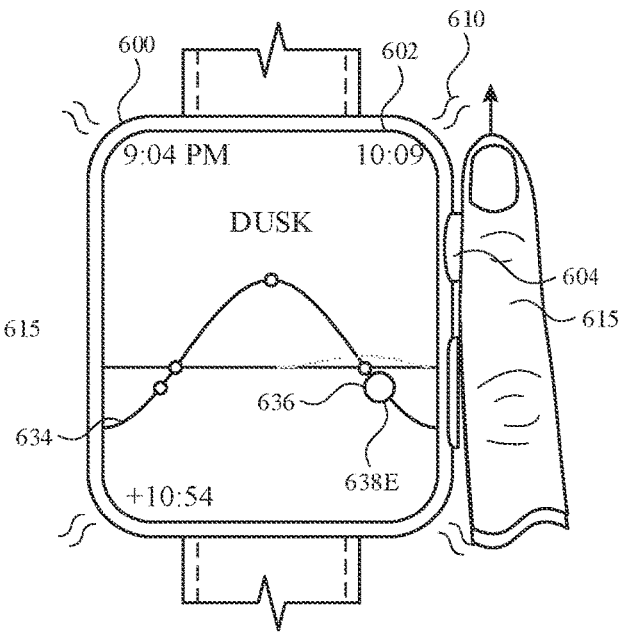
Figure 6A:
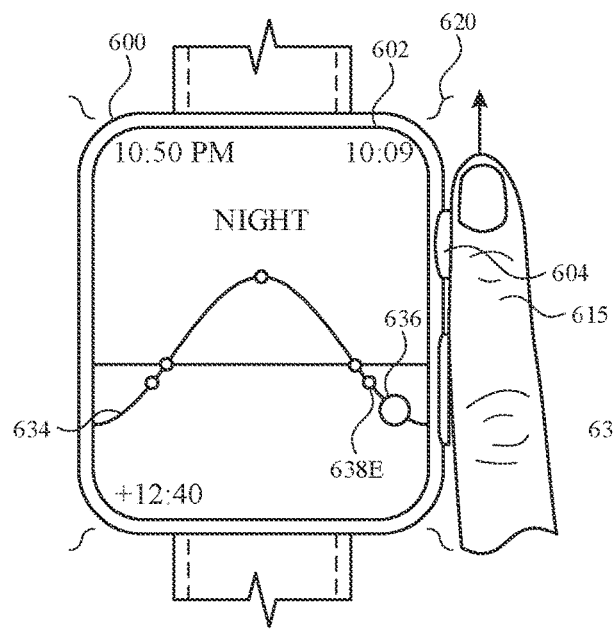
Figure 6A:
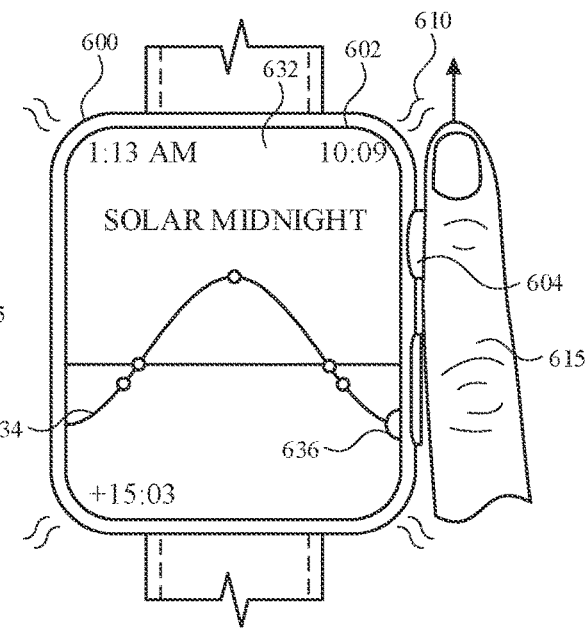
Figure 7A:
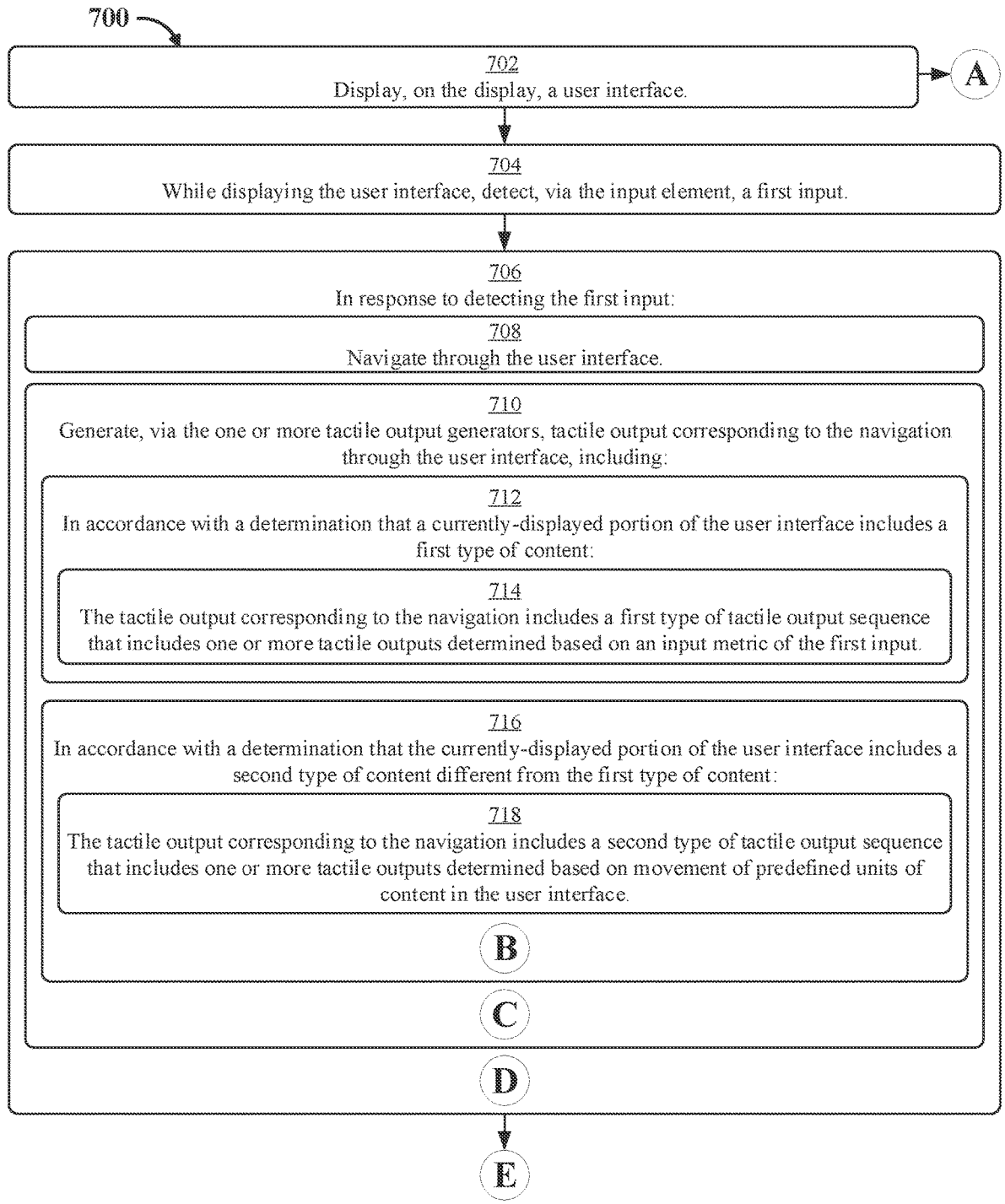
Figure 7D:
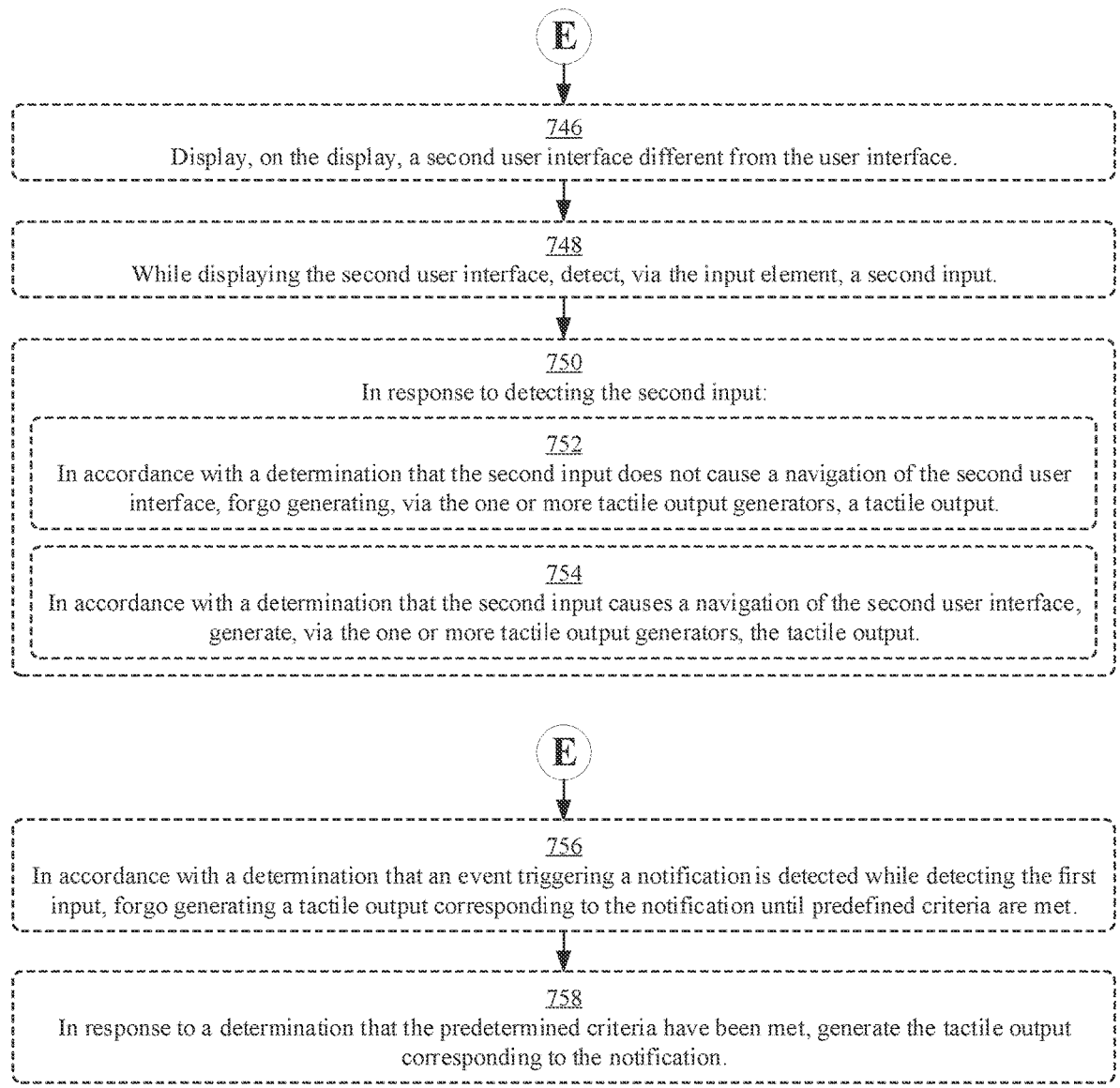

In FIGS. 6Z, while continuing to detect rotational input 611 on input element 604, electronic device 600 continues moving solar indicator 636 along solar path 634 in a forward direction until solar indicator 636 is moved to position 638D (e.g., sunset). Upon reaching position 638D, electronic device 600 generates (e.g., via one or more tactile output generators of the device) tactile output sequence 610 and, in some embodiments, the audio output sequence associated with tactile output sequence 610.

In FIG. 6AA, after reaching position 638D, electronic device 600 detects rotational input 613 on input element 604 (e.g., in a counter-clockwise direction). In response to detecting rotational input 613, electronic device 600 moves solar indicator 636 along solar path 634, between discrete positions 638C and 638D, in a backwards direction and, while moving solar indicator 636, generates (e.g., via one or more tactile output generators of the device) tactile output sequence 620 and, in some embodiments, the audio output sequence associated with tactile output sequence 620.

In FIG. 6AB, electronic device 600 detects rotational input 615 on input element 604 (e.g., in a clockwise direction). In response to detecting rotational input 615, electronic device 600 moves solar indicator 636 along solar path 634 back in a forward direction until solar indicator 636 is again moved to position 638D (e.g., sunset). Upon reaching position 638D, electronic device 600 generates, via the one or more tactile output generators, tactile output sequence 610 and, in some embodiments, the audio output sequence associated with tactile output sequence 610.

In FIG. 6AC, while continuing to detect rotational input 615 on input element 604, electronic device 600 continues moving solar indicator 636 along solar path 634, between discrete positions 638D and 638E, in a forward direction and, while moving solar indicator 636, generates, via the one or more tactile output generators, tactile output sequence 620 and, in some embodiments, the audio output sequence associated with tactile output sequence 620.

In FIG. 6AD, while continuing to detect rotational input 615 on input element 604, electronic device 600 continues moving solar indicator 636 along solar path 634 in a forward direction until solar indicator 636 is moved to position 638E (e.g., Dusk). Upon reaching position 638E, electronic device 600 generates, via the one or more tactile output generators, tactile output sequence 610 and, in some embodiments, the audio output sequence associated with tactile output sequence 610.

In FIG. 6AE, while continuing to detect rotational input 615 on input element 604, electronic device 600 continues moving solar indicator 636 along solar path 634 (e.g., past discrete position 638E) in a forward direction and, while moving solar indicator 636, generates, via the one or more tactile output generators, tactile output sequence 620 and, in some embodiments, the audio output sequence associated with tactile output sequence 620.

In FIG. 6AF, while continuing to detect rotational input 615 on input element 604, electronic device 600 continues moving solar indicator 636 along solar path 634 in a forward direction until solar indicator 636 is moved to position an end position of solar path 634 (e.g., Solar Midnight). Upon reaching the end position of solar path 634, electronic device 600 generates, via the one or more tactile output generators, tactile output sequence 610 and, in some embodiments, the audio output sequence associated with tactile output sequence 610.

FIGS. 7A-7D are a flow diagram illustrating a method for managing user interfaces associated with content-based tactile outputs, in accordance with some embodiments. Method 700 is performed at a device (e.g., 100, 300, 500, 600) with a display (e.g., display 602), an input element (e.g., 604), and one or more tactile output generators (e.g., the one or more tactile output generators of electronic device described above with reference to FIGS. 6A-6AF). Some operations in method 700 are, optionally, combined, the orders of some operations are, optionally, changed, and some operations are, optionally, omitted.

As described below, method 700 provides an intuitive way for managing user interfaces associated with content-based tactile outputs. The method reduces the cognitive burden on a user for managing and navigating user interfaces, thereby creating a more efficient human-machine interface. For battery-operated computing devices, enabling a user to navigate user interfaces faster and more efficiently by providing content-based tactile outputs conserves power and increases the time between battery charges.

The electronic device (e.g., 600) displays (702), on the display (e.g., 602), a user interface (e.g., 608, 616, a user interface that includes continuous content, such as continuous text of a messaging application, and/or discrete content, such as buttons, affordances, rows, platters, paragraphs). In some embodiments, a platter is a predefined unit of a user interface that is a visually discrete and selectable user interface object, item, or element that is separate in functionality and/or purpose from other platters within the user interface, and is visually distinct and/or distinguishable from other platters and other user interface objects, items, or elements within the user interface.

While displaying the user interface (e.g., 608, 616), the electronic device (e.g., 600) detects (704), via the input element (e.g., 604), a first input (e.g., 601, 605, a rotational input on the input element, where the rotational input is in a clockwise or counter-clockwise direction).

In response to detecting (706) the first input (e.g., 601, 605), the electronic device (e.g., 600) navigates (708) through (e.g., scrolls through) the user interface (e.g., 608, 616). In response to detecting (706) the first input, the electronic device (e.g., 600) generates (710), via the one or more tactile output generators, tactile output (e.g., 610, 620, a sequence of a number of discrete, individual tactile outputs) corresponding to the navigation through the user interface. Generating a tactile output in response to a rotational input on an input element and while navigating through content enables a user to quickly and easily recognize that content on the user interface is being scrolled and the type of content that is displayed and scrolled on the user interface, thereby enhancing operability of the device and user efficiency. This in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Generating a tactile output in response to the rotational input The tactile output (e.g., 610, 620, a sequence of a number of discrete, individual tactile outputs) corresponding to the navigation through the user interface (e.g., 616) includes, in accordance with a determination (712) that a currently-displayed portion of the user interface (e.g., 616) (e.g., a currently-selected (e.g., and displayed) portion of the user interface or a currently-selected user interface element within the user interface that is currently-displayed, a top portion or middle portion of the currently-selected user interface element) includes a first type of content (e.g., 618, continuous content, such as continuous text), the tactile output corresponding to the navigation includes (714) a first type of tactile output sequence (e.g., 620, a textural tactile output sequence) that includes one or more tactile outputs determined based on an input metric (e.g., a speed and/or magnitude) of the first input (e.g., without regard to movement of predefined units of content in the user interface). In some embodiments, the first type of tactile output sequence comprises variable tactile output spacing that is determined, for example, by the application corresponding to the displayed content. Generating a different type of tactile output sequence depending on the type of content that is being navigated in the user interface enables a user to quickly and easily recognize the nature, functionality, and/or features of the content that is being navigated while navigating/scrolling the content. Providing additional control of the device and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the number of tactile outputs generated in the first type of tactile output sequence (e.g., 620, generated within a fixed period of time (e.g., a rate of output)) corresponds to (e.g., is proportional to) a speed (e.g., rotational speed) of the first input, the first input is a rotational input on the input element. In some embodiments, as described in greater detail below with reference to FIGS. 14A-14H, the number of tactile outputs in the sequence of tactile outputs increases, and thus the tactile outputs are generated at a higher rate of occurrence, as the speed (e.g., rotational speed) of a rotational input on the input element increases, and the number of tactile outputs in the sequence of tactile outputs decreases (e.g., and thus the tactile outputs are generated at a lower rate of occurrence) as the speed (e.g., rotational speed) of the rotational input on the input element decreases. Generating a tactile output sequence where the number of tactile outputs correspond to the speed of the rotational input provides sensory feedback about a nature/characteristic of the user's input on the device, thereby enabling the user to easily respond accordingly (e.g., by increasing or decreasing the speed of the rotational input). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The tactile output (e.g., a sequence of a number of discrete, individual tactile outputs) corresponding to the navigation through the user interface (e.g., 608) includes, in accordance with a determination (716) that the currently-displayed portion of the user interface (e.g., a currently-selected (e.g., and displayed) portion of the user interface or a currently-selected user interface element within the user interface that is currently-displayed, a top portion or middle portion of the currently-selected user interface element)

includes a second type of content (e.g., discrete content, such as buttons, affordances, rows, platters, paragraphs) different from the first type of content, the tactile output corresponding to the navigation includes a second type of tactile output sequence (e.g., 610, a content-driven tactile output sequence) that includes (718) one or more tactile outputs determined based on movement of predefined units of content in the user interface. In some embodiments, the electronic device (e.g., 600) does not generate tactile outputs corresponding to the second type of tactile output sequence if the content being navigated is of the second type. In some embodiments, the predefined units of content correspond to visually distinguished content elements (e.g., buttons, affordances, rows, platters, paragraphs) within the content.

In some embodiments, the user interface does not include content that is the second type of content. In some embodiments, the user interface is a notification user interface (e.g., 612) that includes continuous notification text without including discrete content items (e.g., buttons, affordances, rows, platters, paragraphs)

In some embodiments, the user interface (e.g., 608) does not include content that is the first type of content. In some embodiments, the user interface includes discrete content items (e.g., buttons, affordances, rows, platters, paragraphs) without including continuous content such as a block of text or an image.

In some embodiments, a particular type of tactile output corresponds to a particular tactile output pattern. For example, as described with reference to FIGS. 5C-5H and in Table 1, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

In some embodiments, the first type of tactile output sequence (e.g., 620, a textural tactile output sequence) is different from (e.g., distinguishable from) the second type of tactile output sequence (e.g., 610, a content-driven tactile output sequence). In some embodiments, the first type of tactile output sequence is different from the second type of tactile output sequence (e.g., 610) in that the number, amplitudes, and/or pattern of the one or more tactile outputs of the first type of tactile output sequence is different from the number, amplitudes, and/or pattern of the one or more tactile outputs of the second type of tactile output. That is, from the perspective of a user of the electronic device (e.g., 600), the sensory sensation felt by the user from first type of tactile output sequence and from the second type of tactile output sequence are distinguishable.

In some embodiments, the second type of tactile output sequence (e.g., 610, a content-driven tactile output sequence) is determined based on (e.g., synchronized to, aligned with, matches with) the movement of the predefined units of content (e.g., affordances, platters) in the user interface (e.g., 608) (e.g., a predefined unit starting to be displayed on the display (e.g., 602), being fully displayed on the display, moving in a snapping animation, starting to leave the display, being fully scrolled off of the display, or being scrolled to some predefined position on the display such as a center of the display), and the first type of tactile output sequence (e.g., 620, a textural tactile output sequence) is determined independently of (e.g., not synchronized to) the movement of content in the user interface.

In some embodiments, generating (710), via the one or more tactile output generators, tactile output corresponding to the navigation through the user interface (e.g., 616) includes, in accordance with a determination (736) that the user interface is displaying a terminal portion (e.g., a beginning or end portion, a top or bottom portion, an edge portion, a border portion) of the first type of content (e.g., continuous content, such as continuous text), the tactile output corresponding to the navigation includes a third type of tactile output sequence (e.g., 630), different from the first type of tactile output sequence (e.g., 620), indicating that the content is at the terminal portion. Providing a different type of tactile output to indicate that the content is at the terminal portion improves sensory feedback by enabling the user to quickly and easily recognize that the user has reached the end of the content (e.g., without having to attempt to further navigate/scroll the content). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, generating (710), via the one or more tactile output generators, tactile output corresponding to the navigation through the user interface includes, in accordance with a determination (738) that the user interface is not displaying a terminal portion of the first type of content, the tactile output portion corresponding to the navigation does not include the third type of tactile output sequence (e.g., although the tactile output portion corresponding to the navigation optionally includes the first type of tactile output sequence or the second type of tactile output sequence depending on the type of content and the amount of navigation through the user interface).

In some embodiments, in accordance with the determination (716) that the user interface includes the second type of content (e.g., 608A, 608B, discrete content, such as buttons, affordances, rows, platters, paragraphs), and in accordance with a determination (728) that the predefined units of content are of a first type (e.g., relatively large discrete user interface objects), the tactile output has a first amplitude. In some embodiments, in accordance with the determination (716) that the user interface includes the second type of content (e.g., discrete content, such as buttons, affordances, rows, platters, paragraphs), and in accordance with a determination (730) that the predefined units of content are of a second type (e.g., relatively small discrete user interface objects) different from the first type, the tactile output has a second amplitude smaller than the first amplitude (e.g., a reduced amplitude). In some embodiments, the tactile output corresponding to the second type of predefined units of content is an amplitude-reduced version of the tactile output corresponding to the first type of predefined units of content. Different types of tactile outputs are described in greater detail above with reference to FIGS. 5C-5H and in Table 1.

In some embodiments, while navigating through the user interface (e.g., 608, 616, 632), in accordance with the determination that the currently-displayed portion of the user interface includes the second type of content (e.g. discrete content, such as buttons, affordances, rows, platters, paragraphs), generating (732) the tactile output (e.g., that includes the second type of tactile output sequence) comprises generating the tactile output in response to a movement (e.g., a snapping movement) of a first predefined unit of content (e.g., 608A, 608B, 622, 624) into alignment on the display (e.g., 602) (e.g., the first predefined unit snapping into a region of the display, such as a focal region, center region, or main viewing region of the display). Generating a tactile output in response to a movement of a first predefined unit of content into alignment on the display improves sensory feedback by enabling a user to quickly and easily recognize that the predefined unit of content is now the currently-selected content, and thus the user can proceed with using a feature/functionality associated with the predefined unit of content. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while navigating through the user interface (e.g., 608, 616, 632), in accordance with the determination that the currently-displayed portion of the user interface includes the second type of content (e.g. discrete content, such as buttons, affordances, rows, platters, paragraphs), generating (734) the tactile output (e.g., that includes the second type of tactile output sequence) comprises generating the tactile output in response a movement (e.g., a snapping movement) of a first predefined unit of content (e.g., 608A, 608B, 622, 624) out of alignment on the display (e.g., 602) (e.g., the first predefined unit snapping out of a region of the display, such as a focal region, center region, or main viewing region of the display).

In some embodiments, the electronic device (e.g., 600) displays (746) (e.g., subsequent to detecting the first input), on the display, a second user interface (e.g., 612, a non-scrollable user interface, a non-modifiable user interface, a non-navigable user interface, a notification) different from the user interface (e.g., 608, 616, 632, a scrollable user interface, a modifiable user interface, a navigable user interface). In some embodiments, while displaying the second user interface, the electronic device detects (748), via the input element, a second input (e.g., a rotational input, a rotational input on the input element in a clockwise or counter-clockwise direction). In some embodiments, in response to detecting (750) the second input, the electronic device, in accordance with a determination that the second input does not cause a navigation of the second user interface (e.g., because the second user interface is non-scrollable), forgoes generating (752), via the one or more tactile output generators, a tactile output. Thus, in some embodiments, if an input (e.g., rotational input) on the input element causes a change and/or modification of the displayed user interface, the electronic device does not generate a tactile output in response to the input, thereby enabling the user to quickly and easily recognize, while making an input on the device, that the input caused a change and/or modification of the displayed user interface. This in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting (750) the second input, the electronic device, in accordance with a determination that the second input causes a navigation of the second user interface (e.g., because the second user interface is scrollable), generates (754), via the one or more tactile output generators, the tactile output. In some embodiments, if the navigation of the second user interface includes (e.g., only includes) a navigation of continuous content (e.g., continuous text), the generated tactile output is the first type of tactile output/tactile output sequence (e.g., a textural tactile output sequence). In some embodiments, if the navigation of the second sure interface includes (e.g., only includes) a navigation of discrete content (e.g., buttons, affordances, rows, platters, paragraphs), the generated tactile output is the second type of tactile output/tactile output sequence (e.g., a content-driven tactile output sequence) different from the first type of tactile output/tactile output sequence.

In some embodiments, the second user interface (e.g., 612) corresponds to a notification (e.g., of an incoming electronic communication, an alert), and the notification replaces display of the user interface (e.g., 608).

In some embodiments, while displaying the user interface (e.g., 608, 616), the electronic device (e.g., 600) detects (720), via a second input element (e.g., a touch-sensitive surface of the display of the electronic device) different from the input element (e.g., 604), a second input (e.g., a touch-based navigational gesture or scrolling gesture on the display (e.g., 602)). In some embodiments, in response to detecting (722) the second input, the electronic device navigates (724) through the user interface (e.g., scrolls through the user interface). In some embodiments, in response to detecting (722) the second input, the electronic device forgoes generating (726), via the one or more tactile output generators, the tactile output corresponding to the navigation through the user interface.

In some embodiments, in response to detecting (706) the first input (e.g., 601, 605), the electronic device (e.g., 600) generates (740) (e.g., via the one or more tactile out generators and/or one or more speakers of or connected to the electronic device) audio output associated with the tactile output corresponding to the navigation through the user interface (e.g., 608, 616, 632). In some embodiments, in accordance with the determination (742) that the currently-displayed portion of the user interface (e.g., 616) includes the first type of content (e.g., continuous content), the audio output includes an audio output sequence that is associated with (e.g., based on) tactile output sequence 610. In some embodiments, in accordance with the determination (744) that the currently-displayed portion of the user interface (e.g., 608) includes the second type of content (e.g., discrete content), the audio output includes a second type of audio output sequence that is associated with (e.g., based on) the second type of tactile output sequence. Providing an audio output associated with the tactile output improves feedback by providing another avenue for the user to recognize that content is being scrolled and the types of content that are being scrolled in the user interface. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination (7526) that an event triggering a notification (e.g., 612, activation of an alert, receiving an electronic communication, such as a text or email message) is detected while not detecting input via the input element (e.g., 604), the electronic device (e.g., 600) generates a tactile output (e.g., 614) corresponding to the notification and, optionally, displaying, on the display, the notification. In some embodiments, in accordance with a determination that the event triggering the notification (e.g., activation of an alert, receiving an electronic communication, such as a text or email message) is detected while detecting input via the first input element, the electronic device forgoes generating the tactile output corresponding to the notification and, optionally, forgoing displaying, on the display, the notification. In some embodiments, the tactile output corresponding to the notification is suppressed. In some embodiments, the tactile output corresponding to the notification is delayed until input via the first input element ceases to be detected. In some embodiments, the electronic device displays the notification upon detecting that the first input is no longer being detected.

In some embodiments, in accordance with a determination that an event triggering a notification (e.g., 612, activation of an alert, receiving an electronic communication, such as a text or email message) is detected while detecting the first input (e.g., 601, 605), the electronic device (e.g., 600) forgoes generating (756) a tactile output (e.g., 614) corresponding to the notification (e.g., an alert tactile output) until predefined criteria (e.g., a predetermined amount of time) are met and, optionally, displaying, on the display, the notification for a predetermined amount of time. In some embodiments, in response to a determination that the predetermined criteria have been met (e.g., that the predetermined amount of time has passed), the electronic device generates (758) the tactile output corresponding to the notification and, optionally, displaying, on the display, the notification. In some embodiments, the electronic device displays the notification after the predetermined amount of time has passed even if the first input is still being detected. Thus, in some embodiments, the tactile output corresponding to the notification (e.g., an alert tactile output) does not interfere with the tactile output corresponding to the navigation through the user interface via the first input.

Note that details of the processes described above with respect to method 700 (e.g., FIGS. 7A-7D) are also applicable in an analogous manner to the methods described below. For example, method 900 optionally includes one or more of the characteristics of the various methods described above with reference to method 700. For example, a different type of tactile output sequence is generated during scrolling of content and at the end of content, as described in method 900. For another example, method 1100 optionally includes one or more of the characteristics of the various methods described above with reference to method 700. For example, a tactile output sequence is generated when adjusting via rotational input on an input element, as opposed to a touch input on a display, as described in method 1100. For another example, method 1300 optionally includes one or more of the characteristics of the various methods described above with reference to method 700. For example, one or more different types of tactile output sequences are provided while adjusting a time setting via a rotational input on an input element, as described in method 1300. For another example, method 1500 optionally includes one or more of the characteristics of the various methods described above with reference to method 700. For example, a magnitude/amplitude and/or number of discrete tactile outputs in a generated tactile output sequence changes in response to a change in rotational speed of a rotational input on an input element, as described in method 1500. For brevity, these details are not repeated below.

FIGS. 8A-8T illustrate exemplary user interfaces associated with end-of-content tactile outputs, in accordance with some embodiments. The user interfaces in these figures are used to illustrate the processes described below, including the processes in FIGS. 9A-9B.

FIG. 8A illustrates electronic device 600, as described above with reference to FIGS. 6A-6AF. In FIG. 8A, electronic device 600 displays, on display 602, text 804 of a received message (e.g., comprising continuous text of the received message) in a user interface 802 of a messaging application (e.g., an email application, a text message application, a chat application). Text 804 is shown in a user interface item 806 of user interface 802, where the user interface item 806 is a terminus user interface element (e.g., a first user interface element) of user interface 802 and is displayed in its initial position, with the beginning of text 804 shown on the display.

In FIG. 8A, while displaying user interface item 806 in its initial position within user interface 802, electronic device 600 detects, via input element 604, a rotational input 801 (e.g., in a clockwise direction). In response to detecting rotational input 801, electronic device 600 scrolls text 804 downwards to display portions of text 804 that, in FIG. 8A, was not visible on the display. As shown in FIG. 8B, while scrolling text 804 (e.g., comprising continuous text), electronic device 600 generates tactile output sequence 620 (e.g., a "minor" tactile output sequence, as described in Table 1). In some embodiments, electronic device 600 also generates, via the one or more tactile output generators, the audio output sequence (e.g., having a second type of audio pattern) associated with tactile output sequence 620.

In FIG. 8B after scrolling text 804 downwards, electronic device 600 detects, via input element 604, a rotational input 803 (e.g., in a counter-clockwise direction). In response to detecting rotational input 803, electronic device 600 scrolls text 804 back upwards towards the initial position of text 804 on the display. As shown in FIG. 8C, while scrolling text 804 (e.g., comprising continuous text), electronic device 600 generates tactile output sequence 620 and, in some embodiments, the audio output sequence associated with tactile output sequence 620.

In FIG. 8C, electronic device 600 continues detecting rotational input 803 on input element 604. In response to continuing to detect rotational input 803, electronic device 600 continues scrolling text 804 upwards until user interface item 806 is back to its initial position on the display, and the top-end of user interface 802 is reached on the top-edge of the display.

Figure 8D:
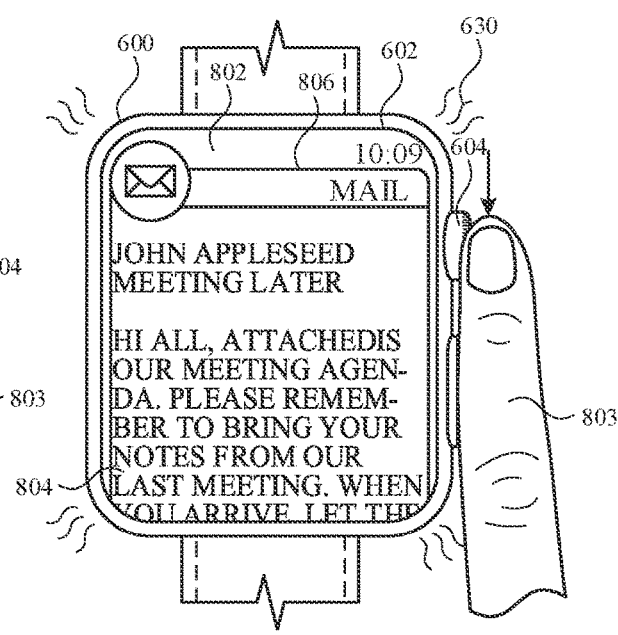

In FIG. 8D, upon user interface 802 reaching its top-end on the display, electronic device generates tactile output sequence 630 (e.g., a "limit" tactile output sequence, as described in Table 1). In some embodiments, electronic device 600 also generates, via the one or more tactile output generators, the audio output sequence (e.g., having a third type of audio pattern) associated with tactile output sequence 630.

In FIG. 8D, electronic device 600 continues detecting rotational input 803 on input element 604, even after user interface 802 reaching its top-end on the display.

Figure 8E:
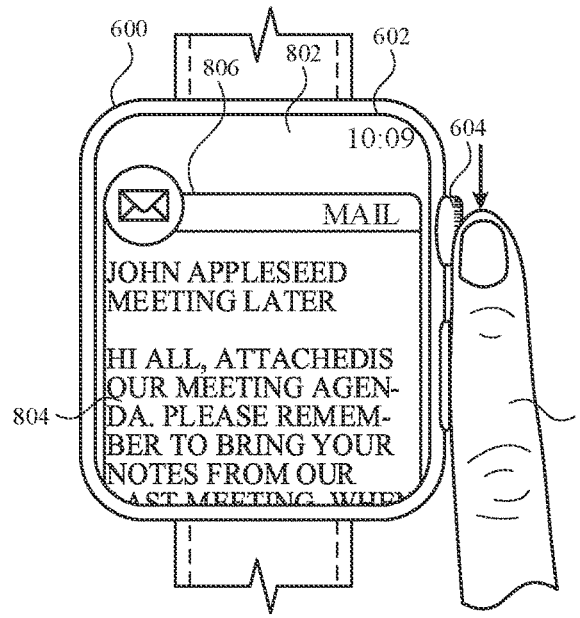
Figure 8F:
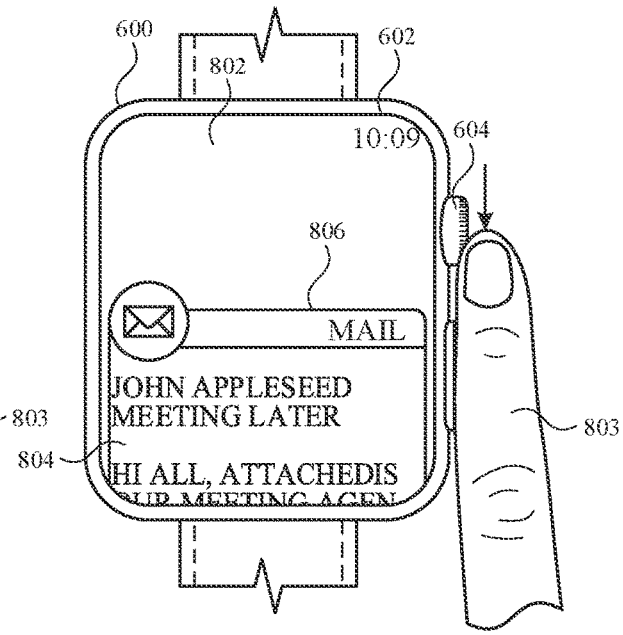
Figure 8G:

FIGS. 8E-8F illustrate user interface item 806 including text 804 being scrolled beyond its initial position in FIG. 8A in a "rubberbanding" effect, as first described above with reference to FIGS. 6P-6R. In FIGS. 8E-8F, electronic device 600 continues detecting rotational input 803 on input element 604. As a result of continued rotational input 803 on input element 604, user interface 802 is further scrolled beyond the terminus user interface item (e.g., user interface item 806) such that an empty region beyond user interface item 806 is shown (e.g., a region that is blank or has a different color or texture from the user interface item) and, once rotational input 803 is no longer detected, user interface item 806 "bounces back" to its initial position in FIG. 8A in a rubberbanding effect, as shown in FIG. 8G. During the rubberbanding effect illustrated in FIGS. 8E-8F, electronic device 600 does not generate a tactile output (e.g., nor an audio output). Further, electronic device 600 does not generate tactile output sequence 630 sequence after the "bounce-back" of user interface item 806 to its initial position, as shown in FIG. 8G.

Figure 8H:

FIGS. 8H-8K illustrate text 804 being scrolled via a touch scrolling input (e.g., on a touch-sensitive surface of display 602). In FIG. 8H, while displaying user interface item 806 in its initial position, electronic device 600 detects (e.g., via a touch-sensitive surface of display 602) a touch scrolling gesture 805 (e.g., in an upwards direction) on text 804.

Figure 8I:
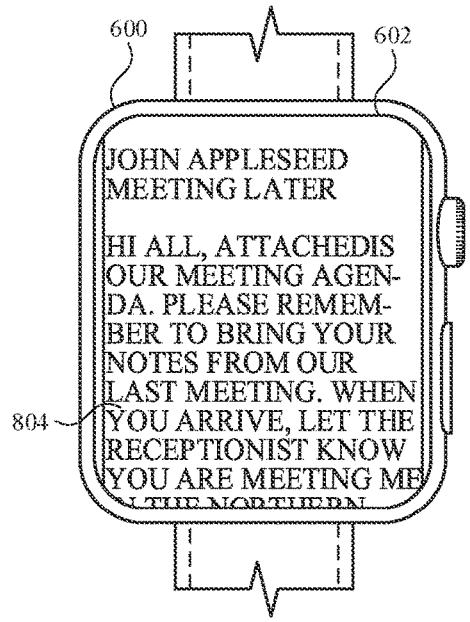
Figure 8J:
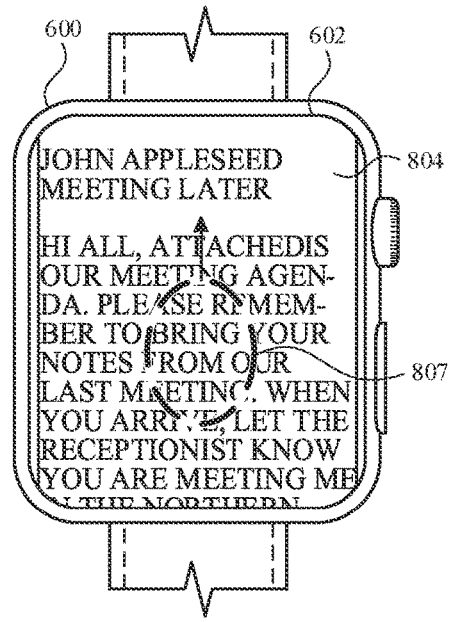

In FIG. 8I, in response to detecting touch scrolling gesture 805, electronic device 600 scrolls text 804 (e.g., in a downwards direction) such that portions of text 804 that was not visible in FIG. 8H is visible in FIG. 8I. In FIG. 8J, after scrolling text 804 in response to detecting touch scrolling gesture 805, electronic device 600 detects (e.g., via a touch-sensitive surface of display 602) another touch scrolling gesture 807 (e.g., in an upwards direction). As shown in FIGS. 8G-8J, electronic device 600 does not generate a tactile output (e.g., tactile output sequence 620) when scrolling text 804 in response to a touch scrolling input (e.g., as opposed to a rotational input on input element 604).

Figure 8K:
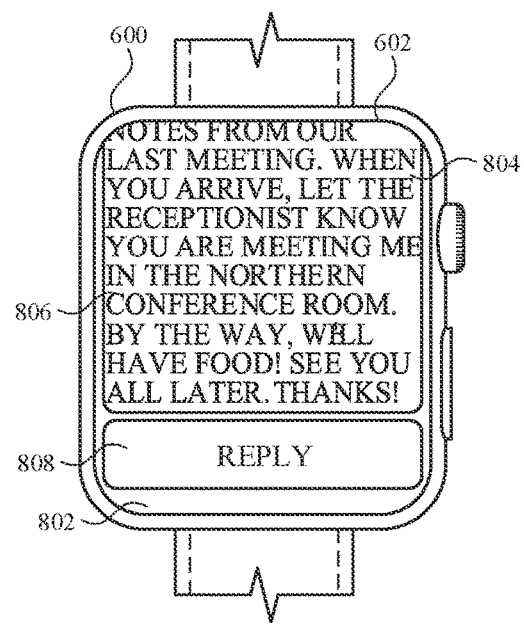

In FIG. 8K, in response to detecting touch scrolling gesture 807, electronic device 600 further scrolls text 804 (e.g., in a downwards direction) such that the bottom-end of text 804 is displayed and an affordance 808 (e.g., a reply button) below user interface item 806 is shown in the display. As shown in FIG. 8K, electronic device 600 does not generate a tactile output (e.g., tactile output sequence 610) when displaying affordance 808 in response to a touch scrolling input (e.g., as opposed to a rotational input on input element 604).

In some embodiments, affordance 808 is a terminus user interface item (e.g., the last, bottom-most user interface item) of user interface 802. In some embodiments, even if affordance 808 is a terminus user interface item of user interface 802, electronic device 600 does not generate a tactile output (e.g., tactile output sequence 630) when the display reaches an end of user interface 802.

FIGS. 8L-8P illustrate a plurality of platters of a workout application (e.g., the workout application first described above with reference to FIGS. 6A-6E) being scrolled by a rotational input 809 on input element 604. As mentioned, a platter is a discrete user interface element/item (e.g., as opposed to the continuous text of text 804, which is a continuous user interface element/item).

Figure 8L:
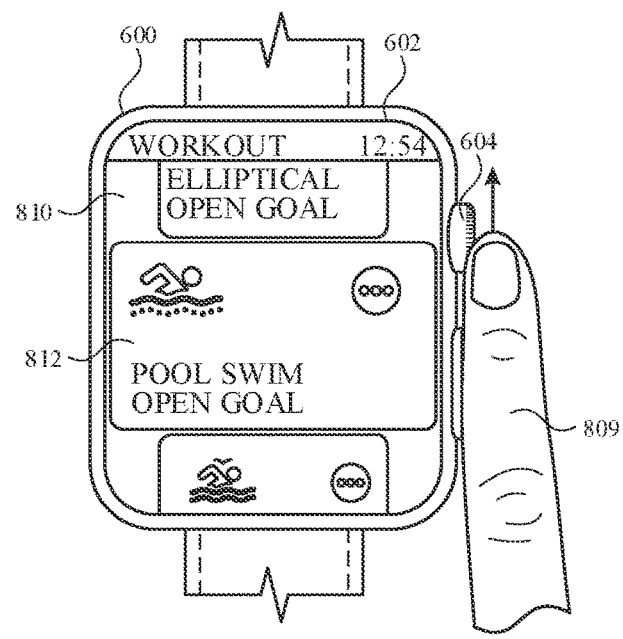

In FIG. 8L, while displaying, on display 602, a user interface 810 of the workout application, where user interface 810 includes a plurality of platters, including a platter 812, electronic device 600 detects, via input element 604, rotational input 809.

Figure 8M:
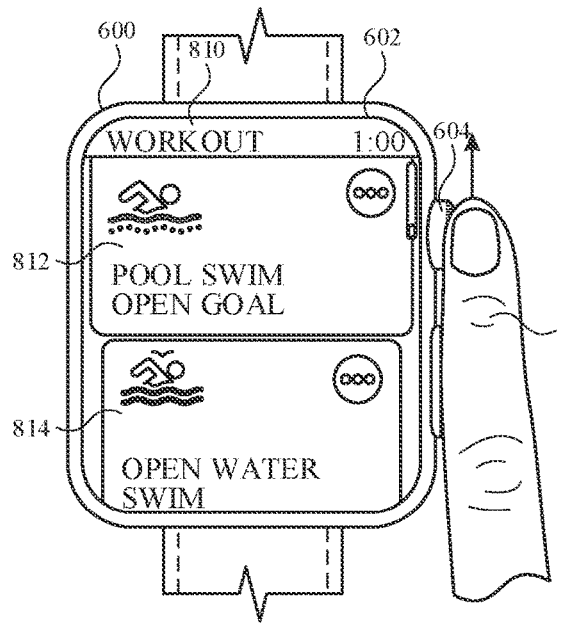

In response to detecting and while continuing to detect rotational input 809 on input element 604, electronic device 600 scrolls the plurality of platters of user interface 810. In FIG. 8M, platter 812 is gradually moved off of a top-edge of the display and a platter 814 (e.g., positioned below platter 812) is gradually moved onto the display, where platter 814 is a terminus user interface item (e.g., the last, bottom-most platter) of user interface 810.

Figure 8N:
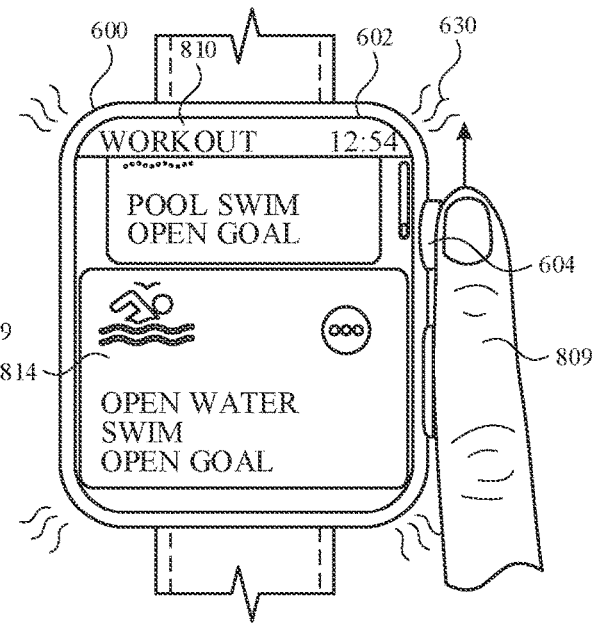

In FIG. 8N, platter 814 is fully moved onto the display as a result of rotational input 809 on input element 604. In response to platter 814 being fully moved onto the bottom of the display, as shown in FIG. 8N, electronic device 600 generates tactile output sequence 630 and, in some embodiments, the audio output sequence associated with the tactile output sequence 630.

Figure 8O:
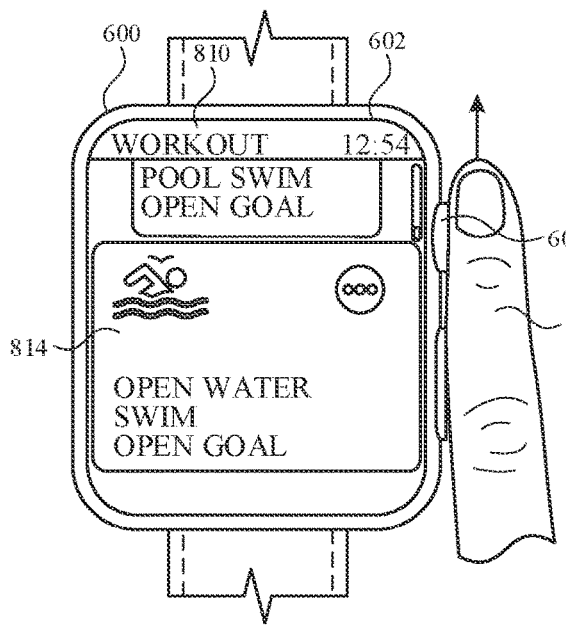
Figure 8P:
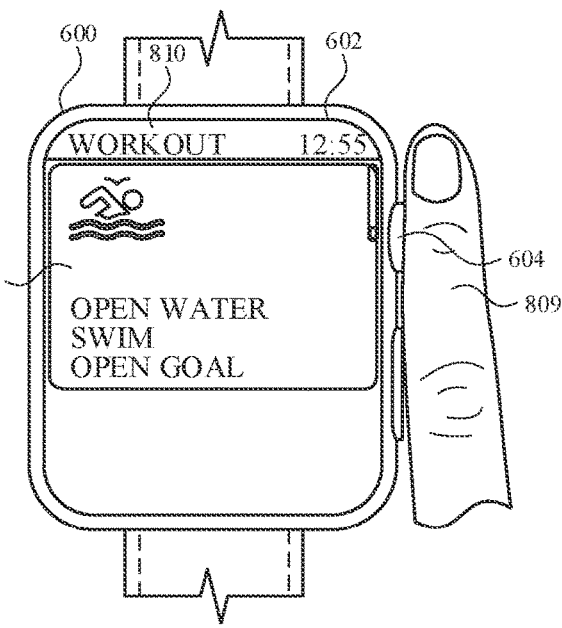

In FIGS. 8O-8P, electronic device 600 continues detecting rotational input 809 on input element 604. As a result of continued rotational input 809 on input element 604, user interface 810 is further scrolled beyond the terminus user interface item (e.g., platter 814) such that an empty region beyond user interface item 814 is shown (e.g., the "stretch" portion of the rubberbanding effect).

Figure 8Q:
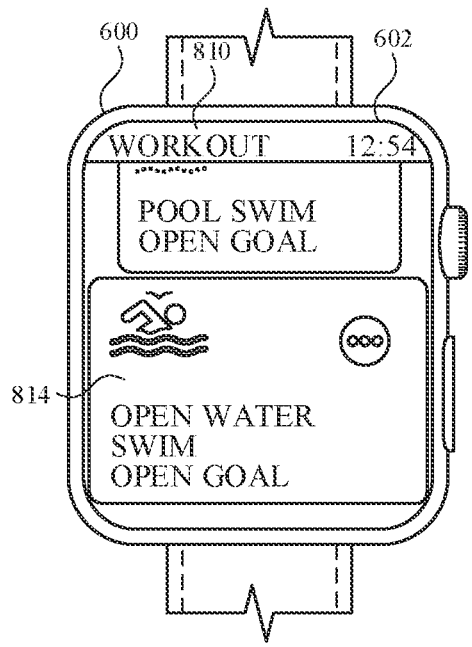

In FIG. 8Q, electronic device 600 no longer detects rotational input 809 on input element 604. Upon no longer detecting rotational input 809 on input element 604, platter 814 "bounces back" to its initial position in FIG. 8N (e.g., the "bounce-back" portion of the rubberbanding effect). During the rubberbanding effect illustrated in FIGS. 8O-8Q, electronic device 600 does not generate a tactile output (e.g., nor an audio output). Further, electronic device 600 does not generate tactile output sequence 630 after the "bounce-back" of platter 814 to its initial position, as shown in FIG. 8Q. This lack of tactile output after an end of the content has been reached when scrolling inputs before reaching the end of the content generated tactile outputs during the scrolling inputs provides the user with an indication that an end of the content has been reached.

Figure 8R:
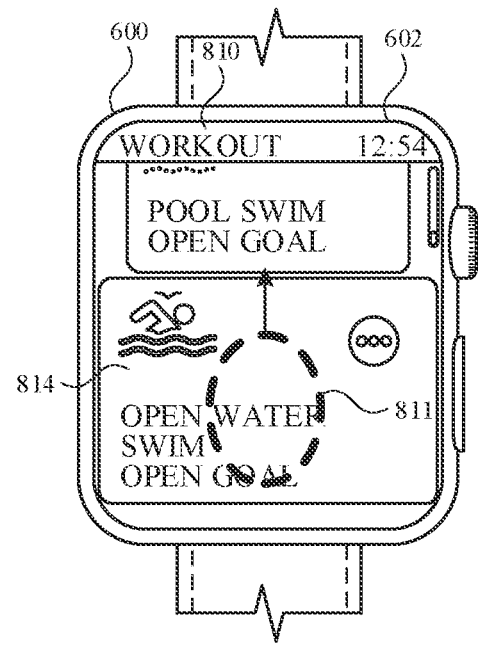
Figure 8S:
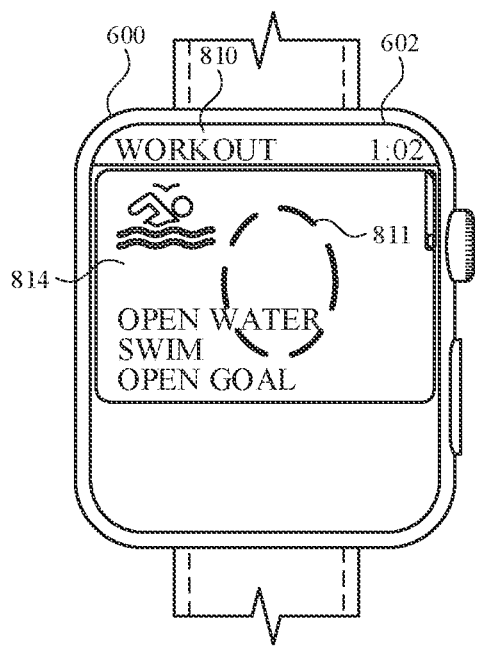
Figure 8T:
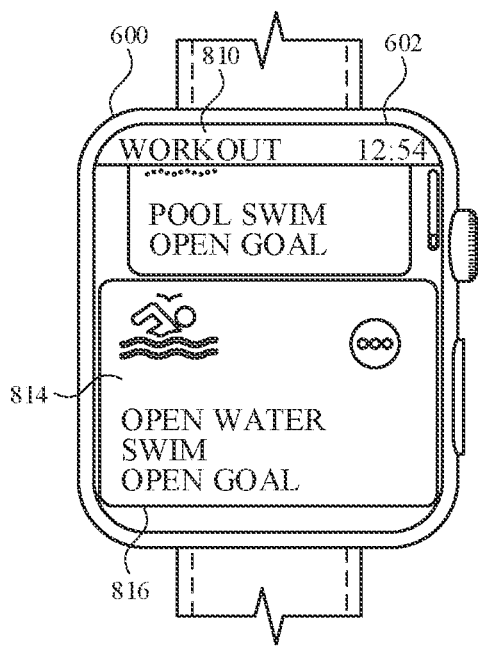
Figure 9A:
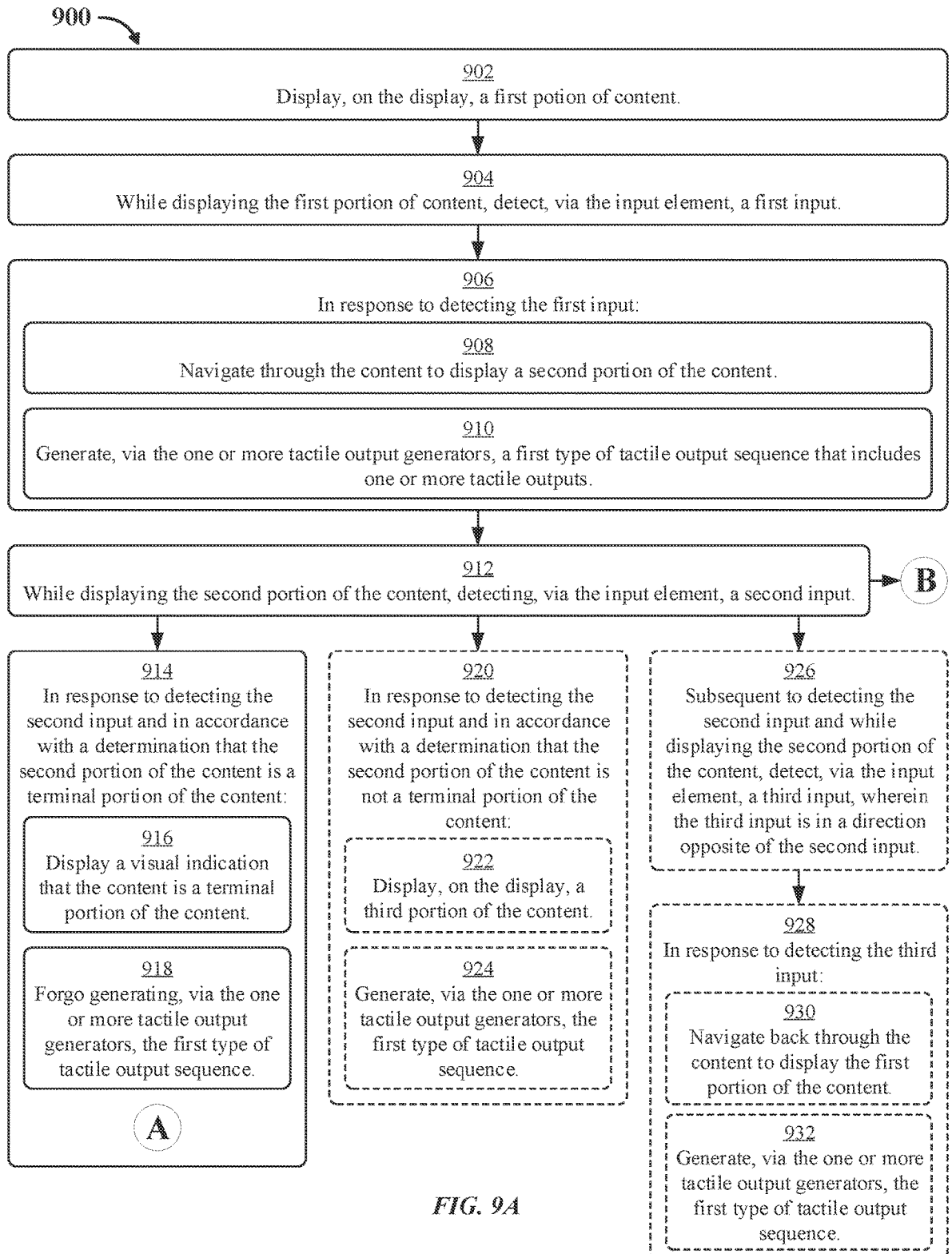
FIGS. 9A-9B are a flow diagram illustrating methods for managing user interfaces associated with end-of-content tactile outputs, in accordance with some embodiments.
Figure 9B:
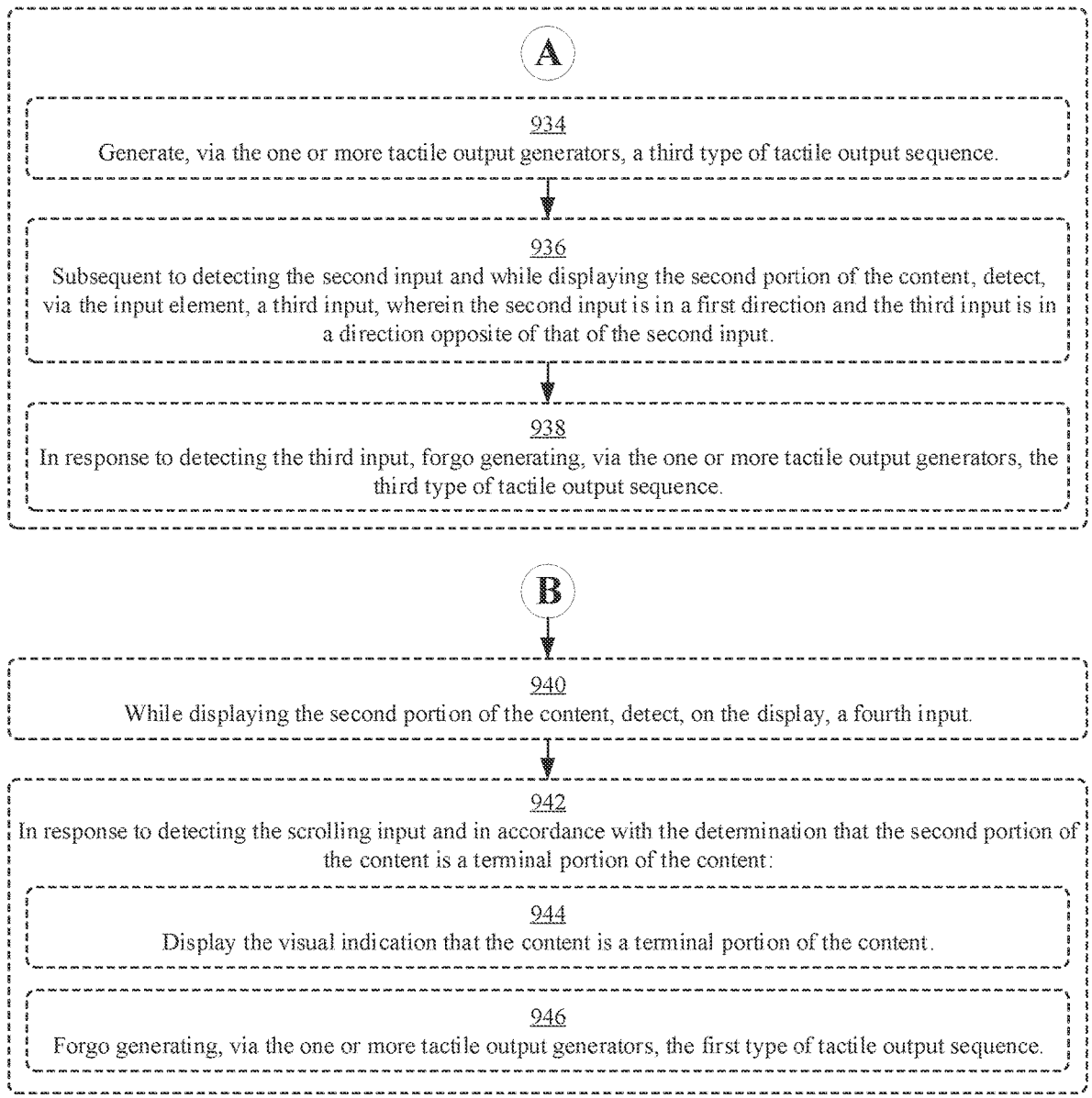

FIGS. 8R-8T illustrate the rubberbanding effect of platter 814 in response to a touch scrolling gesture 811 (e.g., on a touch-sensitive surface of display 602), as opposed to rotational input 809 on input element 604. Prior to the rubberbanding effect, contrary to scrolling in response a rotational input on input element 604 (e.g., rotational input 809), electronic device 600 does not generate a tactile output (e.g., does not generate tactile output sequence 630) upon initially reaching an end of user interface 810 (e.g., platter 814 being fully moved onto the bottom of the display, as shown in FIG. 8N) in response to a touch scrolling gesture. Further, during the rubberbanding effect illustrated in FIGS. 8R-8T, electronic device 600 does not generate a tactile output (e.g., nor an audio output).

FIGS. 9A-9B are a flow diagram illustrating a method for managing user interfaces associated with end-of-content tactile outputs, in accordance with some embodiments. Method 900 is performed at a device (e.g., 100, 300, 500, 600) with a display, an input element (e.g., a rotatable input device that is rotatable relative to a housing of the device; a rotatable input device/mechanism that includes a fixed socket and a rotatable component (e.g., a crown) attached to or affixed to a shaft, where the rotatable component and shaft rotate together in the fixed socket; a rotatable input device/mechanism that includes a rotatable component (e.g., a crown) that rotates relative to a fixed component (e.g., a fixed shaft); a rotatable input device/mechanism that rotates, in response to a rotational input, on an axis such that the direction of the rotation is parallel to the display of the electronic device; a rotatable input device/mechanism that can detect rotational input (e.g., via a touch-detection mechanism) without the device itself being physically rotated; a rotatable and press-able input device; a rotatable crown), and one or more tactile output generators (e.g., located in the input element and/or located in the main housing of the electronic device). Some operations in method 900 are, optionally, combined, the orders of some operations are, optionally, changed, and some operations are, optionally, omitted.

As described below, method 900 provides an intuitive way for managing user interfaces associated with content-based tactile outputs. The method reduces the cognitive burden on a user for managing and navigating user interfaces, thereby creating a more efficient human-machine interface. For battery-operated computing devices, enabling a user to navigate user interfaces faster and more efficiently by providing content-based tactile outputs conserves power and increases the time between battery charges.

The electronic device (e.g., 600) displays (902), on the display (e.g., 602), a first portion (e.g., a non-terminal portion) of content (e.g., continuous content, such as continuous text of a messaging application (e.g., an email application or a chat application), discrete content, such as buttons, affordances, rows, platters, paragraphs).

While displaying the first portion of content (e.g., 804), the electronic device (e.g., 600) detects (904), via the input element (e.g., 604), a first input (e.g., 801, 803, a rotational input on the input element, a rotational input in a particular direction, such as a clockwise direction or a counter-clockwise direction). Detecting a rotational input via an input element (e.g., a rotatable input element) enhances usability and user efficiency of the device by enabling a user to quickly, easily, and intuitively navigate/scroll through displayed content. This is in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting (906) the first input (e.g., 801, 803), the electronic device (e.g., 600) navigates (908) through the content (e.g., 804) (e.g., scrolling through the content) to display a second portion of the content (e.g., a different portion of the content that was previously not displayed). In response to detecting (906) the first input (e.g., 801, 803), the electronic device generates (910), via the one or more tactile output generators, a first type of tactile output sequence (e.g., 620) that includes one or more tactile outputs (e.g., a textural tactile output sequence that is based on an input metric of the input).

While displaying the second portion of the content, the electronic device (e.g., 600) detects (912), via the input element (e.g., 604), a second input (e.g., a rotational input on the input element, a rotational input in a particular direction, such as a clockwise direction or a counter-clockwise direction).

In response to detecting (914) the second input and in accordance with a determination that the second portion of the content is a terminal portion (e.g., a beginning or end portion, a border portion, an edge portion) of the content, the electronic device (e.g., 600) displays (916) a visual indication (e.g., shifting animation, a bouncing animation (e.g., prior to a bounce-back animation), a rubberbanding-effect animation of the content) that the content (e.g., 804) is a terminal portion of the content. In some embodiments, the terminal portion of the content is a beginning portion (e.g., top portion, a top-edge portion) of the content or an end portion (e.g., a bottom portion, a bottom-edge portion) of the content. Displaying a visual indication that the content is a terminal portion of the content improves visual feedback by providing an intuitive visual effect that enables a user to quickly and easily recognize that an end of the content has been reached while the user interface can still be moved. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the visual indication (e.g., the rubberbanding effect) that the content is a terminal portion of the content includes displaying a visual effect that changes as the input (e.g., 803) continues such as displaying an area (e.g., a background) beyond the terminus of the visual content, displaying a graphical element that increases or decreases in size, opacity or brightness as the input continues to be detected after reaching at terminus of the content, or continuing to move the content on the display (e.g., 602) in a respective direction but decreasing the amount by which a unit of movement of the input moves the content in the respective direction as the input continues. Displaying a visual effect that changes as the input continues, such as displaying an area (e.g., a background) beyond the terminus of the visual content improves visual feedback by providing an intuitive visual effect that enables a user to quickly and easily recognize that an end of the content has been reached while the user interface can still be moved. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the visual indication that the content is a terminal portion of the content comprises shifting (e.g., moving the portion of content a particular distance in a particular direction on the display (e.g., 602), bouncing the portion of content off of its initial position on the display) the second portion of the content on the display. In some embodiments, after shifting the second portion of the content, the content is subsequently shifted back to its initial position on the display. Displaying a shifting of the content and then a subsequent bounce-back of the content improves visual feedback by providing an intuitive visual effect that enables a user to quickly and easily recognize that an end of the content has been reached while the user interface can still be moved. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, shifting the second portion of the content on the display (e.g., 602) comprises moving the second portion of the content at least partially off of an edge of the display. In some embodiments, after moving/shifting the second portion of the content at least partially off of an edge of the display, the second portion of the content is subsequently moved/shifted back onto the display, and the content is returned to its initial position.

In some embodiments, a visual characteristic (e.g., a rate of movement of a shifting indication, a color, a brightness, a frequency of a recurring visual effect) of the visual indication that the content is a terminal portion of the content is based on an input metric (e.g., speed and/or magnitude) of the second input.

In response to detecting (914) the second input and in accordance with a determination that the second portion of the content is a terminal portion (e.g., a beginning or end portion, a border portion, an edge portion) of the content, the electronic device (e.g., 600) forgoes generating (918), via the one or more tactile output generators, the first type of tactile output sequence (e.g., 620) or, optionally, forgoing generating any tactile output. In some embodiments, a particular type of tactile output corresponds to a particular tactile output pattern. For example, as described in greater detail above with reference to FIGS. 5C-5H and in Table 1, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

In some embodiments, in response to detecting (914) the second input (e.g., 803, a rotational input on the input element (e.g., 604), a rotational input in a particular direction, such as the clockwise direction or a counter-clockwise direction) and in accordance with the determination that the second portion of the content is a terminal portion (e.g., a beginning or end portion, a border portion, an edge portion) of the content, the electronic device (e.g., 600) generates (934), via the one or more tactile output generators, a third type of tactile output sequence (e.g., different from the first type of tactile output sequence, a reduced-amplitude version first type of tactile output sequence). Generating the tactile output sequence upon first reaching an end of the content improves sensory feedback and user efficiency by enabling the user to quickly and easily recognize, while providing a rotational input on an input element, that the end of the content has been reached. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to detecting the second input (e.g., 803) and while displaying the second portion of the content, the electronic device (e.g., 600) detects (936), via the input element, a third input (e.g., a rotational input on the input element), where the second input (e.g., a rotational input) is in a first direction (e.g., a clockwise direction or a counter-clockwise direction) and the third input is in a direction opposite of that of the second input. In some embodiments, in response to detecting the third input, the electronic device forgoes generating (938), via the one or more tactile output generators, the third type of tactile output sequence (e.g., 630, and instead generating, via the one or more tactile output generators, the first type of tactile output sequence). Forgoing generating the tactile output upon reaching the end of the content a second time (e.g., after a bounce-back from a rubberbanding effect) improves the operability and user convenience of the device by forgoing generating unnecessary feedback, which in turn makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the third type of tactile output sequence (e.g., 630) corresponds to (e.g., has the same types/pattern of tactile outputs as) the first type of tactile output sequence, the first type of tactile output sequence is associated with a first type of audio output sequence, and the third type of tactile output sequence is associated with a second type of audio output sequence different from (e.g., different in types and/or pattern) the first type of audio output sequence. In some embodiments, similar to a tactile output, a particular type of audio output corresponds to a particular type of audio output pattern. For example, an audio output pattern specifies characteristics of an audio output, such as the magnitude/amplitude/volume of the audio output, the shape of a sound waveform of the audio output, the frequency of the audio output, and/or the duration of the audio output. When audio outputs with different audio output patterns are generated by a device (e.g., via one or more tactile output generators that move a moveable mass to generate audio outputs, via one or more speakers), the audio outputs may invoke different audio-related sensations in a user holding or touching the device or proximate to the device.

In some embodiments, subsequent to detecting the second input (e.g., 803) and while displaying the second portion of the content, the electronic device (e.g., 600) detects (926), via the input element (e.g., 604), a third input (e.g., a third rotation of the input element), where the third input is in a direction opposite of the second input. In some embodiments, in response to detecting (928) the third input, the electronic device navigates back (930) (e.g., navigating in the opposite direction from the navigation caused by the first input) through the content to display the first portion of the content. In some embodiments, in response to detecting (928) the third input, the electronic device generates (932), via the one or more tactile output generators, the first type of tactile output sequence (e.g., a textural tactile output sequence that is based on an input metric of the input).

In some embodiments, while displaying the second portion of the content, the electronic device (e.g., 600) detects (940), on the display (e.g., 602, via a touch-sensitive surface of the display), a fourth input (e.g., a touch-based scrolling input on a touch-sensitive surface of the display and not on the input element). In some embodiments, in response to detecting (942) the scrolling input and in accordance with the determination that the second portion of the content is a terminal portion (e.g., a beginning or end portion, a border portion, an edge portion) of the content, the electronic device displays (944) the visual indication that the content is a terminal portion of the content. In some embodiments, in response to detecting (942) the scrolling input and in accordance with the determination that the second portion of the content is a terminal portion (e.g., a beginning or end portion, a border portion, an edge portion) of the content, the electronic device forgoes generating (946), via the one or more tactile output generators, the first type of tactile output sequence and, optionally, forgoing any tactile output/tactile output sequence associated with navigating through the content.

In some embodiments, in response to detecting (920) the second input (e.g., 803) and in accordance with a determination that the second portion of the content is not a terminal portion (e.g., a beginning or end portion, a border portion, an edge portion) of the content, the electronic device (e.g., 600) displays (922), on the display (e.g., 602), a third portion of the content (e.g., navigating through the content to display a portion of the content adjacent to/continuous with the second portion of the content). In some embodiments, in response to detecting (920) the second input and in accordance with a determination that the second portion of the content is not a terminal portion (e.g., a beginning or end portion, a border portion, an edge portion) of the content, the electronic device generates (924), via the one or more tactile output generators, the first type of tactile output sequence (e.g., a textural tactile output sequence that is based on an input metric of the input). Generating a different type of tactile output for navigating/scrolling through content and for reaching an end of the content improves feedback by enabling the user to quickly and easily recognize that whether the displayed content is being scrolled and can be further scrolled. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 900 (e.g., FIGS. 9A-9B) are also applicable in an analogous manner to the methods described above and below. For example, method 700 optionally includes one or more of the characteristics of the various methods described above with reference to method 900. For example, one or more tactile output sequences, as described in method 700 are provided while scrolling content in response to a rotational input on an input element and upon reaching the end of the content. For another example, method 1100 optionally includes one or more of the characteristics of the various methods described above with reference to method 900. For example, as in method 900, tactile outputs are generated in response to rotational input on an input element, but not in response to touch input on a display. For another example, method 1300 optionally includes one or more of the characteristics of the various methods described above with reference to method 900. For example, similar types of tactile output sequences can be generated in a time setting user interface, as described in method 1300, as when scrolling content and reaching an end of content, as described in method 900. For another example, method 1500 optionally includes one or more of the characteristics of the various methods described above with reference to method 900. For example, as described in method 1500, the magnitude/amplitude and/or rate of occurrence of tactile outputs can change based on changes in speed of a rotational input when scrolling content and reaching an end of content. For brevity, these details are not repeated below.

FIGS. 10A-10K illustrate exemplary user interfaces associated with moving a user interface in response to different types of input, in accordance with some embodiments. The user interfaces in these figures are used to illustrate the processes described below, including the processes in FIGS. 11A-11C.

FIGS. 10A-10E illustrate a user interface 1002 of a workout application (e.g., the workout application first described above with reference to FIGS. 6A-6E) being scrolled on display 602 by a rotational input 1001 on input element 604, where user interface 1002 includes a plurality of platters, including platter 1004.

Figure 10A:
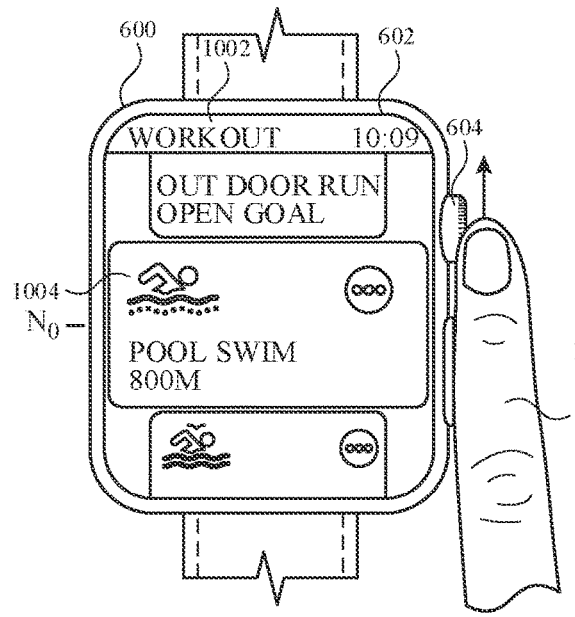
FIGS. 10A-10K illustrate example user interfaces associated with moving a user interface in response to different types of input, in accordance with some embodiments.
Figure 11A:
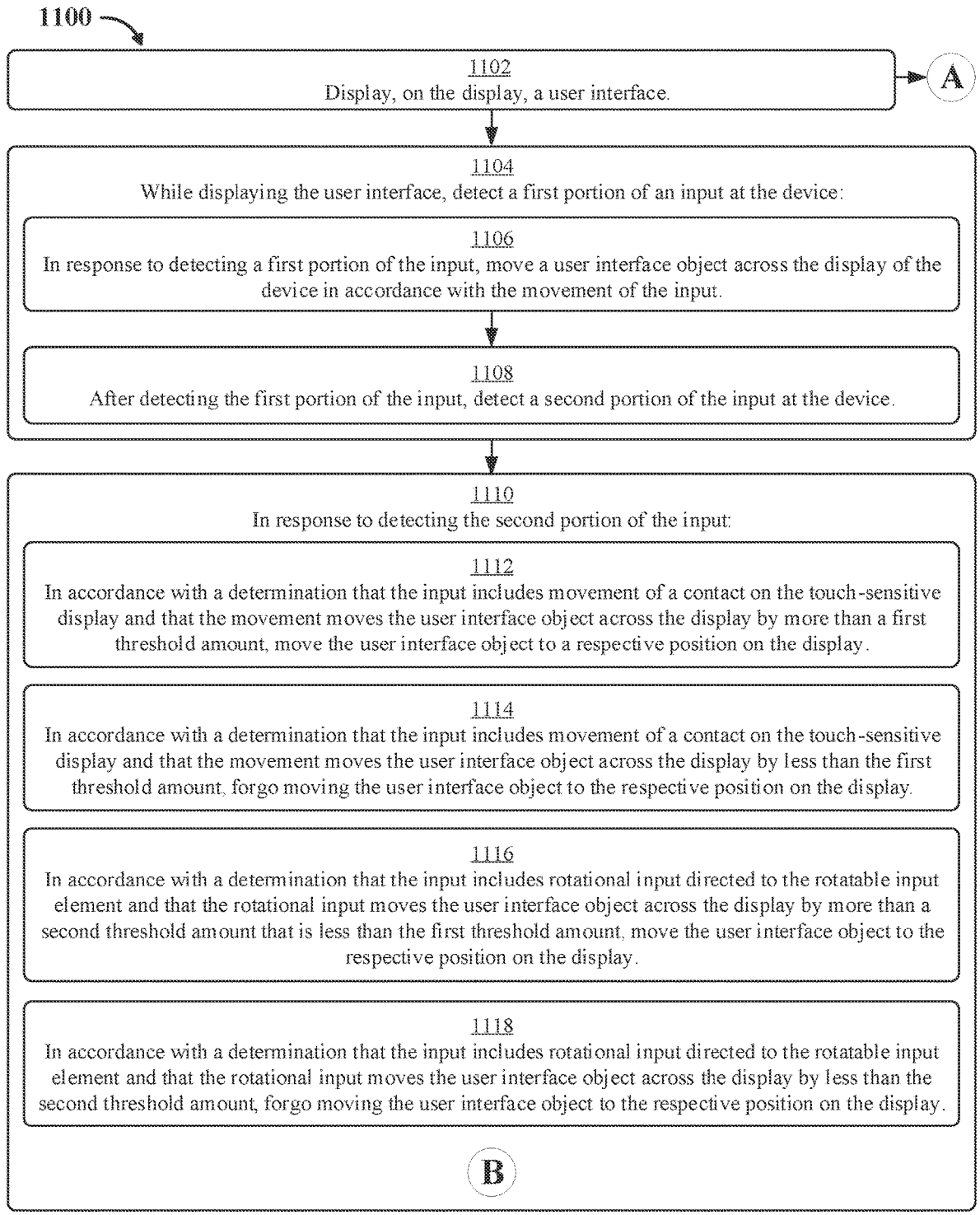
Figure 11B:
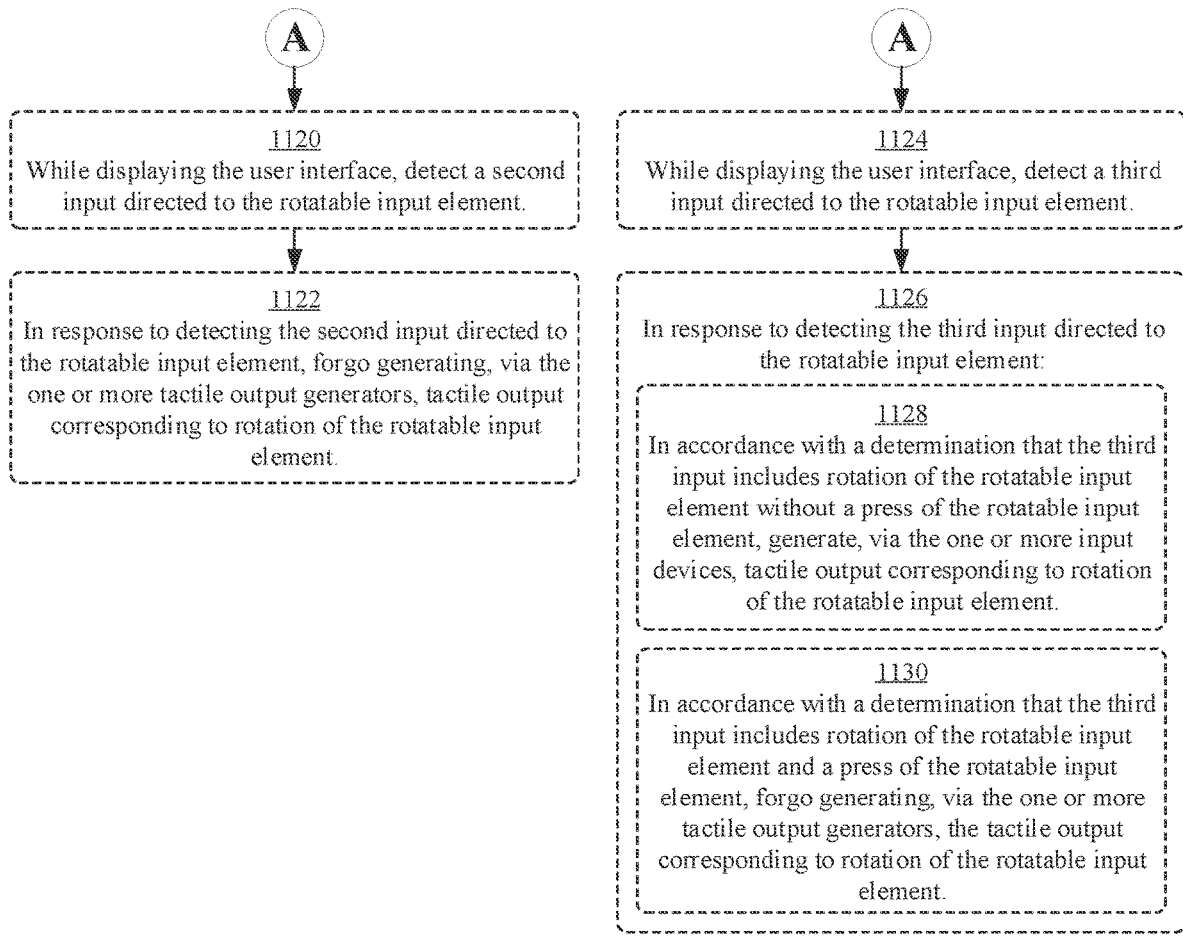

In FIG. 10A, platter 1004 is currently aligned to (e.g., "snapped" to) a focal point (e.g., a center point, a focal region, a center region) of display 602, as indicated by the N-number showing "No" in FIG. 10A. While platter 1004 is aligned to the focal point of the display, electronic device 600 detects, via input element 604, a rotational input 1001 (e.g., in a clockwise direction).

Figure 10B:
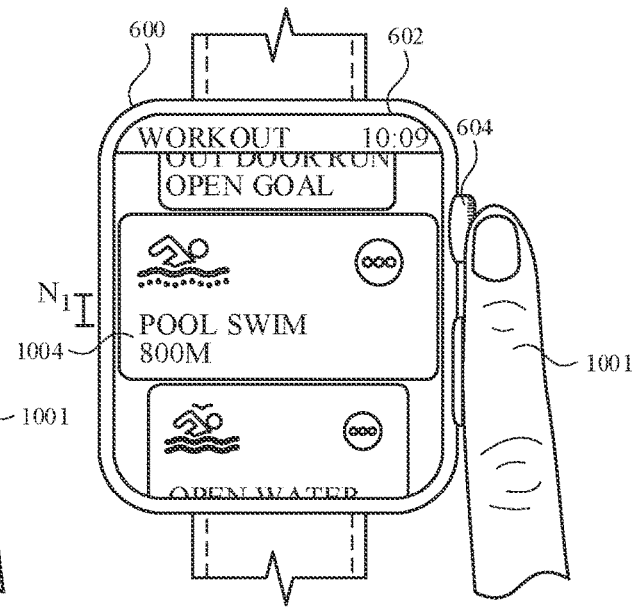

In FIG. 10B, in response to detecting rotational input 1001 on input element 604, and while rotational input 1001 is maintained on input element 604 (e.g., but input element 604 is not being further rotated), electronic device 600 moves platter 1004 upwards by a first linear distance over the focal point of the display, as indicated by the $N_1$ N-number in FIG. 10B.

Figure 10C:
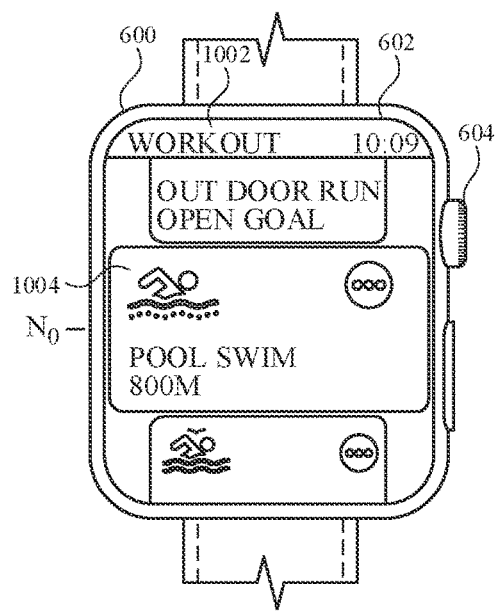

In FIG. 10C, rotational input 1001 is no longer maintained on input element 604. Upon detecting that rotational input 1001 is no longer maintained on input element 604, platter 1004 moves back (e.g., "snaps" back) to again align to the focal point of the display.

Figure 10D:
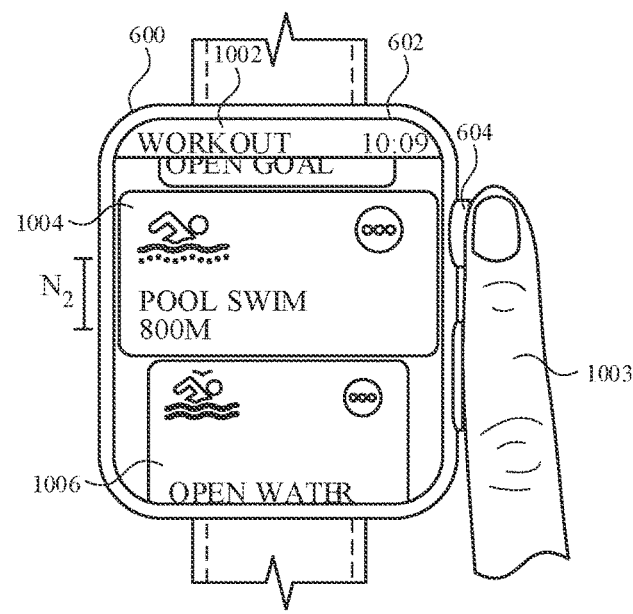

After moving back (e.g., "snapping" back) to the focal point of the display, electronic device 600 detects, via input element 604, a rotational input 1003. In FIG. 10D, in response to detecting rotational input 1003 on input element 604, and while rotational input 1003 is maintained on input element 604 (e.g., but input element 604 is not being further rotated), electronic device 600 moves platter 1004 upwards by a second linear distance, greater than the first linear distance, over the focal point of the display, as indicated by the $N_2$ N-number in FIG. 10D. Further, a platter 1006 (e.g., positioned below platter 1004) is also moved upwards by the second linear distance on the display.

Figure 10E:
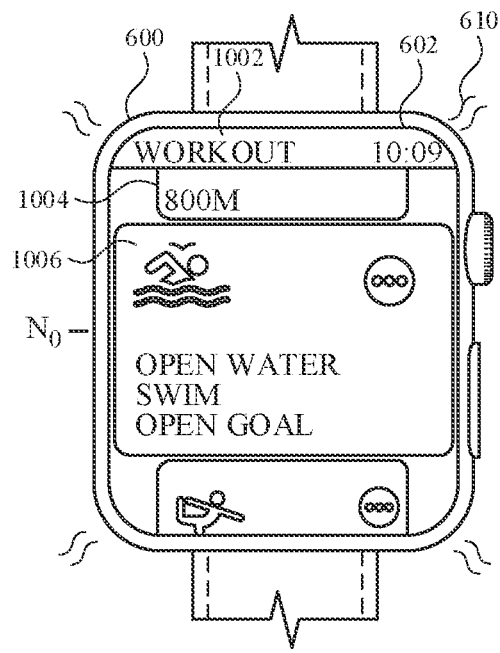

In FIG. 10E, rotational input 1003 is no longer maintained on input element 604. Upon detecting that rotational input 1003 is no longer maintained on input element 604, platter 1004 (e.g., partially) slides off of the top-edge of the display and platter 1006 now aligns to (e.g., "snaps" to) the focal point of the display, as indicated by the No N-number. Further, electronic device 600 generates, via the one or more tactile output generators, tactile output sequence 610 upon platter 1006 aligning to (e.g., "snapping" to) the focal point of the display. In some embodiments, in addition to generating tactile output sequence 610, electronic device 600 also generates (e.g., via the one or more tactile output generators that generate tactile output sequence 610) the audio output sequence associated with tactile output sequence 610.

FIGS. 10F-10K illustrate user interface 1002 of the workout application being scrolled on display 602 by a touch scrolling gesture (e.g., detected via a touch-sensitive surface of display 602).

Figure 10F:
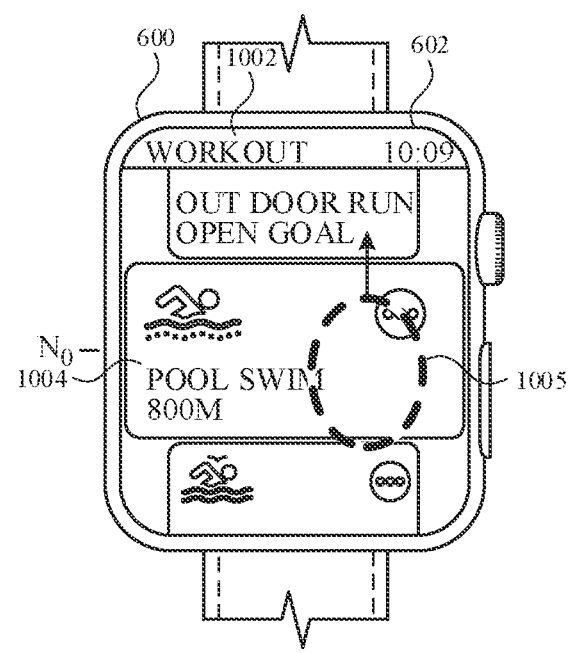

In FIG. 10F, platter 1004 is currently aligned to (e.g., "snapped" to) the focal point (e.g., a center point, a focal region, a center region) of display 602, as indicated by the No N-number. While platter 1004 is aligned to the focal point of the display, electronic device 600 detects (e.g., via a touch-sensitive surface of display 602) a touch scrolling gesture 1005 (e.g., in an upwards direction).

Figure 10G:
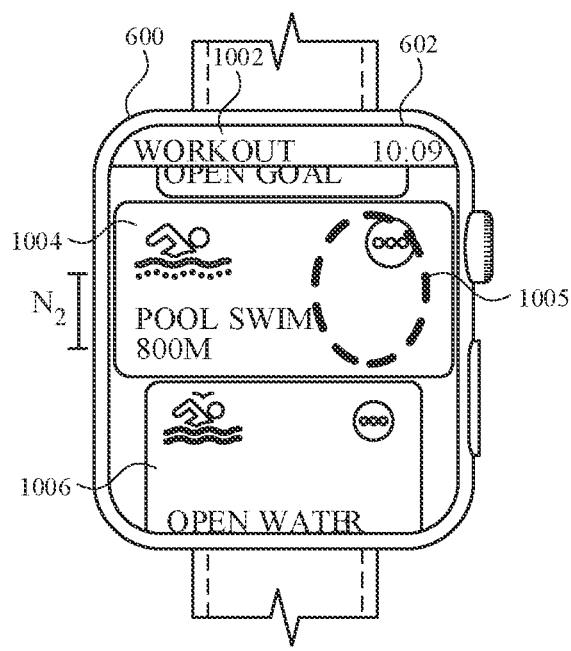

In FIG. 10G, in response to detecting touch scrolling gesture 1005, and while the touch gesture 1005 is maintained on display 602 (e.g., but is not being further moved), electronic device 600 moves platter 1004 upwards by the second linear distance over the focal point of the display, as indicated by the $N_2$ N-number in FIG. 10G, and the same linear distance that platter 1004 was moved in FIG. 10D.

Further, platter 1006 is also moved upwards by the second linear distance on the display.

Figure 10H:
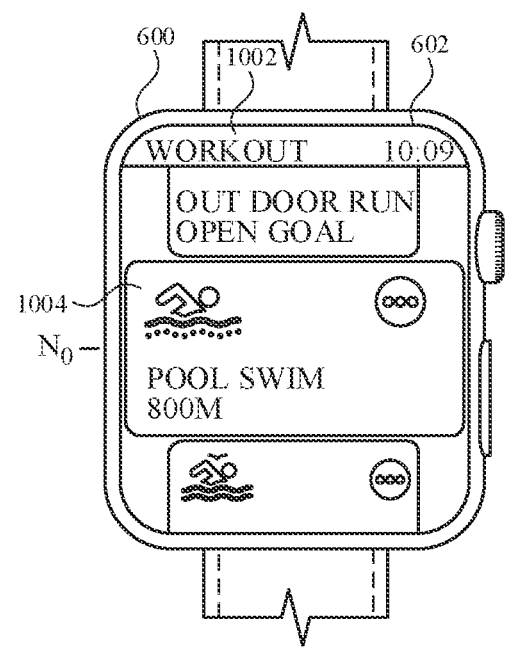

In FIG. 10H, touch scrolling gesture 1005 is no longer maintained on display 602. Upon detecting that touch scrolling gesture 1005 is no longer maintained, platter 1004 moves back (e.g., "snaps" back) to again align to the focal point of the display.

Figure 10I:
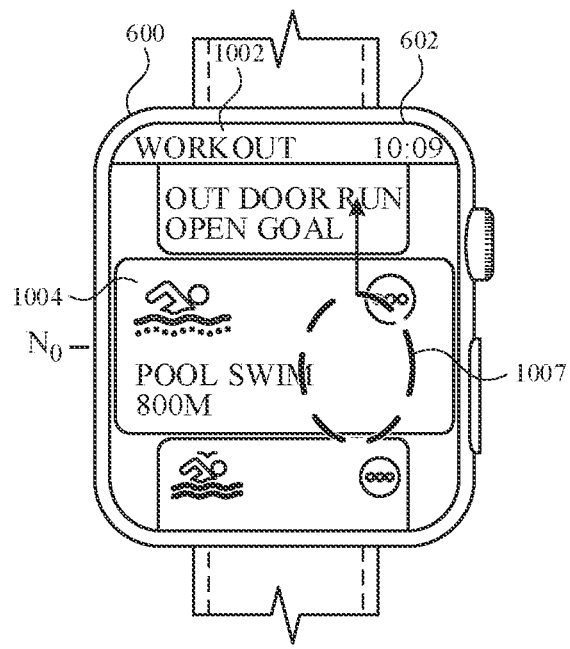

In FIG. 10I, after moving back (e.g., "snapping" back) to the focal point of the display, electronic device 600 detects (e.g., via a touch-sensitive surface of display 602) a touch scrolling gesture 1007 (e.g., in an upwards direction).

Figure 10J:
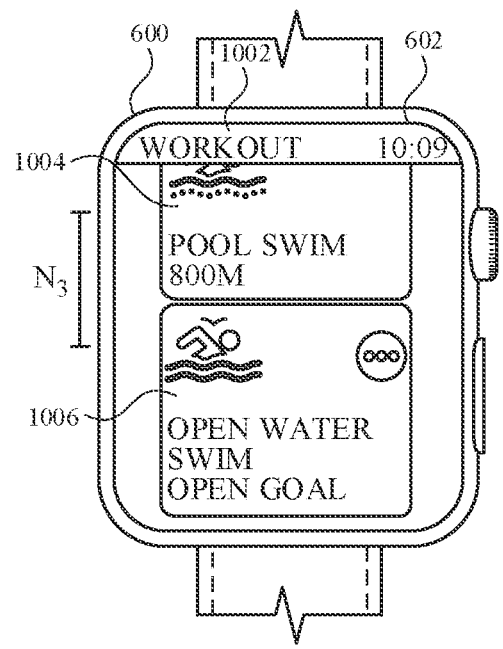

In FIG. 10J, in response to detecting touch scrolling gesture 1007 on display 602, and while touch scrolling gesture 1007 is maintained on display 602 (e.g., the touch scrolling gesture is not being further moved but is still detected on the display), electronic device 600 moves platter 1004 upwards by a third linear distance, greater than the second linear distance, over the focal point of the display, as indicated by the $N_3$ N-number in FIG. 10J. Further, platter 1006 is also moved upwards by the third linear distance on the display.

Figure 10K:
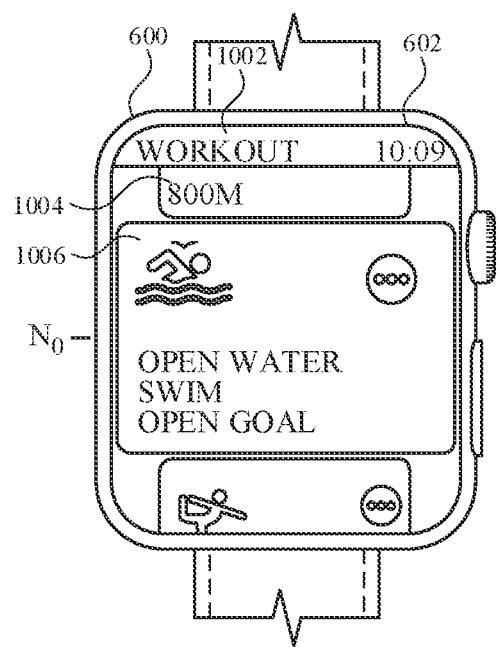

In FIG. 10K, touch scrolling gesture 1007 is no longer maintained on display 602. Upon detecting that touch scrolling gesture 1007 is no longer maintained, platter 1004 (e.g., partially) slides off of the top-edge of the display and platter 1006 now aligns to (e.g., "snaps" to) the focal point of the display, as indicated by the No N-number. Further, electronic device generates, via the one or more tactile output generators, tactile output sequence 610 upon platter 1006 aligning to (e.g., "snapping" to) the focal point of the display. In some embodiments, in addition to generating tactile output sequence 610, electronic device 600 also generates (e.g., via the one or more tactile output generators that generate tactile output sequence 610) the audio output sequence associated with tactile output sequence 610.

Thus, as shown by FIGS. 10A-10E, a first type of user interface item/element (e.g., a discrete user interface item/element, such as a platter) moved by the second linear distance via a rotational input on input element 604 causes the next user interface item/element to align to (e.g., "snap" to) the focal point of the display, whereas, as shown by FIGS. 10F-10K, the first type of user interface item/element moved by the second linear distance via a touch input on display 602 does not cause the next user interface item/element to align to the focal point of the display—instead, if a touch input on display 602 (e.g., as opposed to a rotational input on input element 604) is detected, the user interface item/element needs to be moved by at least the third linear distance, greater than the second linear distance, to cause the next user interface item/element to align to (e.g., "snap" to) the focal region of the display.

FIGS. 11A-11C are a flow diagram illustrating a method for moving a user interface in response to different types of input, in accordance with some embodiments. Method 1100 is performed at a device (e.g., 100, 300, 500, 600) with a touch-sensitive display and a rotatable input element (e.g., a rotatable input device that is rotatable relative to a housing of the device; a rotatable input device/mechanism that includes a fixed socket and a rotatable component (e.g., a crown) attached to or affixed to a shaft, where the rotatable component and shaft rotate together in the fixed socket; a rotatable input device/mechanism that includes a rotatable component (e.g., a crown) that rotates relative to a fixed component (e.g., a fixed shaft); a rotatable input device/mechanism that rotates, in response to a rotational input, on an axis such that the direction of the rotation is parallel to the display of the electronic device; a rotatable input device/mechanism that can detect rotational input (e.g., via a touch-detection mechanism) without the device itself being physically rotated; a rotatable and press-able input device; a rotatable crown). Some operations in method 1100 are, optionally, combined, the orders of some operations are, optionally, changed, and some operations are, optionally, omitted.

As described below, method 1100 provides an intuitive way for managing user interfaces associated with content-based tactile outputs. The method reduces the cognitive burden on a user for managing and navigating user interfaces, thereby creating a more efficient human-machine interface. For battery-operated computing devices, enabling a user to navigate user interfaces faster and more efficiently by providing content-based tactile outputs conserves power and increases the time between battery charges.

The electronic device (e.g., 600) displays (1102), on the display (e.g., 602), a user interface (e.g., 1002, a user interface that includes continuous content, such as continuous text of a messaging application, and/or discrete content, such as buttons, affordances, rows, platters, paragraphs).

While displaying the user interface (e.g., 1002), the electronic device (e.g., 600) detects (1104) a first portion of an input (e.g., 1001, 1005, a rotational input on the rotatable input element or a touch gesture on the touch-sensitive display) at the device. Detecting a rotational input via an input element (e.g., a rotatable input element) enhances usability and user efficiency of the device by enabling a user to quickly, easily, and intuitively navigate/scroll through displayed content. This is in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting a first portion of the input (e.g., 1001, 1005), the electronic device (e.g., 600) moves (1106) a user interface object (e.g., 1004, a unit of content of the user interface) across the display of the device in accordance with the movement of the input. Moving the user interface object across the display in accordance with the movement of the input provides visual feedback that the rotational input is controlling the movement of the user interface object. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

After detecting the first portion of the input, the electronic device (e.g., 600) detects (1108) a second portion of the input (e.g., 1003, 1007) at the device (e.g., an end of the input or movement of the user interface object beyond (e.g., 1004) a threshold amount, where the second portion of the input is a continuation of the first portion of the same input).

In response to detecting (1110) the second portion of the input (e.g., 1003, 1007, an end of the input or movement of the user interface object (e.g., 1004) beyond a threshold amount), in accordance with a determination that the input (e.g., 1007) includes movement of a contact on the touch-sensitive display (e.g., 602) and that the movement moves the user interface object across the display by more than a first threshold amount (e.g., before an end of the input is detected), the electronic device (e.g., 600) moves (1112) (e.g., by snapping) the user interface object to a respective (e.g., predefined) position on the display. In some embodiments, the movement of the user interface object to the respective position on the display occurs upon detecting an end of the input (e.g., liftoff of the contact). In some embodiments, the movement of the user interface object to the respective position on the display occurs upon detecting movement of the user interface object by more than the first threshold amount without regard to whether or not the input has ended. In some embodiments, moving the user interface object to the respective (e.g., predefined) position on the display comprises "snapping" the user interface object to the respective position on the display, where "snapping" the user interface object comprises moving and aligning the object to the next alignment point (e.g., the respective position) on the display.

In response to detecting (1110) the second portion of the input (e.g., 1003, 1007, an end of the input or movement of the user interface object (e.g., 1004) beyond a threshold amount), in accordance with a determination that the input (e.g., 1007) includes movement of a contact on the touch-sensitive display (e.g., 602) and that the movement moves the user interface object across the display by less than the first threshold amount (e.g., before an end of the input is detected), the electronic device (e.g., 600) forgoes moving (1114) the user interface object to the respective (e.g., predefined) position on the display. Forgoing moving the user interface object to the respective position on the display in response to an input provides visual feedback that the input is insufficient to move the user interface object to the respective position. Further, it helps to prevent a user from accidentally moving the user interface object to the respective position on the display against the user's intention. Providing improved visual feedback and additional control options and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting (1110) the second portion of the input (e.g., 1003, 1007, an end of the input or movement of the user interface object (e.g., 1004) beyond a threshold amount), in accordance with a determination that the input (e.g., 1003) includes rotational input directed to the rotatable input element (e.g., 604) and that the rotational input moves the user interface object across the display by more than a second threshold amount that is less than the first threshold amount (e.g., before an end of the input is detected), the electronic device (e.g., 600) moves (1116) (e.g., by snapping) the user interface object to the respective (e.g., predefined) position on the display (e.g., the object snaps into the respective position on the display even if it moves by less than the first threshold amount so long as it moves by more than the second threshold amount). In some embodiments, the movement of the user interface object to the respective position on the display occurs upon detecting an end of the input (e.g., an end of a touch on the rotatable input element or ceasing to detect rotation of the rotatable input element for at least a threshold amount of time). In some embodiments, the movement of the user interface object to the respective position on the display occurs upon detecting movement of the user interface object by more than the first threshold amount without regard to whether or not the input has ended.

In response to detecting (1110) the second portion of the input (e.g., 1003, 1007, an end of the input or movement of the user interface object (e.g., 1004) beyond a threshold amount), in accordance with a determination that the input (e.g., 1003) includes rotational input directed to the rotatable input element (e.g., 604) and that the rotational input moves the user interface object across the display by less than the second threshold amount (e.g., before an end of the input is detected), the electronic device (e.g., 600) forgoes moving (1118) the user interface object to the respective (e.g., predefined) position on the display. In some embodiments, the second portion of the input includes one or more of: liftoff of the contact from the touch-sensitive display or ceasing to detect a touch on the rotatable input element or ceasing to detect rotation of the rotatable input element for more than a threshold amount of time, or detecting rotation of the rotatable input element that moves the user interface object across the display by more than the second threshold amount.

In some embodiments, in response to detecting (1110) the second portion of the input (e.g., 1003, 1007, an end of the input or movement of the user interface object (e.g., 1004) beyond a threshold amount), in accordance with a determination that the input (e.g., 1007) includes movement of a contact on the touch-sensitive display (e.g., 602) and that the movement moves the user interface object across the display by less than the first threshold amount, the electronic device (e.g., 600) moves (1132) (e.g., by snapping) the user interface object back in the opposite direction (e.g., snapping the user interface object back to the previous location of the user interface object before the input started).

In some embodiments, in response to detecting (1110) the second portion of the input (e.g., 1003, 1007, an end of the input or movement of the user interface object (e.g., 1004) beyond a threshold amount), in accordance with a determination that the input (e.g., 1003) includes rotational input directed to the rotatable input element (e.g., 604) and that the rotational input moves the user interface object across the display by less than the second threshold amount, the electronic device (e.g., 600) moves (1134) (e.g., by snapping) the user interface object back in the opposite direction (e.g., snapping the user interface object back to the previous location of the user interface object before the input started). Setting a higher threshold for moving the user interface object to the respective position on the display for one type of input (e.g., a touch input) over a different type of input (e.g., a rotational input on the input element) helps to prevent a user from accidentally moving the user interface object to the respective position on the display against the user's intention when one type of input (e.g., a touch input) is more prone to accidental inputs than the different type of input (e.g., the rotational input). Providing additional control options and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 600) includes a (e.g., single) tactile output generator (e.g., wherein the tactile output generator is located in and is connected to (e.g., and configured to generate tactile outputs to) the rotatable input element (e.g., 604) and a housing of the electronic device).

In some embodiments, the electronic device (e.g., 600) includes one or more tactile output generators that generate localized tactile outputs directed to the rotatable input element (e.g., 604) and one or more separate tactile output generators that generate tactile outputs for the electronic device that are not specifically directed to the rotatable input element (e.g., and instead is located in and is connected to (e.g., and configured to generate tactile outputs to) a main housing of the electronic device or generate tactile outputs that are localized to a different component of the electronic device). In some embodiments, the tactile output generator located in or near the rotatable input element, and is configured to generate tactile outputs that move the rotatable input element relative to the housing (e.g., by moving the shaft of the rotatable input element).

In some embodiments, the one or more tactile output generators are configured to (e.g., in addition to generating tactile outputs) generate audio outputs (e.g., wherein the audio outputs correspond to and/or are associated with tactile outputs generated by the one or more tactile output generators and are generated in a coordinated manner with the tactile outputs to generate combined audio/tactile outputs).

In some embodiments, in response to detecting (1110) the second portion of the input (e.g., an end of the input or movement of the user interface object beyond a threshold amount), in accordance with the determination that the input (e.g., 1003) includes rotational input directed to the rotatable input element (e.g., 604) and that the rotational input meets criteria for moving (e.g., snapping) the user interface object (e.g., 1004) to the respective (e.g., predefined) position on the display, the electronic device (e.g., 600) moves (1136) the user interface object to the respective position on the display in conjunction with generating (e.g., via the one or more tactile output generators) a tactile output (e.g., a sequence of tactile outputs) corresponding to the movement of the user interface object. In some embodiments, if the displayed content is a first type of content (e.g., continuous content, such as continuous text), the tactile output includes a first type of tactile output sequence (e.g., a textural tactile output sequence) that includes one or more tactile outputs determined based on an input metric (e.g., a speed and/or magnitude) of the input. In some embodiments, if the displayed content is a second type of content (e.g., discrete content, such as buttons, affordances, rows, platters, paragraphs), the tactile output includes a second type of tactile output sequence (e.g., a content-driven tactile output sequence) that includes one or more tactile outputs determined based on movement of predefined units of content in the user interface. In some embodiments, in response to detecting (1110) the second portion of the input, in accordance with the determination that the input includes movement of a contact on the touch-sensitive display that meets criteria for moving (e.g., snapping) the user interface object to the respective (e.g., predefined) position on the display, the electronic device moves (1138) the user interface object to the respective position on the display without generating (e.g., via the one or more tactile output generators) the tactile output. Generating the tactile output for one type of input (e.g., a rotational input on the input element) but not for another type of input (e.g., a touch input) enables the device to conserve battery power and thus improve battery life by providing sensory feedback for (e.g., only for) types of input that will have a greater benefit to user experience and convenience if the sensory feedback were provided.

In some embodiments, an amplitude of the tactile output is based on (e.g., corresponds to) a size of the user interface object (e.g., 1004). In some embodiments, the amplitudes of the one or more tactile outputs are larger if the user interface object is a relatively larger object and are smaller if the user interface object is a relatively smaller object.

In some embodiments, the tactile output (e.g., a sequence of tactile outputs) corresponding to the movement (e.g., snapping) of the user interface object (e.g., 1004) to the respective (e.g., predefined) position on the display (e.g., 602) comprise a tactile output sequence having a first predetermined frequency range (e.g., 180-200 Hz) that is different from a second predetermined frequency range (e.g., around 100 Hz) corresponding to a tactile output sequence associated with displaying a notification (e.g., for an alert, for an incoming electronic communication) on the display. Thus, from the perspective of a user of the electronic device (e.g., 600), the sensory sensation experienced from tactile output sequence having the first predetermined frequency (e.g., 180-200 Hz) and from the tactile output sequence having the second predetermined frequency (e.g., around 100 Hz) are distinguishable.

In some embodiments, while displaying the user interface (e.g., 1002), the electronic device (e.g., 600) detects (1120) a second input (e.g., a press input, a press-and-hold input, an input applied with a downward pressing force, a non-rotational input, a non-rotational touch input, a tap input) directed to the rotatable input element (e.g., 604). In some embodiments, in response to detecting the second input directed to the rotatable input element, the electronic device forgoes (e.g., suppresses) generating (1122), via the one or more tactile output generators, tactile output corresponding to rotation of the rotatable input element (e.g., even when the second input includes both a press of the rotatable input element and rotational input directed to the rotatable input element). Thus, in some embodiments, certain types of inputs on the rotatable input element (e.g., a rotatable input that causes a modification of the user interface) causes the electronic device to generate (e.g., via a tactile output generator) tactile outputs, whereas certain types of inputs on the rotatable input element (e.g., a press input, a press-and-hold input, or a touch input) does not cause the electronic device to generate (e.g., via a tactile output generator) tactile outputs.

In some embodiments, while displaying the user interface (e.g., 1002), the electronic device (e.g., 600) detects (1124) a third input directed to the rotatable input element (e.g., 604). In some embodiments, in response to detecting (1126) the third input directed to the rotatable input element, in accordance with a determination that the third input includes rotation of the rotatable input element without a press of the rotatable input element, the electronic device generates (1128), via the one or more input devices, tactile output corresponding to rotation of the rotatable input element. In some embodiments, in response to detecting (1134) the third input directed to the rotatable input element, in accordance with a determination that the third input includes rotation of the rotatable input element and a press of the rotatable input element, the electronic device forgoes generating (1130), via the one or more tactile output generators, the tactile output corresponding to rotation of the rotatable input element.

Note that details of the processes described above with respect to method 1100 (e.g., FIG. 11A-11C) are also applicable in an analogous manner to the methods described above and below. For example, method 700 optionally includes one or more of the characteristics of the various methods described above with reference to method 1100. For example, a tactile output sequence, as described in method 700, is generated when a user interface object aligns to a focal point. For another example, method 900 optionally includes one or more of the characteristics of the various methods described above with reference to method 1100. For example, a rubberbanding effect, as described in method 900, can be provided when reaching the end of a user interface via a rotational input on an input element. For another example, method 1300 optionally includes one or more of the characteristics of the various methods described above with reference to method 1100. For example, the tactile output sequence generated upon an alignment, as described in method 1300, can also be generated upon an alignment of a user interface object to a focal point. For another example, method 1500 optionally includes one or more of the characteristics of the various methods described above with reference to method 1100. For example, dynamic tactile outputs, as described in method 1500, can be provided when scrolling user interface objects via a rotational input on an input element. For brevity, these details are not repeated below.

FIGS. 12A-12L illustrate exemplary user interfaces f associated with adjustable item-based tactile outputs, in accordance with some embodiments. The user interfaces in these figures are used to illustrate the processes described below, including the processes in FIGS. 13A-13B.

Figure 12A:
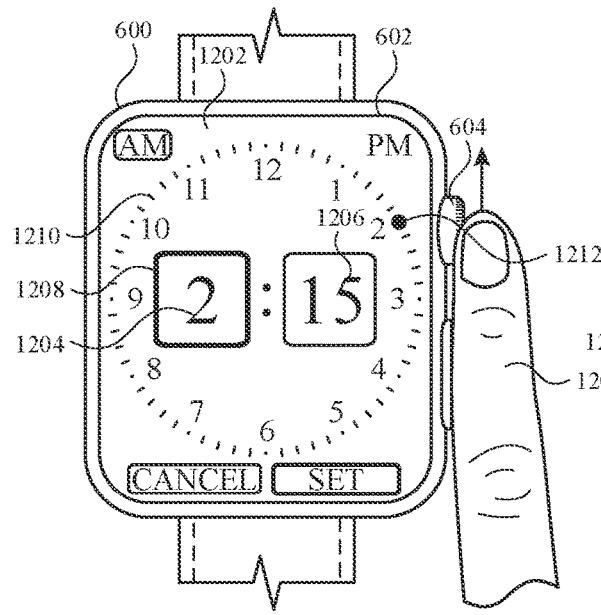
Figure 13A:
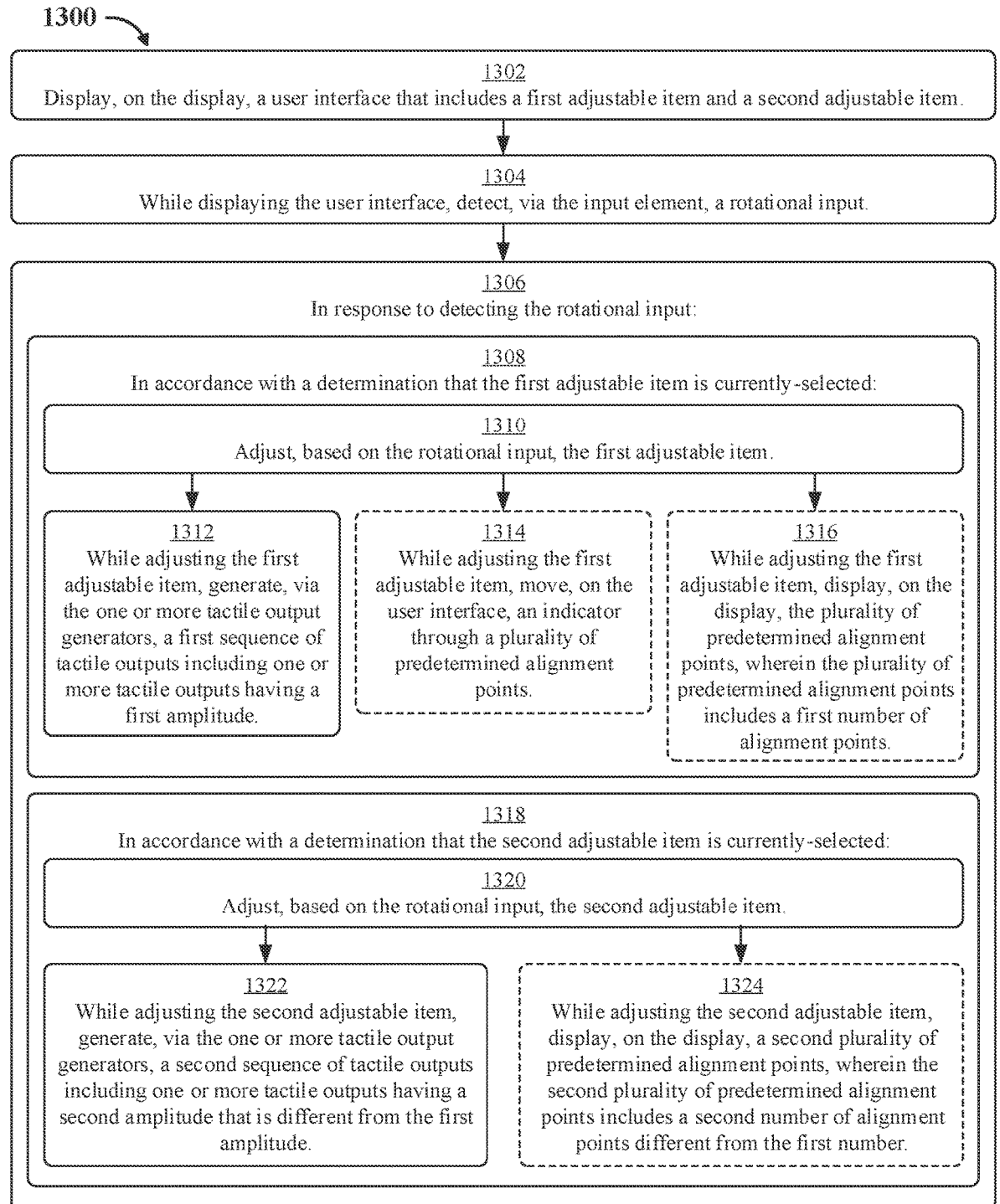
FIGS. 13A-13B are a flow diagram illustrating methods for managing user interfaces associated with adjustable item-based tactile outputs, in accordance with some embodiments.
Figure 13B:
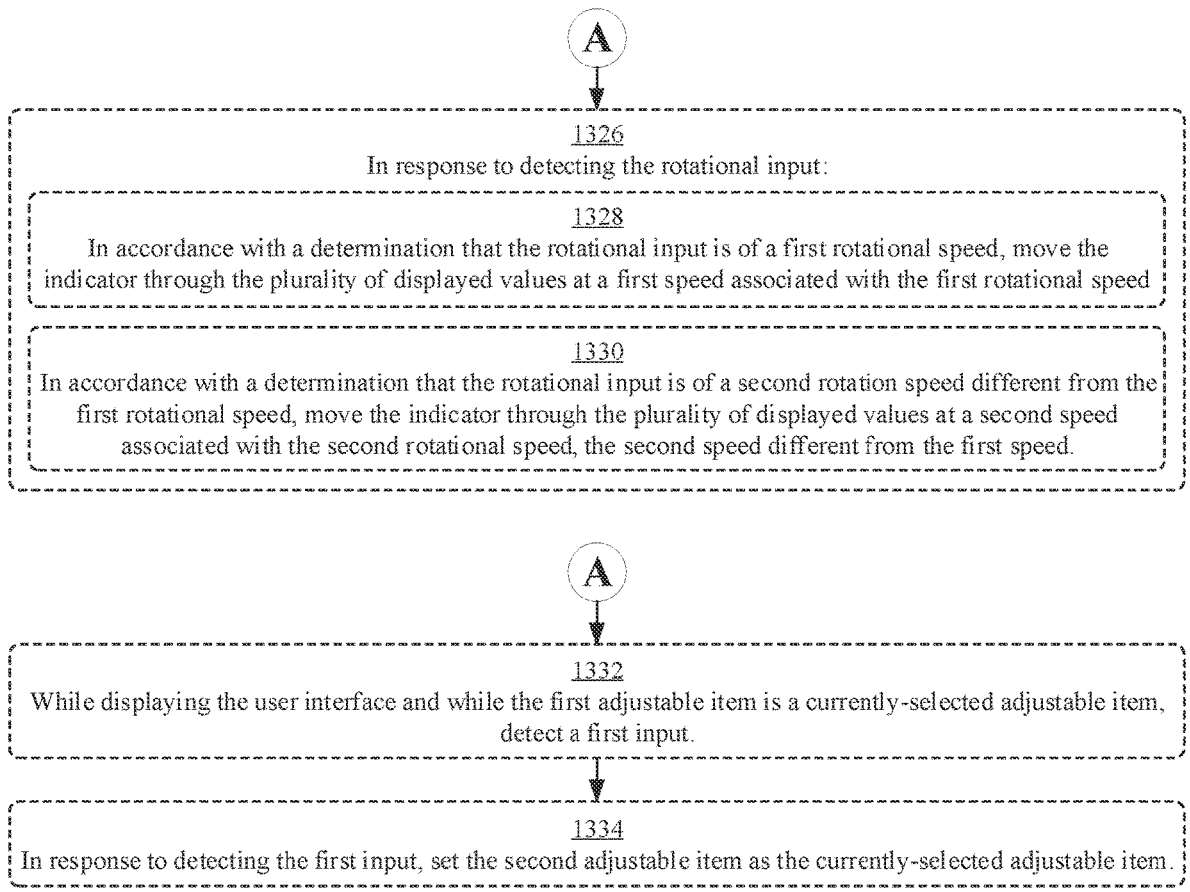

FIG. 12A illustrates electronic device 600 displaying, on display 602, a time setting user interface 1202 (e.g., for setting the current time, for setting a timer, for setting an alarm). Time setting user interface 1202 includes an hour setting 1204 and a minute setting 1206. Time setting interface 1202 also includes a current unit indicator 1208 indicating the currently-selected unit (e.g., hour or minute) to be adjusted. In FIG. 12A, the currently-selected unit is hour, as indicated by indicator 1208 (e.g., by highlighting hour setting 1204). Time setting user interface 1202 also includes a plurality of selectable options 1210 used to select a new setting for the currently-selected unit (e.g., a new hour setting or a new minute setting). In FIG. 12A, the currently-selected unit is hour, and thus selectable options 1210 show the selectable hour units (e.g., as tickmarks and/or as numerical values between 1 and 12), where each selectable unit corresponds to an alignment point. Time setting user interface 1202 also includes a current selection indicator 1212 (e.g., a circular object or a rectangular object) that moves along selectable options 1210 to indicate the currently-selected new unit value and, while moving along selectable options 1210, aligns to (e.g., "snaps" to) each alignment point. In FIG. 12A, current selection indicator 1212 is at a position on selectable options 1210 corresponding to the hour 2.

In FIG. 12A, while displaying time setting user interface 1202 with hour as the currently-selected unit, electronic device 600 detects, via input element 604, a rotational input 1201 (e.g., in a clockwise direction).

Figure 12B:
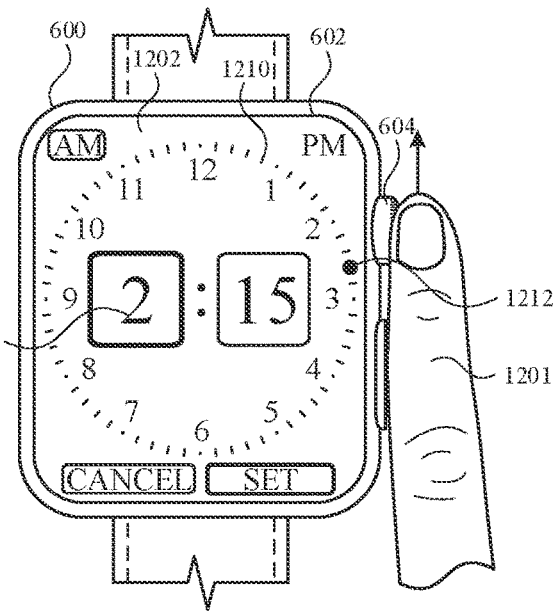

In FIG. 12B, in response to detecting rotational input 1201 on input element 604, electronic device 600 moves/navigates current selection indicator 1212 from its previous alignment point (e.g., the 2 hour value) in selectable options 1210 in a clockwise direction towards a next alignment point in selectable options 1210 (e.g., the 3 hour value). In some embodiments, while current selection indicator 1212 is moving between alignment points in selectable options 1210, electronic device 600 does not generate a tactile output (e.g., nor an audio output).

Figure 12C:
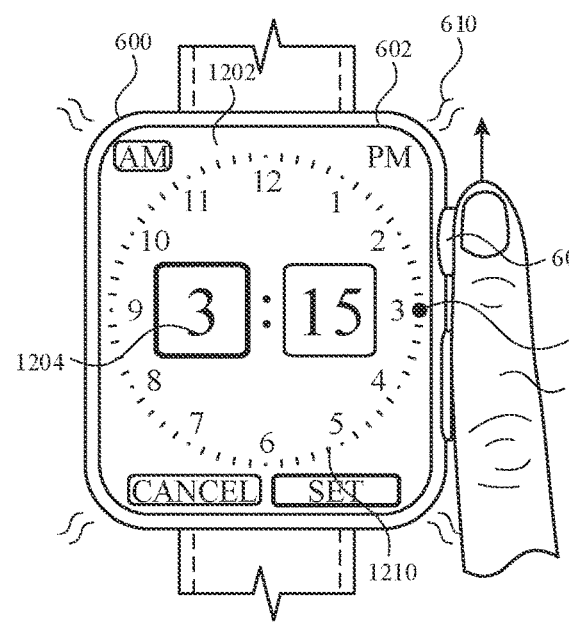

In FIG. 12C, as electronic device 600 continues detecting rotational input 1201 on input element 604, current selection indicator 1212 is moved and aligns to (e.g., "snaps" to) a next alignment point in selectable options 1210 (e.g., the 3 hour value). Upon aligning to (e.g., "snapping" to) the next alignment point, electronic device 600 generates, via the one or more tactile output generators, tactile output sequence 610 and, in some embodiments, the audio output sequence associated with tactile output sequence 610. Electronic device 600 also updates hour setting 1204 to reflect the currently-selected hour value (e.g., 3).

Figure 12D:
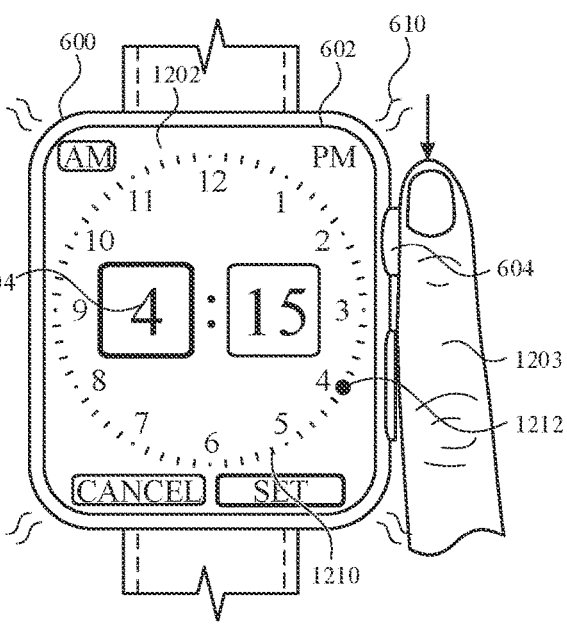

In FIG. 12D, in response to continuing to detect rotational input 1201 on input element 604, current selection indicator 1212 is moved and aligns to (e.g., "snaps" to) a next alignment point in selectable options 1210 (e.g., the 4 hour value). Upon aligning to (e.g., "snapping" to) the next alignment point, electronic device 600 generates, via the one or more tactile output generators, tactile output sequence 610 and, in some embodiments, the audio output sequence associated with tactile output sequence 610. Electronic device 600 also updates hour setting 1204 to reflect the currently-selected hour value (e.g., 4).

In FIG. 12D, after hour setting 1204 is set to the new hour value (e.g., 4), electronic device 600 detects, via input element 604, a rotational input 1203 (e.g., in a counter-clockwise direction).

In FIG. 12E, in response to detecting rotational input 1203 on input element 604, electronic device 600 moves/navigates current selection indicator 1212 from its previous alignment point (e.g., the 4 hour value) in selectable options 1210 in a counter-clockwise direction towards a previous alignment point in selectable options 1210 (e.g., the 3 hour value). Upon aligning to (e.g., "snapping" to) the previous alignment point, electronic device 600 generates, via the one or more tactile output generators, tactile output sequence 610 and, in some embodiments, the audio output sequence associated with tactile output sequence 610. Electronic device 600 also updates hour setting 1204 to reflect the currently-selected hour value (e.g., 3).

In FIG. 12F, while displaying time user interface 1202 with hour set as the currently-selected unit, electronic device 600 detects (e.g., via a touch-sensitive surface of display 602) an input 1205 (e.g., a tap gesture) on minute setting 1206.

In FIG. 12G, in response to detecting input 1205 on minute setting 1206, electronic device 600 moves current unit indicator 1208 from hour setting 1204 to minute setting 1206. Further, electronic device 600 updates selectable options 1210 to show the selectable minute units (e.g., as tickmarks and/or as numerical values that are between 0 and 59), where each selectable unit corresponds to an alignment point. Further, current selection indicator 1212 indicates the currently-set minute value (e.g., 15).

In FIG. 12G, while displaying time user interface 1202 with minute set as the currently-selected unit, electronic device 600 detects, via input element 604, a rotational input 1207 (e.g., in a counter-clockwise direction).

In FIG. 12H, in response to detecting rotational input 1207 on input element 604, electronic device 600 moves/navigates current selection indicator 1212 from its previous alignment point (e.g., the 15 minute value) in selectable options 1210 in a counter-clockwise direction towards a previous alignment point in selectable options 1210 (e.g., the 14 minute value). In some embodiments, upon aligning to (e.g., "snapping" to) the previous alignment point, electronic device 600 generates, via the one or more tactile output generators, a tactile output sequence 1220 (e.g., a "majored-reduced" tactile output sequence, as described in Table 1/a modified version of tactile output sequence 610) and, in some embodiments, the audio output sequence associated with tactile output sequence 1220. Alternatively, in some embodiments, electronic device 600 generates the first type of tactile output sequence and the audio output sequence associated with tactile output sequence 610. Electronic device 600 also updates minute setting 1206 to reflect the currently-selected minute value (e.g., 14).

Figures 12I, 12J:
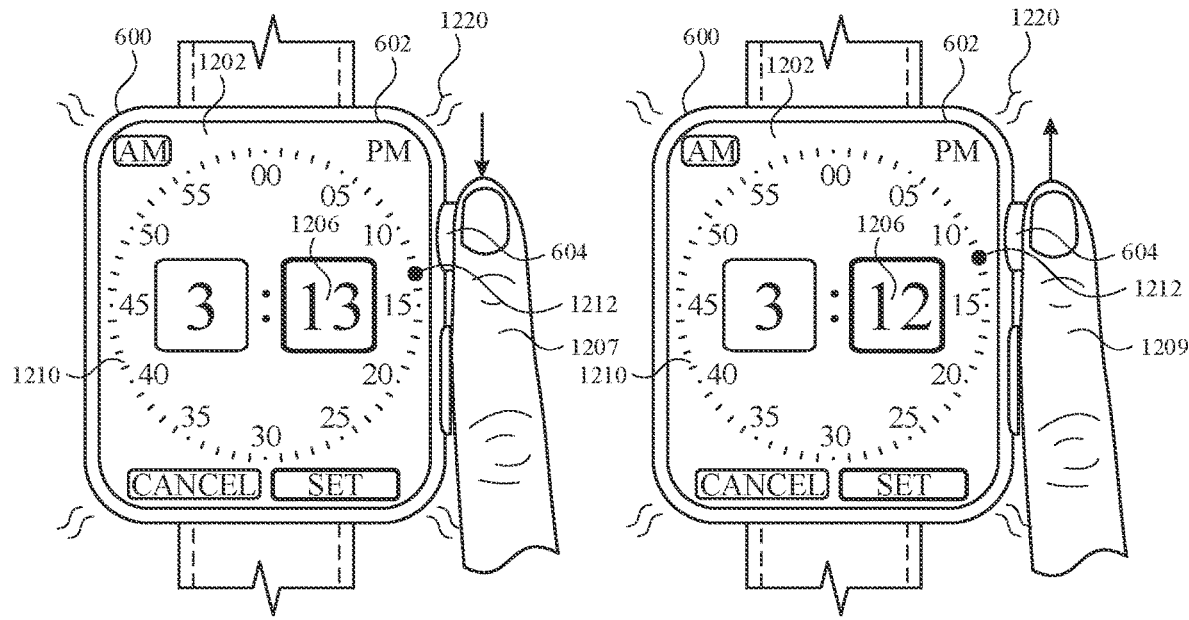

In FIG. 12I, as electronic device 600 continues detecting rotational input 1207 on input element 604, current selection indicator 1212 is moved and aligns to (e.g., "snaps" to) a previous alignment point in selectable options 1210 (e.g., the 13 minute value). Upon aligning to (e.g., "snapping" to) the previous alignment point, electronic device 600 generates, via the one or more tactile output generators, tactile output sequence 1220 and, in some embodiments, the audio output sequence associated with tactile output sequence 1220. Electronic device 600 also updates minute setting 1206 to reflect the currently-selected hour value (e.g., 13).

In FIG. 12J, in response to detecting rotational input 1207 on input element 604, electronic device 600 moves and aligns (e.g., "snaps") current selection indicator 1212 to a previous alignment point in selectable options 1210 (e.g., the 12 minute value). Upon aligning to (e.g., "snapping" to) the previous alignment point, electronic device 600 generates, via the one or more tactile output generators, tactile output sequence 1220 and, in some embodiments, the audio output sequence associated with tactile output sequence 1220. Electronic device 600 also updates minute setting 1206 to reflect the currently-selected hour value (e.g., 12).

Figures 12K, 12L:
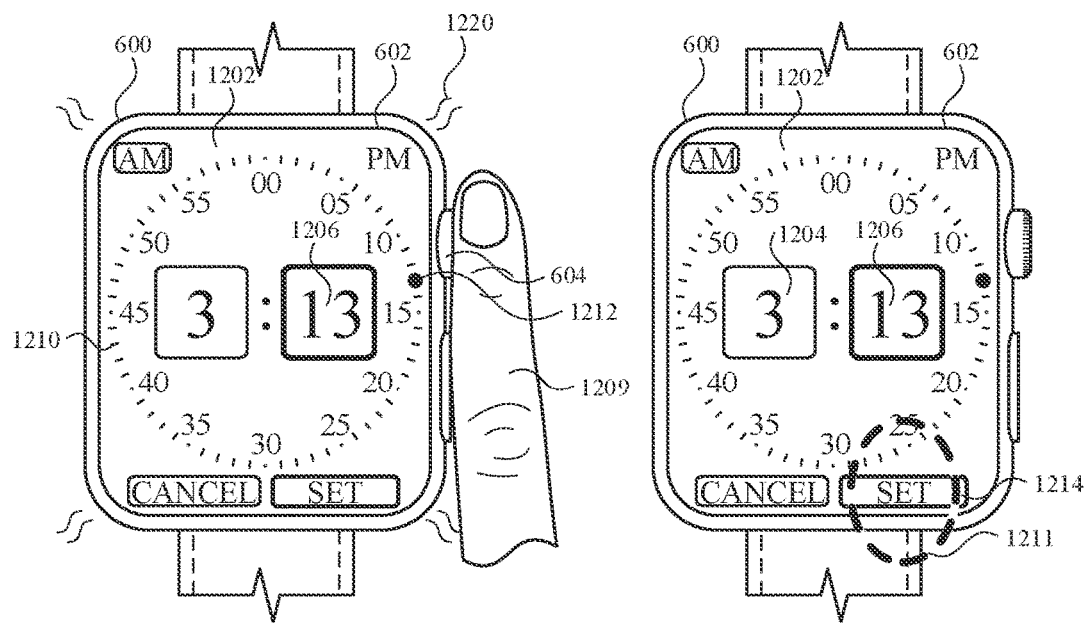

Subsequently, electronic device 600 further detects, via input element 604, a rotational input 1209 (e.g., in a clockwise direction). In FIG. 12K, in response to detecting rotational input 1209 on input element 604, electronic device 600 moves and aligns (e.g., "snaps") current selection indicator 1212 to a next alignment point in selectable options 1210 (e.g., the 13 minute value). Upon aligning to (e.g., "snapping" to) the previous alignment point, electronic device 600 generates, via the one or more tactile output generators, tactile output sequence 1220 and, in some embodiments, the audio output sequence associated with tactile output sequence 1220. Electronic device 600 also updates minute setting 1206 to reflect the currently-selected hour value (e.g., 13).

In FIG. 12L, while displaying time user interface 1202 with a new hour setting (e.g., 3) and a new minute setting (e.g., 13), electronic device 600 detects (e.g., via a touch-sensitive surface of display 602), an input 1211 on a set affordance 1214 for confirming the new time setting. In response to detecting input 1211 on set affordance 1214, electronic device 600 sets a time (e.g., the current time, a timer, an alarm) to the newly-selected time.

FIGS. 13A-13B are a flow diagram illustrating a method for managing user interfaces associated with adjustable item-based tactile outputs, in accordance with some embodiments. Method 1300 is performed at a device (e.g., 100, 300, 500, 600) with a display, an input element (e.g., a rotatable input device that is rotatable relative to a housing of the device; a rotatable input device/mechanism that includes a fixed socket and a rotatable component (e.g., a crown) attached to or affixed to a shaft, where the rotatable component and shaft rotate together in the fixed socket; a rotatable input device/mechanism that includes a rotatable component (e.g., a crown) that rotates relative to a fixed component (e.g., a fixed shaft); a rotatable input device/mechanism that rotates, in response to a rotational input, on an axis such that the direction of the rotation is parallel to the display of the electronic device; a rotatable input device/mechanism that can detect rotational input (e.g., via a touch-detection mechanism) without the device itself being physically rotated; a rotatable and press-able input device; a rotatable crown), and one or more tactile output generators (e.g., located in the input element and/or located in the main housing of the electronic device). Some operations in method 1300 are, optionally, combined, the orders of some operations are, optionally, changed, and some operations are, optionally, omitted.

As described below, method 1300 provides an intuitive way for managing user interfaces associated with content-based tactile outputs. The method reduces the cognitive burden on a user for managing and navigating user interfaces, thereby creating a more efficient human-machine interface. For battery-operated computing devices, enabling a user to navigate user interfaces faster and more efficiently by providing content-based tactile outputs conserves power and increases the time between battery charges.

The electronic device (e.g., 600) displays (1302), on the display (e.g., 602), a user interface (e.g., 1202, a time user interface correlated to changing a time setting of the device) that includes a first adjustable item (e.g., 1204, a first time item, such as hours) and a second adjustable item (e.g., 1206, a second time item, such as minutes). In some embodiments, the user interface is a time user interface, where the time user interface includes a display of the current time, and where the current hour is displayed in the first adjustable item and the current minute is displayed in the second adjustable item. In some embodiments, the time user interface includes a plurality of selectable setting options (e.g., 1210) that are used to adjust the first adjustable time item or the second adjustable time item. In some embodiments, the plurality of selectable setting options surround (e.g., in a circular shape, such as a wheel) the current time setting that is displayed at the center of the time user interface. Displaying the first and second adjustable items together with the selectable settings options enables a user to quickly and easily view adjustments being made to an adjustable item while the adjustment is being made. Providing additional control options and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first adjustable item corresponds to a first portion (e.g., the hour of the time) of a user interface setting (e.g., time) and the second adjustable item corresponds to a second portion (e.g., the minute of the time) of the user interface setting.

In some embodiments, the user interface corresponds to a time-setting user interface (e.g., a "wheel of time" user interface), the first adjustable item corresponds to an hour setting of the electronic device (e.g., for an alarm of the electronic device), and the second adjustable item corresponds to a minute setting of the electronic device (e.g., for an alarm of the electronic device).

While displaying the user interface (e.g., 1202), the electronic device (e.g., 600) detects (1304), via the input element (e.g., 604), a rotational input (e.g., 1201, 1203, 1205, 1207, 1209, in a clockwise or counter-clockwise direction).

In response to detecting (1306) the rotational input (e.g. 1201, 1203, 1205, 1207, 1209), in accordance with a determination (1308) that the first adjustable item (e.g., 1204) is currently-selected, the electronic device (e.g., 600) adjusts (1310), based on the rotational input, the first adjustable item (e.g., changing the current hour setting). While adjusting the first adjustable item, the electronic device generates (1312), via the one or more tactile output generators, a first sequence of tactile outputs (e.g., 610) including one or more tactile outputs having a first amplitude (e.g., without generating tactile outputs having a second amplitude that is different from the first amplitude). Generating the first sequence of tactile outputs in response to detecting the rotational input improves sensory feedback and enhances user experience by enabling the user to perceive of adjustments being made to an adjustable item while the adjustments are being made. Providing additional control options and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting (1306) the rotational input, in accordance with a determination (1318) that the second adjustable item (e.g., 1206) is currently-selected, the electronic device (e.g., 600) adjusts (1320) (e.g., without adjusting the first adjustable item), based on the rotational input (e.g., 1201, 1203, 1205, 1207, 1209), the second adjustable item (e.g., changing the current minute setting). While adjusting the second adjustable item, the electronic device generates (1322), via the one or more tactile output generators, a second sequence of tactile outputs (e.g., 1220) including one or more tactile outputs having a second amplitude that is different from the first amplitude (e.g., without generating tactile outputs having the first amplitude). In some embodiments, the second amplitude is smaller than the first amplitude, and thus the second type of tactile output is a smaller-amplitude tactile output than the first type of tactile output. Generating the second sequence of tactile outputs while adjusting the second adjustable item and generating the first sequence of tactile outputs while adjusting the first adjustable item improves feedback by enabling a user to quickly and easily recognize, without looking closely into the display, whether the user is adjusting the first or second adjustable item. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, adjusting, based on the rotational input (e.g., 1201, 1203, 1205, 1207, 1209, an input having an input magnitude (e.g., an amount of rotation of the rotational input)), the first adjustable item (e.g., 1204) comprises adjusting the first adjustable item by a first number of values (e.g., values between 1 through 12 for hours). In some embodiments, adjusting, based on the rotational input, the second adjustable item (e.g., 1206) comprises adjusting the second adjustable items by a second number of values, the second number of values (e.g., values between 1 through 60 for minutes) different from the first number of values. In some embodiments, the same magnitude of input (e.g., an amount of rotation) adjusts the values of the first adjustable item by a greater amount than that same magnitude of input adjusts the second adjustable item.

In some embodiments, generating, via the one or more tactile output generators, the first sequence of tactile outputs (e.g., 610) including one or more tactile outputs having the first amplitude comprises generating the first sequence of tactile outputs irrespective of the direction (e.g., clockwise direction, counter-clockwise direction) of the rotational input (e.g., 1201, 1203, 1205, 1207, 1209). In some embodiments, generating, via the one or more tactile output generators, the second sequence of tactile outputs (e.g., 1220) including one or more tactile outputs having the second amplitude comprises generating the second sequence of tactile outputs irrespective of the direction (e.g., clockwise direction, counter-clockwise direction) of the rotational input.

In some embodiments, while adjusting the first adjustable item (e.g., 1204), the electronic device (e.g., 600) moves (1314), on the user interface (e.g., 1202), an indicator (e.g., 1212) through a plurality of predetermined alignment points (e.g., 1210), where the indicator snaps to (e.g., aligns to, fits to, stops at) the alignment points of the plurality of alignment point of the predetermined alignment points, and the one or more tactile outputs of the first sequence of tactile outputs are coordinated with the snapping of the indicator to the alignment points of the plurality of alignment points. In some embodiments, the indicator snapping to an alignment point comprises using a particular threshold to determine the amount of rotation of the rotatable input element is required to reach the alignment point, and if the threshold is not reached, then snapping to a prior alignment point, and if the threshold is reached, then snapping to the next alignment point. Moving the indicator through the plurality of predetermined alignment points improves visual feedback by enabling the user to quickly and easily view adjustments being made to the first or second adjustable items in an intuitive manner. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while adjusting the first adjustable item (e.g., 1204), the electronic device (e.g., 600) displays (1316), on the display (e.g., 602), the plurality of predetermined alignment points (e.g., 1210), where the plurality of predetermined alignment points includes a first number of alignment points. In some embodiments, while adjusting the second adjustable item (e.g., 1206), the electronic device displays (1324), on the display, a second plurality of predetermined alignment points (e.g., 1210), where the second plurality of predetermined alignment points includes a second number of alignment points different from the first number. In some embodiments, the first adjustable item corresponds to the hour setting of a time, and each of the plurality of predetermined alignment points corresponds to a particular hour setting. Thus, in some embodiment, the first number is twelve, with each alignment point corresponding to a particular hour setting. In some embodiments, the second adjustable item corresponds to the minute setting of a time, and each of the plurality of predetermined alignment points corresponds to a particular minute setting. Thus, in some embodiments, the second number is sixty, with each alignment point corresponding to a particular minute setting.

In some embodiments, in response to detecting (1326) the rotational input (e.g., 1201, 1203, 1205, 1207, 1209), in accordance with a determination that the rotational input is of a first rotational speed, the electronic device (e.g., 600) moves (1328) the indicator (e.g., 1212) through the plurality of displayed values (e.g., 1210) at a first speed associated with the first rotational speed. In some embodiments, in response to detecting (1326) the rotational input, in accordance with a determination that the rotational input is of a second rotation speed different from the first rotational speed, the electronic device moves (1330) the indicator through the plurality of displayed values at a second speed associated with the second rotational speed, the second speed different from the first speed. In some embodiments, if the second rotational speed of the rotational input is greater than the first rotational speed, the second speed of the indicator moving through the plurality of displayed values is greater than the first speed of the indicator, and if the second rotational speed of the rotational input is slower than the second rotational speed, then the second speed of the indicator moving through the plurality of displayed values is slower than the first speed of the indicator.

In some embodiments, while displaying the user interface (e.g., 1202) and while the first adjustable item (e.g., 1204) is a currently-selected adjustable item, the electronic device (e.g., 600) detects (1332) (e.g., via one or more input devices of the electronic device, such as a touch-sensitive surface of the display) a first input (e.g., 1205, a tap gesture on the display). In some embodiments, in response to detecting the first input, the electronic device sets (1334) the second adjustable item (e.g., 1206) (e.g., instead of the first adjustable item) as the currently-selected adjustable item.

Note that details of the processes described above with respect to method 1300 (e.g., FIGS. 13A-13B) are also applicable in an analogous manner to the methods described above and below. For example, method 700 optionally includes one or more of the characteristics of the various methods described above with reference to method 1300. For example, one or more of the different types of tactile output sequences described in method 700 can be provided while navigating the time setting user interface. For another example, method 900 optionally includes one or more of the characteristics of the various methods described above with reference to method 1300. For example, in method 900, different types of tactile output sequences can be generated while scrolling content and when reaching an end of content, while in method 1300, different types of tactile output sequences can be generated when adjusting a first adjustable item and a second adjustable item. For another example, method 1100 optionally includes one or more of the characteristics of the various methods described above with reference to method 1300. For example, as in method 1100, tactile outputs are generated upon a user interface object, item, or element aligning to (e.g., "snapping" to) an alignment if the user interface is navigated via a rotational input on an input element. For another example, method 1500 optionally includes one or more of the characteristics of the various methods described above with reference to method 1300. For example, as described in method 1500, the magnitude/amplitude and/or rate of occurrence of the tactile outputs can be dynamic in response to changes in speed of a rotational input while adjusting a time. For brevity, these details are not repeated below.

FIGS. 14A-14H illustrate exemplary user interfaces associated with input velocity-based tactile outputs, in accordance with some embodiments. The user interfaces in these figures are used to illustrate the processes described below, including the processes in FIGS. 15A-15C.

Figure 14A:
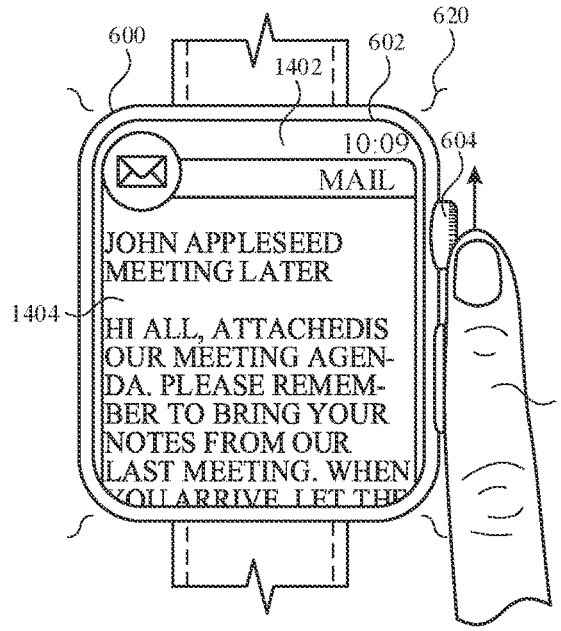
FIGS. 14A-14H illustrate example user interfaces associated with input velocity-based tactile outputs, in accordance with some embodiments.
Figure 15A:
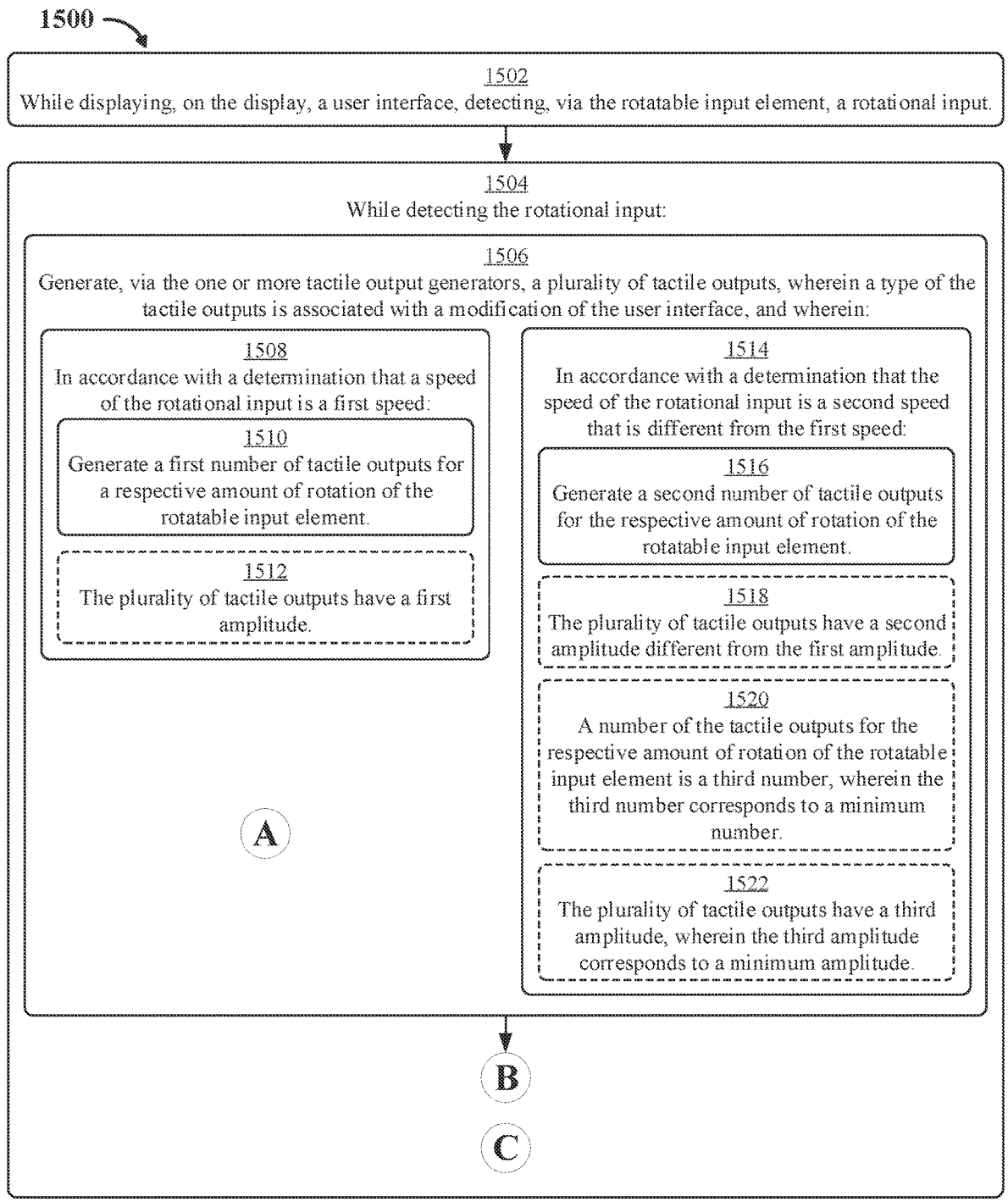
Figure 15B:
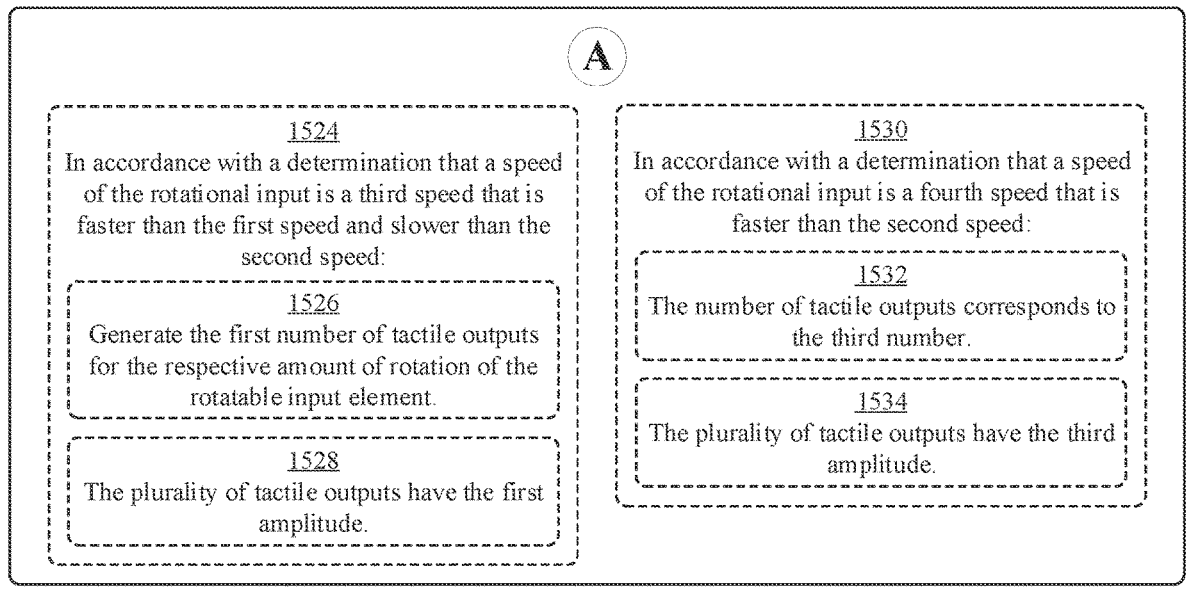
Figure 15B:
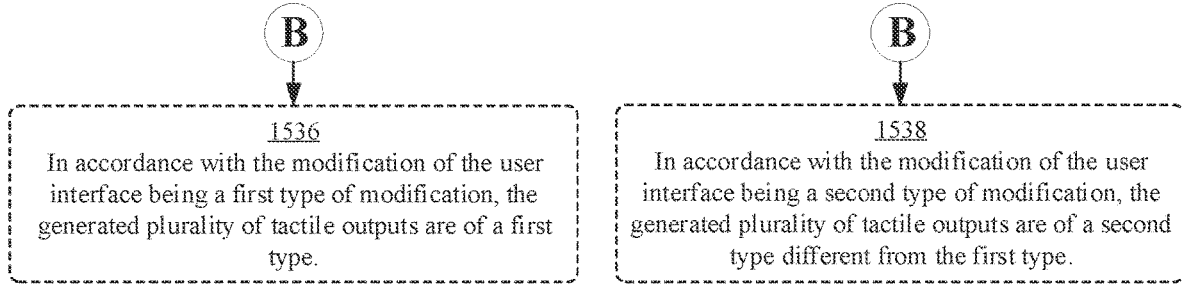

FIG. 14A illustrates electronic device 600 displaying, on display 602, a user interface 1402 of a messaging application (e.g., the email application first described above with reference to FIGS. 6H-6S). In FIG. 14A, electronic device 600 displays, in user interface 1402, text 1404 (e.g., comprising continuous text) corresponding to a continuous type of user interface item/element.

In FIG. 14A, while displaying user interface 1402 with text 1404, electronic device 600 detects, via input element 604, a rotational input 1401 (e.g., in a clockwise direction) comprising a respective amount of rotation of input element 604, where rotational input 1401 has a first rotational speed. In response to detecting rotational input 1401 on input element 604 with the first rotational speed, electronic device 600 begins scrolling text 1404. Further, electronic device 600 generates, via the one or more tactile output generators, tactile output sequence 620, where tactile output sequence 620 has a first magnitude (e.g., an amplitude) and/or a first number of tactile outputs (e.g., discrete, individual tactile outputs) during the respective amount of rotation of input element 604 of rotational input 1401. As described in greater detail above with reference to FIGS. 5C-5H, in some embodiments, a discrete, individual tactile output is one tactile output signal (e.g., 0.5, 1, or 2 cycle(s) of a tactile output waveform), and a tactile output sequence is a plurality of (e.g., the same) discrete, individual tactile outputs that are generated in sequence (e.g., for a predetermined amount of time).

In some embodiments, in addition to generating tactile output sequence 620 in FIG. 14A, electronic device 600 also generates (e.g., via the one or more tactile output generators used to generate the tactile outputs) the audio output sequence associated with tactile output sequence 620, where the audio output sequence has a first magnitude (e.g., an amplitude) and/or a first number of audio outputs (e.g., discrete, individual audio outputs) during the respective amount of rotation of input element 604 of rotational input 1401. In some embodiments, similar to a discrete, individual tactile output, a discrete, individual audio output is one audio output signal (e.g., 0.5, 1, or 2 cycle(s) of an audio output waveform), and an audio output sequence is a plurality of (e.g., the same) discrete, individual audio outputs that are generated in sequence (e.g., for a predetermined amount of time).

Figure 14B:
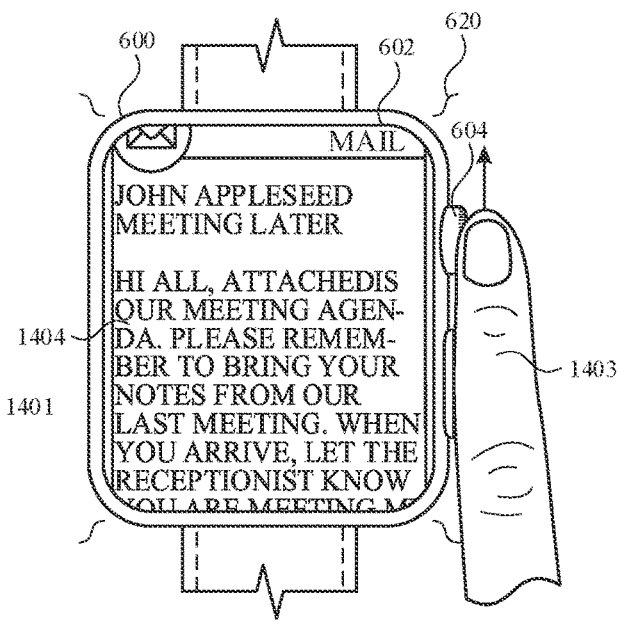

In FIG. 14B, subsequent to detecting rotational input 1401, electronic device 600 detects, via input element 604, a rotational input 1403 (e.g., in a clockwise direction) comprising the respective amount of rotation of input element 604, where rotational input 1403 has a second rotational speed that is faster than the first rotational speed. In response to detecting rotational input 1403 on input element 604 with the second rotational speed, electronic device 600 scrolls text 1404 (e.g., at a faster speed than in FIG. 14A). Further, electronic device 600 generates, via the one or more tactile output generators, tactile output sequence 620, where tactile output sequence 620 has the same first magnitude and/or the same first number of tactile outputs (e.g., discrete, individual tactile outputs) during the respective amount of rotation of input element 604 of rotational input 1403.

In some embodiments, in addition to generating tactile output sequence 620 in FIG. 14B, electronic device 600 also generates (e.g., via the one or more tactile output generators used to generate the tactile outputs) the audio output sequence associated with tactile output sequence 620, where the audio output sequence has the same first magnitude and/or the same first number of audio outputs (e.g., discrete, individual audio outputs) during the respective amount of rotation of input element 604 of rotational input 1403.

Figure 14C:
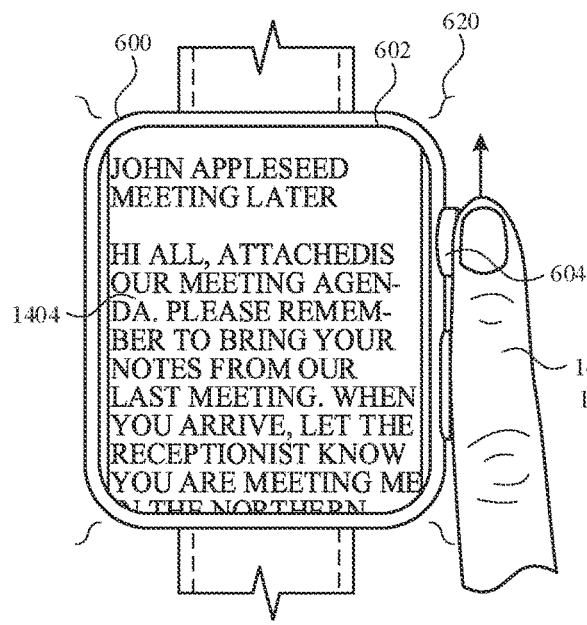

In FIG. 14C, subsequent to detecting rotational input 1403, electronic device 600 detects, via input element 604, a rotational input 1405 (e.g., in a clockwise direction)

comprising the respective amount of rotation of input element 604, where rotational input 1403 has a third rotational speed that is even faster than the second rotational speed. In response to detecting rotational input 1405 on input element 604 with the third rotational speed, electronic device 600 scrolls text 1404 (e.g., at a faster speed than in FIG. 14B). Further, electronic device 600 generates, via the one or more tactile output generators, tactile output sequence 620, where tactile output sequence 620 has a second magnitude and/or a second number of tactile outputs (e.g., discrete, individual tactile outputs) during the respective amount of rotation of input element 604 of rotational input 1405, where the second magnitude is smaller than the first magnitude and the second number of tactile outputs is smaller than the first number of tactile outputs.

In some embodiments, in addition to generating tactile output sequence 620 in FIG. 14C, electronic device 600 also generates (e.g., via the one or more tactile output generators used to generate the tactile outputs) the audio output sequence associated with tactile output sequence 620, where the audio output sequence has a second magnitude and/or a second number of audio outputs (e.g., discrete, individual audio outputs) during the respective amount of rotation of input element 604 of rotational input 1405, where the second magnitude is smaller than the first magnitude and the second number of audio outputs is smaller than the first number of audio outputs.

Figure 14D:
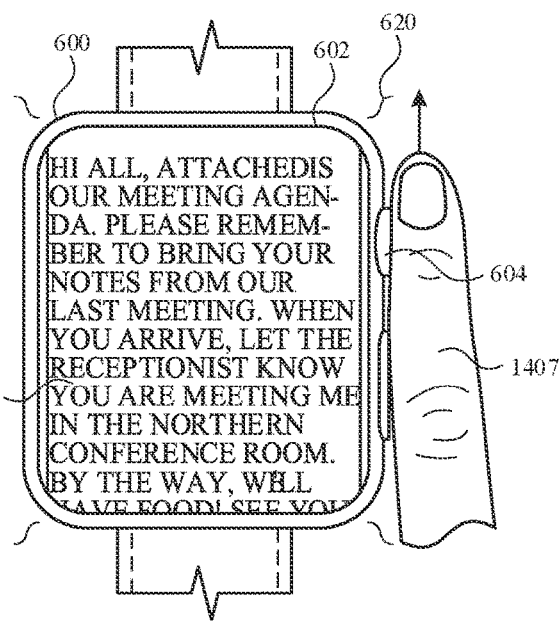

In FIG. 14D, subsequent to detecting rotational input 1405, electronic device 600 detects, via input element 604, a rotational input 1407 (e.g., in a clockwise direction) comprising the respective amount of rotation of input element 604, where rotational input 1407 has a fourth rotational speed that is even faster than the third rotational speed. In response to detecting rotational input 1407 on input element 604 with the fourth rotational speed, electronic device 600 scrolls text 1404 (e.g., at a faster speed than in FIG. 14C). Further, electronic device 600 generates, via the one or more tactile output generators, tactile output sequence 620, where tactile output sequence 620 has a third magnitude and/or a third number of tactile outputs (e.g., discrete, individual tactile outputs) during the respective amount of rotation of input element 604 of rotational input 1407, where the third magnitude is smaller than the second magnitude and the third number of tactile outputs is smaller than the second number of tactile outputs.

In some embodiments, in addition to generating tactile output sequence 620 in FIG. 14D, electronic device 600 also generates (e.g., via the one or more tactile output generators used to generate the tactile outputs) the audio output sequence associated with tactile output sequence 620, where the audio output sequence has a third magnitude and/or a third number of audio outputs (e.g., discrete, individual audio outputs) during the respective amount of rotation of input element 604 of rotational input 1407, where the third magnitude is smaller than the second magnitude and the third number of audio outputs is smaller than the second number of audio outputs.

Figure 14E:
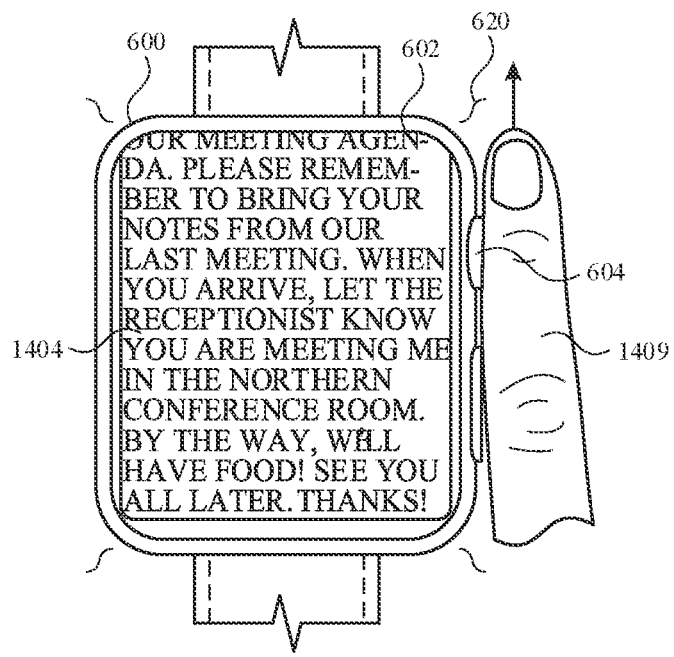

In FIG. 14E, subsequent to detecting rotational input 1407, electronic device 600 detects, via input element 604, a rotational input 1409 (e.g., in a clockwise direction) comprising the respective amount of rotation of input element 604, where rotational input 1409 has a fifth rotational speed that is even faster than the fourth rotational speed. In response to detecting rotational input 1409 on input element 604 with the fifth rotational speed, electronic device 600 scrolls text 1404 (e.g., at a faster speed than in FIG. 14D). Further, electronic device 600 generates, via the one or more tactile output generators, tactile output sequence 620, where tactile output sequence 620 has the same third magnitude and/or the same third number of tactile outputs (e.g., discrete, individual tactile outputs) during the respective amount of rotation of input element 604 of rotational input 1409.

In some embodiments, in addition to generating tactile output sequence 620 in FIG. 14D, electronic device 600 also generates (e.g., via the one or more tactile output generators used to generate the tactile outputs) the audio output sequence associated with tactile output sequence 620, where the audio output sequence has the same third magnitude and/or the same third number of audio outputs (e.g., discrete, individual audio outputs) during the respective amount of rotation of input element 604 of rotational input 1409.

Figure 14F:
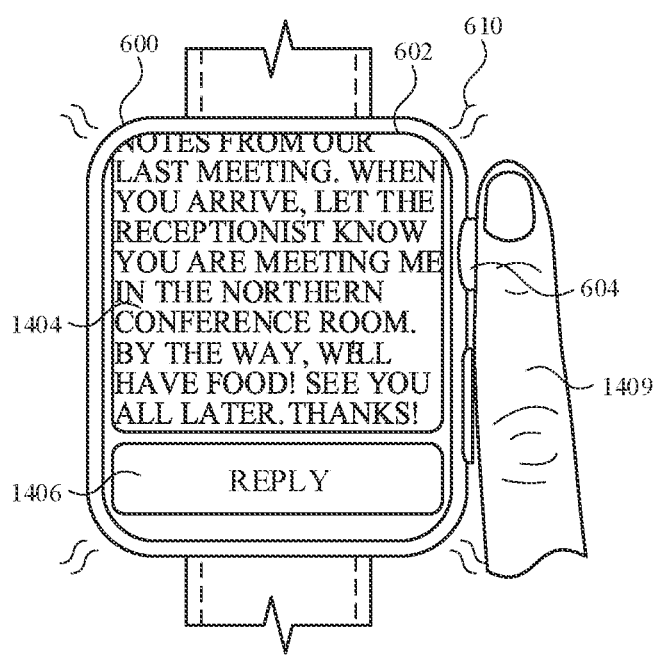

In FIG. 14F, while continuing to detect rotational input 1409 on input element 604, electronic device 600 displays (e.g., adjacent to/below text 1404) an affordance 1406 (e.g., a reply button) corresponding to a discrete type of user interface item/element. Upon displaying (e.g., fully displaying) affordance 1406 or, alternatively, upon affordance 1406 aligning to a focal point or region of the display, such as a center point or center region of the display, electronic device 600 generates, via the one or more tactile output generators, tactile output sequence 610 and, in some embodiments, the audio output sequence corresponding to tactile output sequence 610.

Figure 14G:
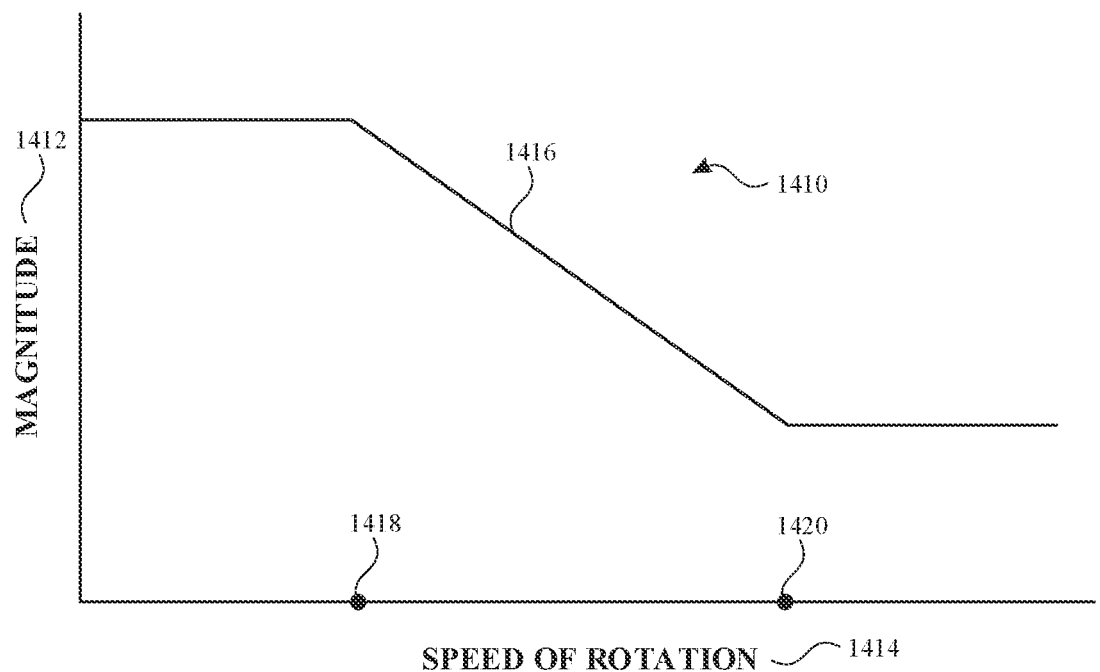

FIG. 14G illustrates a graph 1410 on a x, y plane, where x-axis 1414 corresponds to the speed of rotation of input element 604 and y-axis 1412 corresponds to the magnitude (e.g., amplitude, strength) of a discrete tactile output within a tactile output sequence (e.g., tactile output sequence 610, tactile output sequence 620). Graph 1410 includes a curve 1416 illustrating the relationship between the speed of rotation of input element 604 and the resulting magnitude of generated tactile outputs.

In some embodiments, as shown by graph 1410, the magnitude (e.g., amplitude) of generated tactile outputs remains constant when the speed of rotation of a detected rotational input on input element 604 is less than a speed 1418. The magnitude of generated tactile outputs decreases (e.g., linearly) when the speed of rotation of the detected rotational input on input element 604 is between speed 1418 and a speed 1420. The magnitude of generated tactile outputs again remains constant when the speed of rotation of the detected rotational input on input element 604 is greater than speed 1420.

In some embodiments, the number of discrete tactile outputs that are generated for a respective rotation of input element 604 from a detected rotational input shares a similar (e.g., but inverse) relationship with the speed of rotation of the rotational input. That is, the number of discrete tactile outputs for the respective rotation of input element 604 remains constant when the speed of rotation of the detected rotational input for the respective amount of rotation of input element 604 is less than a first speed (e.g., speed 1418). The number of generated tactile outputs becomes greater (e.g., linearly) as the speed of rotation of the detected rotational input for the respective amount of rotation of input element 604 increases between the first speed (e.g., speed 1418) and a second speed (e.g., speed 1420). The number of discrete tactile outputs of generated tactile outputs remains constant when the speed of rotation of the detected rotational input for the respective amount of rotation of input element 604 is greater than the second speed (e.g., speed 1418).

Figure 14H:
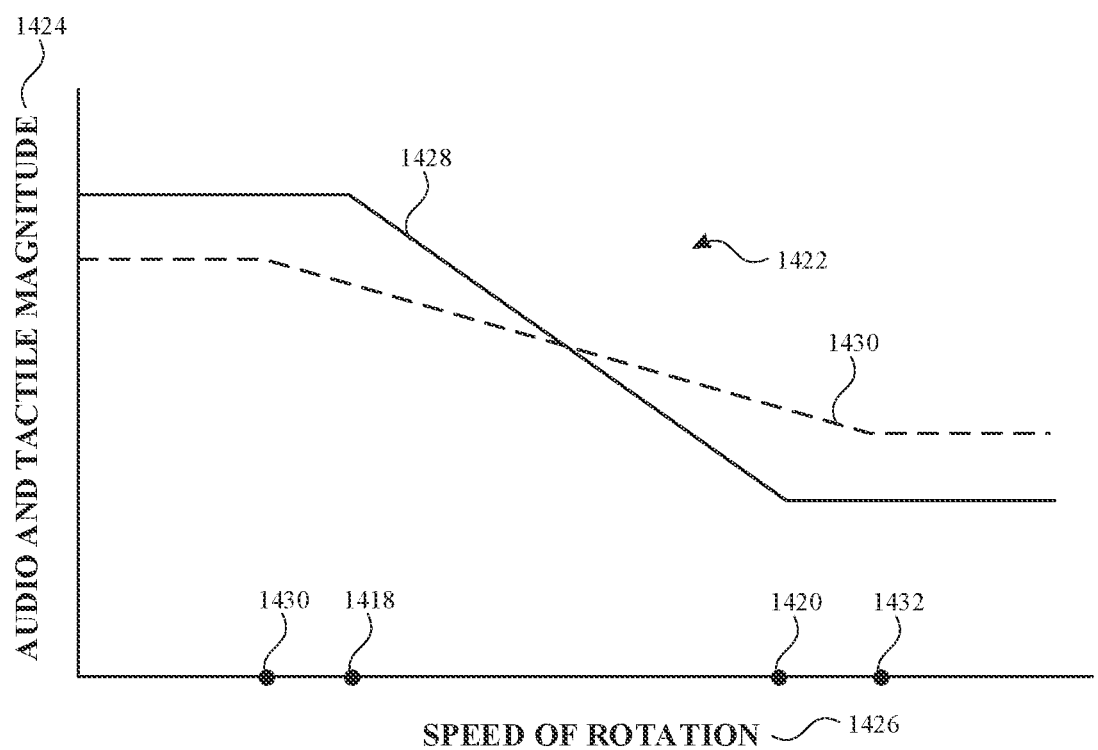

FIG. 14H illustrates graph 1422 on a x, y plane, where x-axis 1426 corresponds to the speed of rotation of input element 604 and y-axis 1424 corresponds to the magnitude (e.g., amplitude, strength) of a discrete tactile output within a tactile output sequence (e.g., tactile output sequence 610, tactile output sequence 620) or of a discrete audio output within an associated audio output sequence (e.g., the first audio output sequence associated with first tactile output sequence 610, the second audio output sequence associated with the second tactile output sequence 620).

Graph 1422 includes a curve 1428 (e.g., similar to curve 1416) illustrating the relationship between the speed of rotation of input element 604 and the resulting magnitude of generated tactile outputs. Graph 1422 also includes a curve 1430 illustrating the relationship between the speed of rotation of input element 604 and the resulting magnitude of generated audio outputs.

In some embodiments, as shown by graph 1430, the magnitude (e.g., amplitude) of generated audio outputs remains constant when the speed of rotation of a detected rotational input on input element 604 is less than a speed 1430. The magnitude of generated audio outputs decreases (e.g., linearly) when the speed of rotation of the detected rotational input on input element 604 is between speed 1430 and a speed 1432. The magnitude of generated audio outputs again remains constant when the speed of rotation of the detected rotational input on input element 604 is greater than speed 1432.

As shown in FIG. 14H, in some embodiments, the speeds that result in changes to the magnitude of audio outputs, as indicated by audio curve 1430 (e.g., speeds 1430 and 1432), is not the same as the speeds that result in changes to the magnitude of tactile outputs, as indicated by the tactile output curve 1428 (e.g., speeds 1418 and 1420). Speed 1430 can be less than, equal to, or greater than speed 1418 and, similarly, speed 1432 can be less than, equal to, or greater than speed 1420.

In some embodiments, the number of discrete audio outputs that are generated for a respective rotation of input element 604 from a detected rotational input shares a similar (e.g., but inverse) relationship with the speed of rotation of the rotational input. That is, the number of discrete audio outputs for the respective amount of rotation of input element 604 remains constant when the speed of rotation of the detected rotational input for the respective amount of rotation of input element 604 is less than a first speed (e.g., speed 1430). The number of generated audio outputs becomes greater (e.g., linearly) as the speed of rotation of the detected rotational input for the respective amount of rotation of input element 604 increases between the first speed (e.g., speed 1430) and a second speed (e.g., speed 1432). The number of discrete audio outputs respective amount of rotation of input element 604 remains constant when the speed of rotation of the detected rotational input for the respective amount of rotation of input element 604 is greater than the second speed (e.g., speed 1432).

As with the magnitude of audio outputs, in some embodiments, the speeds that result in changes to the number of discrete audio outputs (e.g., speeds 1430 and 1432) respective amount of ration of rotational input 604 is not the same as the speeds that result in changes to the number of discrete tactile outputs for the respective amount of ration of rotational input 604 (e.g., speeds 1418 and 1420). Speed 1430 can be less than, equal to, or greater than speed 1418 and, similarly, speed 1432 can be less than, equal to, or greater than speed 1420.

FIGS. 15A-15C are a flow diagram illustrating a method for managing user interfaces associated with input velocity-based tactile outputs, in accordance with some embodiments. Method 1500 is performed at a device (e.g., 100, 300, 500, 600) with a display, a rotatable input element (e.g., a rotatable input device that is rotatable relative to a housing of the device, a rotatable input device/mechanism that includes a rotatable component (e.g., a crown) that rotates relative to a fixed component (e.g., a fixed shaft), a rotatable input device/mechanism that rotates, in response to a rotational input, on an axis such that the direction of the rotation is parallel to the display of the electronic device, a rotatable input device/mechanism that can detect rotational input (e.g., via a touch-detection mechanism) without the device itself being physically rotated, a rotatable and press-able input device, a rotatable crown), and one or more tactile output generators (e.g., located in the input element and/or located in the main housing of the electronic device). Some operations in method 1500 are, optionally, combined, the orders of some operations are, optionally, changed, and some operations are, optionally, omitted.

As described below, method 1500 provides an intuitive way for managing user interfaces associated with content-based tactile outputs. The method reduces the cognitive burden on a user for managing and navigating user interfaces, thereby creating a more efficient human-machine interface. For battery-operated computing devices, enabling a user to navigate user interfaces faster and more efficiently by providing content-based tactile outputs conserves power and increases the time between battery charges.

While displaying, on the display (e.g., 602), a user interface (e.g., 1402), the electronic device (e.g., 600) detects (1502), via the rotatable input element (e.g., 604), a rotational input (e.g., 1401, 1403, 1405, 1407, 1409, a continuous rotational input on the rotatable input element that continues for a period of time, such as 1 second or 2 seconds).

While detecting the rotational input (e.g., 1401, 1403, 1405, 1407, 1409), the electronic device (e.g., 600) generates (1506), via the one or more tactile output generators, a plurality of tactile outputs (e.g., 620, a sequence of tactile outputs (e.g., discrete, individual tactile outputs)), where a type (e.g., a major-type of tactile output, a minor-type of tactile output, a major-reduced-type tactile output) of the tactile outputs is associated with a modification of the user interface (e.g., 1402), and where, in accordance with a determination (1508) that a speed (e.g., rotational speed) of the rotational input (e.g., 1401) is a first speed (e.g., a first rotational speed), the electronic device generates (1510) a first number of tactile outputs for a respective amount of rotation of the rotatable input element (e.g., 604), and in accordance with a determination (1514) that the speed (e.g., rotational speed) of the rotational input (e.g., 1405) is a second speed (e.g., a second rotational speed) that is different from (e.g., faster than or slower than) the first speed, the electronic device generates (1516) a second number of tactile outputs (e.g., different from the first number of tactile outputs) for the respective amount of rotation of the rotatable input element. Generating a plurality of tactile outputs in response to the rotational input, where one or more characteristics (e.g., magnitude/amplitude, rate of occurrence) of the tactile outputs differ based on a rotation speed of the rotational input improves sensory feedback by enabling the user to quickly and easily perceive of the speed and which the user is navigating/scrolling the user interface, and to adjust accordingly. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second speed (e.g., 1420) is greater than the first speed (e.g., 1418) (e.g., the rotatable input element (e.g., 604) is rotated at a faster speed/rate for the second speed than for the first speed), and the second number of tactile outputs is smaller than the first number of tactile outputs for the respective amount of rotation of the rotatable input element. In some embodiments, if the second speed is slower than the first speed (e.g., the rotatable input element is rotated at a slower speed/rate for the second speed than for the first speed), the second number of tactile outputs is greater than the first number of tactile outputs for the same respective amount of rotation of the rotatable input element.

In some embodiments, the second speed (e.g., 1420) is greater than the first speed (e.g., 1418) (e.g., the rotatable input element (e.g., 604) is rotated at a faster speed/rate for the second speed than for the first speed), and amplitudes of the second number of tactile outputs is smaller than amplitudes of the first number of tactile outputs. In some embodiments, if the second speed is slower than the first speed (e.g., the rotatable input element is rotated at a slower speed/rate for the second speed than for the first speed), the amplitudes of the second number of tactile outputs is greater than amplitudes of the first number of tactile outputs.

In some embodiments, in accordance with the modification of the user interface (e.g., 1402) being a first type of modification (e.g. navigating/scrolling continuous content, such as a notification or continuous text), the generated plurality of tactile outputs (e.g., 620) are (1536) of a first type (e.g., plurality of tactile outputs having a first number of tactile outputs in the sequence and/or a first amplitude). In some embodiments, in accordance with the modification of the user interface being a second type of modification (e.g., navigating/scrolling discrete content, such as buttons, affordances, platters, paragraphs), the generated plurality of tactile outputs are (1538) of a second type different from the first type (e.g., plurality of tactile outputs having a second number of tactile outputs in the sequence and/or a second amplitude). Generating a particular type of tactile outputs for a particular type of modification of the user interface improves sensory feedback by enabling a user to quickly and easily recognize the type of modification that was made to the user interface, in particular if the modification was accidental and against the user's intent. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the type of the tactile outputs that are generated is based (e.g., based at least in part) on content displayed in the user interface that is being modified while the rotational input (e.g., 1401, 1403, 1405, 1407, 1409) is detected, as described above with reference to FIGS. 6A-6AF. In some embodiments, the type of the tactile outputs that are generated is based (e.g., based at least in part) on a direction (e.g., clockwise or counterclockwise) of the rotational input.

In some embodiments, the number of tactile outputs of the plurality of tactile outputs (e.g., 620) is at least in part based on a size characteristic (e.g., a size of the display of the device) of the electronic device (e.g., 600). For example, the display (e.g., 602) of the electronic device is of a first size, the number of tactile outputs included in the plurality of tactile outputs is smaller than if the display of the electronic device is of a second size, where the second size is larger than the first size.

In some embodiments, amplitudes of the plurality of tactile outputs (e.g., 620) are at least in part based on a size characteristic (e.g., a size of the display of the device) of the electronic device (e.g., 600). For example, if the display (e.g., 602) of the electronic device is of a first size, the amplitudes are relatively smaller than if the display of the electronic device is of a second size, where the second size is larger than the first size. Basing (e.g., at least in part) the number of tactile outputs of the plurality of tactile outputs and/or the amplitudes of the tactile outputs based on the size of the device improves operability of the device by customizing the number of tactile outputs to be functionality appropriate with the size of the device, which in turn makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while detecting (1504) the rotational input (e.g., 1401, 1403, 1405, 1407, 1409), in accordance with a determination (1524) that a speed (e.g., rotational speed) of the rotational input is a third speed (e.g., a third rotational speed) that is faster than the first speed and slower than the second speed (e.g., the third speed corresponds to a rotational speed that is in between the rotational speed corresponding to the first speed and the rotational speed corresponding to the third speed), the electronic device (e.g., 600) generates (1526) the first number of tactile outputs (e.g., 620) for the respective amount of rotation of the rotatable input element (e.g., 604). Thus, in some embodiments, the number of tactile outputs generated for the respective amount of rotation of the rotatable input element at the first speed of the rotational input and at the third speed of the rotational input (e.g., where the third speed is faster than the first speed but slower than the second speed, and thus is a speed that is between the first and second speeds) is the same, but the number of tactile outputs generated for the respective amount of rotation of the rotatable input element at the second speed is different from the number of tactile outputs generated at the first and third speeds.

In some embodiments, while detecting (1504) the rotational input, in accordance with the determination (1508) that the speed (e.g., rotational speed) of the rotational input (e.g., 1401, 1403, 1405, 1407, 1409) is the first speed (e.g., a first rotational speed), the plurality of tactile outputs has (1512) a first amplitude. In some embodiments, while detecting (1504) the rotational input, in accordance with a determination (1524) that a speed (e.g., rotational speed) of the rotational input is a third speed (e.g., a third rotational speed) that is faster than the first speed and slower than the second speed (e.g., the third speed corresponds to a rotational speed that is in between the rotational speed corresponding to the first speed and the rotational speed corresponding to the third speed), the plurality of tactile outputs have (1528) the first amplitude. Thus, in some embodiments, the plurality of tactile outputs (e.g., 620) have the same amplitude while the rotational input is detected at the first speed and at the third speed, even though the third speed is greater than the first speed. In some embodiments, in accordance with the determination (1514) that the speed (e.g., rotational speed) of the rotational input is the second speed (e.g., a second rotational speed) that is different from (e.g., faster than or slower than) the first speed and from the third speed, the plurality of tactile outputs have (1518) a second amplitude different from (e.g., greater than, smaller than) the first amplitude. In some embodiments, the second speed is a threshold speed of the rotational input at which the rotational input causes the amplitudes of the plurality of tactile outputs to change (e.g., become bigger or smaller).

In some embodiments, while detecting (1504) the rotational input, in accordance with the determination (1514) that the speed (e.g., rotational speed) of the rotational input (e.g., 1401, 1403, 1405, 1407, 1409) is the second speed (e.g., a first rotational speed), a number of the tactile outputs for the respective amount of rotation of the rotatable input element is (1520) a third number, where the third number corresponds to a minimum number (e.g., the smallest number of tactile outputs generated by the electronic device). In some embodiments, in accordance with a determination (1530) that a speed (e.g., rotational speed) of the rotational input is a fourth speed (e.g., a fourth rotational speed) that is faster than the second speed (e.g., the fourth speed corresponds to a rotational speed that is greater than the rotational speed corresponding to the second speed), the number of tactile outputs corresponds to (1532) the third number. Thus, in some embodiments, the electronic device (e.g., 600) does not generate a smaller number of tactile outputs than the third number (e.g., a minimum number) of tactile outputs even if the speed of the rotation input further changes (e.g., becomes even faster).

In some embodiments, while detecting (1504) the rotational input (e.g., 1401, 1403, 1405, 1407, 1409), in accordance with the determination (1514) that the speed (e.g., rotational speed) of the rotational input is the second speed (e.g., a first rotational speed), the plurality of tactile outputs have (1522) a third amplitude, where the third amplitude corresponds to a minimum amplitude (e.g., the smallest greater-than-zero tactile output amplitude generated by the one or more tactile output generators of the electronic device). In some embodiments, in accordance with a determination (1530) that a speed (e.g., rotational speed) of the rotational input is a fourth speed (e.g., a fourth rotational speed) that is faster than the second speed (e.g., the fourth speed corresponds to a rotational speed that is greater than the rotational speed corresponding to the second speed), the plurality of tactile outputs have (1534) the third amplitude. Thus, in some embodiments, the plurality of tactile outputs have the same amplitude while the rotational input is detected at the second speed and at the fourth speed, even though the fourth speed is greater than the second speed.

In some embodiments, while detecting (1504) the rotational input (e.g., 1401, 1403, 1405, 1407, 1409), in accordance with a determination that the second speed corresponds to a maximum threshold speed (e.g., a maximum threshold rotational speed), the second number of tactile outputs corresponds to (1526) a maximum number of tactile outputs that can be generated for the respective amount of rotation of the rotatable input element. Thus, in some embodiments, even if the second speed goes over the maximum threshold speed, the second number of tactile outputs no longer increases (e.g., but rather stays constant at the maximum number of tactile outputs (e.g., at space of 15 ms between tactile outputs).

In some embodiments, while detecting (1504) the rotational input (e.g., 1401, 1403, 1405, 1407, 1409), the electronic device (e.g., 600) generates (1540) (e.g., via the one or more tactile output generators and/or via one or more other output devices of the electronic device, such as one or more internal speakers and/or one or more external speakers (e.g., headphones, earphones) connected to the electronic device) a plurality of audio outputs associated with the plurality of tactile outputs. In some embodiments, in accordance with the determination that the speed of the rotational input is the first speed, the electronic device generates (1544) a first number of audio outputs for the respective amount of rotation of the rotatable input element. In some embodiments, in accordance with the determination that the speed of the rotation input is the second speed, the electronic device generates (1550) a second number of audio outputs for the respective amount of rotation of the rotatable input element. Generating associated audio outputs in addition to the tactile outputs provides another feedback method, thus enhancing the operability of the device by enhancing the versatility of the device.

In some embodiments, the audio outputs are generated via the one or more tactile output generators (e.g., integrated into the rotatable input element and/or a housing of the electronic device).

In some embodiments, while detecting (1504) the rotational input (e.g., 1401, 1403, 1405, 1407, 1409), the electronic device (e.g., 600) generates (1540) (e.g., via the one or more tactile output generators and/or via one or more other output devices of the electronic device, such as one or more internal speakers and/or one or more external speakers (e.g., headphones, earphones) connected to the electronic device) a plurality of audio outputs associated with the plurality of tactile outputs. In some embodiments, in accordance with the determination (1542) that the speed of the rotational input is the first speed, the electronic device generates (1546) the audio outputs at a first magnitude (e.g., a first volume) for the respective amount of rotation of the rotatable input element. In some embodiments, in accordance with the determination (1548) that the speed of the rotation input is the second speed, the electronic device generates (1552) the audio outputs at a second magnitude (e.g., a second volume) different from the first magnitude (e.g., greater/louder than the first magnitude or smaller/quieter than the first magnitude) for the respective amount of rotation of the rotatable input element.

In some embodiments, the second speed (e.g., 1420) is greater than the first speed (e.g., 1418) (e.g., the rotatable input element is rotated at a faster speed/rate for the second speed than for the first speed), and the second number of audio outputs is smaller than the first number of audio outputs for the respective amount of rotation of the rotatable input element. In some embodiments, if the second speed is slower than the first speed (e.g., the rotatable input element is rotated at a slower speed/rate for the second speed than for the first speed), the second number of audio outputs is greater than the first number of audio outputs for the respective amount of rotation of the rotatable input element.

In some embodiments, the difference in the number of outputs between the second number of audio outputs and the first number of audio outputs is different from the difference in the number of outputs between the second number of tactile outputs and the first number of tactile outputs. Thus, in some embodiments, when the speed of rotation of the rotatable input element changes (e.g., becomes faster or becomes slower), the change in the number of audio outputs generated by the electronic device for the respective amount of rotation of the rotatable input element changes at a different rate than the change in the number of tactile outputs generated by the electronic device for the respective amount of rotation of the rotatable input element.

In some embodiments, while detecting (1504) the rotational input (e.g., 1401, 1403, 1405, 1407, 1409), in accordance with a determination (1554) that the speed of the rotational input is of an initial speed (e.g., the initial speed of the rotational input the moment/right after the rotational input is detected), the electronic device (e.g., 600) generates (1556) an initial number of tactile outputs and an initial number of audio outputs for the respective amount of rotation of the rotatable input element (e.g., 604). In some embodiments, while detecting (1504) the rotational input, in accordance with a determination (1560) that the speed of the rotational input is of a threshold speed (e.g., the speed of the rotational input that first triggers a change in the number of tactile outputs that are generated), the electronic device generates (1562) a threshold number of tactile outputs and the initial number of audio outputs for the respective amount of rotation of the rotatable input element, the threshold number of tactile outputs different from (e.g., greater than) the initial number of tactile outputs. In some embodiments, in accordance with a determination (1560) that the speed of the rotational input is of the threshold speed, the electronic device generates the initial number of tactile outputs and a threshold number of audio outputs for the respective amount of rotation of the rotatable input element, the threshold number of audio outputs different from (e.g., greater than) the initial number of audio outputs. In some embodiments, the tactile outputs and the audio outputs are generated by the same tactile output generators of the one or more tactile output generators.

In some embodiments, while detecting (1504) the rotational input (e.g., 1401, 1403, 1405, 1407, 1409), in accordance with a determination (1554) that the speed of the rotational input is of an initial speed (e.g., the initial speed of the rotational input the moment/right after the rotational input is detected), the electronic device (e.g., 600) generates (1558) the plurality of tactile outputs having an initial amplitude and the plurality of audio outputs having an initial magnitude (e.g., an initial volume) for the respective amount of rotation of the rotatable input element. In some embodiments, while detecting (1504) the rotational input, in accordance with a determination (1560) that the speed of the rotational input is of a threshold speed (e.g., the speed of the rotational input that first triggers a change in the number of tactile outputs that are generated), the electronic device (e.g., 600) generates (1564) the plurality of tactile outputs having a threshold amplitude and the plurality of audio outputs having the initial magnitude (e.g., the initial volume) for the respective amount of rotation of the rotatable input element, the threshold amplitude different from (e.g., greater than) the initial amplitude. In some embodiments, in accordance with a determination that the speed of the rotational input is of the threshold speed, the electronic device generates the plurality of tactile outputs having the initial amplitude and the plurality of audio outputs having a threshold magnitude for the respective amount of rotation of the rotatable input element, the threshold magnitude different from (e.g., greater than) the initial magnitude. In some embodiments, the tactile outputs and the audio outputs are generated by the same tactile output generators of the one or more tactile output generators.

In some embodiments, in accordance with the modification of the user interface (e.g., 1402) corresponding to a navigation of the user interface in a first direction (e.g., an upwards scrolling direction, a forwards navigation direction), the generated plurality of tactile outputs (e.g., 620) and the generated plurality of audio outputs are of a first type (e.g., plurality of tactile outputs having a first number of tactile outputs in the sequence and/or a first amplitude, plurality of audio outputs having a first number of audio outputs in the sequence and/or a first magnitude). In some embodiments, in accordance with the modification of the user interface corresponding to a navigation of the user interface in a second direction (e.g., a downwards scrolling direction, a backwards navigation direction), the generated plurality of tactile outputs and the generated plurality of audio outputs are of a second type different from the first type (e.g., plurality of tactile outputs having a second number of tactile outputs in the sequence and/or a second amplitude, plurality of audio outputs having a second number of audio outputs in the sequence and/or a second magnitude).

In some embodiments, a particular type of tactile output corresponds to a particular tactile output pattern. For example, as described in greater detail above with reference to FIGS. 5C-5H and in Table 1, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Similarly, in some embodiments, a particular type of audio output corresponds to a particular type of audio output pattern. For example, an audio output pattern specifies characteristics of an audio output, such as the magnitude/amplitude/volume of the audio output, the shape of a sound waveform of the audio output, the frequency of the audio output, and/or the duration of the audio output. When audio outputs with different audio output patterns are generated by a device (e.g., via one or more tactile output generators that move a moveable mass to generate audio outputs, via one or more speakers), the audio outputs may invoke different audio-related sensations in a user holding or touching the device or proximate to the device.

Note that details of the processes described above with respect to method 1500 (e.g., FIGS. 15A-15C) are also applicable in an analogous manner to the methods described above. For example, method 700 optionally includes one or more of the characteristics of the various methods described above with reference to method 1500. For example, the different types of tactile and audio output sequences described in method 700 can be adjusted dynamically as described in method 1500. For another example, method 900 optionally includes one or more of the characteristics of the various methods described above with reference to method 1500. For example, the tactile and audio output sequence generated during scrolling of content described in method 900 can be adjusted dynamically as described in method 1500. For another example, method 1100 optionally includes one or more of the characteristics of the various methods described above with reference to method 1500. For example, the tactile and audio output sequences generated while scrolling through user interface objects, items, or elements that align to a focal point on the display as the objects, items, or elements are being scrolled can be adjusted dynamically as described in method 1500. For another example, method 1300 optionally includes one or more of the characteristics of the various methods described above with reference to method 1500. For example, the tactile outputs generated while adjusting a time setting, as described in method 1300, can be adjusted dynamically as described in method 1500. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve sensor feedback to users, and thus enhance user experience, convenience, and efficiency, as a user navigates through content of a user interface displayed on an electronic device. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An electronic device, comprising:
   a display;
   an input element;
   one or more tactile output generators;
   one or more processors; and
   memory storing one or more programs configured to be executed by the one or more processors, the one or more programs including instructions for:
      displaying, on the display, a first portion of content;
      while displaying the first portion of content, detecting, via the input element, a first input;
      in response to detecting the first input:
         navigating through the content to display a second portion of the content; and
         generating, via the one or more tactile output generators, a first type of tactile output sequence that includes one or more tactile outputs corresponding to input detected via the input element;
      while displaying the second portion of the content, detecting, via the input element, a second input; and
      in response to detecting the second input and in accordance with a determination that the second portion of the content is a terminal portion of the content:

displaying a visual indication that the content is a terminal portion of the content; and forgoing generating, via the one or more tactile output generators, tactile output corresponding to input detected via the input element.

2. The electronic device of claim 1, wherein displaying the visual indication that the content is a terminal portion of the content comprises shifting the second portion of the content on the display.

3. The electronic device of claim 2, wherein shifting the second portion of the content on the display comprises moving the second portion of the content at least partially off of an edge of the display.

4. The electronic device of claim 1, wherein a visual characteristic of the visual indication that the content is a terminal portion of the content is based on an input metric of the second input.

5. The electronic device of claim 1, further comprising:
in response to detecting the second input and in accordance with a determination that the second portion of the content is not a terminal portion of the content:
displaying, on the display, a third portion of the content; and
generating, via the one or more tactile output generators, the first type of tactile output sequence.

6. The electronic device of claim 1, further comprising:
subsequent to detecting the second input and while displaying the second portion of the content, detecting, via the input element, a third input, wherein the third input is in a direction opposite of the second input; and
in response to detecting the third input:
navigating back through the content to display the first portion of the content; and
generating, via the one or more tactile output generators, the first type of tactile output sequence.

7. The electronic device of claim 1, further comprising:
in response to detecting the second input and in accordance with the determination that the second portion of the content is a terminal portion of the content:
generating, via the one or more tactile output generators, a third type of tactile output sequence.

8. The electronic device of claim 7, further comprising:
subsequent to detecting the second input and while displaying the second portion of the content, detecting, via the input element, a third input, wherein the second input is in a first direction and the third input is in a direction opposite of that of the second input; and
in response to detecting the third input, forgoing generating, via the one or more tactile output generators, the third type of tactile output sequence.

9. The electronic device of claim 7, wherein:
the third type of tactile output sequence corresponds to the first type of tactile output sequence,
the first type of tactile output sequence is associated with a first type of audio output sequence, and
the third type of tactile output sequence is associated with a second type of audio output sequence different from the first type of audio output sequence.

10. The electronic device of claim 1, further comprising:
while displaying the second portion of the content, detecting, on the display, a fourth input; and
in response to detecting the fourth input and in accordance with the determination that the second portion of the content is a terminal portion of the content:
displaying the visual indication that the content is a terminal portion of the content; and
forgoing generating, via the one or more tactile output generators, the first type of tactile output sequence.

11. The electronic device of claim 1, wherein the terminal portion of the content is a beginning portion of the content or an end portion of the content.

12. The electronic device of claim 1, wherein displaying the visual indication that the content is a terminal portion of the content comprises displaying a visual effect.

13. The electronic device of claim 12, wherein displaying the visual effect includes displaying an animated visual effect.

14. The electronic device of claim 12, wherein displaying the visual effect includes displaying an empty region beyond the terminal portion of the content.

15. The electronic device of claim 1, wherein:
the first input is a first portion of a continuous input; and
the second input is a second portion of the continuous input.

16. A non-transitory computer-readable storage medium storing one or more programs configured to be executed by one or more processors of an electronic device with a display, an input element, and one or more tactile output generators, the one or more programs including instructions for:
displaying, on the display, a first portion of content;
while displaying the first portion of content, detecting, via the input element, a first input;
in response to detecting the first input:
navigating through the content to display a second portion of the content; and
generating, via the one or more tactile output generators, a first type of tactile output sequence that includes one or more tactile outputs corresponding to input detected via the input element;
while displaying the second portion of the content, detecting, via the input element, a second input; and
in response to detecting the second input and in accordance with a determination that the second portion of the content is a terminal portion of the content:
displaying a visual indication that the content is a terminal portion of the content; and
forgoing generating, via the one or more tactile output generators, tactile output corresponding to input detected via the input element.

17. The non-transitory computer-readable storage medium of claim 16, wherein displaying the visual indication that the content is a terminal portion of the content comprises shifting the second portion of the content on the display.

18. The non-transitory computer-readable storage medium of claim 17, wherein shifting the second portion of the content on the display comprises moving the second portion of the content at least partially off of an edge of the display.

19. The non-transitory computer-readable storage medium of claim 16, wherein a visual characteristic of the visual indication that the content is a terminal portion of the content is based on an input metric of the second input.

20. The non-transitory computer-readable storage medium of claim 16, further comprising:
in response to detecting the second input and in accordance with a determination that the second portion of the content is not a terminal portion of the content:
displaying, on the display, a third portion of the content; and
generating, via the one or more tactile output generators, the first type of tactile output sequence.

21. The non-transitory computer-readable storage medium of claim 16, further comprising:
   subsequent to detecting the second input and while displaying the second portion of the content, detecting, via the input element, a third input, wherein the third input is in a direction opposite of the second input; and
   in response to detecting the third input:
      navigating back through the content to display the first portion of the content; and
      generating, via the one or more tactile output generators, the first type of tactile output sequence.

22. The non-transitory computer-readable storage medium of claim 16, further comprising:
   in response to detecting the second input and in accordance with the determination that the second portion of the content is a terminal portion of the content:
      generating, via the one or more tactile output generators, a third type of tactile output sequence.

23. The non-transitory computer-readable storage medium of claim 22, further comprising:
   subsequent to detecting the second input and while displaying the second portion of the content, detecting, via the input element, a third input, wherein the second input is in a first direction and the third input is in a direction opposite of that of the second input; and
   in response to detecting the third input, forgoing generating, via the one or more tactile output generators, the third type of tactile output sequence.

24. The non-transitory computer-readable storage medium of claim 22, wherein:
   the third type of tactile output sequence corresponds to the first type of tactile output sequence,
   the first type of tactile output sequence is associated with a first type of audio output sequence, and
   the third type of tactile output sequence is associated with a second type of audio output sequence different from the first type of audio output sequence.

25. The non-transitory computer-readable storage medium of claim 16, further comprising:
   while displaying the second portion of the content, detecting, on the display, a fourth input; and
   in response to detecting the fourth input and in accordance with the determination that the second portion of the content is a terminal portion of the content:
      displaying the visual indication that the content is a terminal portion of the content; and
      forgoing generating, via the one or more tactile output generators, the first type of tactile output sequence.

26. The non-transitory computer-readable storage medium of claim 16, wherein the terminal portion of the content is a beginning portion of the content or an end portion of the content.

27. The non-transitory computer-readable storage medium of claim 16, wherein displaying the visual indication that the content is a terminal portion of the content comprises displaying a visual effect.

28. The non-transitory computer-readable storage medium of claim 27, wherein displaying the visual effect includes displaying an animated visual effect.

29. The non-transitory computer-readable storage medium of claim 27, wherein displaying the visual effect includes displaying an empty region beyond the terminal portion of the content.

30. The non-transitory computer-readable storage medium of claim 16, wherein:
   the first input is a first portion of a continuous input; and
   the second input is a second portion of the continuous input.

31. A method, comprising:
   at an electronic device with a display, an input element, and one or more tactile output generators:
      displaying, on the display, a first portion of content;
      while displaying the first portion of content, detecting, via the input element, a first input;
      in response to detecting the first input:
         navigating through the content to display a second portion of the content; and
         generating, via the one or more tactile output generators, a first type of tactile output sequence that includes one or more tactile outputs corresponding to input detected via the input element;
      while displaying the second portion of the content, detecting, via the input element, a second input; and
      in response to detecting the second input and in accordance with a determination that the second portion of the content is a terminal portion of the content:
         displaying a visual indication that the content is a terminal portion of the content; and
         forgoing generating, via the one or more tactile output generators, tactile output corresponding to input detected via the input element.

32. The method of claim 31, wherein displaying the visual indication that the content is a terminal portion of the content comprises shifting the second portion of the content on the display.

33. The method of claim 32, wherein shifting the second portion of the content on the display comprises moving the second portion of the content at least partially off of an edge of the display.

34. The method of claim 31, wherein a visual characteristic of the visual indication that the content is a terminal portion of the content is based on an input metric of the second input.

35. The method of claim 31, further comprising:
   in response to detecting the second input and in accordance with a determination that the second portion of the content is not a terminal portion of the content:
      displaying, on the display, a third portion of the content; and
      generating, via the one or more tactile output generators, the first type of tactile output sequence.

36. The method of claim 31, further comprising:
   subsequent to detecting the second input and while displaying the second portion of the content, detecting, via the input element, a third input, wherein the third input is in a direction opposite of the second input; and
   in response to detecting the third input:
      navigating back through the content to display the first portion of the content; and
      generating, via the one or more tactile output generators, the first type of tactile output sequence.

37. The method of claim 31, further comprising:
   in response to detecting the second input and in accordance with the determination that the second portion of the content is a terminal portion of the content:
      generating, via the one or more tactile output generators, a third type of tactile output sequence.

38. The method of claim 37, further comprising:
   subsequent to detecting the second input and while displaying the second portion of the content, detecting, via the input element, a third input, wherein the second input is in a first direction and the third input is in a direction opposite of that of the second input; and in response to detecting the third input, forgoing generating, via the one or more tactile output generators, the third type of tactile output sequence.

39. The method of claim 37, wherein:

the third type of tactile output sequence corresponds to the first type of tactile output sequence, the first type of tactile output sequence is associated with a first type of audio output sequence, and the third type of tactile output sequence is associated with a second type of audio output sequence different from the first type of audio output sequence.

40. The method of claim 31, further comprising:

while displaying the second portion of the content, detecting, on the display, a fourth input; and in response to detecting the fourth input and in accordance with the determination that the second portion of the content is a terminal portion of the content:

displaying the visual indication that the content is a terminal portion of the content; and forgoing generating, via the one or more tactile output generators, the first type of tactile output sequence.

41. The method of claim 31, wherein the terminal portion of the content is a beginning portion of the content or an end portion of the content.

42. The method of claim 31, wherein displaying the visual indication that the content is the terminal portion of a content comprises displaying a visual effect.

43. The method of claim 42, wherein displaying the visual effect includes displaying an animated visual effect.

44. The method of claim 42, wherein displaying the visual effect includes displaying an empty region beyond the terminal portion of the content.

45. The method of claim 31, wherein:

the first input is a first portion of a continuous input; and the second input is a second portion of the continuous input.

\* \* \* \* \*